US012252865B2

(12) United States Patent
Torii et al.

(10) Patent No.: US 12,252,865 B2
(45) Date of Patent: Mar. 18, 2025

(54) WORKING MACHINE

(71) Applicant: KUBOTA CORPORATION, Osaka (JP)

(72) Inventors: Yoshinori Torii, Sakai (JP); Toyoharu Hashima, Sakai (JP); Akira Komukai, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 649 days.

(21) Appl. No.: 17/553,454

(22) Filed: Dec. 16, 2021

(65) Prior Publication Data
US 2022/0105783 A1 Apr. 7, 2022

Related U.S. Application Data

(63) Continuation of application No. PCT/JP2020/024980, filed on Jun. 25, 2020.

(30) Foreign Application Priority Data

Jun. 26, 2019 (JP) .................................. 2019-118604
Jun. 26, 2019 (JP) .................................. 2019-118605
(Continued)

(51) Int. Cl.
*E02F 9/08* (2006.01)
*B60N 2/38* (2006.01)
(Continued)

(52) U.S. Cl.
CPC .............. *E02F 9/0891* (2013.01); *B60N 2/38* (2013.01); *B62D 25/10* (2013.01); *B62D 25/12* (2013.01);
(Continued)

(58) Field of Classification Search
CPC ......... E02F 9/0891; E02F 9/16; E02F 9/0833; B62D 25/12; B62D 25/10
(Continued)

(56) References Cited

U.S. PATENT DOCUMENTS 8,191,960 B2 * 6/2012 Schmitz .................... B60J 10/32
296/193.11
8,528,681 B2 * 9/2013 Fujiwara ............... E02F 9/0891
180/69.2
(Continued)

FOREIGN PATENT DOCUMENTS

JP 11-280117 A 10/1999
JP 3148638 B2 3/2001
(Continued)

OTHER PUBLICATIONS

International Search Report for PCT/JP2020/024980 (PCT/ISA/210) mailed on Sep. 15, 2020.
(Continued)

*Primary Examiner* — Jason S Morrow
(74) *Attorney, Agent, or Firm* — Birch, Stewart, Kolasch & Birch, LLP

(57) ABSTRACT

A working machine includes: a machine body; a frame member; a cover member; and a hinge with which the cover member is swingably supported on the frame member, a connector plate attached to the hinge, the hinge includes: a movable arm which is supported on the frame member such that the movable arm is swingable up and down; a mounting plate which is fixed on a swinging end of the movable arm; the mounting plate has a hole for insertion of a mounting bolt, the hole being an elongated hole including: a mounting area through which the mounting bolt is passed to attach the connector plate to the mounting plate; and a guiding area which extends from the mounting area to guide the mounting bolt therethrough, and the guiding area extends upward
(Continued)

from the mounting area when the movable arm is in an upward swung position.

15 Claims, 116 Drawing Sheets

(30) Foreign Application Priority Data

| Jun. 26, 2019 | (JP) | ................................. 2019-118606 |
|---|---|---|
| Jun. 26, 2019 | (JP) | ................................. 2019-118607 |
| Jun. 26, 2019 | (JP) | ................................. 2019-118608 |
| Jun. 26, 2019 | (JP) | ................................. 2019-118609 |
| Jun. 26, 2019 | (JP) | ................................. 2019-118610 |
| Jun. 26, 2019 | (JP) | ................................. 2019-118611 |
| Jun. 26, 2019 | (JP) | ................................. 2019-118612 |
| Jun. 26, 2019 | (JP) | ................................. 2019-118613 |

(51) Int. Cl.
  *B62D 25/10* (2006.01)
  *B62D 25/12* (2006.01)
  *E02F 9/16* (2006.01)
  *B60N 2/06* (2006.01)
  *F16L 5/02* (2006.01)

(52) U.S. Cl.
  CPC ............. *E02F 9/0833* (2013.01); *E02F 9/16* (2013.01); *B60N 2/06* (2013.01); *F16L 5/02* (2013.01)

(58) Field of Classification Search
  USPC ........................... 296/190.08, 190.11, 193.11
  See application file for complete search history.

(56) References Cited

U.S. PATENT DOCUMENTS

| 9,683,348 B2* | 6/2017 | Mitsuda | ................. B62D 63/02 |
| 10,207,749 B2* | 2/2019 | Krijnen | ................. B62D 29/043 |
| 11,313,101 B2* | 4/2022 | Umizaki | ................ E02F 9/0891 |
| 12,012,721 B2* | 6/2024 | Kim | ...................... E02F 9/0891 |
| 12,054,910 B2* | 8/2024 | Soejima | ................ E02F 9/0841 |
| 2010/0122862 A1 | 5/2010 | Fujiwara et al. | |
| 2019/0024346 A1 | 1/2019 | Nishi | |
| 2023/0039973 A1* | 2/2023 | Kumeuchi | .............. E02F 3/325 |
| 2024/0003173 A1* | 1/2024 | Kim | ...................... B62D 25/12 |
| 2024/0044105 A1* | 2/2024 | Miki | ..................... E02F 9/0866 |

FOREIGN PATENT DOCUMENTS

| JP | 2005-213816 A | 8/2005 |
|---|---|---|
| JP | 2006-103666 A | 4/2006 |
| JP | 3881170 B2 | 2/2007 |
| JP | 2007-92278 A | 4/2007 |
| JP | 2009-7764 A | 1/2009 |
| JP | 2011-116253 A | 6/2011 |
| JP | 5061085 B2 | 10/2012 |
| JP | 5154467 B2 | 2/2013 |
| JP | 2013-63774 A | 4/2013 |
| JP | 5451668 B2 | 3/2014 |
| JP | 6002091 B2 | 10/2016 |
| JP | 2016-188063 A | 11/2016 |
| JP | 2017-179738 A | 10/2017 |
| JP | 2019-11572 A | 1/2019 |
| JP | 2019-56299 A | 4/2019 |
| WO | WO 2017/170900 A1 | 10/2017 |

OTHER PUBLICATIONS

Written Opinion of the International Searching Authority for PCT/JP2020/024980 (PCT/ISA/237) mailed on Sep. 15, 2020.
English translation of the Japanese Office Action for Japanese Application No. 2019-118608, dated Jul. 19, 2022.
English translation of the Japanese Office Action for Japanese Application No. 2019-118613, dated Jul. 19, 2022.

* cited by examiner

WORKING MACHINE

CROSS REFERENCE TO RELATED APPLICATIONS

This application is a continuation application of International Application No. PCT/JP2020/024980, filed on Jun. 25, 2020, which claims the benefit of priority to Japanese Patent Application No. 2019-118610, filed on Jun. 26, 2019, Japanese Patent Application No. 2019-118611, filed on Jun. 26, 2019, Japanese Patent Application No. 2019-118604, filed on Jun. 26, 2019, Japanese Patent Application No. 2019-118605, filed on Jun. 26, 2019, Japanese Patent Application No. 2019-118606, filed on Jun. 26, 2019, Japanese Patent Application No. 2019-118607, filed on Jun. 26, 2019, Japanese Patent Application No. 2019-118608, filed on Jun. 26, 2019, Japanese Patent Application No. 2019-118609, filed on Jun. 26, 2019, Japanese Patent Application No. 2019-118612, filed on Jun. 26, 2019, and Japanese Patent Application No. 2019-118613, filed on Jun. 26, 2019. The entire contents of each of these applications are hereby incorporated herein by reference.

BACKGROUND OF THE INVENTION

1. Field of the Invention

The present invention relates to a working machine such as a backhoe.

2. Description of the Related Art

Working machines disclosed in Japanese Unexamined Patent Application Publication No. 2007-92278, Japanese Unexamined Patent Application Publication No. 2019-11572, Japanese Unexamined Patent Application Publication No. 2005-213816, Japanese Unexamined Patent Application Publication No. 2013-63774, Japanese Unexamined Patent Application Publication No. 2016-188063, Japanese Unexamined Patent Application Publication No. 2011-116253, Japanese Unexamined Patent Application Publication No. 2019-56299, Japanese Unexamined Patent Application Publication No. H11-280117, and Japanese Patent No. 5451668 are known.

The working machine disclosed in Japanese Unexamined Patent Application Publication No. 2007-92278 includes a frame member supported on a machine body and a cover member which covers apparatus(es) mounted on the machine body is supported with a hinge on the frame member such that the cover member is swingable up and down.

The working machine disclosed in Japanese Unexamined Patent Application Publication No. 2019-11572 includes a hood which covers the rear side of a prime mover mounted on a rear portion of a machine body and a cover member which is disposed laterally outward of the prime mover and which covers apparatus(es) mounted on the machine body.

The working machine disclosed in Japanese Unexamined Patent Application Publication No. 2005-213816 includes a floor step that defines the floor surface of a machine body.

In the working machine disclosed in Japanese Unexamined Patent Application Publication No. 2013-63774, an air conditioner main body is provided in a cabin mounted on a machine body. The cabin has, provided therein, an outside air intake duct for intake of outside air into the air conditioner main body.

In the working machine disclosed in Japanese Unexamined Patent Application Publication No. 2016-188063, an air conditioner main body and a duct connected to the air conditioner main body are provided within the interior of a cabin mounted on a machine body. The duct includes an air outlet portion through which conditioned air sent from the air conditioner main body is discharged into the cabin.

In the working machine disclosed in Japanese Unexamined Patent Application Publication No. 2011-116253, a console cover is disposed at a lateral side of an operator's seat. A lever member is disposed on the console cover.

In the working machine disclosed in Japanese Unexamined Patent Application Publication No. 2019-56299, a seat base is attached to a floor step which defines a floor surface at an upper portion of a machine body and an operator's seat is attached to the seat base. Furthermore, consoles are provided at opposite sides of the operator's seat.

In the working machine disclosed in Japanese Unexamined Patent Application Publication No. H11-280117, a rail device which adjusts the position of an operator's seat along a front-rear direction is provided between the operator's seat and a seat base which supports the operator's seat.

The working machine disclosed in Japanese Unexamined Patent Application Publication No. 2016-188063 includes an engine mounted on a machine body.

The working machine disclosed in Japanese Patent No. 5451668 includes a grille which covers the rear side of an engine mounted on a machine body such that the grille is openable and closable, and a camera which captures an image of an area rearward of the machine body is attached to the grille. The camera is configured such that the rear end of a weight provided below the grille is included within the field of view of the camera.

SUMMARY OF THE INVENTION

In the case where the cover member is a heavy object, the cover member is hoisted with a crane and attached to a hinge. In such a case, after the cover member is hoisted with a crane, if there is some component in the vicinity of the position to which the cover member is to be lowered to be attached to the hinge, it would be necessary to attach the cover member while preventing interference with that component. This necessitates precise operation of the crane and a covering (protective covering) on the component, and makes it difficult to quickly mount the cover member.

Furthermore, in the case where the hood and the cover member are openable and closable, a gap is provided between the hood and the cover member in their closed state so that they will not interfere with each other. However, if the gap is not parallel, there is an issue of poor external appearance quality.

Furthermore, in the case where a hydraulic hose and a harness of electrical wires are routed from the lower surface side to the upper surface side of the floor step, grommets for passage of the hydraulic hose and the harness are attached to the floor step. However, there is an issue in that, if the hydraulic hose and the harness are fixed with separate grommets, much space is occupied. There is another issue in that, when the harness is passed through the grommet, the harness is difficult to bend and difficult to mount.

Furthermore, it is difficult to mount the outside air intake duct within the cabin after the cabin is mounted on the machine body, and the mounting work takes time.

Moreover, conventionally, it takes time to mount the duct and an interior cover which covers the duct after the cabin is mounted on the machine body.

Furthermore, in the case where an operation unit is provided forward of the lever member on a front portion of the console cover and a wire member connected to the operation unit is routed through the console cover from the rear portion to the front portion, there is an issue that it takes time to route the wire member while avoiding the lever member, resulting in poor mountability of the console cover.

Furthermore, in the case where the operator's seat and the consoles at the opposite sides of the operator's seat are supported on the seat base such that the positions of the operator's seat and the consoles can be adjusted together along the front-rear direction, it is necessary to provide extra length for the harnesses to move in the routes of the harnesses routed to both consoles.

Furthermore, there is an issue in that, if the surface to which the rail device is attached has poor flatness due to welding distortion, the rail device does not slide well.

Furthermore, in the case where pipes such as a hose are routed below a partition wall member that separates an engine room and an area diagonally upward and forward of the engine room, a clamp which clamps the hose is provided below the partition wall member. However, it is necessary to lower the partition wall member to detach the clamp when replacing hoses, making the hose replacement work very burdensome.

With the working machine disclosed in Japanese Patent No. 5451668, the camera is attached inside the grille. Therefore, there is an issue in that the angle of the camera is difficult to set (it is difficult to set the shooting angle at which an image of the subject is captured) and the angle setting is burdensome.

In view of the above-described issues, an object of the present invention is to make it easy to mount a cover member.

Another object of the present invention is to provide a working machine which makes it possible to prevent deterioration of external appearance quality.

Another object of the present invention is to provide a working machine including a grommet body which is mounted within a small space and which is easy to mount.

Another object of the present invention is to improve mountability of an outside air intake duct.

Another object of the present invention is to provide a working machine which makes it possible to reduce the time taken for the work of mounting a duct and an interior cover covering the duct to be done.

Another object of the present invention is to provide a working machine which makes it possible to efficiently mount a console cover.

Another object of the present invention is to, in a working machine in which the positions of an operator's seat and consoles disposed on at opposite sides of the operator's seat are adjustable together in a front-rear direction, provide extra lengths for harnesses routed to the consoles to move.

Another object of the present invention is to improve the flatness of a surface to which a rail device is attached.

Another object of the present invention is to provide a working machine in which a clamp which clamps a pipe or the like can be detached without lowering a partition wall member.

Another object of the present invention is to provide a working machine which makes it possible to easily set the angle of a camera.

A working machine according to an aspect of the present invention includes a machine body, a frame member supported on the machine body, a cover member which covers one or more apparatuses mounted on the machine body, and a hinge with which the cover member is swingably supported on the frame member, wherein the cover member includes a connector plate attached to the hinge, the hinge includes a movable arm which is supported on the frame member such that the movable arm is swingable up and down, a mounting plate which is fixed on a swinging end of the movable arm, and a mounting bolt with which the connector plate is attached to the mounting plate, the mounting plate has a hole for insertion of the mounting bolt, the hole being an elongated hole including a mounting area through which the mounting bolt is passed to attach the connector plate to the mounting plate, and a guiding area which extends from the mounting area to guide the mounting bolt therethrough, and the guiding area extends upward from the mounting area when the movable arm is in an upward swung position.

The working machine further includes a cabin disposed at a lateral side of the cover member, and a fixed cover which covers a side of the cover member facing the cabin, wherein the guiding area extends in a direction away from the cabin when the cover member is in a closed position.

The hinge includes another mounting bolt other than the mounting bolt, the mounting plate has another hole for insertion of the other mounting bolt, and the other hole is equal in length to the mounting area.

The working machine further includes a damper to bias the cover member in a direction in which the cover member is opened.

The working machine further includes a cabin disposed at a lateral side of the cover member, and a fixed cover which covers a side of the cover member facing the cabin, wherein the damper is positioned such that the damper causes the cover member in an open position to move along the guiding area to cause the cover member to be displaced in a direction away from the cabin.

The hinge includes a hinge bracket attached to the frame member and a hinge shaft with which the movable arm is supported on the hinge bracket such that the movable arm is swingable up and down about an axis extending along a machine body front-rear direction, and the connector plate is disposed in an upper and machine-body-inward portion of an interior space of the cover member in a closed position and is attached to the mounting plate such that the connector plate is superimposed on the mounting plate.

The working machine further includes a frame body which is provided inside the cover member and which supports the cover member, wherein the frame body includes a first rod member which extends in a machine body-forward direction from the connector plate along the cover member, a second rod member which extends in a machine body-outward direction from the connector plate along the cover member, and a third rod member which extends in a machine body-rearward direction from the connector plate along the cover member.

The cover member includes a main cover and a sub-cover which is attached to the main cover and which differs in color from the main cover.

The working machine further includes a prime mover mounted on a rear portion of the machine body, and a hood which covers a rear side of the prime mover and which is configured to be opened and closed, wherein the cover member is configured to be opened and closed, is disposed at a lateral side of the hood and laterally outward of the prime mover, and includes an insertion edge portion which is one of opposite edge portions that is closer to the hood than the other, and which is located within the hood when the hood and the cover member are in a closed position.

A working machine according to another aspect of the present invention includes a machine body, a prime mover mounted on a rear portion of the machine body, a hood which covers a rear side of the prime mover and which is configured to be opened and closed, and a cover member which is configured to be opened and closed, which is disposed laterally outward of the prime mover, which covers one or more apparatuses mounted on the machine body, and which is disposed at a lateral side of the hood, wherein the cover member includes an insertion edge portion which is one of opposite edge portions that is closer to the hood than the other and which is located within the hood when the hood and the cover member are in a closed position.

The hood has an upper portion pivotally supported on an axis extending along a machine body-width direction about which the hood is swingable up and down, and the cover member has an upper portion pivotally supported on an axis extending along a machine body front-rear direction about which the cover member is swingable up and down.

The working machine further includes a seal abutment member provided inside the hood and the cover member, wherein the hood has a first stay wall which is located at a position inward of the insertion edge portion with respect to the machine body and to which a first sealing member is attached, the cover member has a second stay wall which is located at a position outward of the insertion edge portion with respect to the machine body and to which a second sealing member is attached, and the seal abutment member has a first abutment surface on which the first sealing member abuts when the hood is in the closed position and a second abutment surface on which the second sealing member abuts when the cover member is in the closed position.

The hood includes a hood edge portion which extends toward the prime mover, the hood edge portion being one of opposite end portions that is closer to the cover member than the other, and the insertion edge portion is located within the hood on the same side of the hood edge portion as the prime mover.

The working machine further includes a support frame which extends upward from the machine body within the hood and which supports the hood, a cabin disposed forward of the hood, and a fixed hood which is disposed between the cabin and the hood, wherein the fixed hood is attached to the support frame and includes a third sealing member on which an upper front portion of the hood abuts.

The support frame includes a plurality of leg bodies, an upper plate which is fixed to upper portions of the plurality of leg bodies and which is for placement of a rear portion of the cabin, and a plate member which is fixed to a rear portion of the upper plate such that the plate member projects upward, the fixed hood includes an upright plate part which is disposed forward of the plate member and rearward of the cabin, a fourth sealing member which is attached to a lower portion of the upright plate part and which abuts on the upper plate, and an upper plate part which extends rearward from an upper portion of the upright plate part beyond the plate member, and the third sealing member is attached to a rear portion of the upper plate part.

A working machine according to a further aspect of the present invention includes a floor step which defines a floor surface, and a grommet body which is attached to the floor step and which is for passage of a harness of electrical wires and a hydraulic hose, wherein the grommet body is divided into a grommet main body which is composed of a part of a harness grommet portion for passage of the harness and a hose grommet portion for passage of the hydraulic hose which are integral with each other, and a grommet part having another part which together with the part forms the harness grommet portion.

The harness grommet portion is divided into the part and the other part such that a harness through-hole for passage of the harness is divided into two.

The working machine further includes an operator's seat mounted on the floor step such that the operator's seat is adjustable in position along a front-rear direction, and pilot valves to which the hydraulic hose is connected, wherein the pilot valves move along the front-rear direction together with the operator's seat, the hose grommet portion includes a corrugated portion in a corrugated form which expands and contracts along a top-bottom direction, and the hose grommet portion includes a clamping member to clamp a part of the hose grommet portion which part is located higher than the corrugated portion toward the hydraulic hose.

The floor step includes a main plate which has an opening, and a cover plate which is detachably attached to the main plate and which closes the opening, and the grommet body has a holding groove which fits an edge portion of the opening and is fixed to the main plate with the cover plate.

The holding groove is a continuous groove formed in the grommet main body and the grommet part, the grommet body has an insertion groove which is a continuous groove formed in the grommet main body and the grommet part, and the cover plate has an insertion portion to be inserted into the insertion groove.

The grommet part is pressed against the grommet main body from a machine body-forward side toward a machine body-rearward side, and the cover plate is inserted into the insertion groove from the machine body-forward side and attached to the main plate.

The working machine further includes an operator's seat mounted on the floor step, wherein the grommet body is disposed on one of opposite sides of the operator's seat in a machine body-width direction such that the harness grommet portion and the hose grommet portion are arranged along the machine body-width direction, and the hose grommet portion is provided on the opposite side of the harness grommet portion from the operator's seat.

A working machine according to a further aspect of the present invention includes a machine body, a cabin mounted on the machine body, an air conditioner main body provided in the cabin, an outside air intake duct for intake of outside air into the air conditioner main body, and an engaging portion configured to engage with the outside air intake duct, wherein the cabin has a mounting opening for attachment of an outside air-entrance portion of the outside air intake duct, the outside air intake duct is expandable and contractable, and the engaging portion is configured to engage with the outside air intake duct in a contracted state in which the outside air intake duct is contracted in a direction away from the mounting opening.

The mounting opening has a size which allows access to the outside air intake duct engaged with the engaging portion from outside of the cabin in order to attach the outside air intake duct to the mounting opening.

The cabin includes a wall body which has the mounting opening, the outside air intake duct includes a body portion formed of an elastic body and expandable and contractable, and an outside-air-entrance-side connection portion to be connected to a part of the wall body that has the mounting opening with the body portion in an expanded state, the outside-air-entrance-side connection portion includes an outside air intake inserted in the mounting opening and a flange which protrudes from the outside air intake to abut on an outer surface of the wall body, and the flange is configured to be taken out of the wall body through the mounting opening.

The cabin includes a cover wall which is disposed outward of the wall so as to face the wall body and which covers the outside-air-entrance-side connection portion and an outside air inlet which is defined by the wall body and the cover wall and which is for intake of outside air, and the outside-air-entrance-side connection portion includes a partition wall which projects from the flange and which abuts on the cover wall at portions upward and forward of the outside air intake.

The working machine further includes a main harness routed on the machine body, a cabin harness routed on the cabin, a main-harness-side connector which is attached to the main harness and which is disposed in the vicinity of the mounting opening within the cabin, and a cabin-harness-side connector which is attached to the cabin harness and which is configured to be connected to the main-harness-side connector through the mounting opening from outside of the cabin.

The working machine further includes a floor step which defines a floor surface at an upper portion of the machine body and to which the air conditioner main body is attached, a seat base which is attached to the floor step and to which the main harness is attached, an air conditioner harness connected to the air conditioner main body, an AC connector on one side attached to the air conditioner harness, an AC connector on an opposite side which is attached to the main harness and which is connected to the AC connector on one side, and an engagement member which is provided on the air conditioner main body and which is for temporary placement of the AC connector on one side before the seat base is attached to the floor step.

A working machine according to a further aspect of the present invention includes a machine body, a cabin mounted on the machine body, a floor step which defines a floor surface at an upper portion of the machine body, an air conditioner main body attached to the floor step, a first flow duct attached to the cabin and including a first air outlet through which conditioned air from the air conditioner main body is discharged, a first connection duct to guide the conditioned air from the air conditioner main body to the first flow duct, and an interior cover which covers the first flow duct and the first connection duct within an interior of the cabin, wherein the first connection duct is detachably attached to the first flow duct, and the interior cover includes a first interior cover which is a separate part that corresponds to the first connection duct.

The working machine further includes a second flow duct which includes a second air outlet through which conditioned air from the air conditioner main body is discharged, and a second connection duct which connects the second flow duct and the first connection duct, wherein the second connection duct has a first connection portion connected to the second flow duct by being lowered from above and a second connection portion connected to the first connection duct by being lowered from above.

The second flow duct includes a third connection portion which is open in a horizontal direction, the first connection duct includes a fourth connection portion which is open in an upward direction, the first connection portion is open in a/the horizontal direction and is brought into communication with the third connection portion by being inserted into the third connection portion from above, and the second connection portion is open in a downward direction and is brought into communication with the fourth connection portion by fitting the fourth connection portion from above.

The first connection duct includes a main duct to which the second connection duct is connected and a sub-duct connected to the first flow duct, and the sub-duct is configured to move toward and away from the first flow duct.

The working machine further includes a third connection duct which connects the main duct and the air conditioner main body, the third connection duct includes a first duct portion connected to the air conditioner main body and a second duct portion connected to the main duct, and the second duct portion is configured to move toward and away from the main duct.

The interior cover includes a second interior cover which is a separate part that corresponds to the second connection duct. The working machine further includes an operator's seat, a seat base on which the operator's seat is mounted and which is attached to the floor step, a harness of electrical wires supported on the seat base, and an apparatus to which the harness is connected, wherein the apparatus is disposed above the first connection duct and is covered with the first interior cover.

A working machine according to a further aspect of the present invention includes an operator's seat, a first console cover disposed at a lateral side of the operator's seat, a second console cover disposed at the opposite side of the first console cover from the operator's seat, a wire member which is connected to an operation unit provided in a front portion of the second console cover, and a lever member which is disposed rearward of the operation unit, wherein the wire member is routed within the second console cover in a rear-to-front direction, and the second console cover is disposed at a lateral side of the first console cover by being lowered from above such that the wire member passes between the lever member and the first console cover.

The first console cover includes a wire receiver to receive the wire member from below.

The wire receiver includes a receiver wall located below the wire member and a lateral wall which extends upward from the receiver wall at a machine body-outward side of the wire member.

The working machine further includes a valve which is disposed below the first console cover and which is to be operated with the lever member, and a lever stay which connects the valve and the lever member, wherein the lever stay includes a valve mounting portion which is attached to the valve and a lever fixing portion which extends from the valve mounting portion toward the lever member through an area below the wire receiver and to which the lever member is fixed.

The second console cover has a recessed groove which is open in a machine body-outward direction and which is defined by a front surface portion located forward of the lever member, a rear surface portion located rearward of the lever member, and a side surface portion located at a machine body-inward side of the lever member, and the lever member is disposed in the recessed groove.

A working machine according to a further aspect of the present invention incudes a machine body, a floor step which defines a floor surface at an upper portion of the machine body and which has an opening, a seat base attached to the floor step, a movable body supported on the seat base such that the movable body is adjustable in position along a front-rear direction, an operator's seat mounted on the movable body, consoles which are disposed at opposite sides of the operator's seat and which are attached to the movable body, and a harness of electrical wires, wherein the harness includes a first harness portion which is routed upward from a lower surface side of the floor step through the opening at the same side of the seat base as the console that is one of the consoles, and a second harness portion and a third harness portion each of which branches off from the first harness portion at a position lower than an upper edge of the seat base, the second harness portion extends upward at the same side of the seat base as the console that is one of the consoles and is routed to the console that is the one of the consoles, the third harness portion extends between the upper edge of the seat base and an upper surface of the floor step toward the console that is the other of the consoles, extends upward at the opposite side of the seat base 83, and is routed to the console that is the other of the consoles.

The working machine further includes a prime mover provided rearward of the operator's seat, and a partition wall member which separates a prime mover chamber housing the prime mover and an area where the operator's seat is, wherein the seat base includes a top panel which is disposed above the floor step with a space therebetween and which supports the movable body, and the third harness portion is routed in an area forward of the partition wall member and below a rear portion of the top panel.

The movable body includes a support on which the operator's seat is supported such that the operator's seat is adjustable in position along the front-rear direction, and a slide frame which is supported on the seat base such that the slide frame is adjustable in position along the front-rear direction, the slide frame includes a main mounting portion for attachment of the support, one mounting portion which extends from the main mounting portion in a machine body-width direction and which is for attachment of the console that is the one of the consoles, and an opposite mounting portion which extends from the main mounting portion in an opposite machine body-width direction and which is for attachment of the console that is the other of the consoles, the second harness portion extends upward at a machine body-outward side of the one mounting portion and is routed to the console that is the one of the consoles, and the third harness portion extends upward at a machine body-outward side of the opposite mounting portion and is routed to the console that is the other of the consoles.

The working machine further includes a hydraulic hose which is routed upward from the lower surface side of the floor step through the opening at the same side of the seat base as the console that is the one of the consoles and then is routed to the console that is the other of the consoles, wherein the hydraulic hose is routed from one side to the opposite side behind the movable body.

The harness includes a fourth harness portion and a fifth harness portion branching off from the second harness portion, the second harness portion includes a main portion which extends from the first harness portion toward a portion at which the fourth harness portion and the fifth harness portion branch off and a routed-to-console portion which extends upward from a portion at which the routed-to-console portion branches off from the main portion and is routed to the console that is the one of the consoles, and the routed-to-console portion, the fourth harness portion, and the fifth harness portion are arranged along a front-rear direction.

The working machine further includes a cabin mounted on the machine body, a hydraulic hose which is routed upward from the lower surface side of the floor step through the opening at the same side of the seat base as the console that is the one of the consoles, and an interior cover which is disposed above the hydraulic hose within the cabin, wherein the console that is the one of the consoles includes a console cover which is disposed above the hydraulic hose and which is positioned such that the console cover overlaps the hydraulic hose and the interior cover when seen from an operator seated on the operator's seat.

A working machine according to a further aspect of the present invention includes an operator's seat, a top panel which supports the operator's seat, a rail device to adjust a position of the operator's seat in a front-rear direction, and a rail mounting plate which has a mounting surface for attachment of the rail device, wherein the top panel has a mounting hole to accommodate the rail mounting plate, and the rail mounting plate is inserted in the mounting hole and fixed by welding to the top panel.

The rail mounting plate is composed of a thick plate which is greater in plate thickness than the top panel, and is inserted in the mounting hole and fixed by welding so as to project upward from the top panel.

The rail mounting plate is substantially twice as great in plate thickness as the top panel, and includes an upper portion projecting upward from the top panel.

The working machine further includes a mounting bolt and a mounting nut to attach the rail device, wherein the rail device includes a lower rail attached to the rail mounting plate and an upper rail supported on the lower rail such that the upper rail is moveable along the front-rear direction, the mounting nut is fixed to a lower surface of the rail mounting plate, and the mounting bolt passes through the lower rail and the rail mounting plate from above and is screwed into the mounting nut.

The working machine further includes a floor step provided below the operator's seat, and a rear support leg which supports a rear portion of the top panel, wherein the rear support leg includes a support plate which is fixed to a lower surface of the top panel such that the support plate intersects the mounting hole in plan view and a leg part which is fixed to the support plate and which is attached to the floor step, and a lower surface of the rail mounting plate is located higher than the lower surface of the top panel.

The working machine further includes a movable body which is supported with the rail device on the top panel such that the movable body is adjustable in position along a front-rear direction, and another rail device which supports the operator's seat on the movable body such that the operator's seat is adjustable in position along the front-rear direction.

A working machine according to a further aspect of the present invention includes a machine body, a prime mover mounted on the machine body, a partition wall member which separates a prime mover chamber housing the prime mover E1 and an area located diagonally upward and forward of the prime mover chamber, a partition plate which is disposed below the partition wall member and which partitions a lower front portion of the prime mover chamber, and a clamp which is provided on an upper portion of the partition plate and which clamps pipes routed from the prime mover chamber to an area located forward of the partition wall member, wherein the partition wall member has an access opening which is located above the clamp and which allows access from the area forward of the partition wall member to a side of the clamp facing the prime mover chamber, and the clamp is configured to be detached toward the prime mover chamber.

The working machine further includes a stay fixed to a back surface of the partition plate and a holding member which is attached to the stay from above and which holds the clamp.

The clamp includes an upper first member which abuts on the partition plate from rear and which is movable rearward and a lower second member which is engaged with the partition plate and which together with the first member clamps the pipes, and the holding member includes a holding portion to hold the first member and a restricting portion to restrict rearward movement of the first member.

The partition plate has a cutout recess which is in the form of a groove having an open top and which has a bottom surface, one side surface extending upward from one edge of the bottom surface, and an opposite side surface extending upward from the opposite edge of the bottom surface, the clamp is inserted in the cutout recess and has a first recess in a side facing the one side surface, a second recess in a side facing the opposite side surface, and a third recess in a side facing the bottom surface, the first recess has a first forward-facing surface which abuts on a back surface of a first wall portion having the one side surface, a first downward-facing surface which extends forward from an upper edge of the first forward-facing surface and abuts on an upper surface of the first wall portion, and a first side-facing surface which extends forward from one of opposite edges of the first forward-facing surface that is closer to the one side surface than the other and abuts on the one side surface, the second recess has a second forward-facing surface which abuts on a back surface of a second wall portion having the opposite side surface, a second downward-facing surface which extends forward from an upper edge of the second forward-facing surface and abuts on an upper surface of the second wall portion, and a second side-facing surface which extends forward from one of opposite edges of the second forward-facing surface that is closer to the opposite side surface than the other and abuts on the opposite side surface, the third recess has a third forward-facing surface which connects together lower portions of the first forward-facing surface and the second forward-facing surface and which abuts on a back surface of a third wall portion having the bottom surface, a third downward-facing surface which extends forward from an upper edge of the third forward-facing surface and which abuts on the bottom surface, and a fourth downward-facing surface which is located forward of the third downward-facing surface and which is located lower than the third downward-facing surface, and the clamp is divided by a dividing surface which divides each of the first and second recesses into upper and lower parts.

The clamp includes a plurality of pipe passage portions for passage of the pipes and is divided into upper and lower parts by a dividing surface which divides each of the plurality of pipe passage portions into two, and the plurality of pipe passage portions are provided such that adjacent ones of the plurality of pipe passage portions are displaced from each other along a top-bottom direction.

The working machine further includes a cabin provided on the opposite side of the partition wall member from the prime mover chamber, and an air conditioner main body provided in the cabin, wherein the clamp clamps the pipes connected to the air conditioner main body.

A working machine according to a further aspect of the present invention includes a machine body, a prime mover mounted on a rear portion of the machine body, a hood which covers a rear side of the prime mover such that the hood is openable and closable, a weight provided below the hood, and a camera configured to capture an image of an area rearward of the machine body, wherein the camera is attached to an outside of the hood such that an angle of the camera is adjustable to include the weight 46 within a field of view of the camera.

The working machine further includes a camera cover which covers the camera, and the camera cover is attached from an inside of the hood.

The hood includes a mount which includes a sign mounting portion configured for attachment of a sign member, the mount includes a camera mounting portion for attachment of the camera, and the camera cover is configured to be attached to the sign mounting portion instead of the sign member.

The hood includes an upper wall and an extension wall which extends from a rear edge of the upper wall and slopes rearward in a downward direction, and the mount is provided on the extension wall.

The camera cover includes another mount for attachment of the sign member.

The camera cover includes a cover main body which covers the camera, a cover bracket for attachment to the sign mounting portion, a protruding part which extends from the cover bracket in machine body-width directions, and a trim which is attached to the protruding part and which abuts on the hood.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 38 is a perspective view of a hood and the like.

DETAILED DESCRIPTION OF THE PREFERRED EMBODIMENTS

Figure 1:
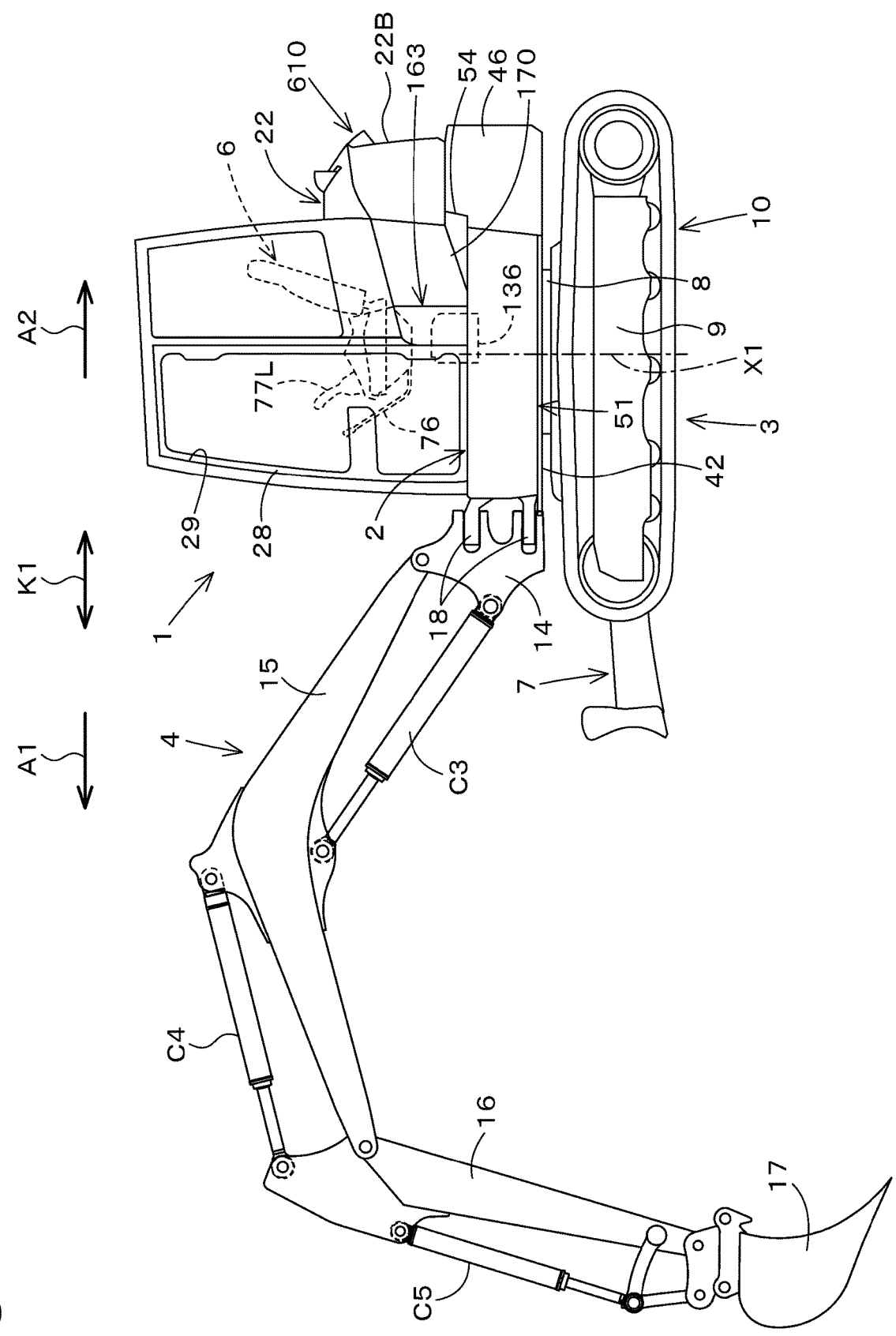
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses an embodiment of the present invention with reference to drawings as appropriate.

Figure 2:
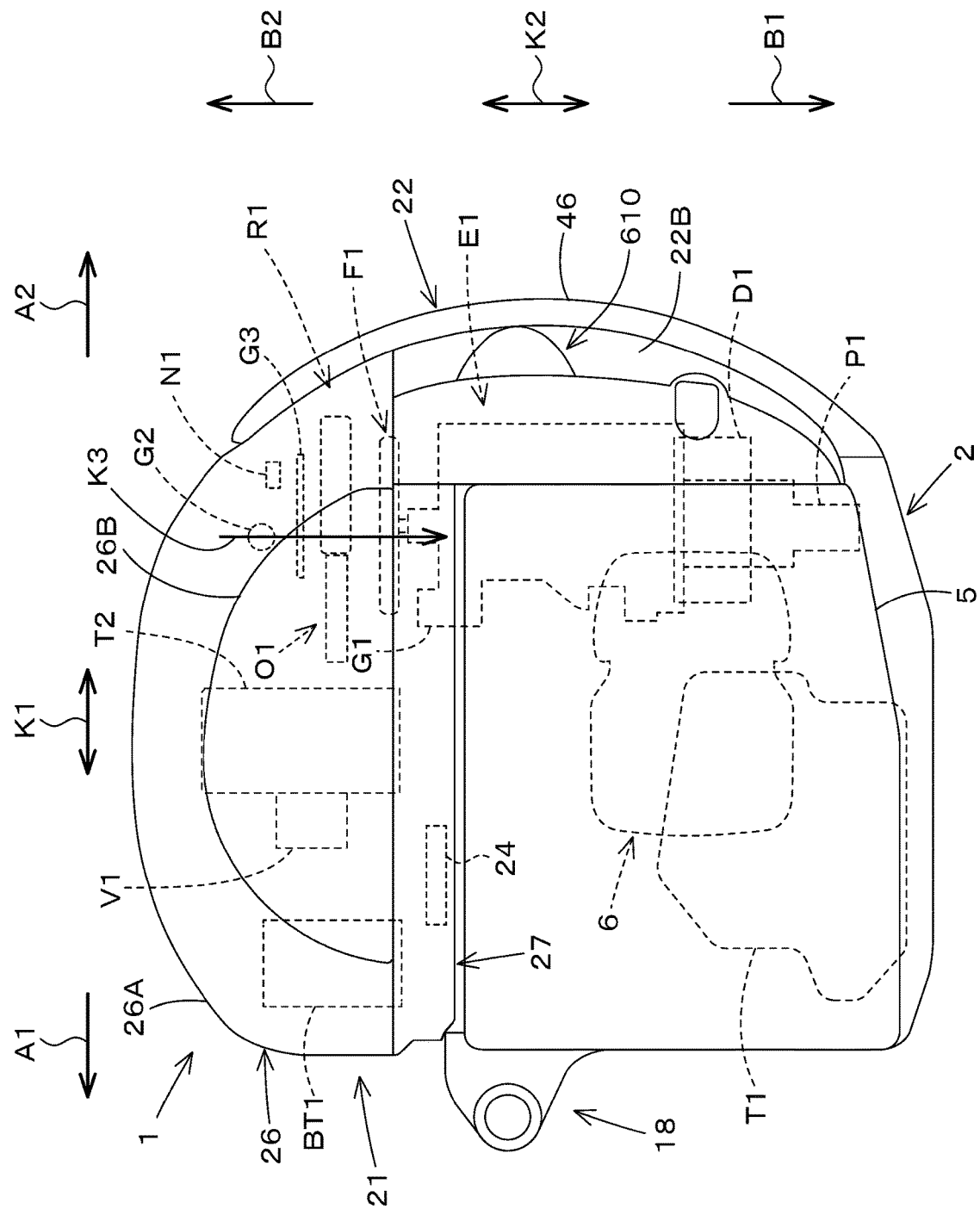
FIG. 2 is a plan view of the working machine.

FIG. 1 is a side view schematically illustrating a general configuration of a working machine 1 according to the present embodiment. FIG. 2 is a plan view schematically illustrating the working machine 1 in which a working device 4 is not illustrated. In the present embodiment, a backhoe, which is a revolving working machine, is illustrated as an example of the working machine 1.

As illustrated in FIGS. 1 and 2, the working machine 1 includes a machine body (revolving frame) 2, a traveling device 3, and the working device 4. A cabin 5 is mounted on the machine body 2. The cabin 5 is mounted on a front-left portion of the machine body 2. The cabin 5 includes, inside thereof, an operator's seat (seat) 6 on which an operator (driver) is to be seated. The operator's seat 6 is surrounded by the cabin 5.

In the present embodiment, the following description is based on the assumption that a forward direction from the operator seated on the operator's seat 6 of the working machine 1 (indicated by arrow A1 in FIGS. 1 and 2) is a forward direction (machine body-forward direction), that a rearward direction from the operator (indicated by arrow A2 in FIGS. 1 and 2) is a rearward direction (machine body-rearward direction), that a leftward direction from the operator (near side in FIG. 1, indicated by arrow B1 in FIG. 2) is a leftward direction, and that a rightward direction from the operator (far side in FIG. 1, indicated by arrow B2 in FIG. 2) is a rightward direction.

The following description is also based on the assumption that a horizontal direction orthogonal to a front-rear direction (machine body front-rear direction) K1 is a machine body-width direction K2 (see FIG. 2). The following description is based on the assumption that a rightward or leftward direction from the widthwise center of the machine body 2 is a machine body-outward direction. That is, the machine body-outward direction is a direction away from the widthwise center of the machine body 2 along the machine body-width direction K2. The following description is based on the assumption that a direction opposite to the machine body-outward direction is a machine body-inward direction. That is, the machine body-inward direction is a direction toward the widthwise center of the machine body 2 along the machine body-width direction K2.

As illustrated in FIG. 1, the traveling device 3 includes a traveling frame 9 and a traveling mechanism 10. The traveling mechanism 10 is composed of a crawler-type traveling mechanism driven by a hydraulic motor. In the present embodiment, the traveling device 3 is a crawler-type traveling device. The traveling mechanism 10 is provided on each of the left and right sides of the traveling frame 9. A dozer 7 is attached to a front portion of the traveling device 3. The dozer 7 is configured to be raised and lowered with a hydraulic cylinder.

As illustrated in FIG. 1, the working device 4 is provided on a front portion of the machine body 2, and includes a boom 15, an arm 16, and a bucket (working tool) 17. The boom 15 includes a proximal portion pivotably attached to a swing bracket 14 such that the boom 15 is pivotable (swingable up and down) about a lateral axis (axis extending along the machine body-width direction K2). The swing bracket 14 is supported on a support bracket 18 provided on the front portion of the machine body 2 such that the swing bracket 14 is pivotable about a vertical axis (axis extending along a top-bottom direction). The arm 16 is pivotably attached to a distal end of the boom 15 such that the arm 16 is pivotable (swingable forward and rearward or swingable up and down) about a lateral axis. The bucket 17 is provided at a distal end of the arm 16 and is configured to perform a scoop action and a dump action. The working machine 1 is configured to have, attached thereto, some other working tool (hydraulic attachment) that can be driven with a hydraulic actuator, instead of or in addition to the bucket 17. Such other working tool can be, for example, a hydraulic breaker, a hydraulic crusher, an angle broom, an earth auger, a pallet fork, a sweeper, a mower, a snow blower, or the like.

The expansion or contraction of a hydraulic cylinder causes the swing bracket 14 to swing. The expansion or contraction of a boom cylinder C3 causes the boom 15 to swing. The expansion or contraction of an arm cylinder C4 causes the arm 16 to swing. The expansion or contraction of a bucket cylinder (working tool cylinder) C5 causes the bucket 17 to perform the scoop action or the dump action. The boom cylinder C3, the arm cylinder C4, and the bucket cylinder C5 are each composed of a hydraulic cylinder (hydraulic actuator).

As illustrated in FIG. 1, the machine body 2 is supported on the traveling frame 9 with a swivel bearing 8 therebetween such that the machine body 2 is rotatable about a vertical axis (configured to turn about a vertical axis leftward and rightward).

As illustrated in FIG. 2, a prime mover E1 is mounted on a rear portion of the machine body 2. The prime mover E1 is a diesel engine. Note that the prime mover E1 may be a gasoline engine or an electric motor and may be a hybrid prime mover including an engine and an electric motor. The prime mover E1 is disposed at the rear of the cabin 5.

A hydraulic pump P1 and an exhaust gas purifier D1 are provided at the left side of the prime mover E1. The hydraulic pump P1 is driven by power from the prime mover E1. The hydraulic pump P1 discharges hydraulic fluid (pressure oil) to drive hydraulic actuators such as hydraulic cylinders and a hydraulic motor equipped on the working machine 1. Furthermore, the hydraulic pump P1 discharges a pilot pressure to actuate a hydraulic valve and a hydraulic pressure for a signal. The hydraulic pump P1 is composed of, for example, a plurality of pumps. The exhaust gas purifier D1 is a device to purify exhaust gas emitted from the prime mover E1, and is, for example, a diesel particulate filter (DPF).

As illustrated in FIG. 2, a cooling fan F1 and a compressor G1 are provided at the right side of the prime mover E1. The cooling fan F1 and the compressor G1 are driven by power from the prime mover E1. The cooling fan F1 is a suction fan which draws in air (outside air) from an area rightward of the machine body 2 and causes it to flow leftward. Arrow K3 in FIG. 2 indicates the direction in which cooling air from the cooling fan F1 flows. The compressor G1 is a device which constitutes a part of an air conditioner equipped on the working machine 1, and compresses a cooling medium (air conditioner gas) into a semi-liquid form.

As illustrated in FIG. 2, a radiator R1 and an oil cooler O1 are disposed rightward of the cooling fan F1. The radiator R1 and the oil cooler O1 are disposed such that their core portion extends along the machine body-width direction K2 and are arranged side by side along the machine body front-rear direction K1. The radiator R1 is a cooler to cool a coolant for the prime mover E1. The oil cooler O1 is a cooler to cool a hydraulic fluid which goes back to a hydraulic fluid tank T2.

A condenser G3 and a receiver G2, which are devices of a cooling system of the air conditioner, and a fuel cooler N1 are disposed rightward of the radiator R1. The condenser G3 is a cooler to cool the cooling medium which has been turned into a semi-liquid form by the compressor G1 to further liquefy the cooling medium. The receiver G2 is a device to separate cooling medium which has not been liquefied by the condenser G3 from the liquefied cooling medium to remove moisture and impurities. The fuel cooler N1 is a cooler to cool fuel (return fuel) returned from the prime mover E1 before allowing the fuel to go back to a fuel tank T1. The fuel tank T1 is a tank for storing fuel for the prime mover E1. The fuel tank T1 is mounted on a front-left portion of the machine body 2.

A hydraulic fluid tank T2 and a control valve V1 are disposed forward of the oil cooler O1. The control valve V1 is attached on the front side of the hydraulic fluid tank T2. The hydraulic fluid tank T2 is a tank for storing a hydraulic fluid to be supplied to the hydraulic pump P1. The control valve V1 is a valve unit which is a set of control valves for controlling the respective hydraulic actuators equipped on the working machine 1. A battery BT1 is disposed forward of the control valve V1 and the hydraulic fluid tank T2. The battery BT1 is a storage battery which supplies electricity to electric devices equipped on the working machine 1.

A controller 24 is disposed leftward of the control valve V1. The controller 24 is, for example, an electronic control unit to control the prime mover E1 and control various apparatuses (e.g., air-conditioning apparatus) equipped on the working machine 1. The controller 24 is configured using a microcomputer including a CPU, an EEPROM, and/or the like.

Note that the working machine 1 includes an electronic control unit (controller) called a main ECU, which together with the controller 24 constitutes a control device and which controls the overall action of the working machine 1 (controls electrical apparatus equipped on the working machine 1). The main ECU, for example, controls a solenoid valve provided in a hydraulic circuit to control the flow rate of the hydraulic fluid, and controls the recycling of the filter of the exhaust gas purifier D1.

Figure 5:
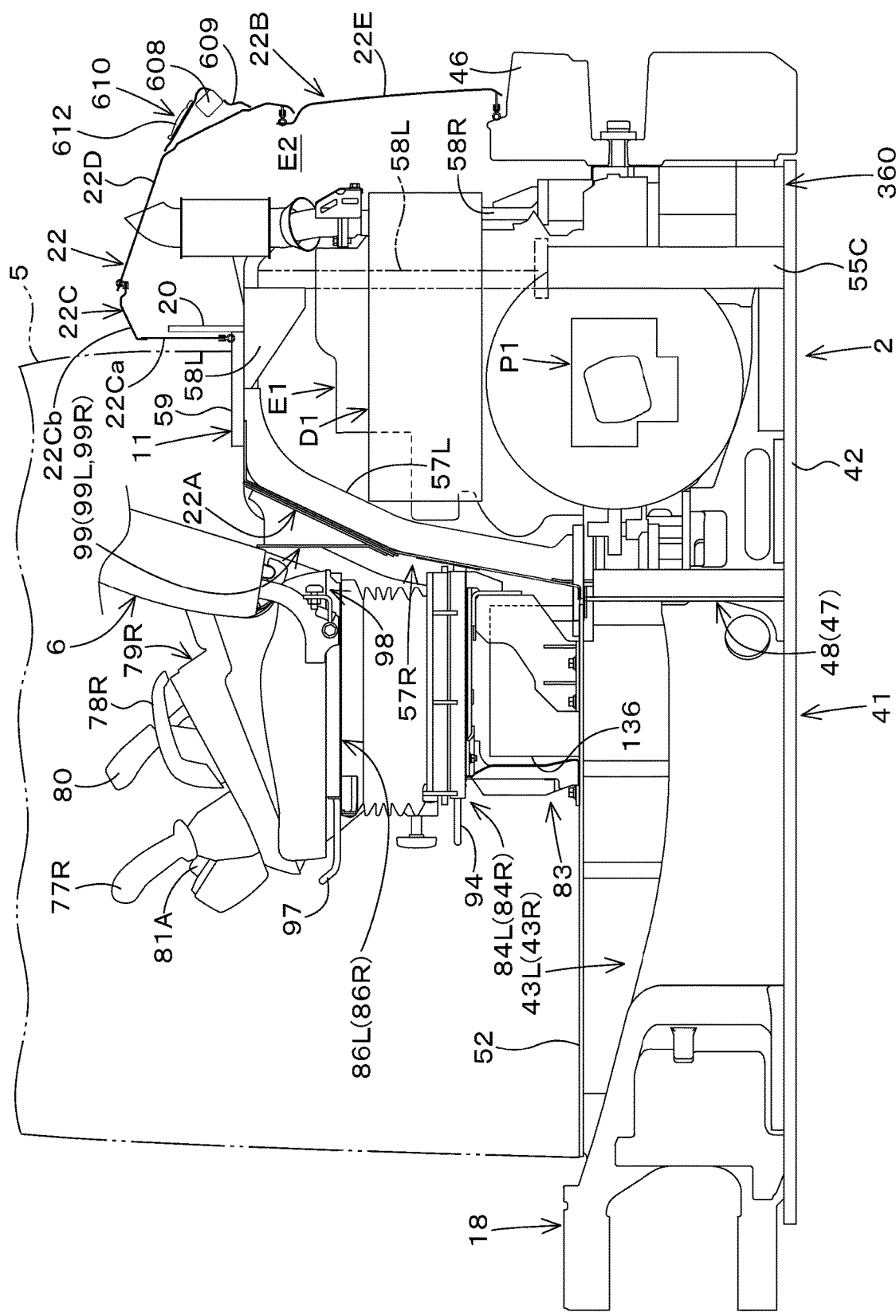
FIG. 5 is a side of a machine body on which an operator's seat and a prime mover are mounted.

As illustrated in FIGS. 1 and 5, an air conditioner main body 136 is provided below the operator's seat 6 within the cabin 5. The air conditioner main body 136 constitutes a main body of the air conditioner (air conditioner). The air conditioner main body 136 includes a case, and a blower, a cooling heat exchanger (evaporator), a heating heat exchanger (heater), and/or the like contained in the case. The cooling system of the air conditioner includes the compressor G1, the receiver G2, and the condenser G3. A heating system of the air conditioner uses heat from the prime mover E1.

Figure 3:
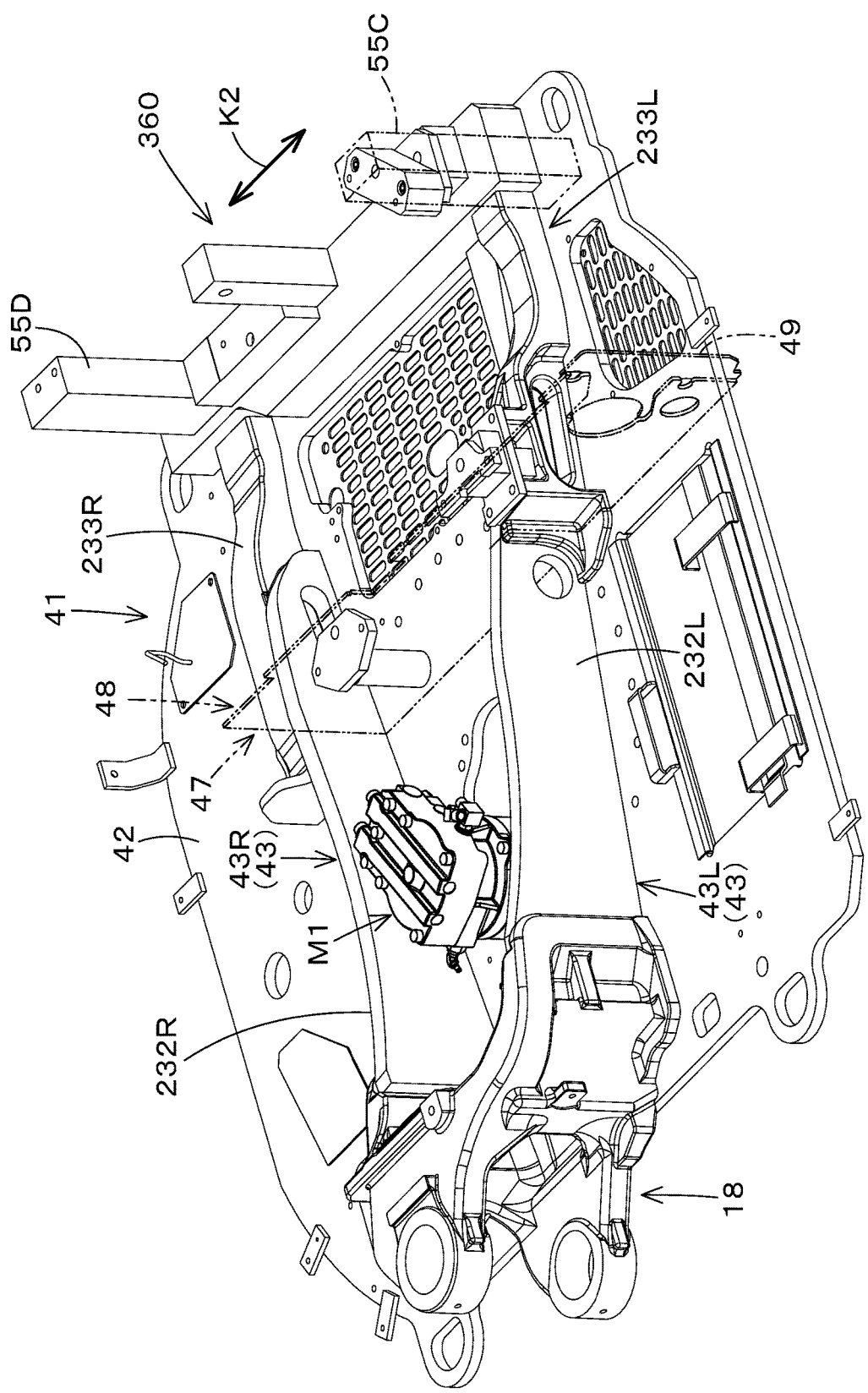
FIG. 3 is a perspective view of a swivel frame.
Figure 4:
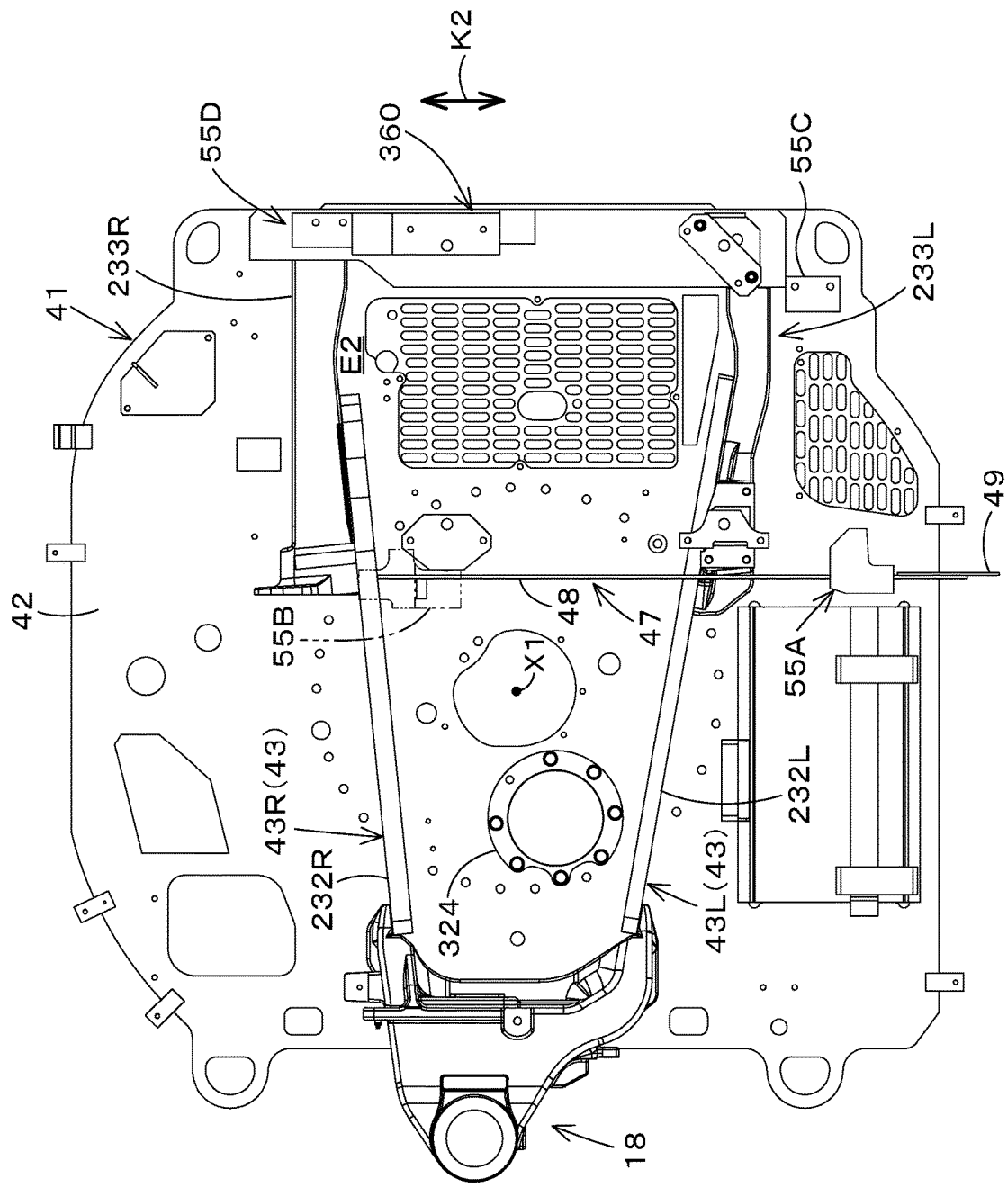
FIG. 4 is a plan view of the swivel frame.

As illustrated in FIGS. 3 and 4, the machine body 2 includes a swivel frame 41 serving as a framework. The swivel frame 41 includes a swivel base plate 42 which defines the bottom of the machine body 2, a reinforcing rib 43 which reinforces the swivel base plate 42, and the support bracket 18. The swivel frame 41 also includes bracket(s) and/or stay(s) for attachment of apparatuses (including tanks), other component(s), and/or the like mounted on the machine body 2. The swivel base plate 42 is formed of a thick steel plate or the like, and is supported via the swivel bearing 8 on the traveling device 3 pivotably about a vertical axis (swiveling axis X1) (see FIG. 1). The reinforcing rib 43 is provided on the swivel base plate 42 in a direction from a front portion (one of opposite ends) to a rear portion (the other of the opposite ends), and is fixed to the swivel base plate 42 by welding. The reinforcing rib 43 includes a first rib 43L provided on a left portion of the swivel base plate 42 and a second rib 43R provided on a right portion of the swivel base plate 42. The first rib 43L includes a front rib 232L made of sheet metal and a rear rib 233L made of cast steel. The second rib 43R includes a front rib 232R made of sheet metal and a rear rib 233R made of cast steel. The support bracket 18 is fixed to a front portion of the swivel base plate 42 by welding or the like and connected to a front portion of the reinforcing rib 43.

As illustrated in FIGS. 3 and 4, a partition plate 47 is provided along the machine body-width direction K2 and slightly rearward of the center of the swivel base plate 42 in the front-rear direction K1. The partition plate 47 includes a main partition plate 48 and a sub-partition plate 49. The main partition plate 48 extends along the machine body-width direction K2 from a left side surface of the second rib 43R to a left edge portion of the swivel base plate 42 beyond the first rib 43L. Furthermore, the main partition plate 48 is fixed on the swivel base plate 42 by welding and extends upward from the swivel base plate 42. The sub-partition plate 49 is attached such that the sub-partition plate 49 is superimposed on the back surface of the main partition plate 48 in a left portion of the swivel base plate 42. A motor mounting portion 324 is provided in a front portion of the space between the first rib 43L and the second rib 43R. The motor mounting portion 324 has attached thereto a swivel motor M1 composed of a hydraulic motor to drive the machine body 2 to rotate about the swiveling axis X1 (see FIG. 3).

As illustrated in FIG. 5, the prime mover E1 is mounted rearward of the partition plate 47 on the swivel base plate 42. The prime mover E1 is covered by a hood 22 provided at the rear of the machine body 2. The hood 22 defines a prime mover chamber E2 for housing the prime mover E1. The prime mover chamber E2 is provided above the swivel base plate 42.

As illustrated in FIG. 5, the hood 22 includes a partition wall member (partition plate) 22A which covers the prime mover E1 from the front (upper front side), a hood's rear portion 22B which covers the prime mover E1 from the upper side and the rear side and which is configured to be opened and closed, and a fixed hood 22C which is disposed diagonally upward and forward of the hood's rear portion 22B. A support frame 11 which supports the hood 22 is provided inside the hood 22. The support frame 11 extends upward from the machine body 2 (swivel frame 41). The partition wall member 22A is a member which separates the prime mover chamber E2 and an area diagonally upward and forward of the prime mover chamber E2. The operator's seat 6 is disposed forward of the partition wall member 22A. That is, the partition wall member 22A is a member which separates the prime mover chamber E2 and an area in which the operator's seat 6 is disposed (area at the same side of the prime mover chamber E2 as the operator's seat 6). Furthermore, the cabin 5 is provided at the opposite side of the partition wall member 22A from the prime mover chamber E2. That is, the partition wall member 22A also serves to separate the prime mover chamber E2 and the interior of the cabin 5.

The partition wall member 22A is made of, for example, a sheet metal, and is fixed to the support frame 11. The partition plate 47 is provided below the partition wall member 22A. The partition plate 47 separates a lower front portion of the prime mover chamber E2. A weight 46 is provided below the hood's rear portion 22B. The weight 46 projects rearward relative to the hood's rear portion 22B. The weight 46 is disposed at the rear of the machine body 2 and rearward of the prime mover E1. The weight 46 covers the prime mover E1 from the lower rear side. The weight 46 is attached to a weight mounting 360 illustrated in FIGS. 3 and 4.

As illustrated in FIG. 5, a front portion of the machine body 2 is provided with a floor step 52 which defines a floor surface of the machine body 2 (floor surface at an upper portion of the machine body 2). The floor step 52 covers a left portion of a front portion of the swivel frame 41. The floor step 52 is attached to the swivel frame 41 and defines the floor surface of the cabin 5.

Figure 6:
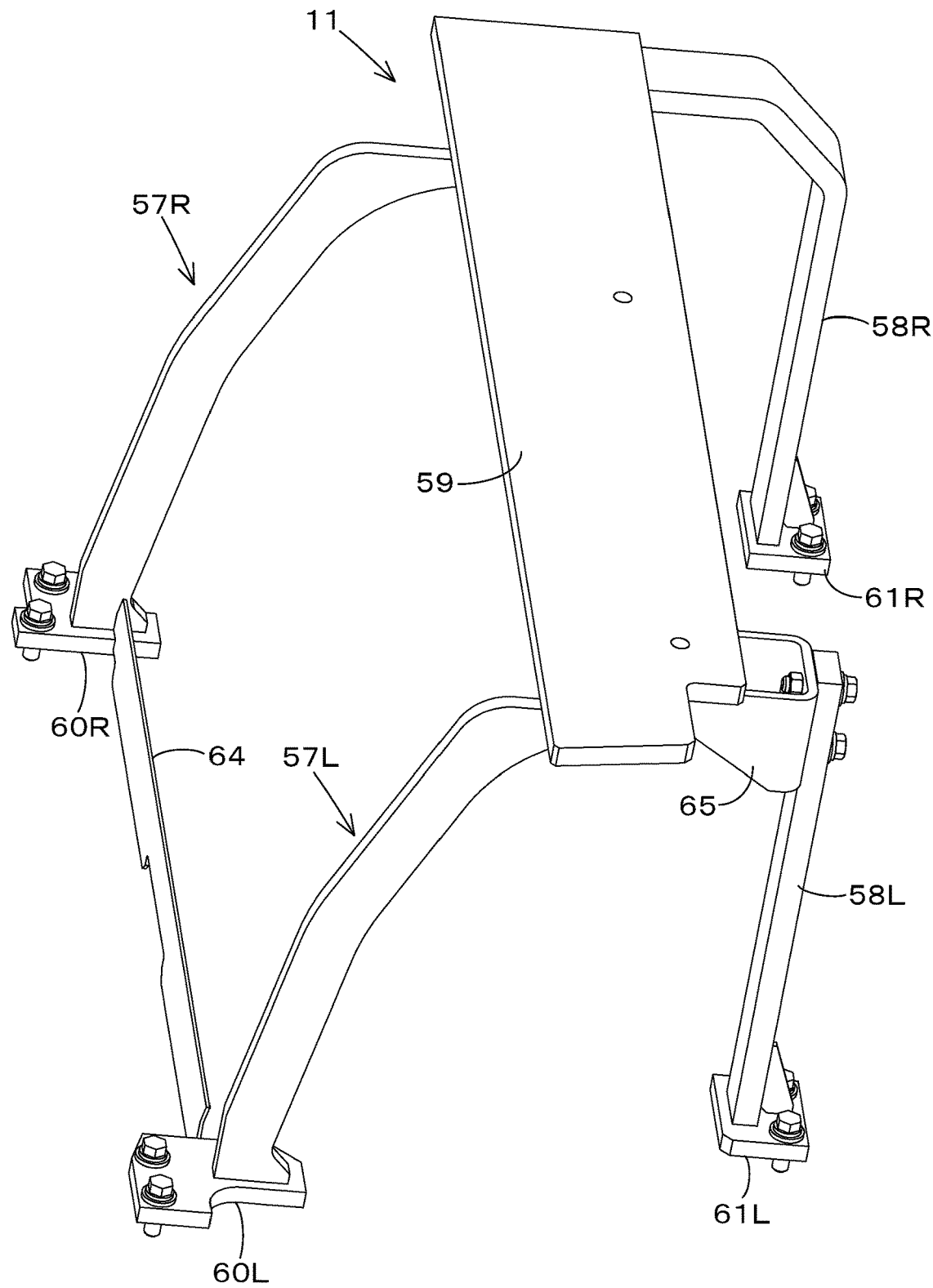
FIG. 6 is a perspective view of a support frame.

As illustrated in FIG. 6, the support frame 11 includes a plurality of leg bodies (first front leg 57L, second front leg 57R, first rear leg 58L, and second rear leg 58R) and an upper plate 59. The first front leg 57L and the second front leg 57R are arranged with a space therebetween along the machine body-width direction K2 and are disposed near a front portion of the prime mover E1. A first front mounting plate 60L is fixed to a lower end of the first front leg 57L. The first front mounting plate 60L is fixed to a first frame mounting portion 55A (illustrated in FIG. 3) with bolt(s). A second front mounting plate 60R is fixed to a lower end of the second front leg 57R. The second front mounting plate 60R is fixed to a second frame mounting portion 55B (illustrated in FIG. 3) with (bolt). The first front mounting plate 60L and the second front mounting plate 60R are connected by a connecting plate 64. The upper plate 59 has plate surfaces facing up and down, is formed of a thick plate which is elongated in the machine body-width direction K2, and extends from an upper portion of the first front leg 57L to an upper portion of the second front leg 57R. The upper plate 59 is fixed to the upper portion of the first front leg 57L and the upper portion of the second front leg 57R. A rear portion of the cabin 5 is placed on the upper plate 59 and is elastically suspended with a cabin mount including an elastic member.

As illustrated in FIG. 6, the first rear leg 58L and the second rear leg 58R are arranged with a space therebetween along the machine body-width direction K2 and are disposed near a rear portion of the prime mover E1. An upper portion of the first rear leg 58L is attached to a mounting member 65 fixed to a left portion of the upper plate 59. A first rear mounting plate 61L is fixed to a lower end of the first rear leg 58L. The first rear mounting plate 61L is fixed to a third frame mounting portion 55C (illustrated in FIGS. 3 and 4) with bolt(s). An upper end portion of the second rear leg 58R is fixed to a lower surface of the upper plate 59. A second rear mounting plate 61R is fixed to a lower end of the second rear leg 58R. The second rear mounting plate 61R is fixed to a fourth frame mounting portion 55D (illustrated in FIGS. 3 and 4) with bolt(s).

Figure 9:
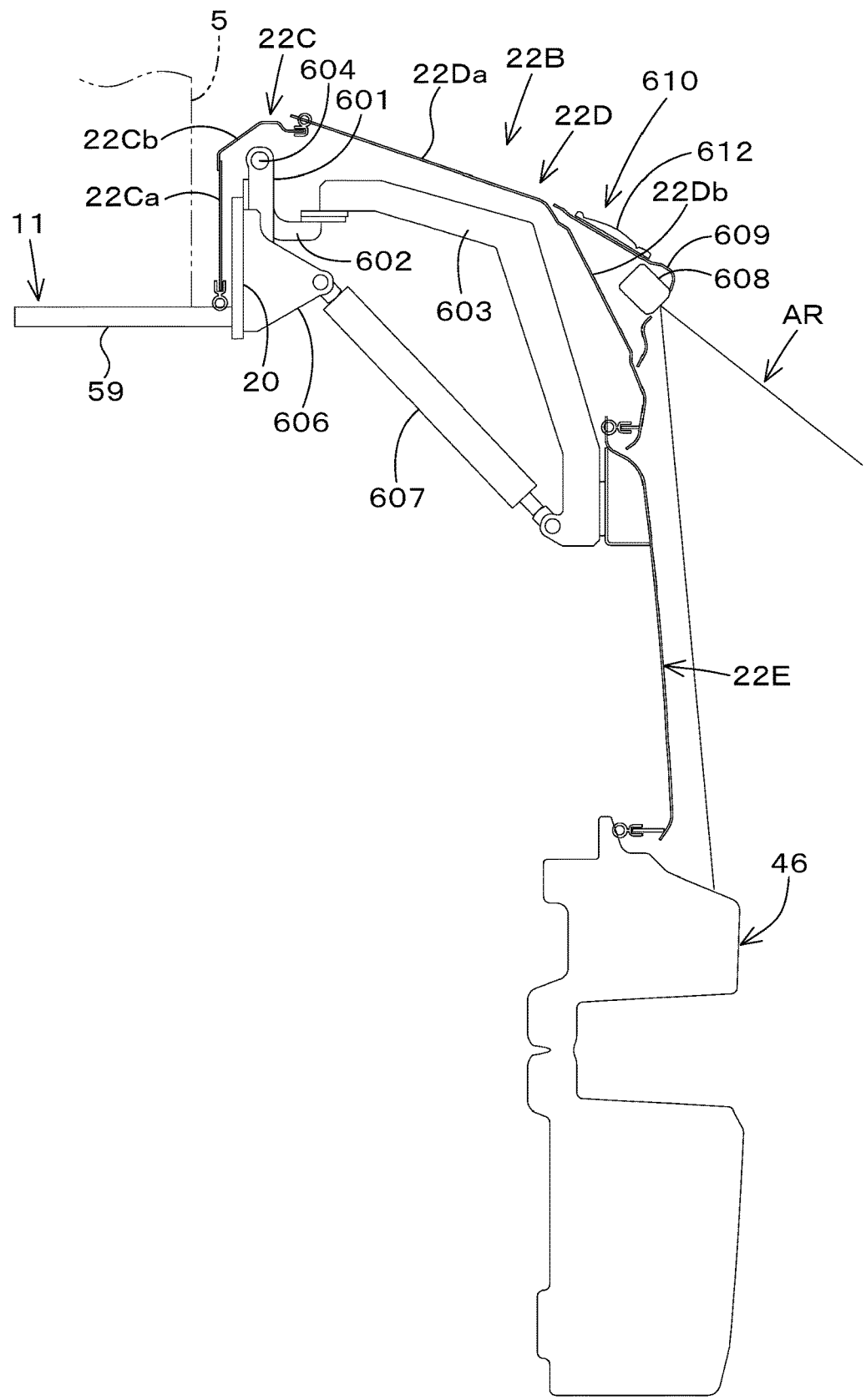
FIG. 9 is a cross-sectional view of the hood's rear portion as seen from a side.

As illustrated in FIG. 9, the hood's rear portion 22B extends from a rear edge portion of the fixed hood 22C to an area above the weight 46. The fixed hood 22C is disposed rearward of the upper plate 59. The fixed hood 22C is attached to a plate member 20 which projects upward from a rear portion of the upper plate 59. As illustrated in FIG. 5, the upper plate 59 closes a gap between an upper portion of the partition wall member 22A and a lower portion of the fixed hood 22C.

Figure 7:
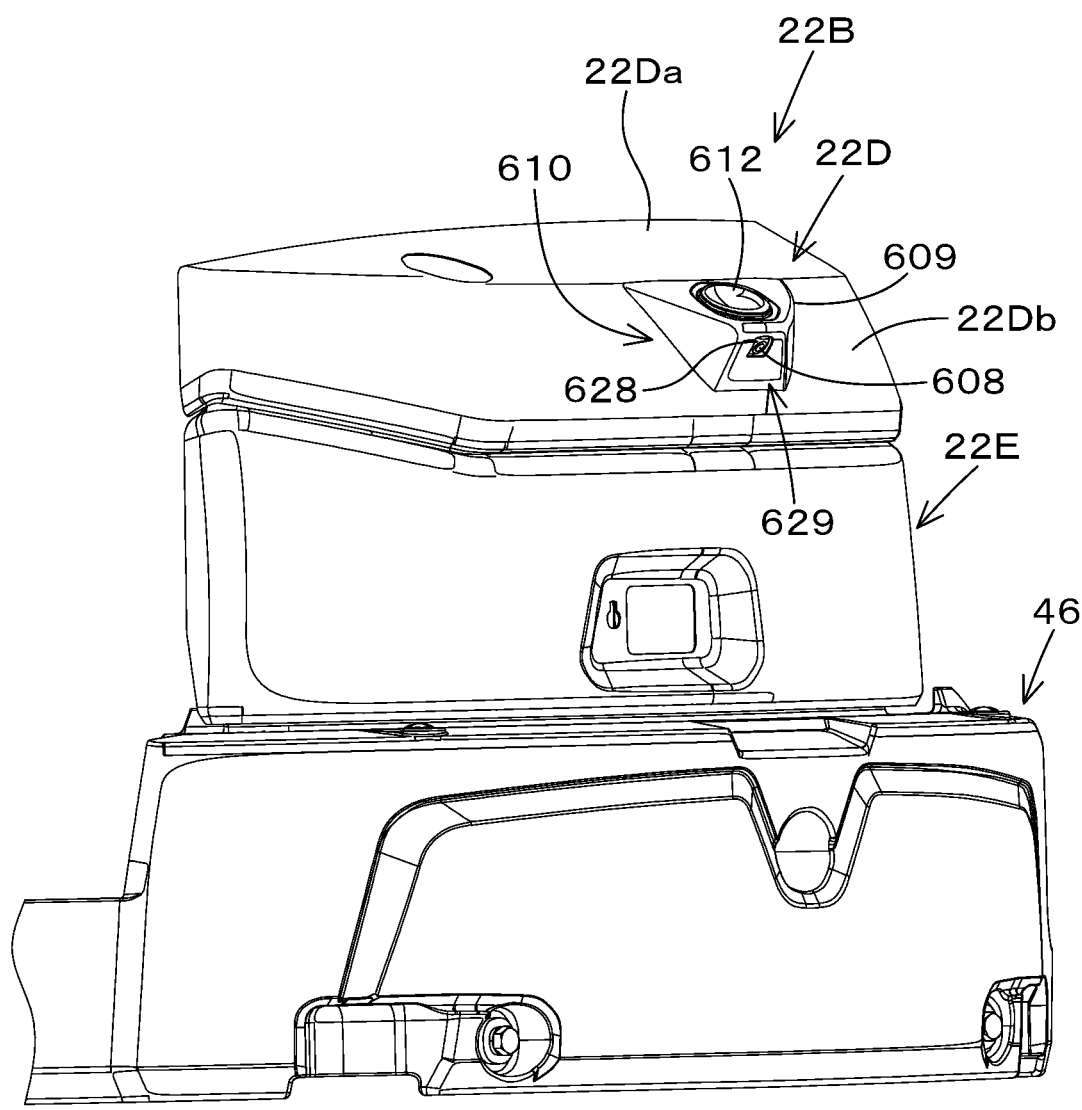
FIG. 7 is a rear perspective view of a hood's rear portion and a weight.
Figure 8:
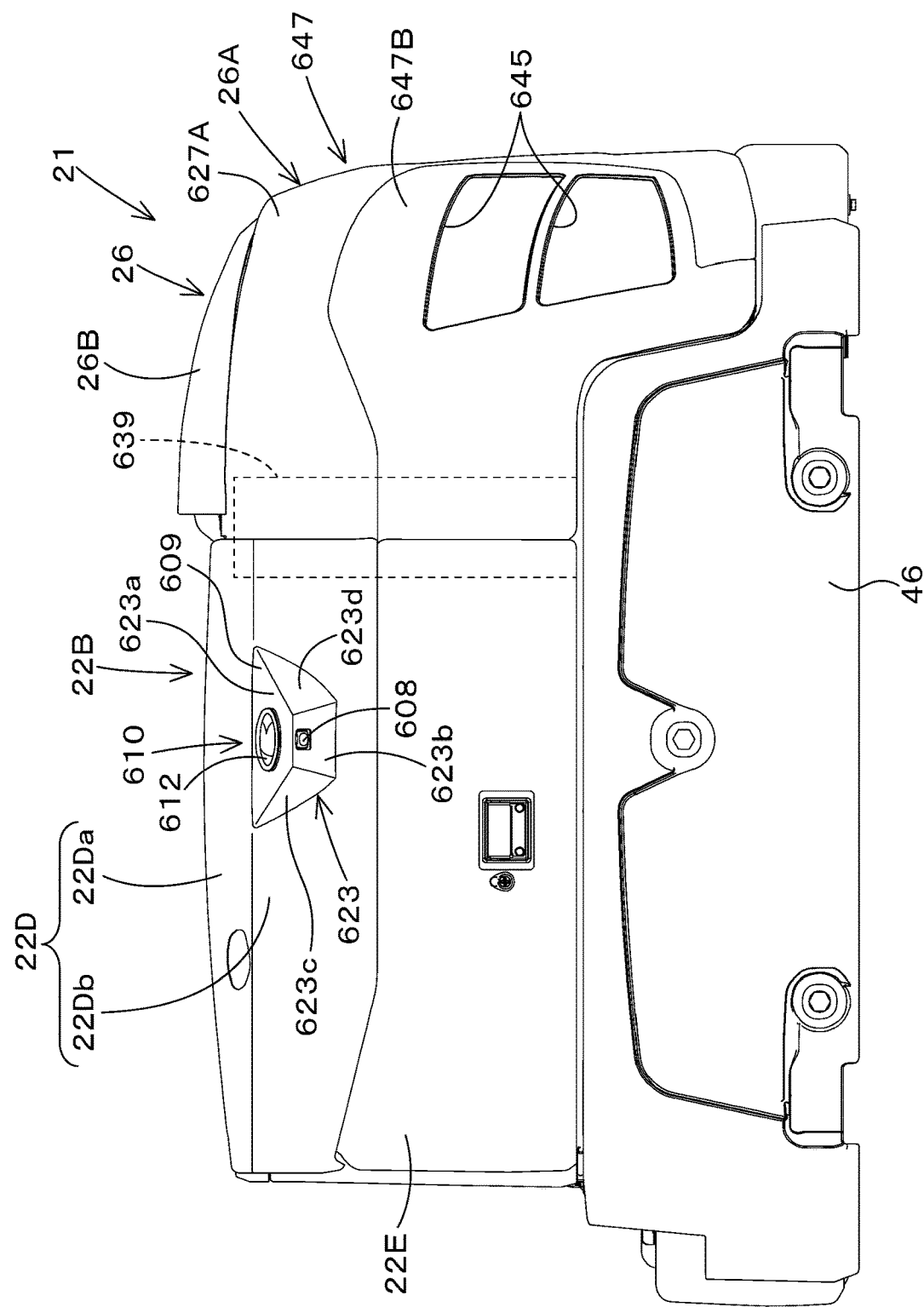
FIG. 8 is a rear view of the hood's rear portion, a cover body, and the weight.

As illustrated in FIGS. 7 to 9, the hood's rear portion 22B includes a first member 22D and a second member 22E which is located lower than the first member 22D. The first member 22D includes an upper wall 22Da and an extension wall 22Db. The upper wall 22Da slopes downward toward the rear. The extension wall 22Db extends from a rear edge of the upper wall 22Da and slopes rearward in a downward direction. The second member 22E extends downward from a lower portion of the extension wall 22Db (first member 22D) toward an upper portion of the weight 46

As illustrated in FIG. 9, the hood's rear portion 22B is connected to the plate member 20 via a bracket 601, a hinge 602, and a link 603. The bracket 601 is attached to the plate member 20. The hinge 602 is pivotably connected to the bracket 601 via a pivot shaft 604. The link 603 connects the hinge 602 and a mounting bracket 605 fixed on an upper portion of the second member 22E. The pivot shaft 604 is provided forward of and located lower than a front edge of the upper wall 22Da of the first member 22D. Furthermore, the pivot shaft 604 has an axis extending along the machine body-width direction K2. The hood's rear portion 22B includes an upper front portion swingable up and down about the pivot shaft 604, and is opened by being swung upward. Furthermore, the hood's rear portion 22B opens and closes the prime mover chamber E2 by being swing up and down about the pivot shaft 604.

An assisting cylinder 607 is provided so as to extend from a stay member 606 attached to the plate member 20 to a lower portion of the link 603. The assisting cylinder 607 is composed of, for example, a gas damper (also called gas spring). The gas damper is an expandable and contractable spring including a hermetically sealed cylinder with high pressure gas inside, in which the reaction force of the gas is used as a spring. When the hood's rear portion 22B is swung open, the assisting cylinder 607 expands to assist the hood's rear portion 22B in swinging open. Furthermore, the assisting cylinder 607 keeps the hood's rear portion 22B in an open position.

As illustrated in FIGS. 7 to 9, the hood's rear portion 22B has, attached thereto, a camera unit 610 which includes a camera 608 configured to capture an image of an area rearward of the machine body 2, and a camera cover 609 which covers the camera 608. Specifically, the camera unit 610 is provided on the extension wall 22Db of the first member 22D. Furthermore, the camera unit 610 is disposed at the center of the machine body 2 in the width direction K2. As illustrated in FIG. 2, the camera unit 610 is located within the turning radius defined by the rear end of the weight 46 so that the camera unit 610 is prevented from hitting obstacles when the machine body 2 is turned.

Figure 10:
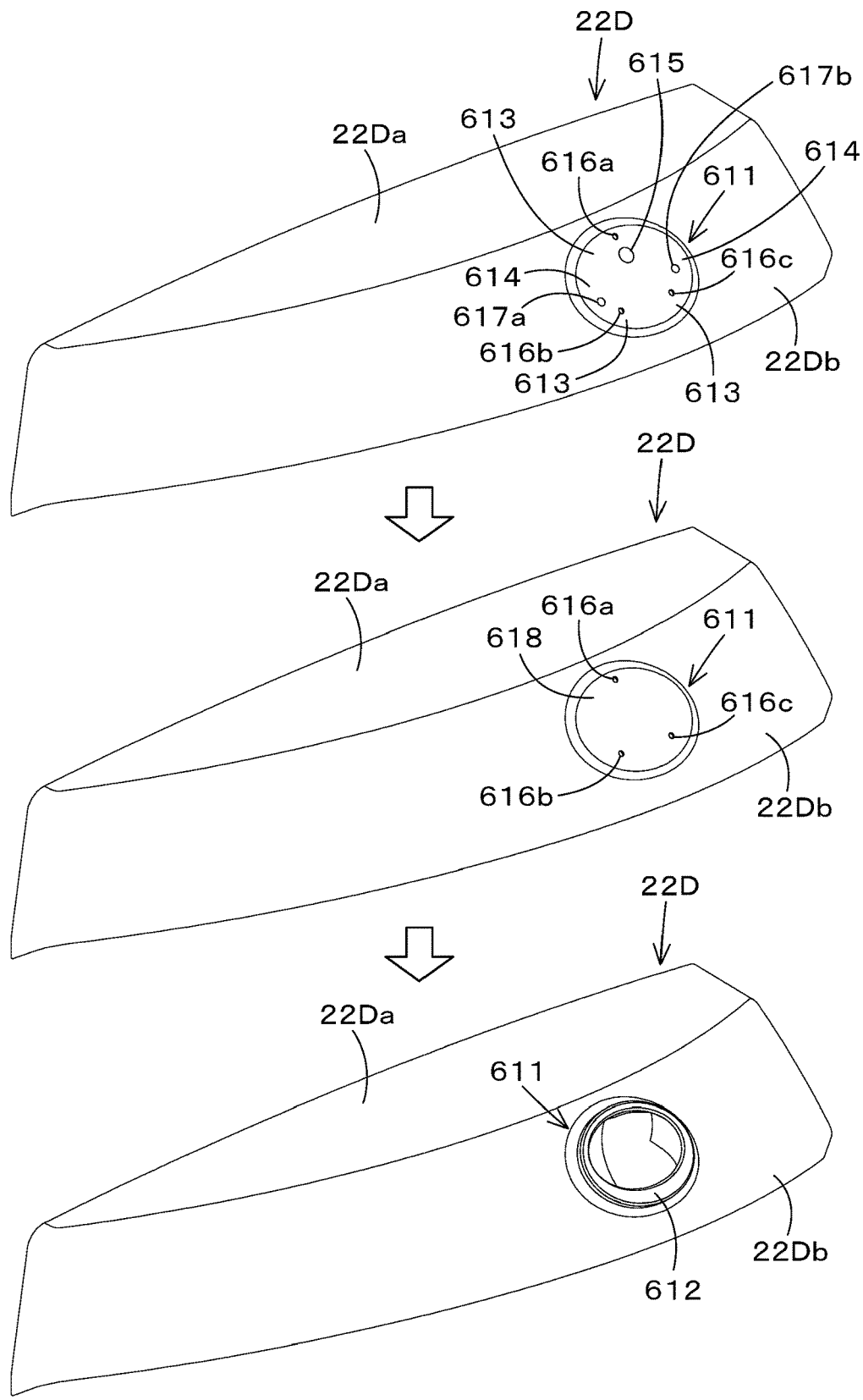
FIG. 10 is a perspective view illustrating a manner in which an emblem is attached to the hood's rear portion.

As illustrated in the top part of the FIG. 10, a mount (referred to as "first mount") 611 is provided in the part of the extension wall 22Db that is for attachment of the camera unit 610. The first mount 611 is a part for attachment of an emblem (sign member) 612 or the camera unit 610. The first mount 611 includes a sign mounting portion 613, a camera mounting portion 614, and a harness through-hole 615. The sign mounting portion 613 is a part which has three mounting holes 616a to 616c for attachment of the emblem 612 or the camera cover 609. The camera mounting portion 614 is a part which has two bracket mounting holes 617a and 617b for attachment of the camera 608. The harness through-hole 615 is a hole for passage of a harness 622 connected to the camera 608 (see FIG. 11). When the camera unit 610 is not attached, as illustrated in the middle part of FIG. 10, a covering label 618 is put to hide the bracket mounting holes 617a and 617b and the harness through-hole 615 and, as illustrated in the bottom part of FIG. 10, the emblem 612 is attached to the first mount 611 (sign mounting portion 613) with the covering label 618 therebetween.

Figure 11:
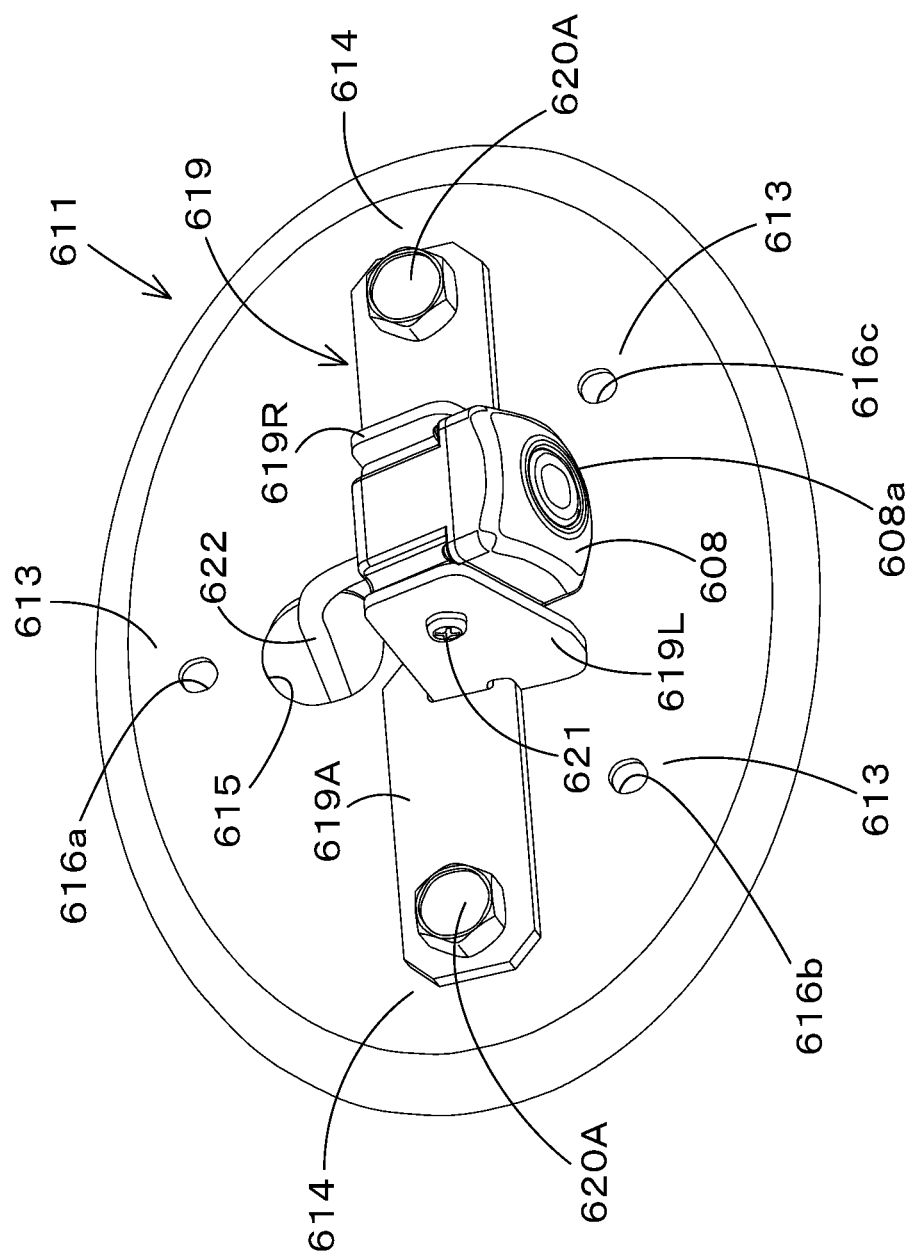
FIG. 11 is a perspective view illustrating a mount to which a camera is attached.
Figure 12:
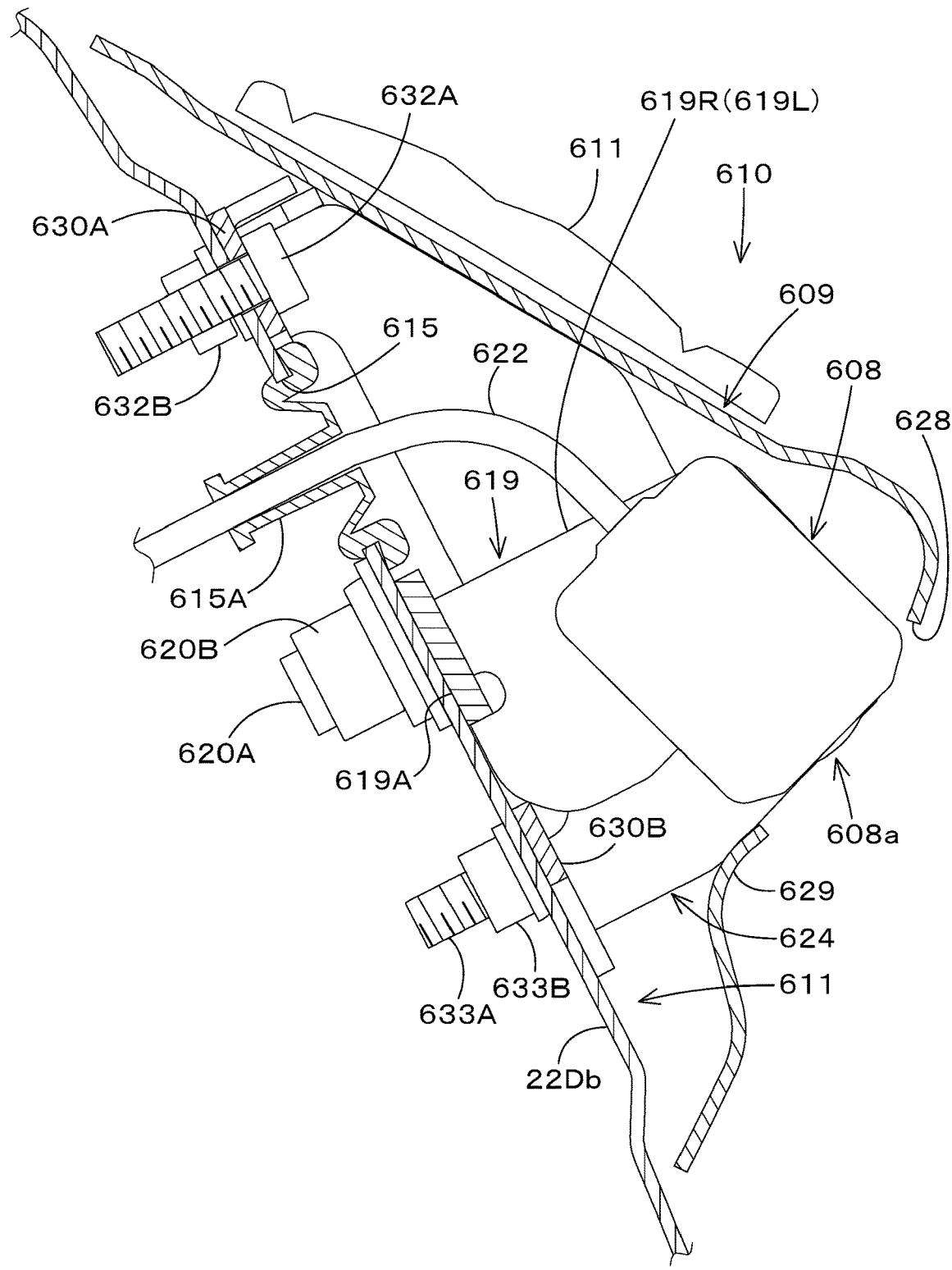
FIG. 12 is a cross-sectional view of a part in which the camera is attached, as seen from a side.

As illustrated in FIG. 11, the camera unit 610 includes a camera bracket 619 for attachment of the camera 608. The camera 608 is attached to the camera mounting portion 614 via the camera bracket 619. The camera bracket 619 includes a base part 619A which extends along the machine body-width direction K2, and a first mounting part 619L and a second mounting part 619R which are provided with a space therebetween at the center of the base part 619A along the machine body-width direction K2. As illustrated in FIGS. 11 and 12, the base part 619A is attached to the camera mounting portion 614 with bolts 620A and nuts 620B. Specifically, the bolts 620A are fixed to the base part 619A and are inserted into the bracket mounting holes 617a and 617b in the camera mounting portion 614 from the outside of the first mount 611. The nuts 620B are screwed onto the bolts 620A from the inside of the hood's rear portion 22B. This makes it possible to prevent the camera bracket 619 from being detached outward from the hood's rear portion 22B. The camera 608 is disposed between the first mounting part 619L and the second mounting part 619R with a head portion (through which a shape or the like is admitted as optical information) 608a facing downward, and attached to the first mounting part 619L and the second mounting part 619R with mounting screws 621. Loosening the mounting screws 621 allows the camera 608 to swing, making it possible to adjust the angle of the camera 608. As illustrated in FIG. 9, the camera 608 is set so that a part (upper part) of the weight 46 falls within a field of view AR of the camera 608 (the weight 46 is within the field of view of the camera 608). This makes it easy to know the distance between the rear end of the machine body 2 and an obstacle.

Figure 13:
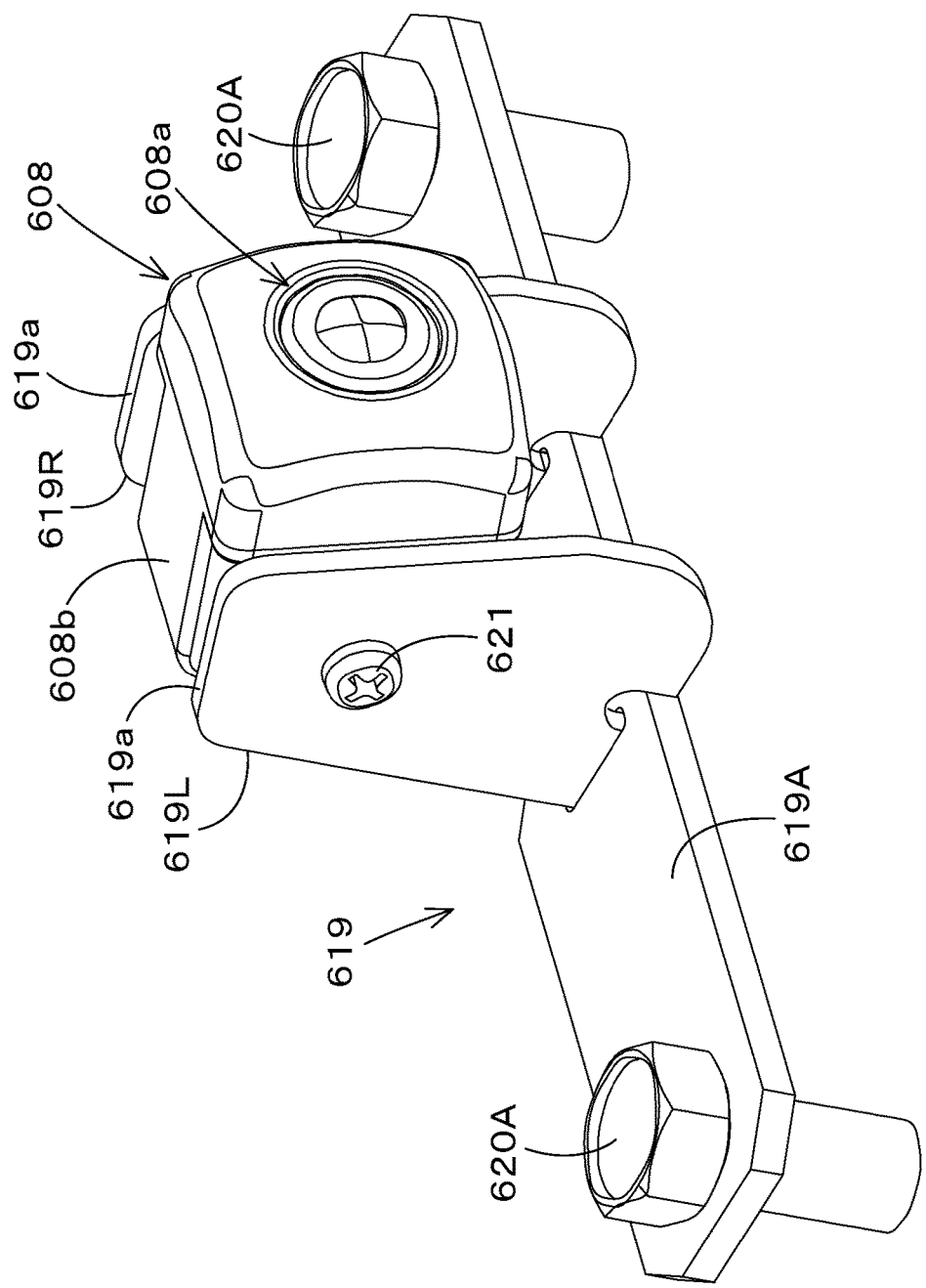
FIG. 13 is a perspective view illustrating a camera bracket to which the camera is attached.

As illustrated in FIG. 13, the angle of the camera 608 is set by aligning a top edge 619a of the first mounting part 619L or the second mounting part 619R with an upper surface 608b of the camera 608. This makes it possible to easily set the angle of the camera 608.

As illustrated in FIG. 12, a grommet 615A is fitted in the harness through-hole 615, and the harness 622 is inserted in the grommet 615A.

Figure 14:
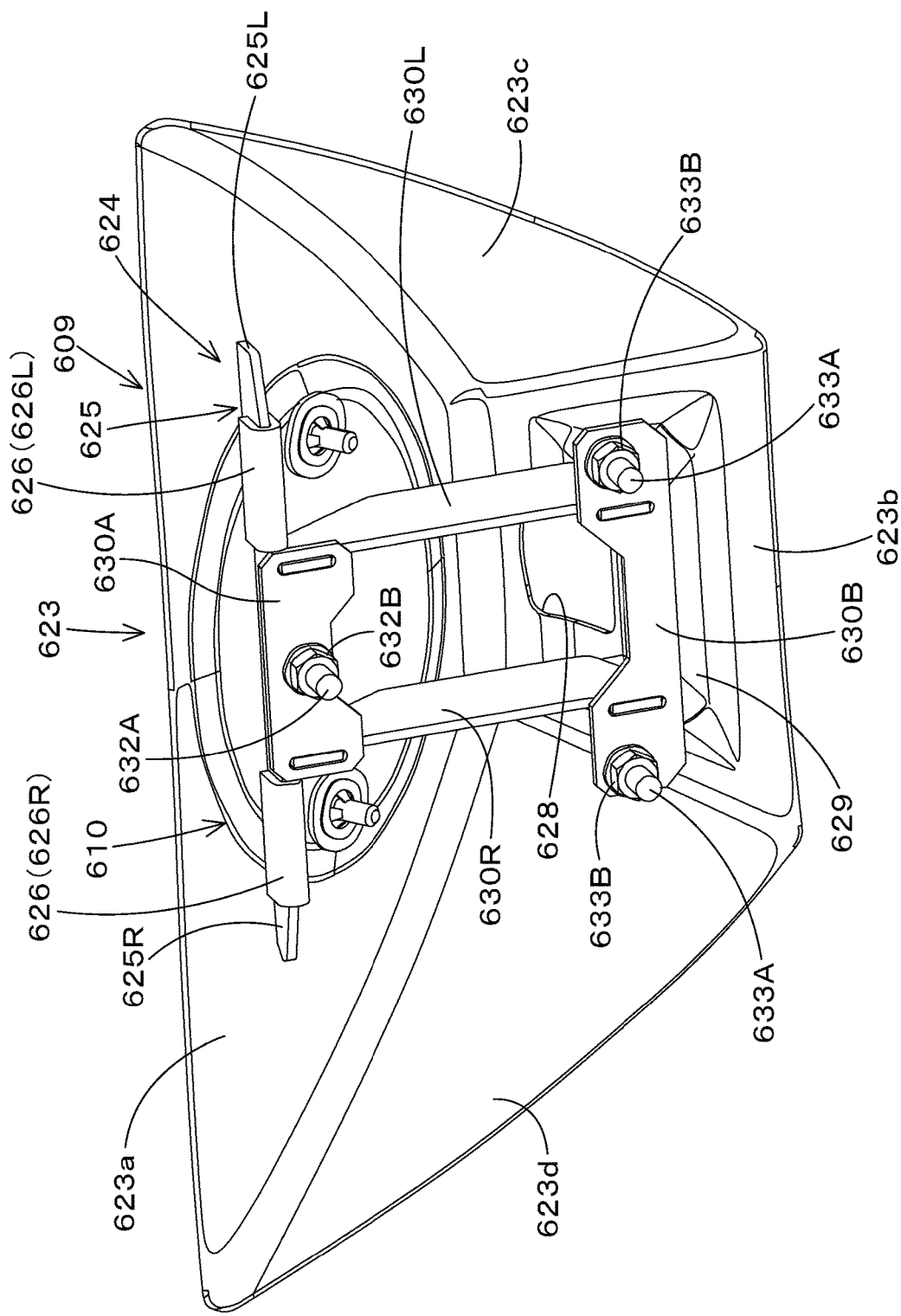
FIG. 14 is a perspective view of the camera cover as seen from the inside.

As illustrated in FIG. 14, the camera cover 609 includes a cover main body 623 which covers the camera 608, a cover bracket 624 attached to the sign mounting portion 613, a protruding part 625 extending from the cover bracket 624 in opposite directions along the machine body-width direction K2, and trims 626 which are attached to the protruding part 625 and which abut on the hood's rear portion 22B. The camera cover 609 can be attached to the sign mounting portion 613 instead of the emblem 612.

As illustrated in FIGS. 8 and 14, the cover main body 623 includes an upper wall portion 623a, a central wall portion 623b which extends downward from the center of the upper wall portion 623a in the machine body-width direction K2, a first side wall portion 623c which extends leftward from a left edge of the central wall portion 623b and which is connected to a lower left edge of the upper wall portion 623a, and a second side wall portion 623d which extends rightward from a right edge of the central wall portion 623b and which is connected to a lower right edge of the upper wall portion 623a. As illustrated in FIG. 9, the upper wall portion 623a slopes downward toward the rear. Furthermore, as illustrated in FIGS. 8 and 14, the upper wall portion 623a is formed such that its width along the machine body-width direction K2 increases toward the front. The upper wall portion 623a covers the camera 608 from the upper side. This makes it possible to prevent rainwater from reaching the camera 608 and eliminate or reduce the likelihood that the rainwater will adhere to a lens of the camera 608 and the captured image will be blurred. The upper wall portion 623a has another mount (second mount) 627 for attachment of the emblem 612. The second mount 627 is somewhat set back from the surrounding area, but a lower portion of the outer periphery of the second mount 627 slopes downward relative to the horizontal direction. Therefore, rainwater is prevented from staying at the second mount 627. The central wall portion 623b has an opening 628 through which the head portion 608a of the camera 608 is exposed. As illustrated in FIGS. 7 and 12, there is a recess 629 which is depressed toward the interior of the cover main body 623 in an area where the opening 628 is present so that the angular field of view of the camera 608 will not be hindered.

Figure 15:
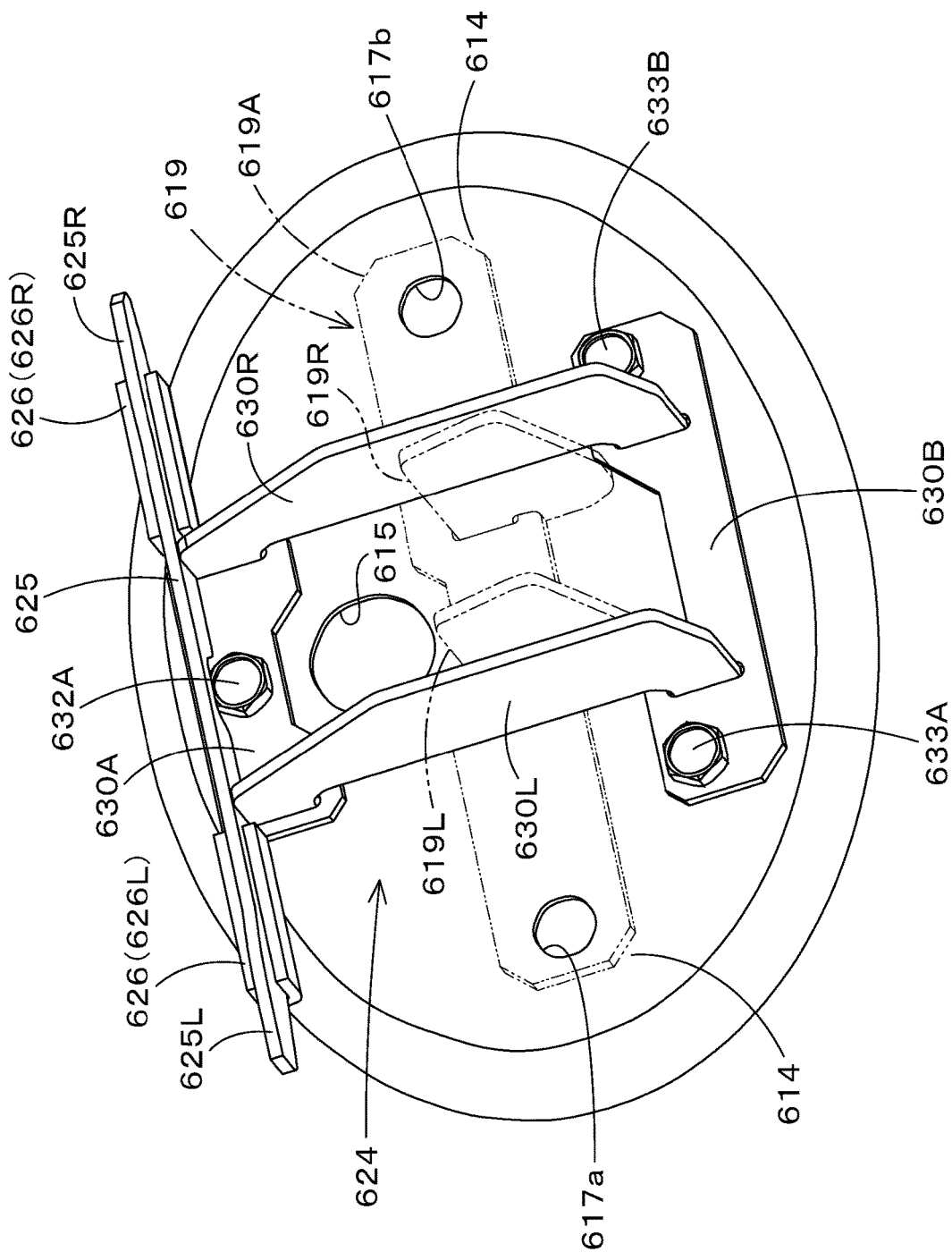
FIG. 15 is a perspective view illustrating a mount to which a cover bracket is attached.

As illustrated in FIGS. 14 and 15, the cover bracket 624 includes a first mounting plate 630A, a second mounting plate 630B, and a first connecting plate 631L and a second connecting plate 631R which connect the first mounting plate 630A and the second mounting plate 630B. The first mounting plate 630A is attached to the sign mounting portion 613 via the upper mounting hole 616a (see FIG. 10). Specifically, a bolt 632A is fixed to the first mounting plate 630A, the bolt 632A is inserted into the mounting hole 616a from the outside of the first mount 611, and the nut 632B is screwed onto the bolt 632A from the inside of the hood's rear portion 22B to attach the first mounting plate 630A. Furthermore, the second mounting plate 630B is attached to the sign mounting portion 613 via the lower mounting holes 616b and 616c (see FIG. 10). Specifically, the bolts 633A are fixed to the second mounting plate 630B, the bolts 633A are inserted into the mounting holes 616b and 616c from the outside of the first mount 611, and the nuts 633B are screwed onto the bolts 633A from the inside of the hood's rear portion 22B to attach the second mounting plate 630B.

The cover bracket 624 is attached from the inside of the hood's rear portion 22B, making it possible to prevent the camera cover 609 from being detached outward from the hood's rear portion 22B. This makes it possible to prevent the theft of the camera 608.

The first connecting plate 631L and the second connecting plate 631R are fixed to the inner side of the upper wall portion 623a. The first connecting plate 631L and the second connecting plate 631R are arranged with a space therebetween along the machine body-width direction K2. The space between the first connecting plate 631L and the second connecting plate 631R allows insertion of the first mounting part 619L and the second mounting part 619R of the camera bracket 619.

The protruding part 625 includes a first protruding portion 625L which is fixed to upper portions of the first connecting plate 631L and the second connecting plate 631R and which projects leftward from the first connecting plate 631L, and a second protruding portion 625R which extends rightward from the second connecting plate 631R. The trims 626 include a first trim 626L attached to the first protruding portion 625L, and a second trim 626R attached to the second protruding portion 625R. Each trim 626 is formed of an elastic member such as rubber and abuts on the outer surface of the hood's rear portion 22B. The width of the cover main body 623 along the machine body-width direction K2 increases in the machine body-forward direction, and therefore the opposite sides of the cover main body 623 in the machine body-width direction K2 may sway forward and rearward. However, the first trim 626L abuts on the hood's rear portion 22B at the left of the cover main body 623, and the second trim 626R abuts on the hood's rear portion 22B at the right of the cover main body 623, making it possible to prevent the swaying.

Figure 16:
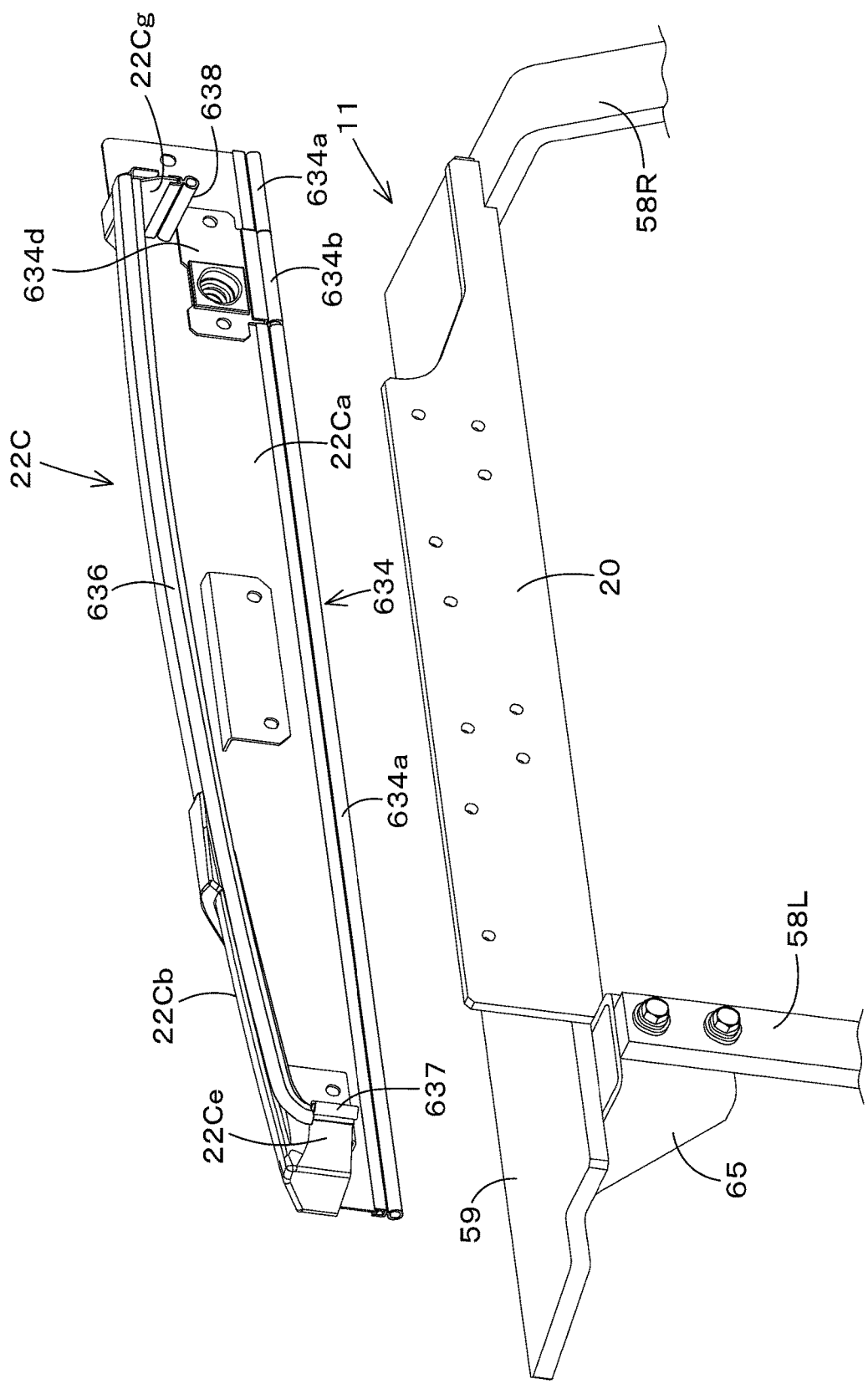
FIG. 16 is a perspective view of a fixed hood and the support frame.
Figure 17:
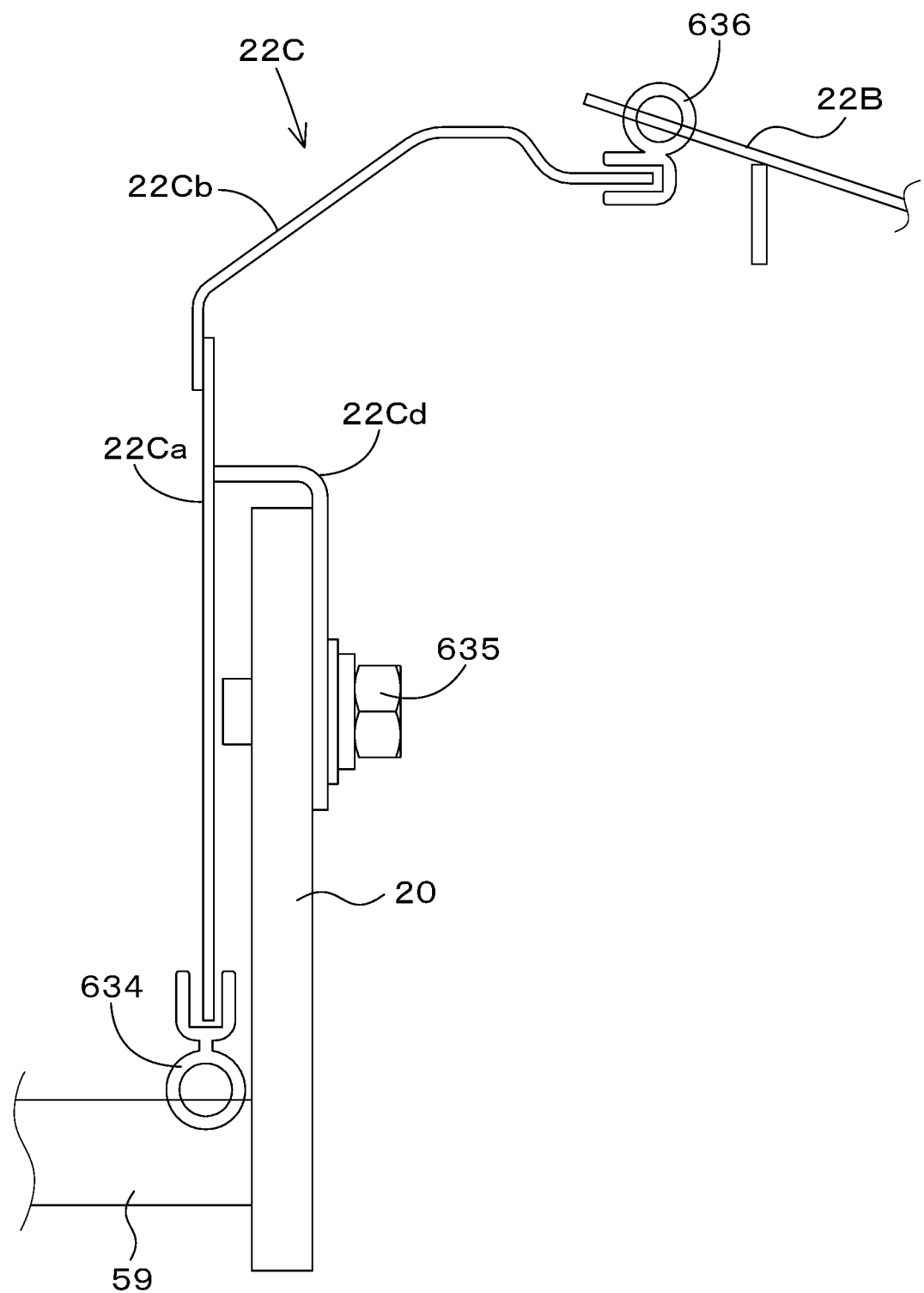
FIG. 17 is a cross-sectional view of a part in which the fixed hood is attached, as seen from a side.

As illustrated in FIG. 16, the plate member 20 is disposed with plate surfaces facing forward and rearward, and extends from the mounting member 65 to an upper portion of the second rear leg 58R. As illustrated in FIG. 17, the fixed hood 22C includes an upright plate part 22Ca and an upper plate part 22Cb. The upright plate part 22Ca is disposed with plate surfaces facing forward and rearward and is disposed forward of the plate member 20 so as to face the plate member 20. The upright plate part 22Ca is substantially parallel with the plate member 20, and an upper portion projects upward relative to the plate member 20. The upper plate part 22Cb is disposed higher than the plate member 20, has a front portion bent downward, and is fixed to an upper portion of the upright plate part 22Ca. Furthermore, the upper plate part 22Cb extends from the upper portion of the upright plate part 22Ca rearward to an upper front portion of the hood's rear portion 22B beyond the plate member 20. As such, the fixed hood 22C is disposed between the cabin 5 and the hood's rear portion 22B.

The upright plate part 22Ca has, attached to a lower portion thereof, a sealing member (fourth sealing member) 634 which abuts on the upper surface of the upper plate 59. The sealing member 634 is composed of, for example, a trim seal (sealing member composed of a base which fits the mounting part and a tube with cushioning properties).

In the present embodiment, the sealing member 634 is divided into a sealing part 634a attached to the body of the upright plate part 22Ca and a sealing part 634b attached to a stay plate 634d for attachment of a grommet for passage of a routed member such as a harness. However, the sealing member 634 may be a single continuous member extending throughout from the left end of the upright plate part 22Ca to the right end of the upright plate part 22Ca.

As illustrated in FIGS. 16 and 17, the fixed hood 22C includes an L-shaped mounting stay 22Cd fixed to the back side of the upright plate part 22Ca. The mounting stay 22Cd is attached to the plate member 20 with a bolt 635. With this, the upright plate part 22Ca (fixed hood 22C) is attached to the plate member 20.

As illustrated in FIG. 16, the upper plate part 22Cb has, attached to a rear portion thereof, a sealing member (third sealing member) 636 composed of a trim seal. The sealing member 636 extends from the left end of the upper plate part 22Cb to the right end of the upper plate part 22Cb. As illustrated in FIG. 17, the front edge portion of the upper portion of the hood's rear portion 22B abuts on the sealing member 636 from above.

In the present embodiment, the upright plate part 22Ca and the upper plate part 22Cb are composed of separate members which are joined together. However, the upright plate part 22Ca and the upper plate part 22Cb may be composed of a single member.

For example, when sealing between the hood's rear portion 22B and the cabin 5 (located forward of the hood's rear portion 22B) is to be achieved, if the upper portion of the hood's rear portion 22B abuts on the cabin 5 via a sealing member, it is difficult to achieve tight sealing because the cabin 5 is elastically suspended with a rubber mount. If the sealing is loose, an issue arises in that a hot air flows out from the prime mover chamber through the gap. Furthermore, tight sealing necessitates a complex shape. However, in the present embodiment, the fixed hood 22C (abutment structure), which is composed of a different member from that of the hood's rear portion 22B, is provided on an upper portion of the support frame 11. This makes it possible to achieve tight sealing of the upper portion of the hood's rear portion 22B. It is also possible to simplify the shape of the sealing structure.

As illustrated in FIG. 16, the left end of the fixed hood 22C is provided with a support wall 22Ce which extends rearward from the left end. The support wall 22Ce has, attached to a rear end thereof, a sealing member (trim seal) 637 to which an upper portion of a left edge portion of the hood's rear portion 22B abuts. Furthermore, the right end of the fixed hood 22C is provided with a support wall 22Cg which extends downward from the right end. The support wall 22Cg has a sealing member (trim seal) 638 attached to a lower end thereof As illustrated in FIG. 8, a seal abutment member 639 is provided at the right side of the hood's rear portion 22B (see FIG. 29). The seal abutment member 639 is provided inside the hood's rear portion 22B (at the same side of the hood's rear portion 22B as the prime mover chamber E2). The seal abutment member 639 extends from the upper portion of the hood's rear portion 22B to the lower portion of the hood's rear portion 22B.

Figure 18:
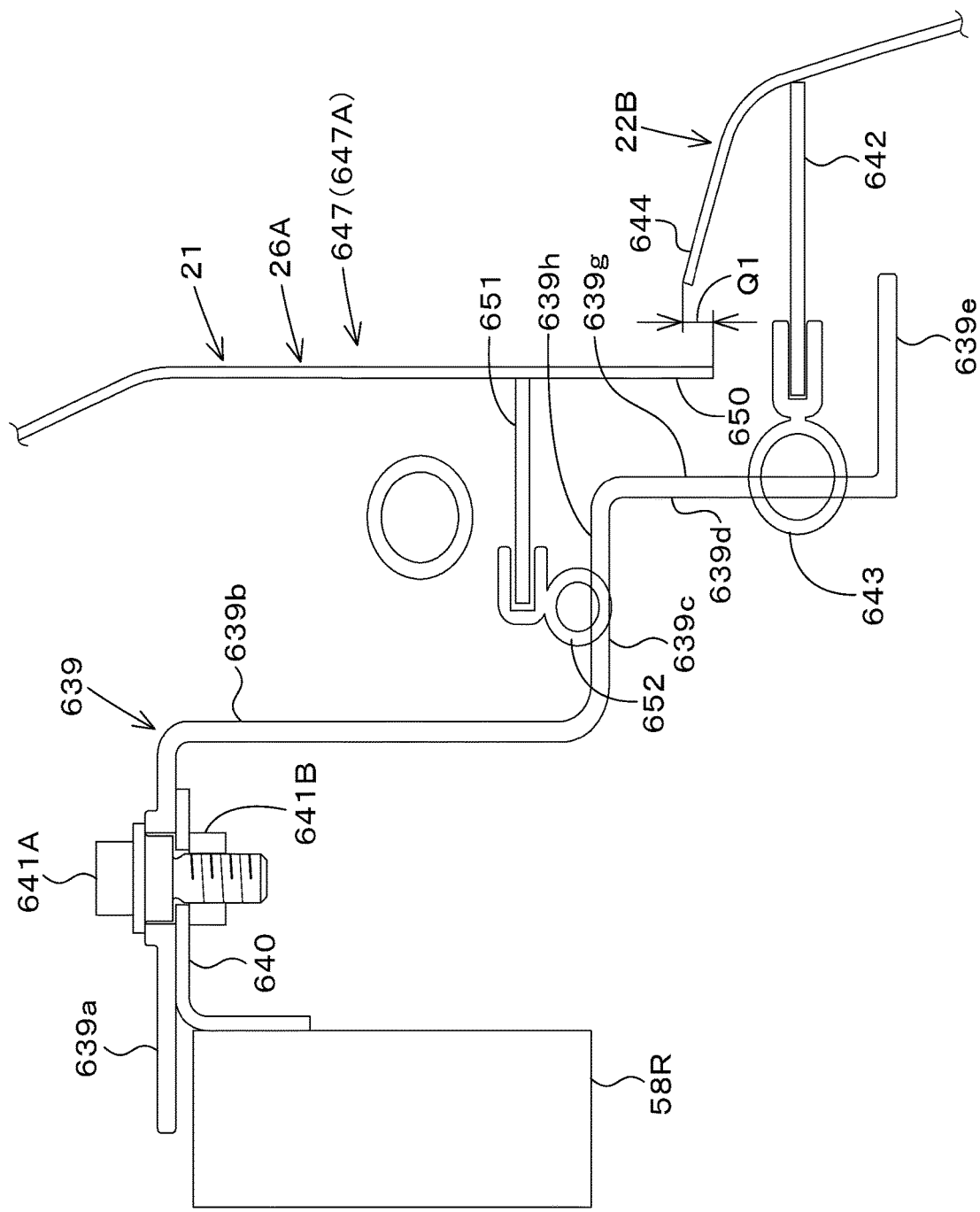
FIG. 18 is a planar cross-sectional view of a part in which the hood's rear portion and a cover main body meet each other.
Figure 19:
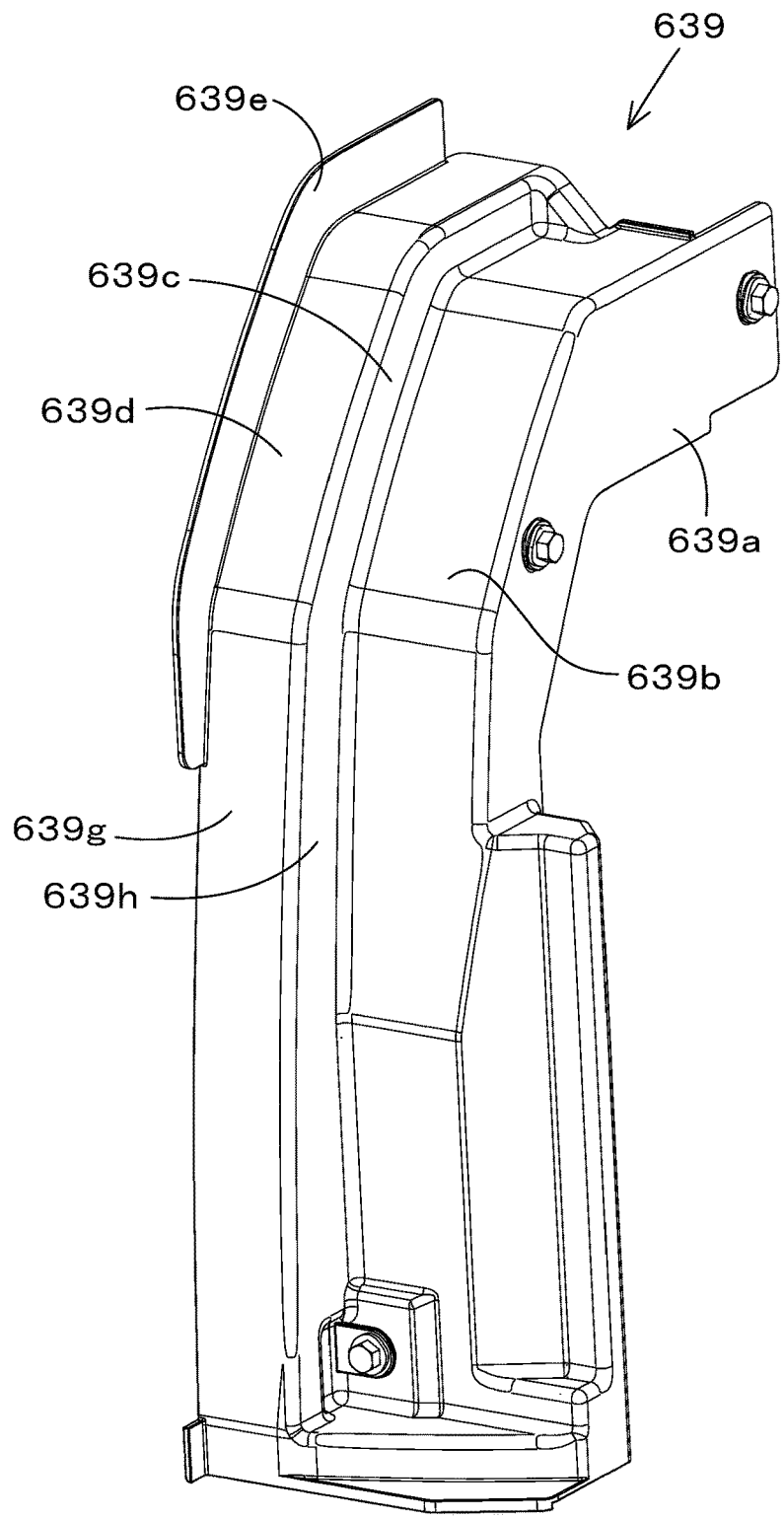
FIG. 19 is a perspective view of a seal abutment member.

As illustrated in FIGS. 18 and 19, the seal abutment member 639 includes first to fifth walls 639a to 639e. The first wall 639a extends from an upper portion to an intermediate portion of the seal abutment member 639 on the right side of the seal abutment member 639. The first wall 639a is attached to a stay 640 fixed to the second rear leg 58R with a bolt 641A and a nut 641B. The second wall 639b has an upper portion extending leftward from an upper edge of the first wall 639a and an intermediate portion extending leftward from a rear edge of the first wall 639a. A lower portion of the second wall 639b extends downward from a lower edge of the intermediate portion. The third wall 639c has an upper portion extending upward from a left edge of an upper portion of the second wall 639b, and has intermediate and lower portions extending rearward from the intermediate portion of the second wall 639b and a left edge of the lower portion of the second wall 639b. The fourth wall 639d has an upper portion extending leftward from an upper edge of the upper portion of the third wall 639c and an intermediate and lower portions extending leftward from rear edges of the intermediate portion and lower portion of the third wall 639c. The fifth wall 639e extends from an upper portion to an intermediate portion of the seal abutment member 639 on the left side of the seal abutment member 639. The fifth wall 639e has an upper portion extending upward from a left edge of the upper portion of the fourth wall 639d and a lower portion extending rearward from a left edge of the intermediate portion of the fourth wall 639d.

The seal abutment member 639 has a first abutment surface 639g and a second abutment surface 639h. The first abutment surface 639g is composed of the upper surface of the upper portion of the fourth wall 639d and the rear surfaces of the intermediate and lower portions of the fourth wall 639d. Therefore, an upper portion of the first abutment surface 639g faces up, and intermediate and lower portions of the first abutment surface 639g face rearward. The second abutment surface 639h is composed of a right surface of the third wall 639c. That is, the second abutment surface 639h is provided adjacent to the first abutment surface 639g on the right side of the first abutment surface 639g and faces rightward.

The sealing member 638 (see FIG. 16) on the right side of the fixed hood 22C abuts on a front portion of an upper portion of the first abutment surface 639g.

Figure 20:
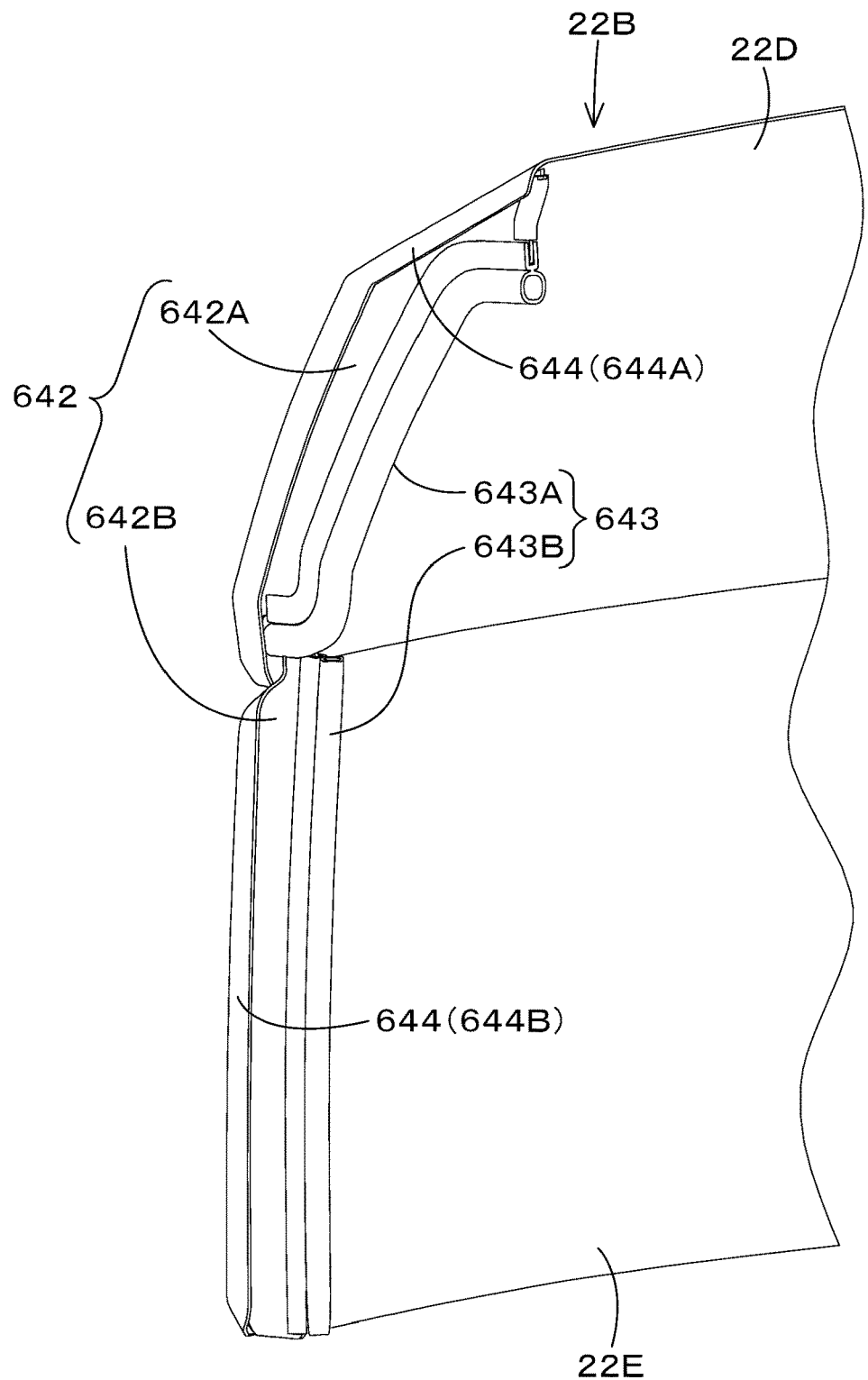
FIG. 20 is a perspective view of a right portion of the hood's rear portion as seen from the inside.

As illustrated in FIG. 20, at the right edge of the hood's rear portion 22B, a stay wall (first stay wall) 642 projecting inward from the inner surface is provided. The first stay wall 642 extends from the upper portion to the lower portion of the hood's rear portion 22B. Specifically, the first stay wall 642 includes an upper stay 642A provided on the inner surface of the first member 22D, and a lower stay 642B provided on the inner surface of the second member 22E. The first stay wall 642 has, attached to a distal edge thereof, a sealing member (first sealing member) 643 composed of a trim seal. Specifically, the sealing member 643 includes a first seal 643A attached to the upper stay 642A, and a second seal 643B attached to the lower stay 642B. When the hood's rear portion 22B is closed, the sealing member 643 abuts on the rear portion of the upper portion and the intermediate and lower portions of the first abutment surface 639g from the upper rear side.

As illustrated in FIGS. 18 and 20, the right edge portion of the hood's rear portion 22B is bent forward. That is, the hood's rear portion 22B includes a hood edge portion 644 which extends toward the prime mover chamber E2 and which is a right edge portion (one of opposite end portions that is closer to the cover main body 26 (described later) than the other). Specifically, as illustrated in FIG. 18, the hood edge portion 644 extends such that it is inclined in the machine body-outward direction (rightward) toward the front. As illustrated in FIG. 20, the hood edge portion 644 includes an upper edge portion 644A provided at the right edge of the first member 22D and a lower edge portion 644B at the right edge of the second member 22E. The first stay wall 642 is provided at a position inward of the hood edge portion 644 with respect to the machine body (provided inward of the hood edge portion 644 in the machine body-inward direction, or provided on the machine body-inward side of the hood edge portion 644) (provided leftward of the hood edge portion 644).

Figure 21:
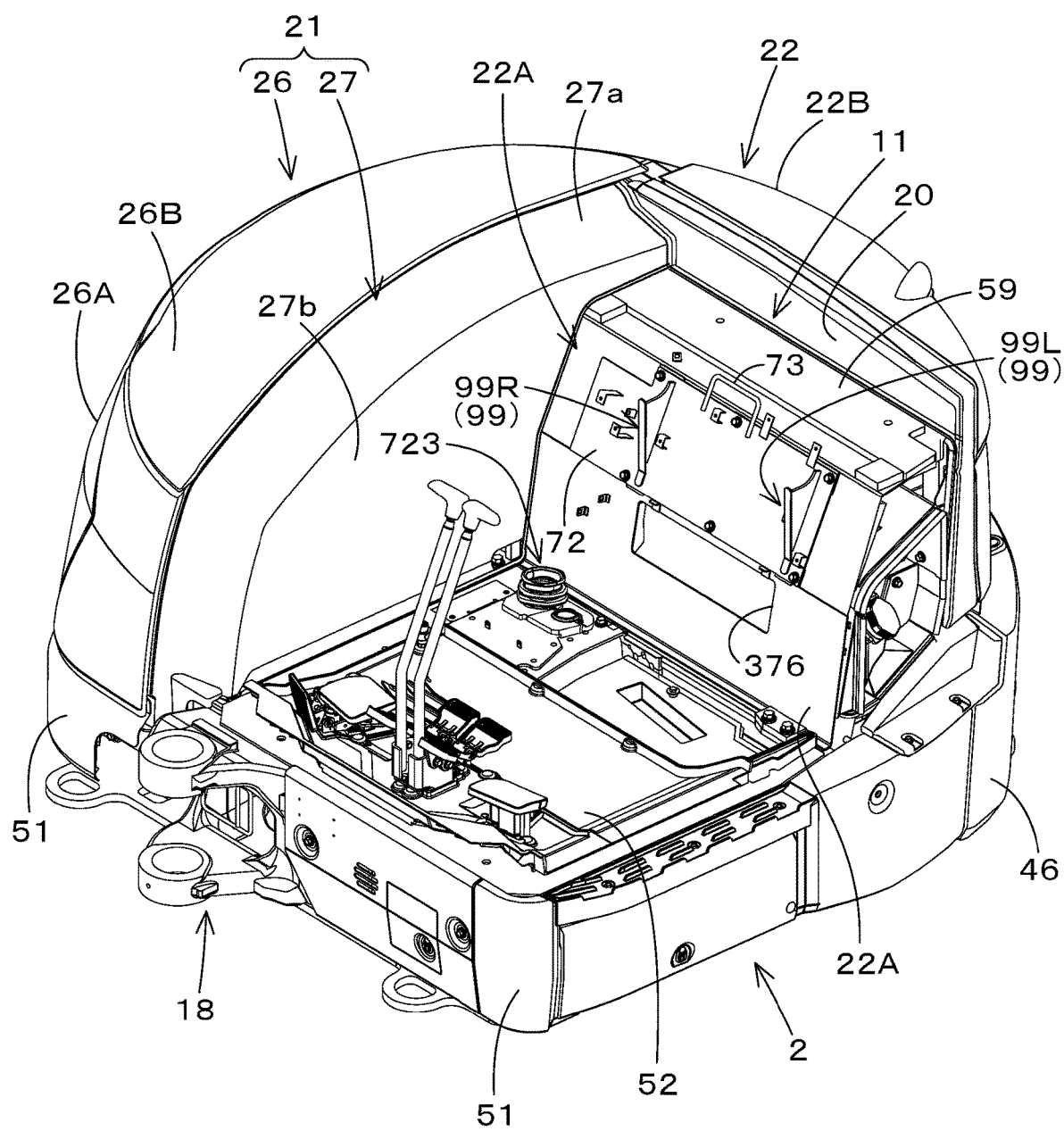
FIG. 21 is an external view of the machine body.

As illustrated in FIG. 21, a swivel cover (exterior member) 51 is provided on the left and right sides and the front side of the machine body 2. The swivel cover 51 covers the left side, right side, and the front side of the swivel frame 41.

As illustrated in FIG. 2, a cover body 21 is provided on the opposite side of the machine body 2 from the side on which the cabin 5 is mounted (the cover body 21 is provided on the right side of the machine body 2). That is, the cover body 21 is disposed at a lateral side (right side) of the cabin 5.

As illustrated in FIGS. 2 and 21, the cover body 21 extends from a front portion of a right portion of the machine body 2 to a rear portion of the machine body 2, and covers the upper side of the swivel frame 41. The cover body 21 is a cover which covers apparatuses disposed at a lateral side of the prime mover E1. Specifically, the cover body 21 houses apparatuses such as the battery BT1, the control valve V1, the hydraulic fluid tank T2, the controller 24, the radiator R1, the oil cooler O1, the receiver G2, and the condenser G3.

The hood's rear portion 22B (hood 22) is located leftward of a rear portion of the cover body 21. The cover body 21 has, in a rear portion of the right side surface thereof, outside air intake(s) 645 where air enters the rear portion of the cover body 21 and the hood 22 (see FIG. 23).

Figure 22:
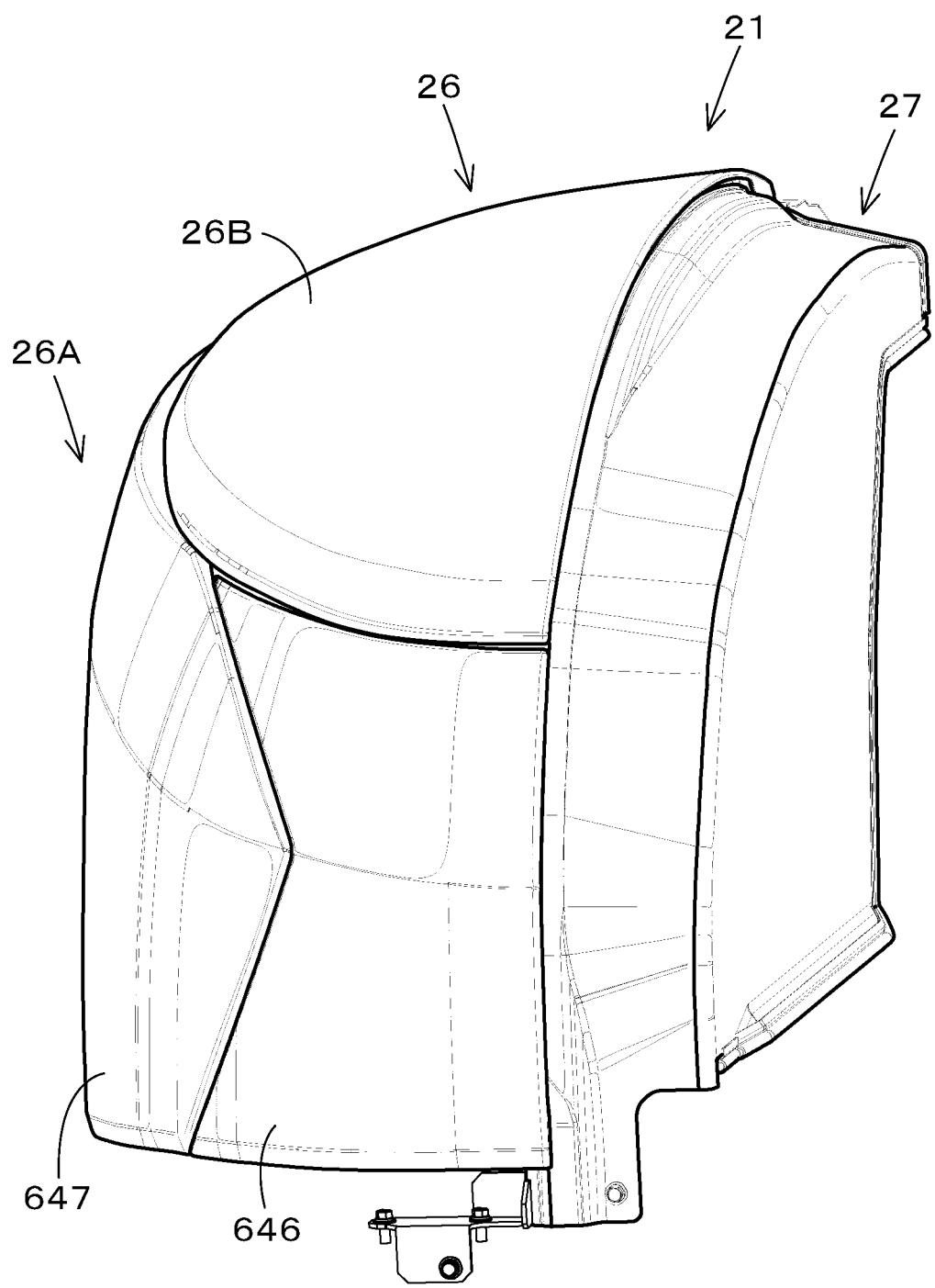
FIG. 22 is a perspective view of the cover main body as seen from the front.

As illustrated in FIGS. 2, 21, and 22, the cover body 21 includes a cover main body (cover member) 26 swingably attached to the machine body 2 and configured to be opened and closed, and a fixed cover 27 attached to the machine body 2 in a fixed manner. As illustrated in FIG. 2, the fixed cover 27 is disposed rightward of the cabin 5, and the cover main body 26 is disposed rightward of the fixed cover 27. The cover main body 26 has an open left side and an open bottom, and the fixed cover 27 covers (closes) the left side of the cover main body 26. The cover main body 26 has an upper and machine-body-inward portion (left portion of the upper portion) pivotably supported on an axis extending along the machine body front-rear direction K1 and is swingable up and down about the axis. The cover main body 26 is opened by being swung upward, and is closed by being swung downward.

As illustrated in FIGS. 21 and 22, the cover main body 26 includes a lower cover 26A and an upper cover 26B. The lower cover 26A defines a front surface, a machine body-outward side surface, and a rear surface of a chamber for the apparatuses housed in the cover body 21. The upper cover 26B defines the upper surface of the chamber for the apparatuses.

Figure 23:
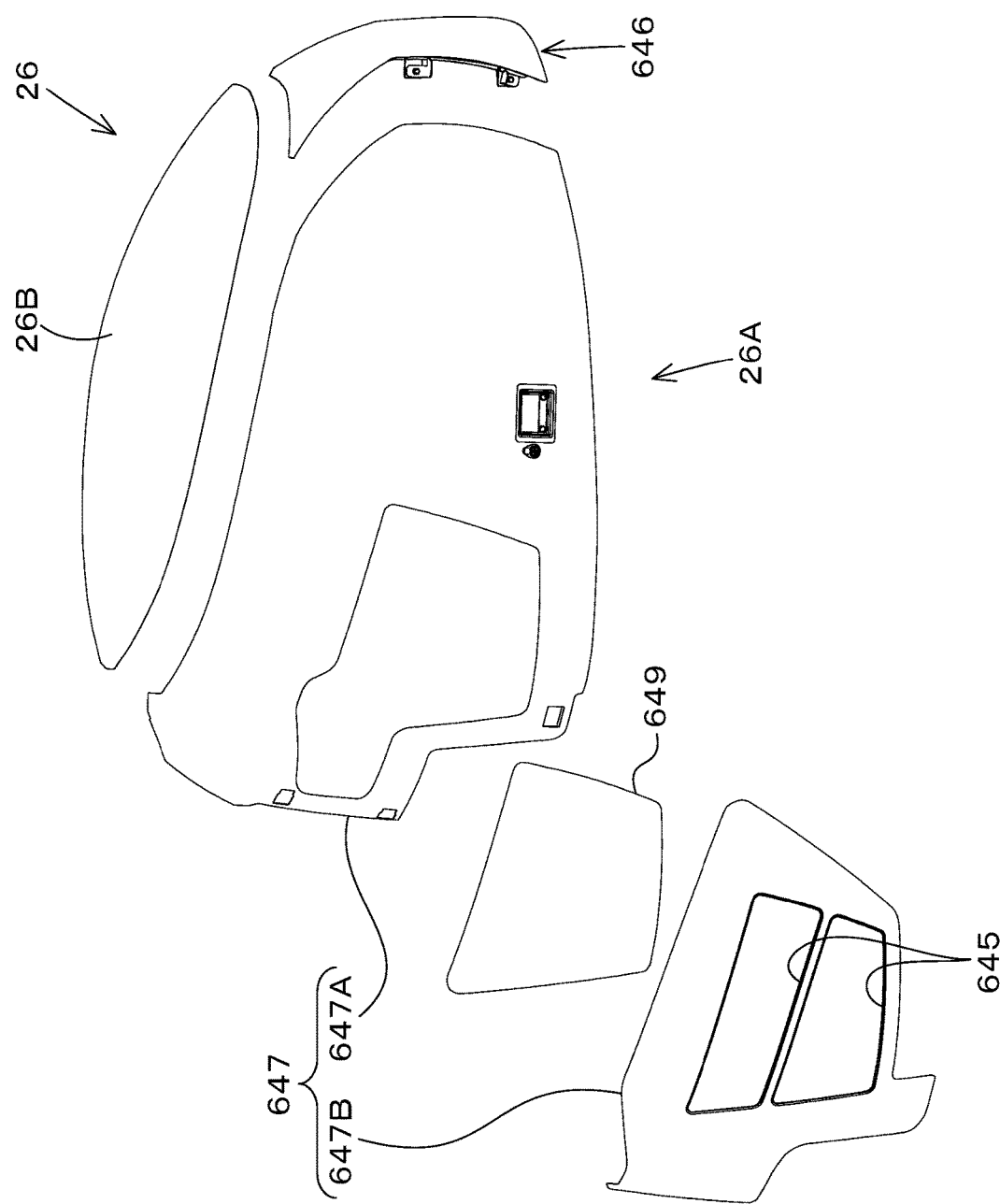
FIG. 23 is an exploded perspective view of the cover main body.

As illustrated in FIG. 23, the lower cover 26A is composed of a plurality of members. The lower cover 26A includes a first cover 646 which constitutes a front portion, and a second cover 647 which constitutes an intermediate portion and a rear portion. Furthermore, the second cover 647 includes a main cover 647A which mainly constitutes front to rear portions of the second cover 647, and a sub-cover 647B which closes an opening 648 in a rear portion of the main cover 647A. The sub-cover 647B has outside air intake(s) 645. The outside air intake(s) 645 is/are closed by a dust cover 649 permeable to air.

The main cover 647A and the sub-cover 647B are painted in respective different colors. That is, the second cover 647 is painted in two colors (painted partially in a different color). Since the second cover 647 is divided into the main cover 647A and the sub-cover 647B, a painting process for the two-color painting can be simplified. Specifically, the second cover 647 can be easily painted in two colors by painting the main cover 647A and the sub-cover 647B in respective different colors, and then attaching the sub-cover 647B to the main cover 647A. For example, if the second cover 647 is composed of a single component, an area not to be painted needs be masked for the two-color painting, necessitating more steps than usual painting. In the present embodiment, masking is not necessary, and therefore the painting process can be simplified.

Note that, in the present embodiment, the upper cover 26B and the first cover 646 are painted in a different color from the main cover 647A of the second cover 647, similarly to the sub-cover 647B.

As illustrated in FIG. 2, the fixed cover 27 is disposed between the cover main body 26 and the cabin 5. The fixed cover 27 houses the controller 24 therein. As illustrated in FIG. 17, the fixed cover 27 includes a peripheral wall 27a and a medial wall 27b which covers a side facing the cabin 5. The interior of the fixed cover 27 is in communication with the interior of the cover main body 26.

Figure 25:
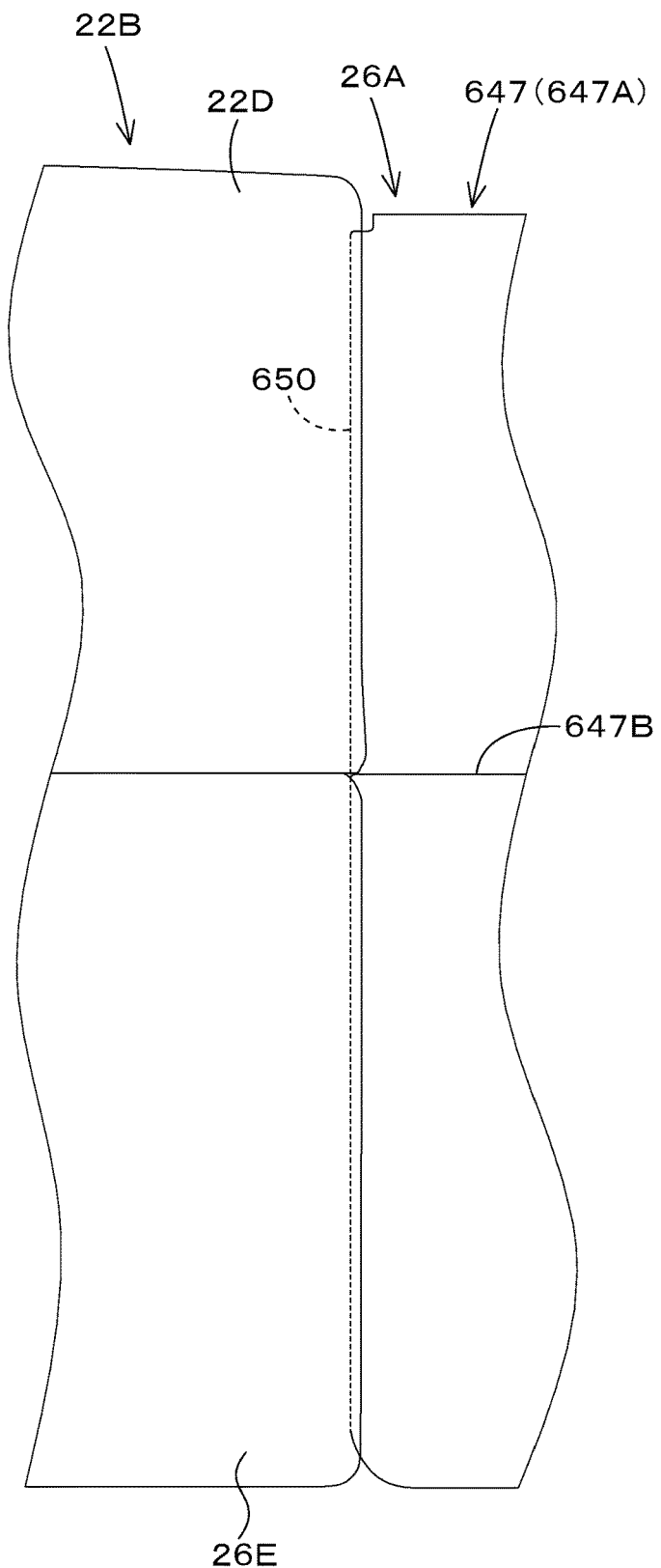
FIG. 25 is a rear view of a part in which the hood's rear portion and the cover main body meet each other.

As illustrated in FIG. 18, the cover main body 26 (main cover 647A) includes an insertion edge portion 650 which is one of opposite edge portions that is closer to the hood's rear portion 22B than the other. The insertion edge portion 650 is located within the hood's rear portion 22B when the hood's rear portion 22B and the cover main body 26 are in their closed position. That is, the insertion edge portion 650 overlaps the hood edge portion 644 in rear view. An overlap Q1 is, for example, about 5 mm. Since the insertion edge portion 650 is located within the hood's rear portion 22B, as illustrated in FIG. 25, when the working machine 1 is viewed from the rear when the hood's rear portion 22B and the cover main body 26 are in their closed position, the insertion edge portion 650 is hidden by the hood edge portion 644. This makes it possible to prevent a gap from forming between the right edge of the hood's rear portion 22B and the left edge of a rear portion of the cover main body 26 in the machine body-width direction K2, and possible to prevent deterioration of external appearance quality. When the hood's rear portion 22B is closed, the first stay wall 642 and the sealing member 643 abut on the first abutment surface 639g, making it possible to prevent the right edge of the hood's rear portion 22B from interfering with the insertion edge portion 650.

Figure 24:
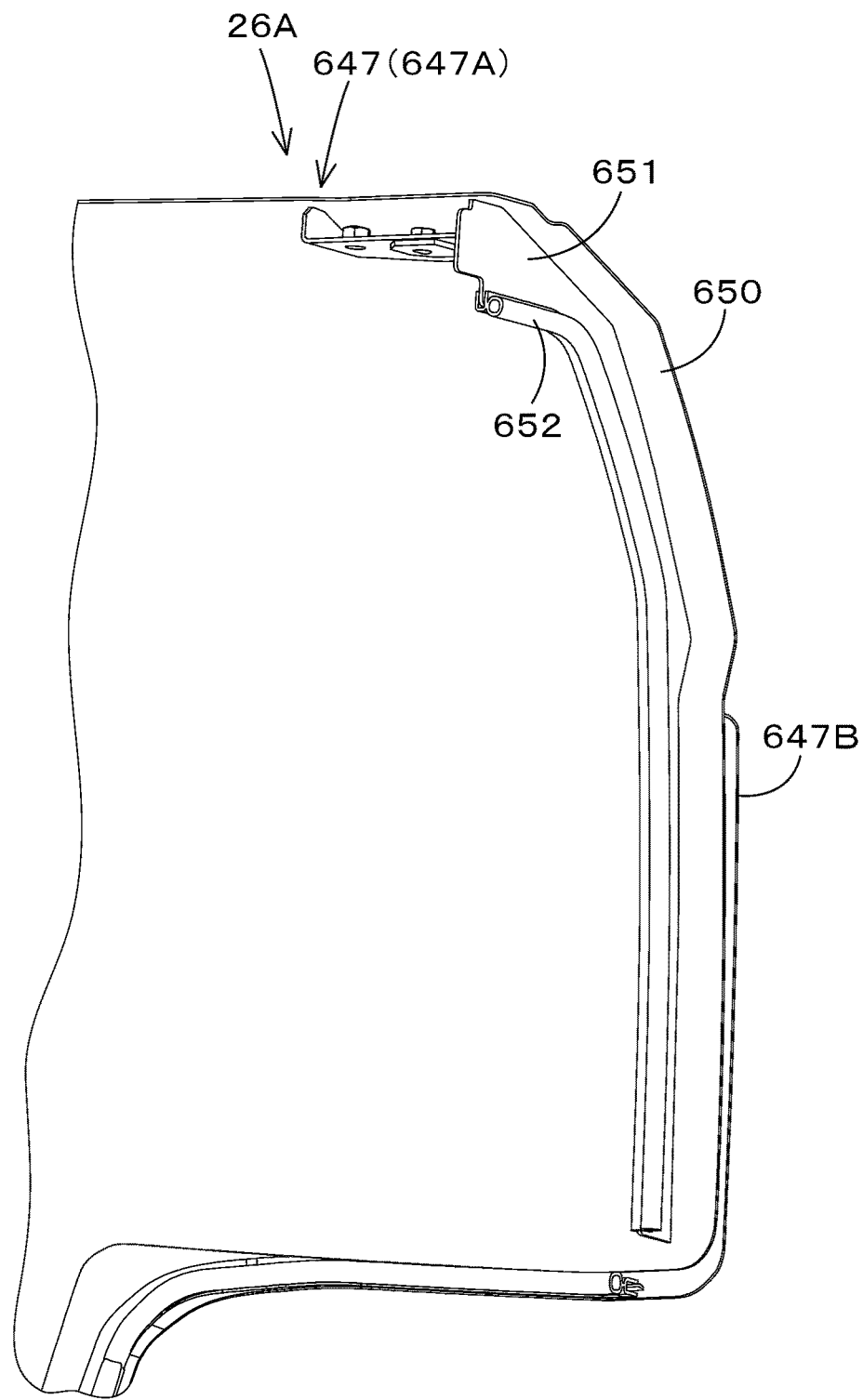
FIG. 24 is a perspective view of a lower cover as seen from the inside.

As illustrated in FIG. 24, a second stay wall 651 is provided on the inner surface of the rear portion of the cover main body 26 such that the second stay wall 651 extends from an upper portion to a lower portion and projects from the inner surface. As illustrated in FIG. 18, the second stay wall 651 is located at a position outward of the insertion edge portion 650 and the second abutment surface 639h with respect to the machine body (located outward of the insertion edge portion 650 and the second abutment surface 369h in the machine body-outward direction, or located on the machine body-outward side of the insertion edge portion 650 and the second abutment surface 369h) (located rightward of the insertion edge portion 650 and the second abutment surface 639h) when the cover main body 26 is in its closed position. As illustrated in FIGS. 18 and 24, the second stay wall 651 has, attached to a distal edge thereof, a sealing member (second sealing member) 652 composed of a trim seal. The sealing member 652 abuts on the second abutment surface 639h from the right side when the cover main body 26 is closed.

Figure 26:
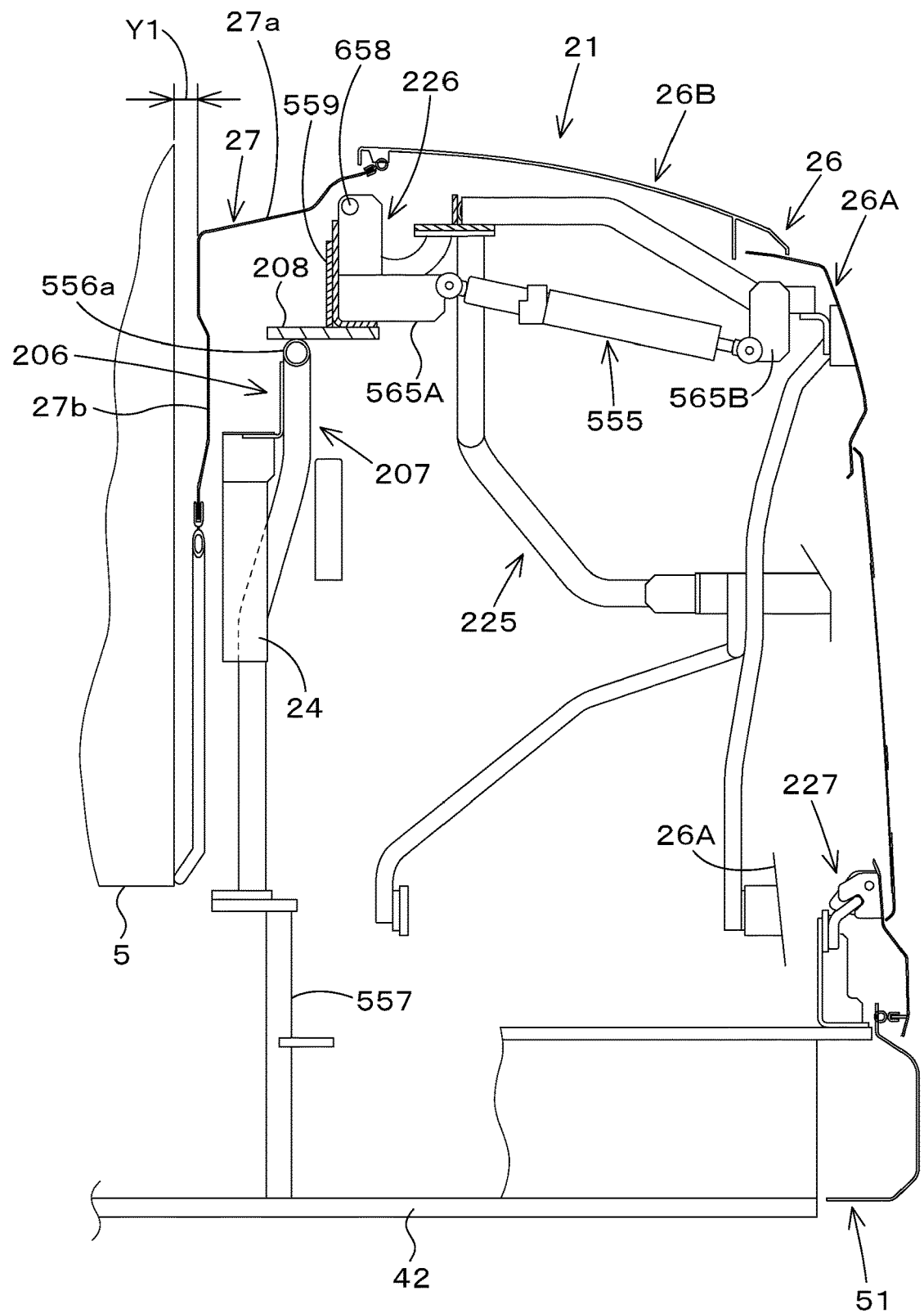
FIG. 26 is a cross-sectional view of a right portion of the machine body as seen from the rear.

As illustrated in FIG. 26, a frame member 206 is disposed in the fixed cover 27 (cover body 21). The cover body 21 (the cover main body 26 and the fixed cover 27) is supported on the frame member 206.

Figure 27:
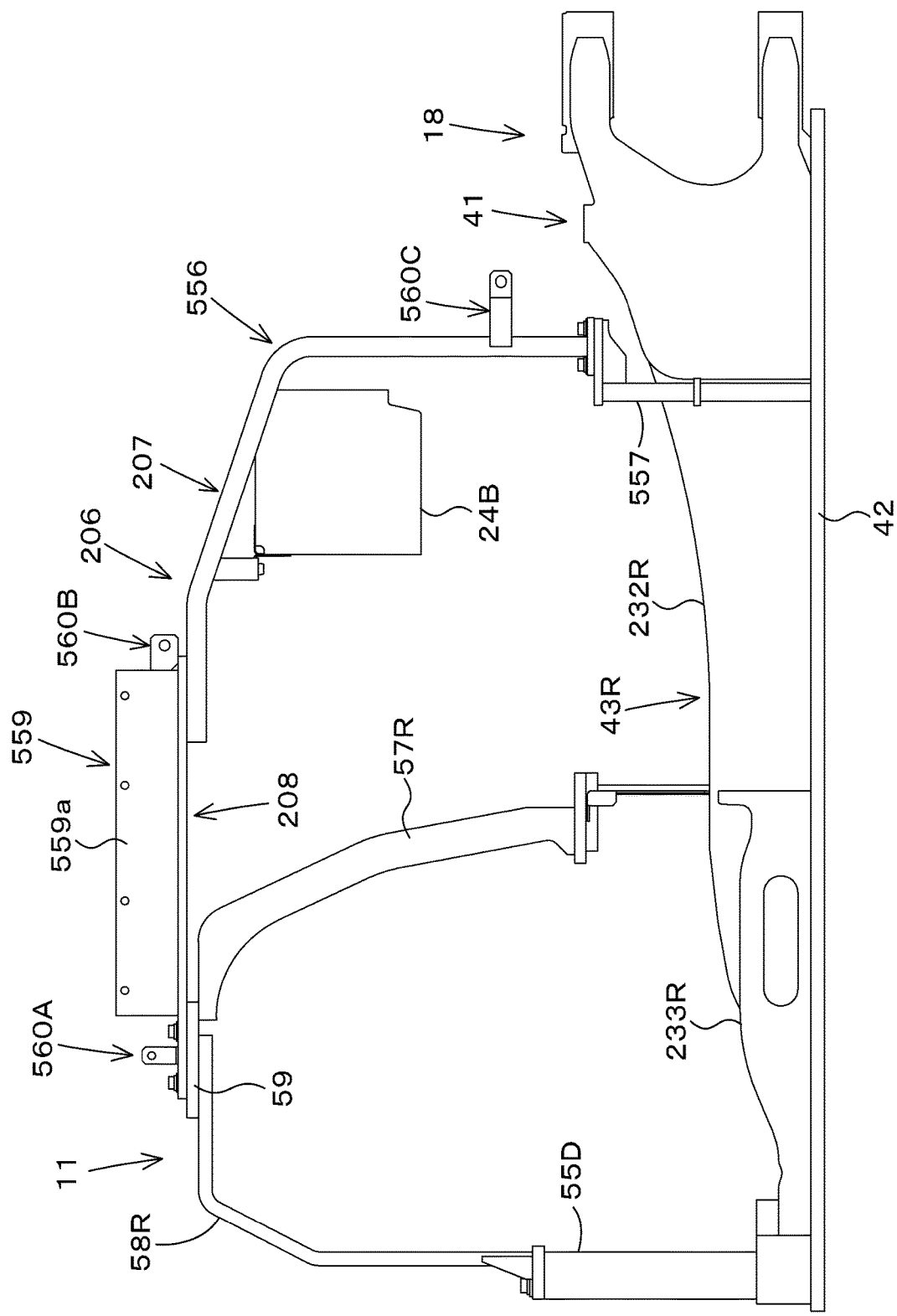
FIG. 27 is a right side view of a frame member.
Figure 28:
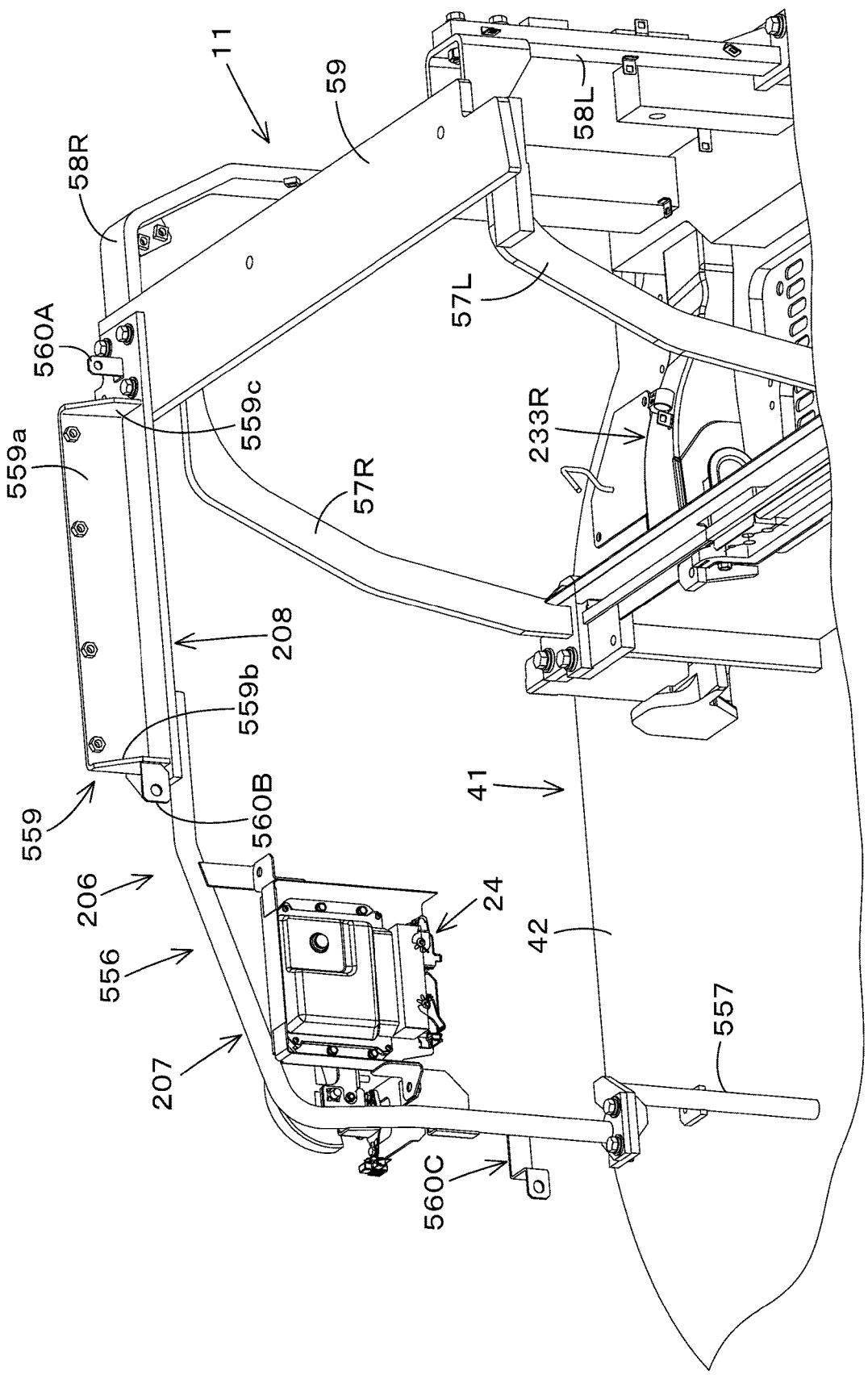
FIG. 28 is a perspective view of the frame member as seen from the left side.

As illustrated in FIGS. 27 and 28, the frame member 206 includes a first frame constituent member 208 and a second frame constituent member 207. The first frame constituent member 208 is formed of a thick plate disposed with plate surfaces facing up and down, and a rear portion of the first frame constituent member 208 is attached to an upper portion of the support frame 11 with bolt(s) and projects forward from the support frame 11. The second frame constituent member 207 includes a first frame part 556 which extends forward from the first frame constituent member 208 and which includes a front portion bent to extend downward, and a second frame part 557 which extends upward from the swivel frame 41 (swivel base plate 42). The first frame part 556 and the second frame part 557 are each formed of a rod-shaped member such as a pipe material. A lower end of a front portion of the first frame part 556 is connected to the second frame part 557 by flange coupling. The controller 24 is attached to the first frame part 556. The controller 24 is the foregoing prime mover ECU.

As illustrated in FIGS. 27 and 28, the frame member 206 includes a hinge supporting plate 559 fixed on the first frame constituent member 208. The hinge supporting plate 559 includes a side plate portion 559a having a plate surface facing in the machine body-width direction K2, a front plate portion 559b which extends leftward from a front edge of the side plate portion 559a, and a rear plate portion 559c which extends leftward from a rear edge of the side plate portion 559a.

As illustrated in FIG. 26, the side plate portion 559a of the hinge supporting plate 559 has, attached on the right side thereof, a hinge 226 which supports the cover main body 26 such that the cover main body 26 is swingable up and down. In the cover main body 26, there is a frame body 225 which supports the cover main body 26. The frame body 225 is connected to the first frame constituent member 208 via the hinge 226 and the hinge supporting plate 559. The frame body 225 includes a lower portion which is configured to be engaged (locked) with the machine body 2 via an engagement mechanism 227. The cover main body 26 is configured such that, since an upper and machine-body-inward portion of the cover main body 26 (left portion of the upper portion of the cover main body 26) is supported by the hinge 226 pivotably about an axis extending along the machine body front-rear direction K1, unlocking the engagement mechanism 227 allows the cover main body 26 to swing up and down (to be opened and closed). A damper 555 is provided such that the damper 555 extends from a supporting piece 565A provided on the hinge 226 to a supporting piece 565B provided on the frame body 225. The damper 555 is composed of, for example, a gas damper (gas spring), and biases the cover main body 26 in a direction in which the cover main body 26 is opened. When the cover main body 26 is swung upward (swung open), the damper 555 expands due to the reaction force of gas to assist the cover main body 26 in swinging open. Furthermore, the damper 555 is configured to keep the cover main body 26 in an open position. Furthermore, the damper 555 is positioned such that the damper 555 causes the cover member 26 in an open position to move along a guiding area 667 to cause the cover member 26 to be displaced in a direction away from the cabin 5.

As illustrated in FIGS. 27 and 28, the frame member 206 includes a cover mounting unit including a plurality of mounting pieces (mounting pieces 560A to 560C). The fixed cover 27 is attached to the cover mounting unit. The mounting piece 560A is fixed to a rear portion of the first frame constituent member 208. The mounting piece 560B is fixed to a front portion of the hinge supporting plate 559. The mounting piece 560C is fixed to a lower front portion of the first frame part 556.

Figure 29:
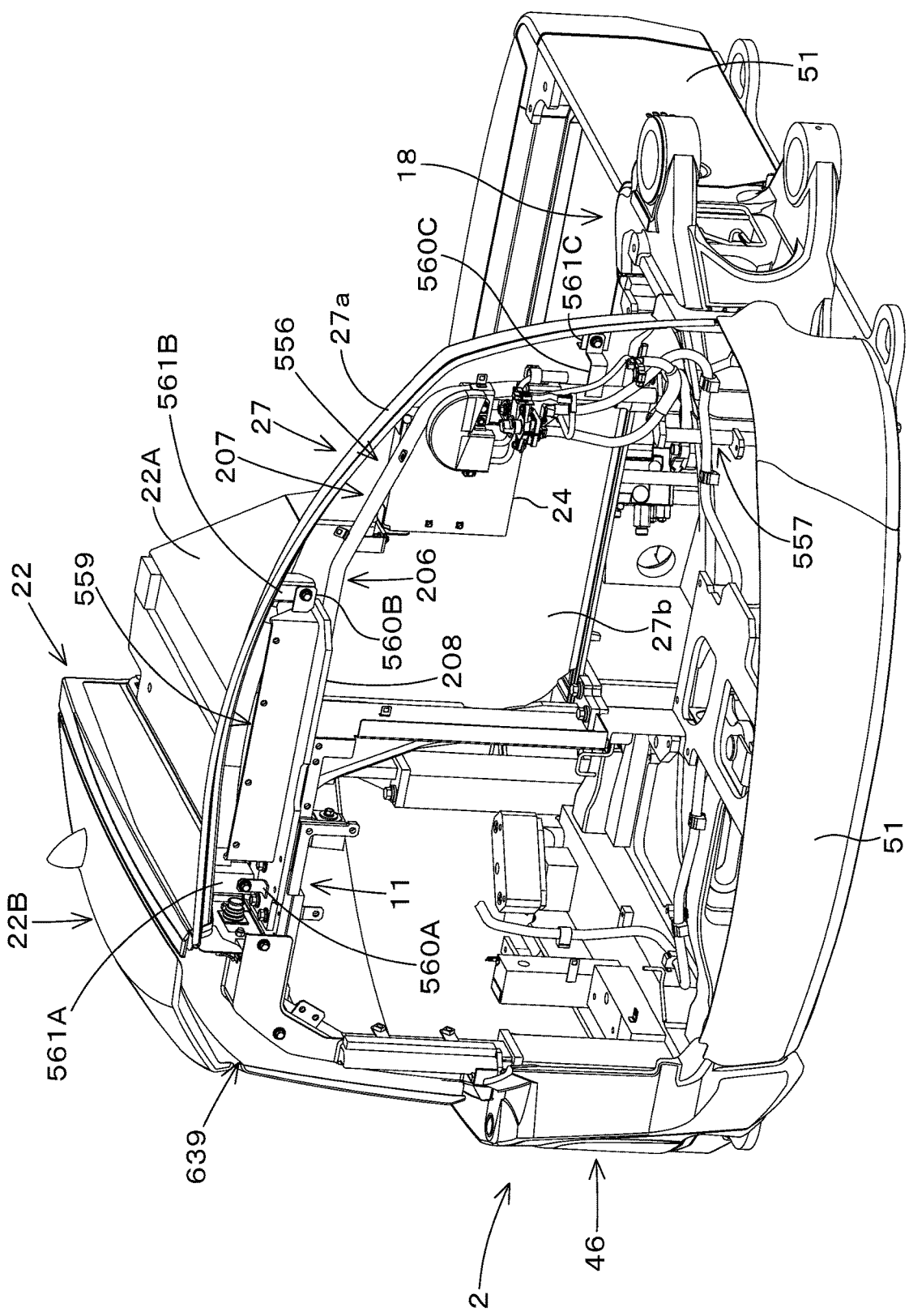
FIG. 29 is a perspective view of the right portion of the machine body.

As illustrated in FIG. 29, the inner surface of the fixed cover 27 is attached to the frame member 206 such that the fixed cover 27 is detachable from the frame member 206. Specifically, the fixed cover 27 has, provided on the inner surface thereof, fixed parts 561A to 561C fixed to the mounting pieces 560A to 560C. The fixed part 561A is provided at a position corresponding to the mounting piece 560A and is fixed to the mounting piece 560A with bolt(s). The fixed part 561B is provided at a position corresponding to the mounting piece 560B and is fixed to the mounting piece 560B with bolt(s). The fixed part 561C is provided at a position corresponding to the mounting piece 560C and is fixed to the mounting piece 560C with bolt(s).

Detachment of the fixed cover 27 allows easy access to the controller 24. Specifically, by detaching the fixed cover 27, the controller 24 can be visually recognized easily, and can be easily detached from the frame member 206 or attached to the frame member 206.

Figure 30:
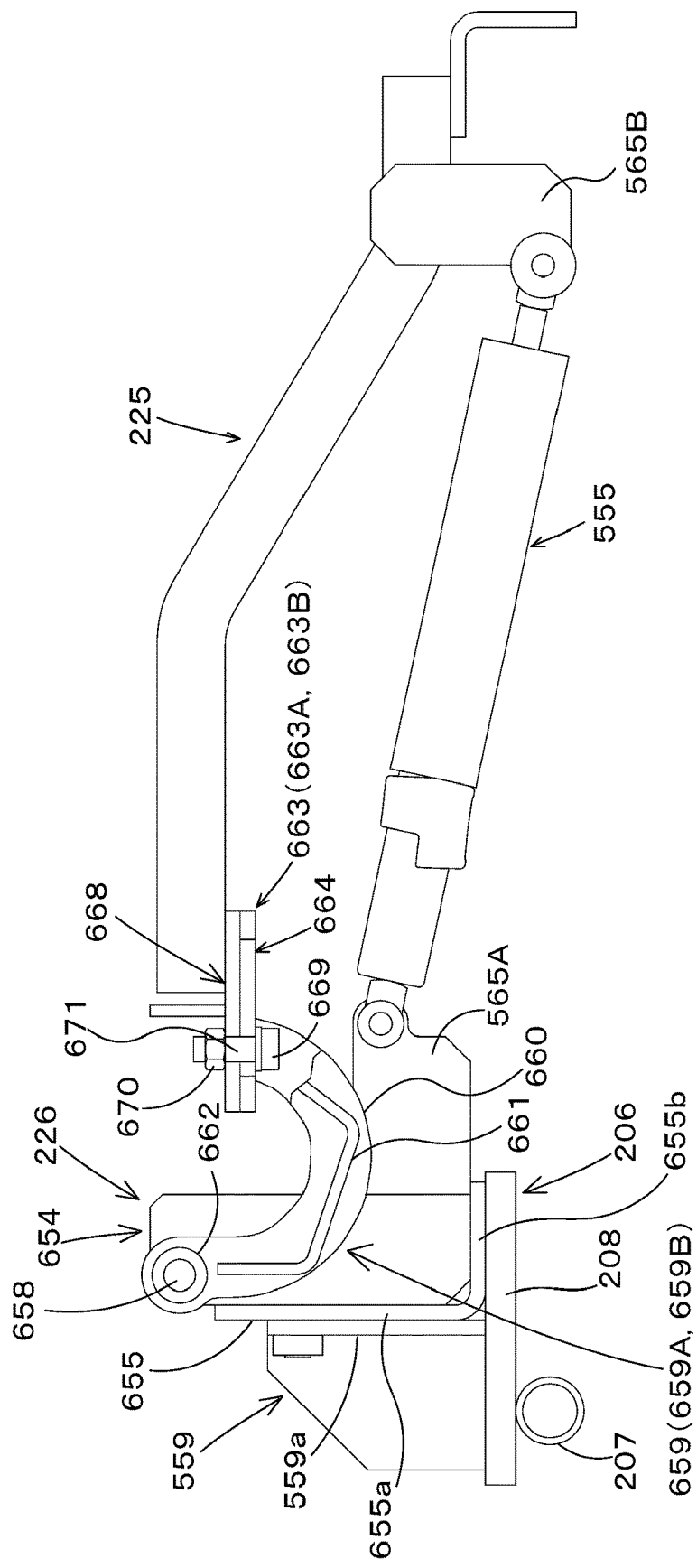
FIG. 30 illustrates a part in which the cover main body is supported, as seen from the rear.
Figure 31:
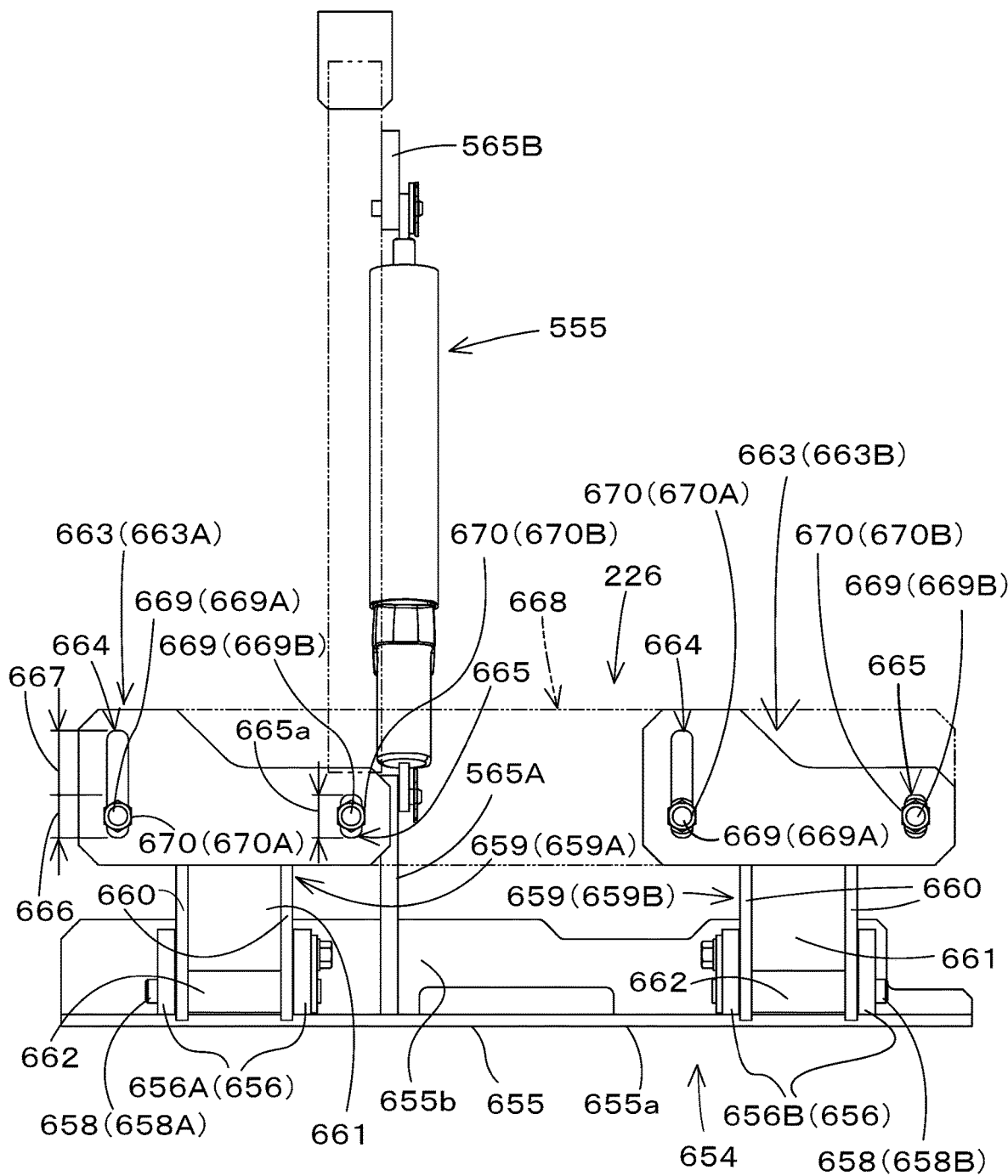
FIG. 31 is a plan view of the part in which the cover main body is supported.
Figure 32:
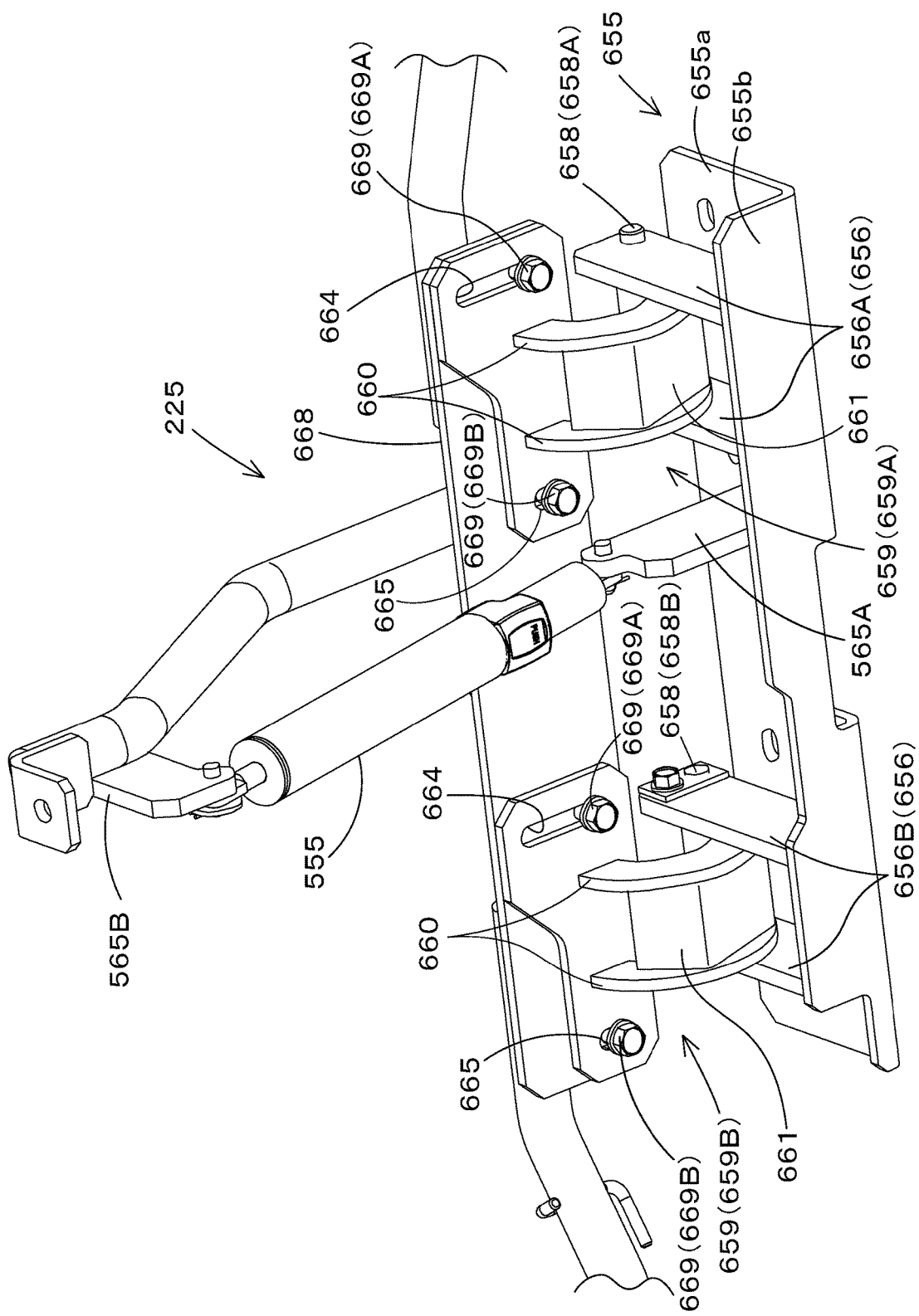
FIG. 32 is a perspective view of the part in which the cover main body is supported, as seen from below.

As illustrated in FIGS. 30 to 32, the hinge 226 includes a hinge bracket 654 fixed to the frame member 206 (hinge supporting plate 559). The hinge bracket 654 includes a bracket main body 655 and a plurality of mounting plates 656. The bracket main body 655 includes an upright wall portion 655a which is superimposed on a right surface of the side plate portion 559a of the hinge supporting plate 559 and which is fixed with bolt(s), and a lower wall 655b which extends in the machine body-outward direction (rightward) from a lower edge of the upright wall portion 655a and which is placed on the first frame constituent member 208. The mounting plates 656 are fixed to the right surface of the upright wall portion 655a and an upper surface of the lower wall 655b. The plurality of mounting plates 656 include a pair of first mounting plates 656A disposed on a front portion of the hinge bracket 654, and a pair of second mounting plates 656B disposed on a rear portion of the hinge bracket 654. The pair of first mounting plates 656A are arranged along the front-rear direction with a space therebetween. The pair of second mounting plates 656B are also arranged along the front-rear direction with a space therebetween.

Furthermore, the hinge 226 includes a hinge shaft 658, and a movable arm 659 supported on the hinge bracket 654 via the hinge shaft 658 such that the movable arm 659 is swingable up and down. The hinge shaft 658 includes a first hinge shaft 658A provided on the pair of first mounting plates 656A and a second hinge shaft 658B provided on the pair of second mounting plates 656B. The hinge shaft 658 has an axis extending along the machine body front-rear direction K1. The movable arm 659 includes a first movable arm 659A swingably supported on the first mounting plates 656A via the first hinge shaft 658A, and a second movable arm 659B swingably supported on the second mounting plates 656B via the second hinge shaft 658B. The first movable arm 659A and the second movable arm 659B each include a pair of arm members 660 arranged along the front-rear direction with a space therebetween, and a connecting member 661 which connects the pair of arm members 660. The arm members 660 are each curved to convex downward, and a left proximal portion thereof is fixed to a tubular boss 662 (see FIG. 30) externally fitted on the hinge shaft 658 rotatably about an axis. With this, the movable arm 659 is swingable up and down about the axis of the hinge shaft 658 (about an axis extending along the machine body front-rear direction K1).

Furthermore, the hinge 226 includes a mounting plate 663 which is fixed to a swinging end of the movable arm 659. The mounting plate 663 includes a first mounting plate 663A fixed to a swinging end of the first movable arm 659A, and a second mounting plate 663B fixed to a swinging end of the second movable arm 659B. The mounting plate 663 projects forward and rearward from the movable arm 659. The mounting plate 663 is wider along the machine body-width direction K2 in a front portion than in a rear portion. Each mounting plate 663 has an insertion hole (hole for insertion) (referred to as a first insertion hole) 664 in a front portion and another insertion hole (referred to as a second insertion hole) 665 in a rear portion. The first insertion hole 664 is formed forward of the movable arm 659 and the second insertion hole 665 is formed rearward of the movable arm 659. The first insertion hole 664 and the second insertion hole 665 are elongated holes each of which is elongated in the machine body-width direction K2. The first insertion hole 664 is an elongated hole longer than the second insertion hole 665. The first insertion hole 664 is an elongated hole longer than the second insertion hole 665. Specifically, the left end of the first insertion hole 664 and the left end of the second insertion hole 665 are located at the same position in the machine body-width direction K2, and the right end of the first insertion hole 664 is located outward of the right end of the second insertion hole 665 in the machine body-outward direction. The first insertion hole 664 includes a mounting area 666 and a guiding area 667 which extends from the mounting area 666. The mounting area 666 has a length equal to a length 665a of the second insertion hole 665. The guiding area 667 is an area extending from the mounting area 666 along the longitudinal direction.

As illustrated in FIG. 30, the hinge 226 includes mounting bolts 669 which attach a connector plate 668 provided on the cover main body 26 to the mounting plate 663 such that the connector plate 668 is superimposed on the mounting plate 663, and nuts 670 screwed onto the mounting bolts 669. The mounting bolts 669 include a first mounting bolt 669A inserted into the first insertion hole 664, and a second mounting bolt (another mounting bolt) 669B inserted into the second insertion hole 665. The nuts 670 include a first nut 670A screwed onto the first mounting bolt 669A, and a second nut 670B screwed onto the second mounting bolt 669B. The connector plate 668 is attached and fixed to the mounting plate 663 with the mounting bolts and the nuts within the range of the mounting area 666 of the first insertion hole 664 and the range of the length of the second insertion hole 665. The connector plate 668 is fixed to the frame body 225. The connector plate 668 has bolt insertion holes 671 for insertion of the first mounting bolt 669A and the second mounting bolt 669B, which are formed of circular holes.

Note that, in the present embodiment, the shaft diameter of the mounting bolts 669 is 10 mm, the first insertion hole 664 is 11 mm in width and 55 mm in length, and the second insertion hole 665 is 11 mm in width and 22 mm in length. The sizes of such components are not limited to those sizes described above, but the length of the second insertion hole 665 is preferably set to be longer than the shaft diameter of the mounting bolt 669 by about 10 mm to 20 mm, in order to enable fine adjustment of the position at which the cover main body 26 is attached. Furthermore, the length of the first insertion hole 664 is preferably set to be longer than the shaft diameter of the mounting bolt 669 by about 30 mm to 100 mm, more preferably by about 40 mm to 70 mm, in order to achieve suitable results such as easy assembling (described later). Note that the width of the first insertion hole 664 and the width of the second insertion hole 665 each need only be set to be slightly greater than the shaft diameter of the mounting bolt 669.

Figure 33:
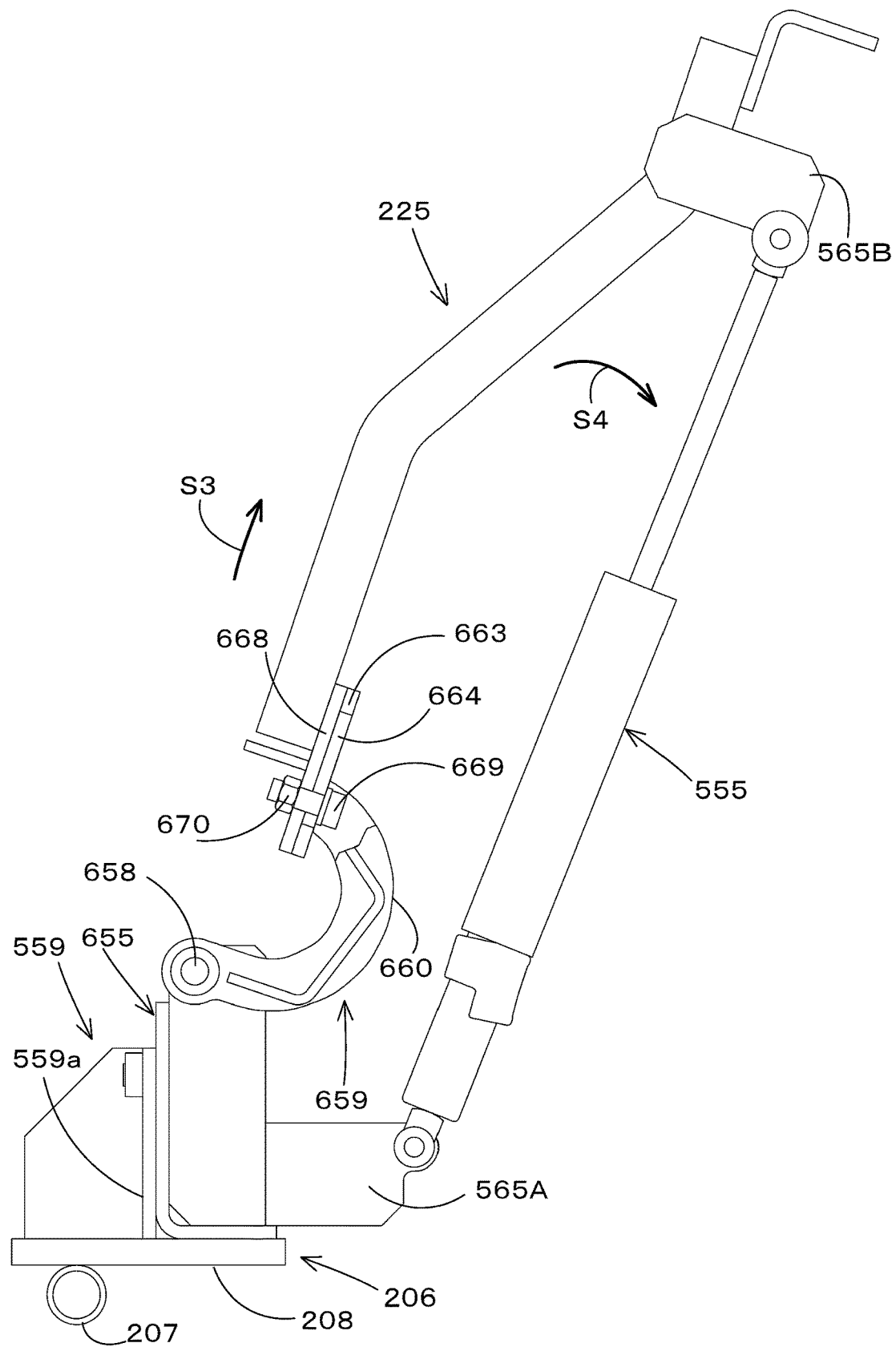
FIG. 33 illustrates a hinge which has raised the cover main body, as seen from the rear.

As illustrated in FIG. 30, the first insertion hole 664 and the second insertion hole 665 each extend along the machine body-width direction K2 when the movable arm 659 is in a downward swung position (when the cover main body 26 is in a closed position). Therefore, the guiding area 667 extends rightward (in a direction away from the cabin 5) from the mounting area 666 when the cover main body 26 is in the closed position. Furthermore, as illustrated in FIG. 33, the guiding area 667 extends upward from the mounting area 666 when the movable arm 659 is in an upward swung position (when the cover main body 26 is in its open position).

The following description discusses an attaching process involving attaching the cover main body 26 to the hinge 226.

The fixed cover 27 is attached to the frame member 206 before the cover main body 26 is attached. The cover main body 26 is attached in the following manner. The cover main body 26, which is in an open position (with the connector plate 668 positioned at the lower side), is hoisted with a crane and then lowered so that the connector plate 668 is positioned above the hinge 226, and is stopped when the cover main body 26 is located higher than the fixed cover. Next, the connector plate 668 is attached to the mounting plate 663 with the mounting bolts 669 and the nuts 670. In so doing, first, each first mounting bolt 669A and each first nut 670A are loosely tightened at the upper end of the guiding area 667 of the first insertion hole 664. Next, lowering the cover main body 26 causes the first mounting bolt 669A to be lowered along the first insertion hole 664. Once each first mounting bolt 669A has reached the mounting area 666, the first mounting bolts 669A and the first nuts 670A are finally tightened. Next, each second mounting bolt 669B is inserted into the second insertion hole 665, and the second nut 670B is screwed onto the second mounting bolt 669B and tightened up.

As such, the first mounting bolt 669A can be loosely tightened to the first insertion hole 664 at a position higher than the position at which the cover main body 26 is attached. This makes it possible to attach the cover main body 26 while preventing the cover main body 26 from interfering with another component (fixed cover 27) that would interfere with the cover main body 26 at the position at which the cover main body 26 is attached.

For example, if it is necessary to lower the cover main body 26 to the attachment position in order to attach the cover main body 26, it is necessary to attach the cover main body 26 while preventing interference with another component that would interfere with the cover main body 26 at the attachment position. This necessitates precise operation of the crane and a covering (protective covering) on the other component, and makes it difficult to quickly mount the cover main body 26. In the present embodiment, after each first mounting bolt 669A is loosely tightened to the first insertion hole 664 at a position higher than the attachment position at which the cover main body 26 is attached, it is only necessary to lower the cover main body 26 along the first insertion hole 664. This makes it possible to improve the mountability of the cover main body 26. This also facilitates maintenance.

Figure 34:
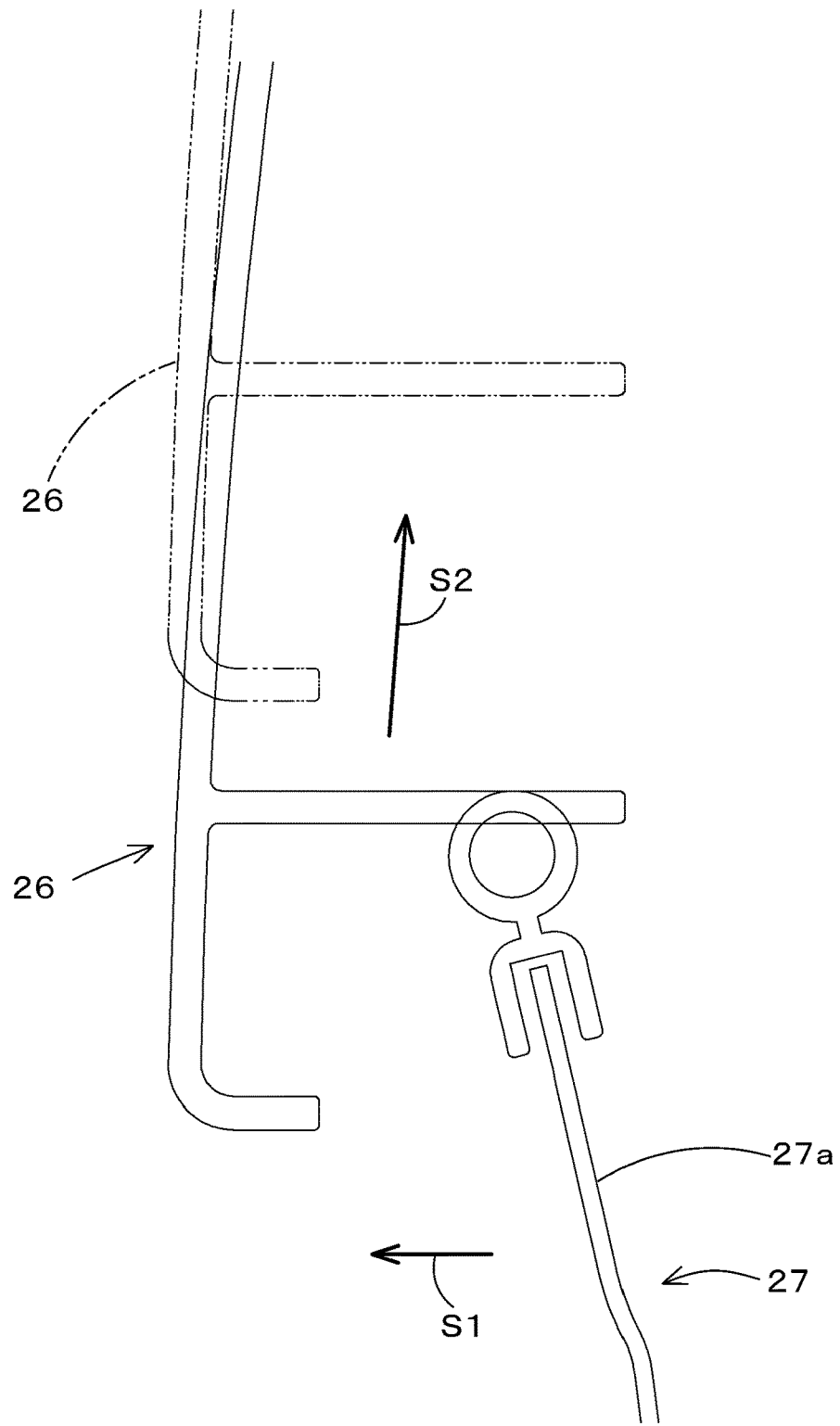
FIG. 34 is a planar cross-sectional view of a front edge portion of the cover body.

Furthermore, in the case of inspection of the controller 24, detachment of the fixed cover 27 allows easy access to the controller 24. However, as illustrated in FIG. 34, a right end portion of the peripheral wall 27a of the fixed cover 27 is located inside the cover main body 26, and therefore, if nothing is done, the fixed cover 27 cannot be brought out from the space between the cover main body 26 and the cabin 5 by moving the fixed cover 27 forward (in the direction of arrow S1 in FIG. 34). One way would be to move the fixed cover 27 toward the cabin 5 and then bring it forward. However, if a gap Y1 (see FIG. 26) between the fixed cover 27 and the cabin 5 is small, it is not possible to move the fixed cover 27 toward the cabin 5. Furthermore, providing a sufficient gap that allows the movement of the fixed cover 27 toward the cabin 5 would narrow the work space in the cabin 5.

In view of this, the present embodiment uses a configuration in which the fixed cover 27 can be brought forward from the space between the cabin 5 and the cover main body 26 by moving the cover main body 26 rightward (in a direction S2 away from the cabin 5 and the fixed cover 27) as indicated by an imaginary line in FIG. 34. The cover main body 26 is moved rightward in the following manner.

First, while the cover main body 26 is kept in an open position, each second mounting bolt 669B is removed from the second insertion hole 665 and each first mounting bolt 669A in the first insertion hole 664 is loosened. With this, since the cover main body 26 is biased by the damper 555 in a direction in which the cover main body 26 is pressed up (in the direction of arrow S3 in FIG. 33), the biasing force of the damper 555 causes each first mounting bolt 669A to move within the first insertion hole 664 to an end of the guiding area 667 while causing the cover main body 26 to swing downward (in the direction of arrow S4 in FIG. 33). Then, each first mounting bolt 669A in the first insertion hole 664 is tightened and the cover main body 26 is closed. It follows that the cover main body 26 is located at a position deviated rightward from the fixed cover 27 (see the imaginary line in FIG. 34). This makes it possible to bring the fixed cover 27 forward from the space between the cabin 5 and the cover main body 26. As such, since the fixed cover 27 can be brought forward from the space between the cabin 5 and the cover main body 26 without having to move the fixed cover 27 leftward (toward the cabin 5), the gap Y1 between the fixed cover 27 and the cabin 5 can be reduced. Furthermore, since the gap Y1 between the fixed cover 27 and the cabin 5 can be reduced, the work space in the cabin 5 can be increased.

The cover main body 26 is moved back to its original position in the following manner. First, the cover main body 26 is swung open until it stops. Next, each first mounting bolt 669A in the first insertion hole 664 is loosened, and then the cover main body 26 is pressed up. It follows that each first mounting bolt 669A moves to the mounting area 666 of the first insertion hole 664. Each first mounting bolt 669A is tightened while in the mounting area 666. With this, the cover main body 26 is brought back to its original mounted state.

Figure 35:
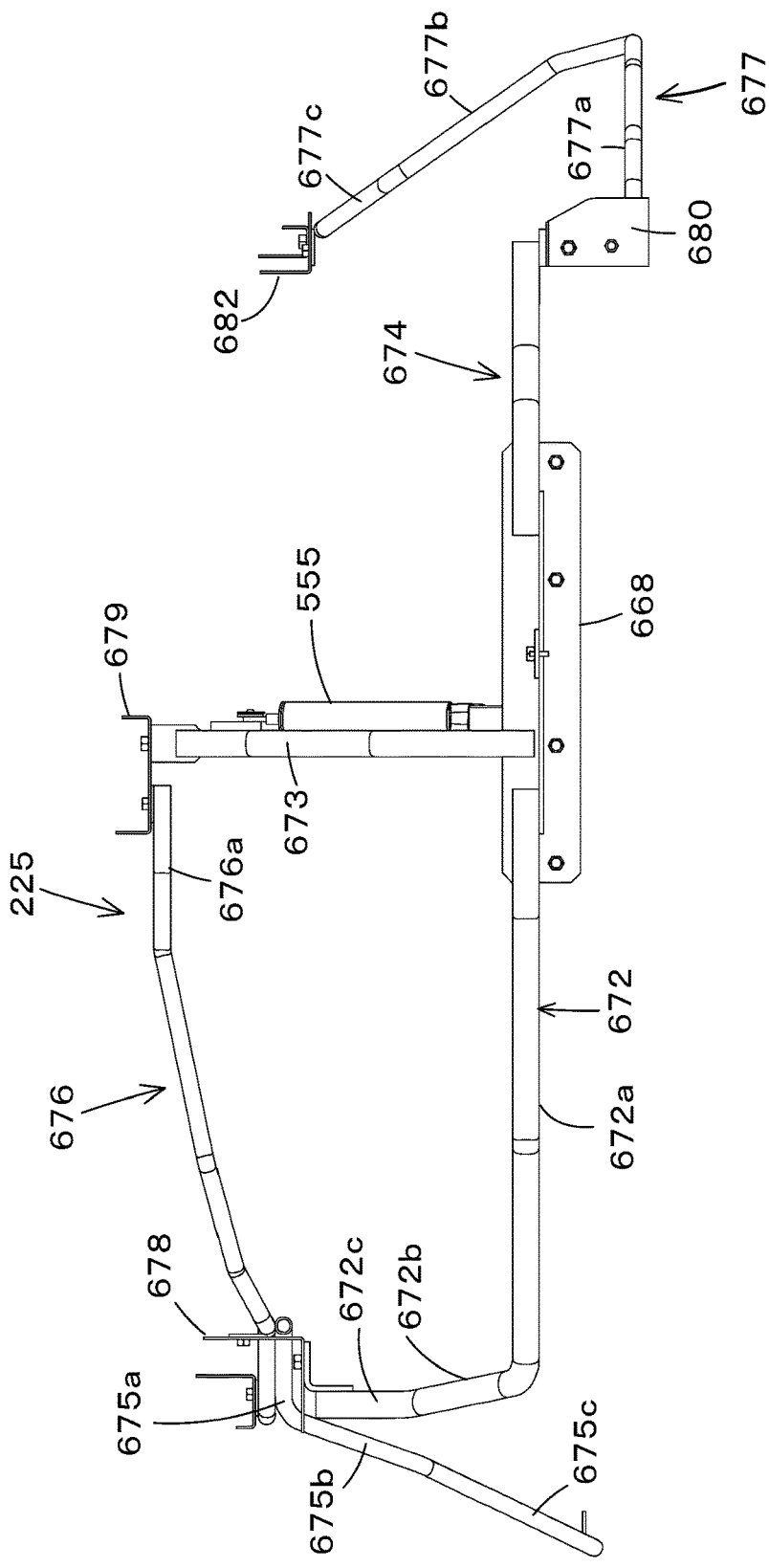
FIG. 35 is a plan view of the frame body.
Figure 36:
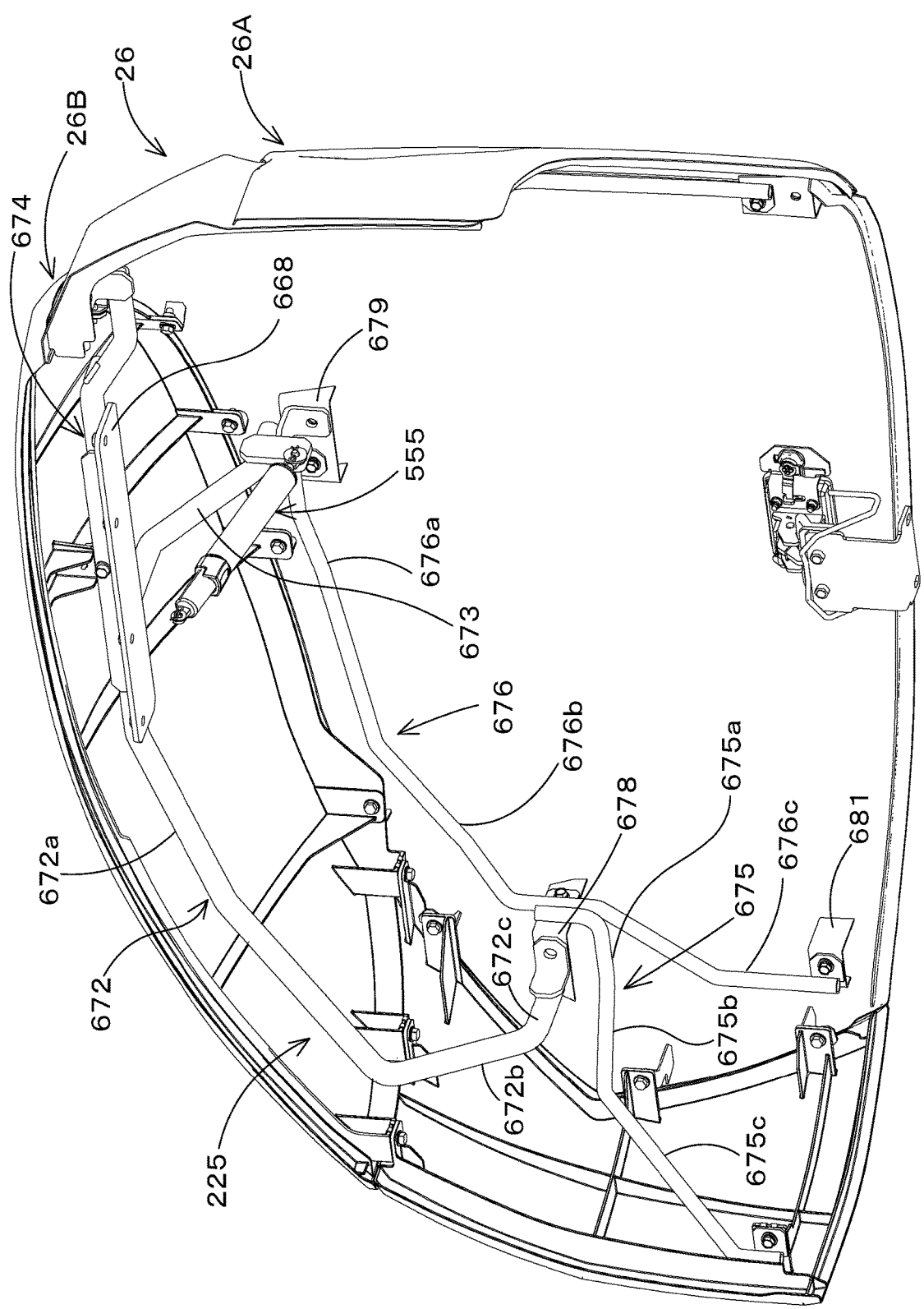
FIG. 36 is a perspective view of the interior of the cover main body.
Figure 37:
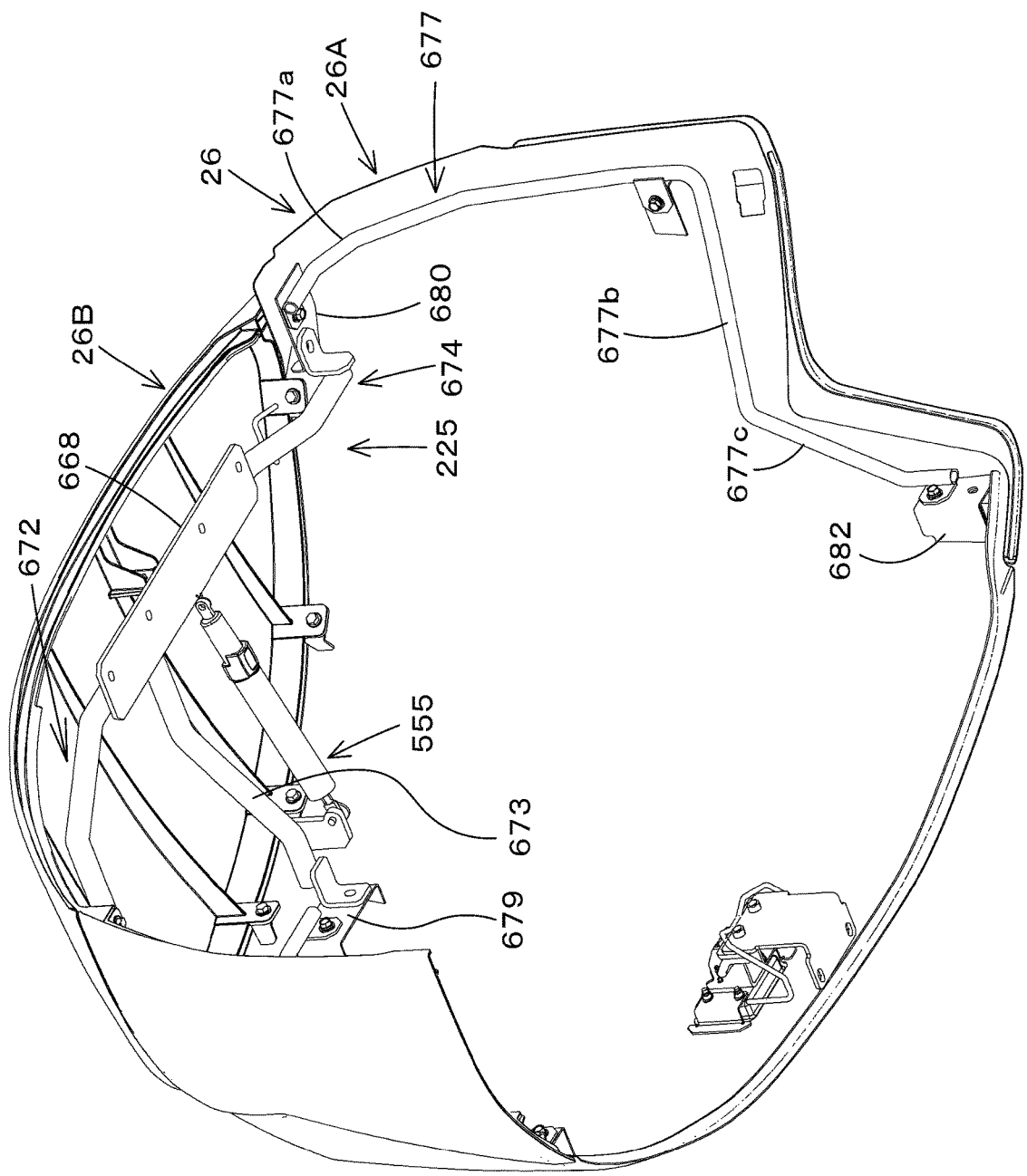
FIG. 37 is a perspective view of the interior of the cover main body.

The following description discusses the frame body 225 with reference to FIGS. 35 to 37.

As illustrated in FIGS. 35 to 37, the frame body 225 includes first to sixth rod members 672 to 677. The first to sixth rod members 672 to 677 are each composed of a rod-shaped member (rod member) such as a pipe member. The first to third rod members 672 to 674 are each composed of a rod member larger in diameter than the fourth to sixth rod members 675 to 677.

The first rod member 672 extends from a front portion of the connector plate 668 along the cover main body 26 in a machine body-forward direction. Specifically, the first rod member 672 includes a first section 672a which extends forward from the connector plate 668 along the upper cover 26B toward the front end of the upper cover 26B, a second section 672b which extends from the front end of the first section 672a such that the second section 672b is inclined in the machine body-outward direction toward the bottom, and a third section 672c which extends from the lower end of the second section 672b in the machine body-outward direction. An end of the third section 672c is attached to a first mounting bracket 678 fixed to the lower cover 26A.

The second rod member 673 extends in the machine body-outward direction from an intermediate portion of the connector plate 668 in the front-rear direction K1. Specifically, the second rod member 673 extends in the machine body-outward direction from the connector plate 668 along the upper cover 26B to a machine body-outward side edge of the upper cover 26B, and the outer end of the second rod member 673 is attached to a second mounting bracket 679 fixed to an upper portion of the lower cover 26A.

The third rod member 674 extends in a machine body-rearward direction from the connector plate 668 along the cover member. Specifically, the third rod member 674 extends in the machine body-rearward direction from the connector plate 668 along the upper cover 26B to the rear edge of the upper cover 26B, and the rear end of the third rod member 674 is attached to a third mounting bracket 680 fixed to the upper portion of the lower cover 26A.

The fourth rod member 675 includes a first section 675a which extends forward from the first mounting bracket 678, a second section 675b which extends in the machine body-inward direction from the front end of the first section 675a, and a third section 675c which extends from a machine body-inward side end of the second section 675b such that the third section 675c is inclined downward in the machine body-inward direction and then is bent downward. The third section 675c is attached to a lower front portion of the lower cover 26A.

The fifth rod member 676 includes a first section 676a which extends forward from the second mounting bracket 679, a second section 676b which extends from the front end of the first section 676a such that the second section 676b is inclined downward toward the front and then is bent downward, and a third section 676c which extends from the lower end of the second section 676b such that the third section 676c is inclined forward toward the bottom and then is bent downward. A lower portion of the second section 676b is attached to the first mounting bracket 678, and a lower end of the third section 676c is attached to a fourth mounting bracket 681 fixed to a lower portion of the lower cover 26A.

The sixth rod member 677 includes a first section 677a which extends downward from the third mounting bracket 680 along a rear portion of the lower cover 26A, a second section 677b which extends in the machine body-outward direction from the lower end of the first section 677a along the lower cover 26A, and a third section 677c which extends downward along the lower cover 26A from a machine body-outward end of the second section 677b. The lower end of the third section 677c is attached to a fifth mounting bracket 682 fixed to the lower portion of the lower cover 26A.

The frame body 225 is composed of rod members, and therefore is capable of supporting the cover main body 26 in a substantially uniform manner in the machine body front-rear direction K1 and the machine body-width direction K2. Furthermore, since the frame body 225 is routed on the inner surface of the cover main body 26, the frame body 225 is prevented from interfering with the apparatuses housed in the cover main body 26. The first rod member 672, the second rod member 673, and the third rod member 674 extend from the connector plate 668 (hinge 226) in three directions (forward, rearward, and in the machine body-outward direction), and therefore are capable of supporting the cover main body 26 as a whole.

Figure 38:
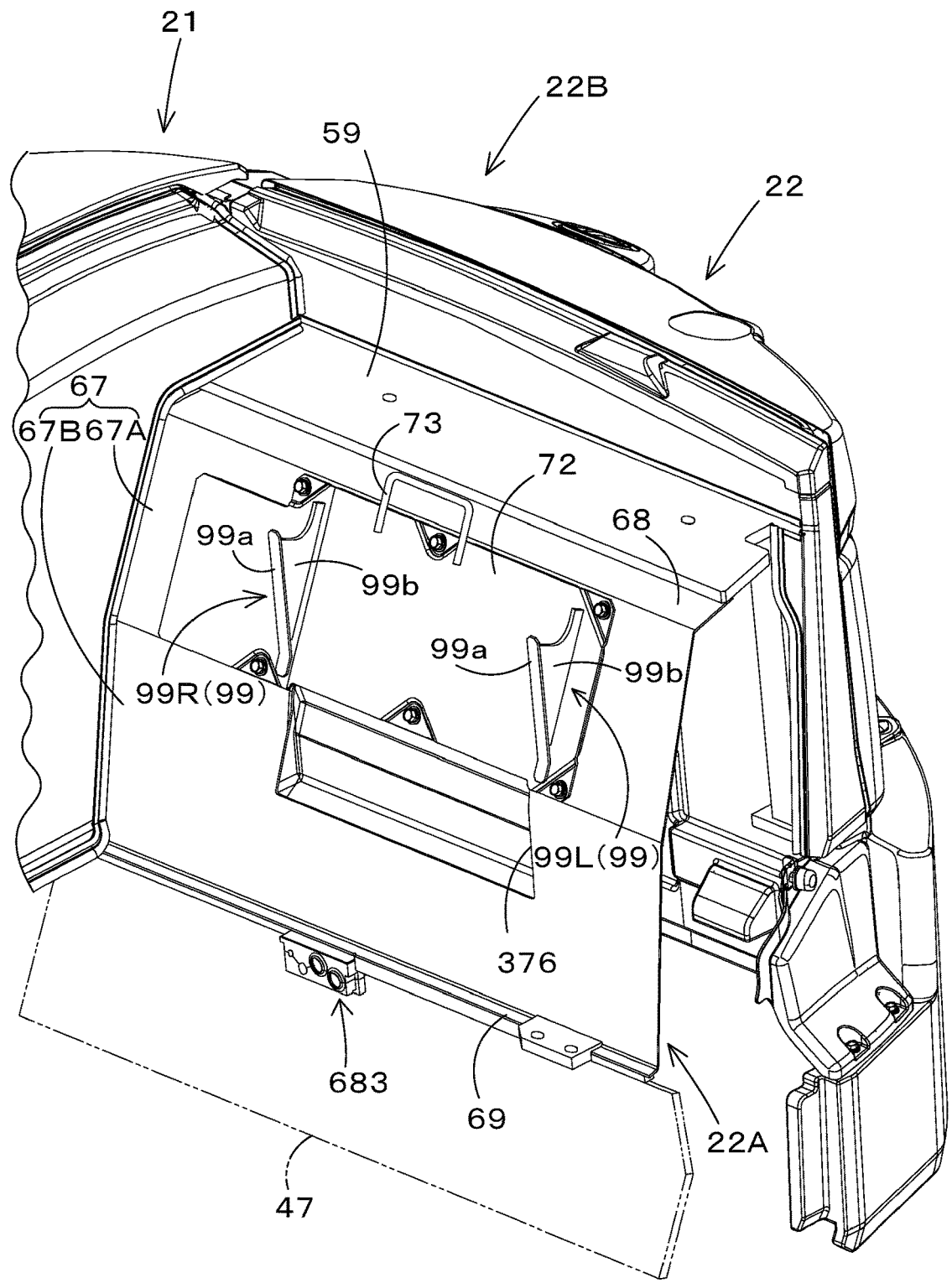
Figure 39:
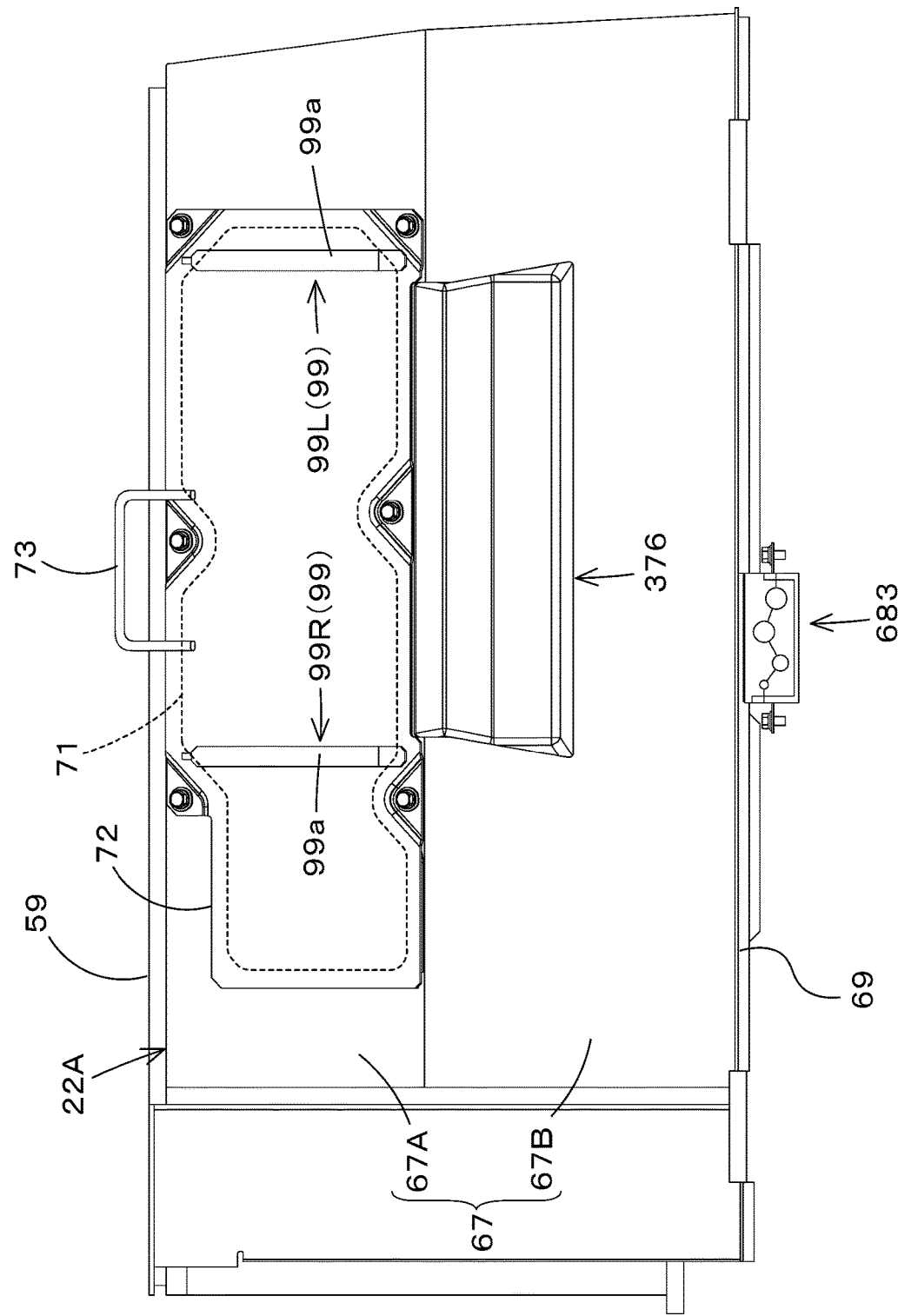
FIG. 39 is an elevational view of a partition wall member.
Figure 40:
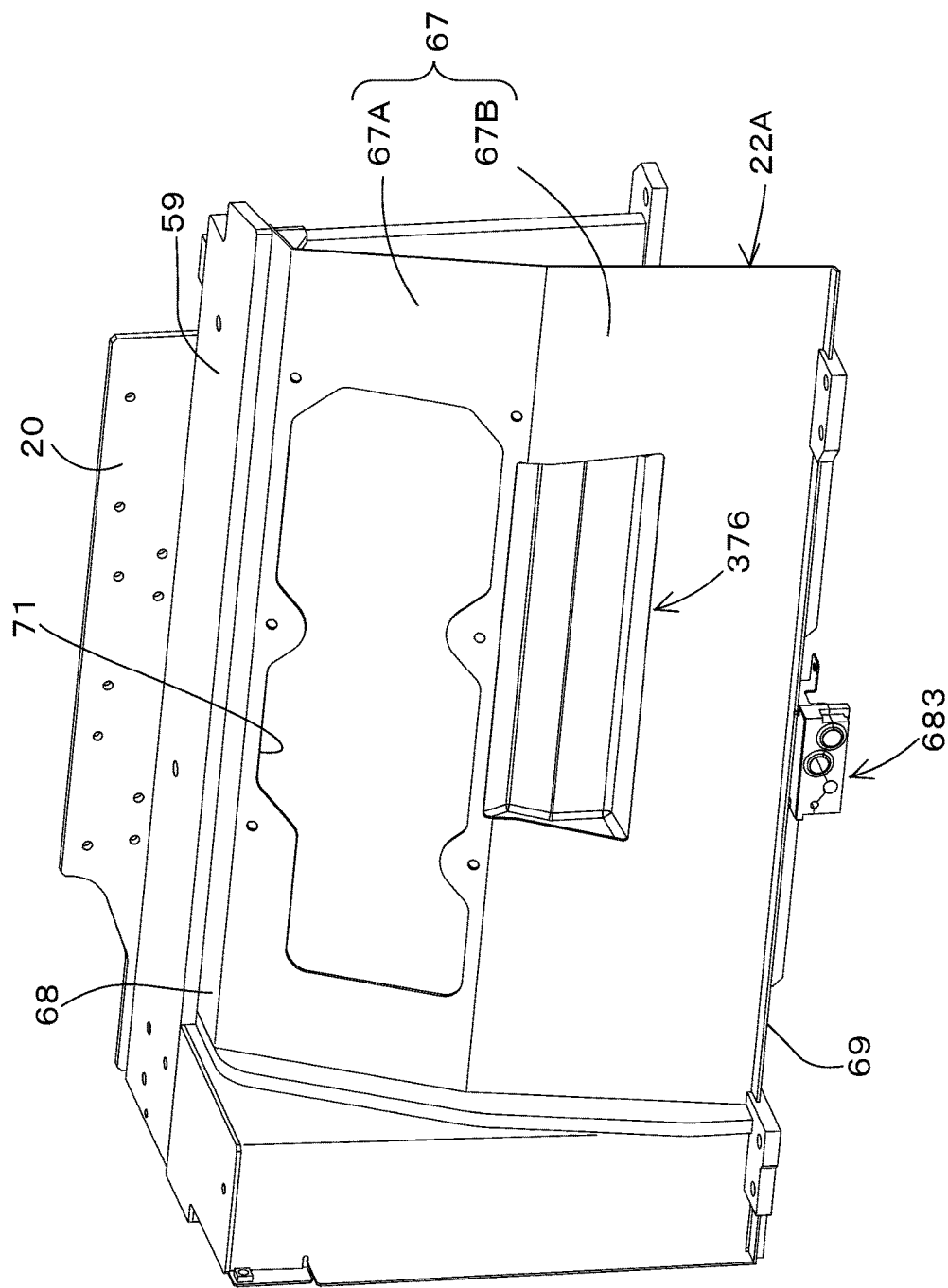
FIG. 40 is a perspective view of the partition wall member.

As illustrated in FIGS. 38 to 40, the partition wall member 22A includes a partition main body 67 which substantially separates the interior of the cabin 5 and the prime mover chamber E2, an upper extension portion 68 which extends rearward from an upper edge of the partition main body 67, and a lower extension portion 69 which extends forward from a lower edge of the partition main body 67.

As illustrated in FIG. 5, a back surface of a left portion of the partition wall member 22A is fixed by welding or the like to a front surface of the first front leg 57L in surface contact with the front surface of the first front leg 57L. As illustrated in FIG. 40, a right edge portion of the partition wall member 22A is fixed by welding to a left side surface of the second front leg 57R. As illustrated in FIG. 40, the rear edge of the upper extension portion 68 is fixed by welding to a lower surface of the upper plate 59.

As illustrated in FIGS. 38 to 40, the partition main body 67 includes an upper first section 67A and a lower second section 67B. The first section 67A and the second section 67B are each inclined rearward toward the top. With regard to the angle of inclination of the first section 67A and the second section 67B with respect to the top-bottom direction, the first section 67A is greater in angle of inclination than the second section 67B. The partition main body 67 is bent at an intermediate portion thereof in the top-bottom direction.

Figure 41:
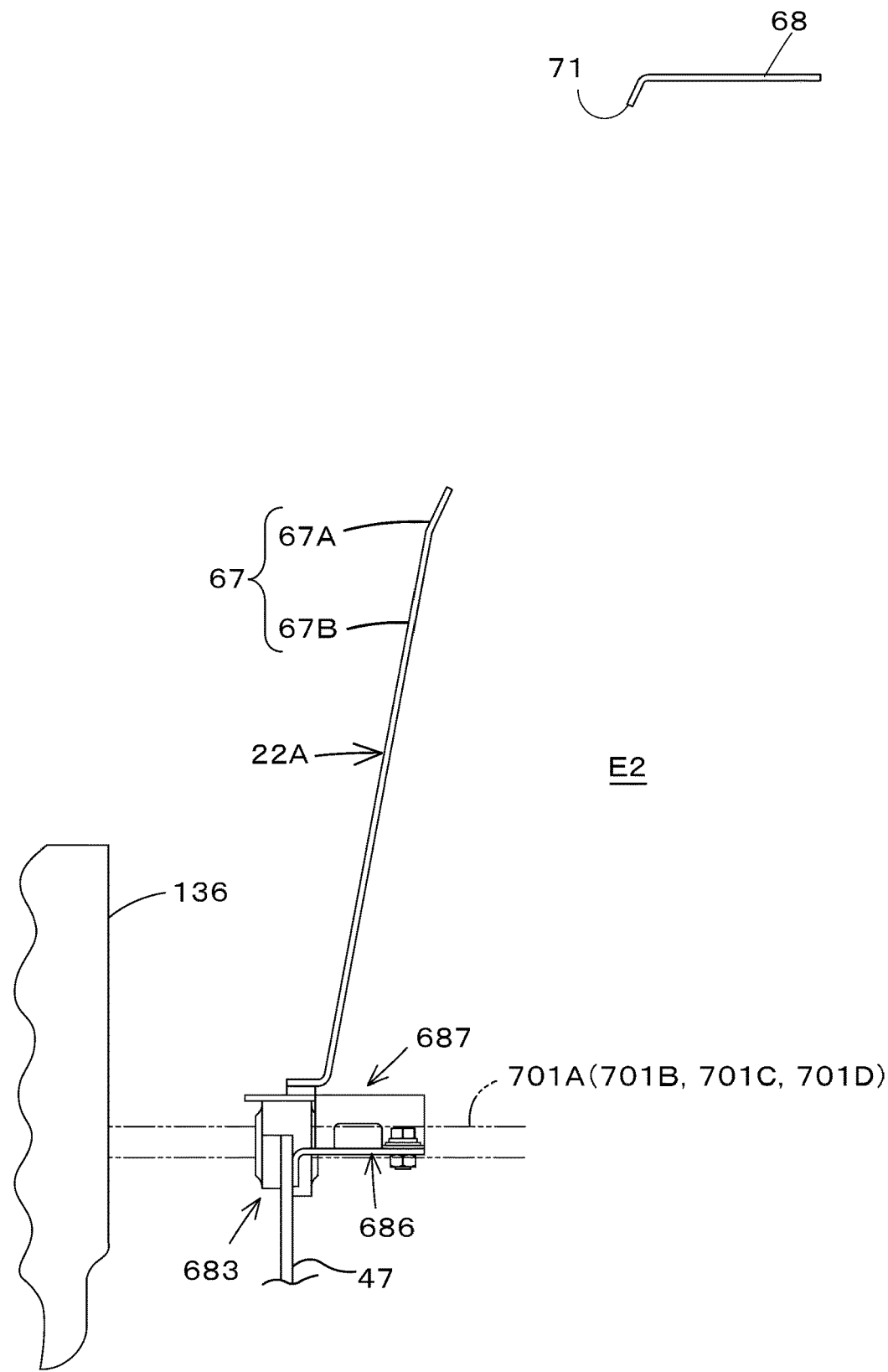
FIG. 41 is a cross-sectional view showing a relationship between an access opening and a clamp, as seen from a side.

As illustrated in FIG. 39, the partition wall member 22A has an access opening 71 which allows access to a component and the like in the prime mover chamber E2, and a closing plate 72 which closes the access opening 71 from the front. The access opening 71 is formed in the partition main body 67. Specifically, as illustrated in FIGS. 40 and 41, the access opening 71 passes through the first section 67A. Furthermore, the access opening 71 extends from one of opposite side portions of the first section 67A in the machine body-width direction K2 to the other. The closing plate 72 is fixed with bolt(s) to the first section 67A from the front side.

As illustrated in FIGS. 38 and 39, the closing plate 72 is provided with abutment members 99. The abutment members 99 are members on which stoppers 98 (see FIG. 49) provided on the operator's seat 6 abut. The abutment members 99 are attached by welding or the like to the front side of the closing plate 72. The abutment members 99 include a first abutment member 99L provided on a left portion of an upper portion of the partition wall member 22A, and a second abutment member 99R provided on a right portion of the upper portion of the partition wall member 22A.

As illustrated in FIG. 38, each of the abutment members 99 includes an abutment plate 99a and a mounting piece 99b fixed to the back surface of the abutment plate 99a. The mounting piece 99b is fixed by welding to the closing plate 72. The abutment plate 99a has a shape that is elongated in the top-bottom direction. Being elongated in the top-bottom direction means that the length in the top-bottom direction is greater than the width in the machine body-width direction K2. The front surface of the abutment plate 99a is an abutment surface on which one of the stoppers 98 abuts, and is a vertical surface (surface along the vertical direction). Since the abutment plate 99a (abutment member 99) is elongated in the top-bottom direction, it is possible to deal with sinking of the operator's seat 6 and adjusted heights of the operator's seat 6.

The closing plate 72 is provided with a handle member 73. The handle member 73 is provided on an intermediate portion in the machine body-width direction K2 of an upper portion of the closing plate 72, and projects upward from the closing plate 72.

As illustrated in FIGS. 38 to 40, the partition wall member 22A has an escape recess 376. The escape recess 376 is formed in a lower portion of the partition wall member 22A. An upper portion of the escape recess 376 is formed to avoid interference with a plurality of hydraulic hoses 732 (see FIG. 60) routed on the back side of the operator's seat 6, and a lower portion of the escape recess 376 is formed to avoid interference with a first rail device 84.

As illustrated in FIGS. 38 and 41, a clamp 683 is provided on an upper portion of the partition plate 47 (between the partition wall member 22A and the partition plate 47). As illustrated in FIG. 41, the clamp 683 is a member to hold a plurality of pipes (first to fourth pipes 684A to 684D) routed from the prime mover chamber E2 to the air conditioner main body 136, and is also a member which allows passage of the plurality of pipes therethrough while providing sealing between the prime mover chamber E2 and an area forward of the partition wall member 22A and the partition plate 47.

Figure 42:
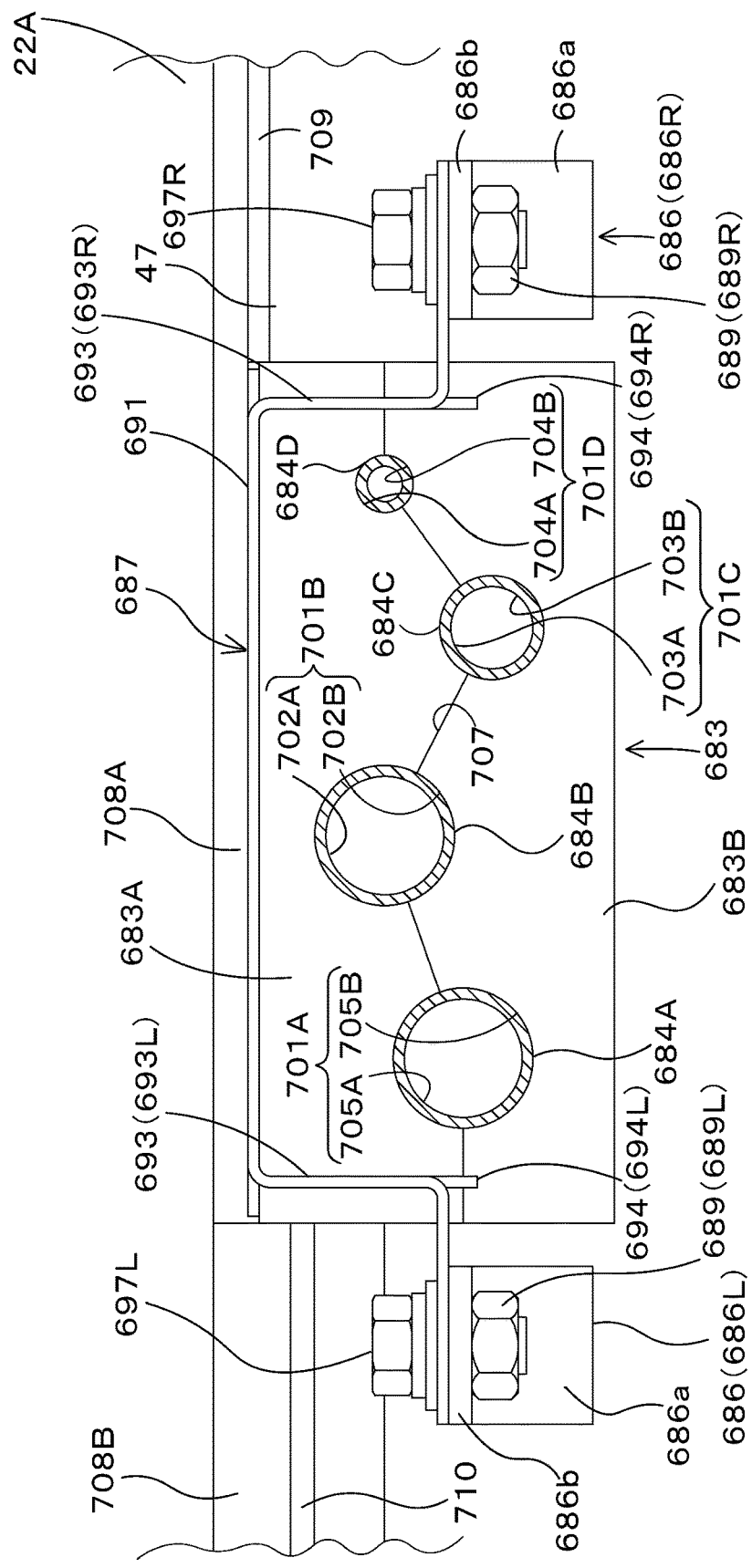
FIG. 42 illustrates a part in which the clamp is attached, as seen from the rear.

As illustrated in FIG. 42, the first pipe 684A and the second pipe 684B are pipes for heating and are each formed of a hose. Specifically, one of the first and second pipes 684A and 684B is a pipe which is for supplying a heating medium and which is routed from the prime mover E1 to the air conditioner main body 136, and the other is a pipe which is for returning the heating medium and which is routed from the air conditioner main body 136 to the prime mover E1. The third pipe 684C and the fourth pipe 684D are pipes for cooling and are each formed of a metal pipe. Specifically, one of the third and fourth pipes 684C and 684D is a pipe which is for supplying a cooling medium and which is routed from the compressor G1 to the air conditioner main body 136, and the other is a pipe which is for returning the cooling medium and which is routed from the air conditioner main body 136 to the compressor G1.

Figure 43:
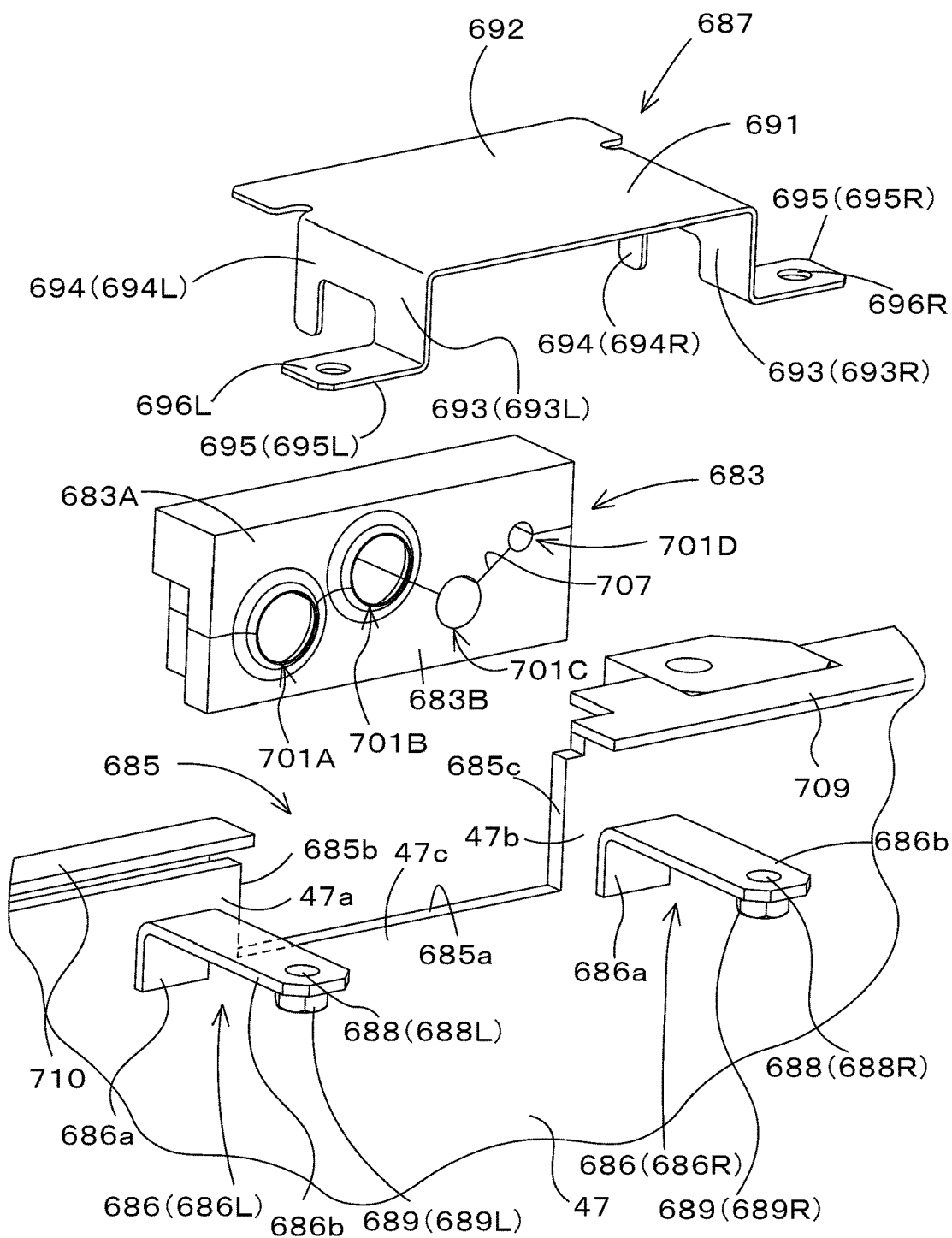
FIG. 43 is an exploded perspective view of the part in which the clamp is attached.
Figure 44:
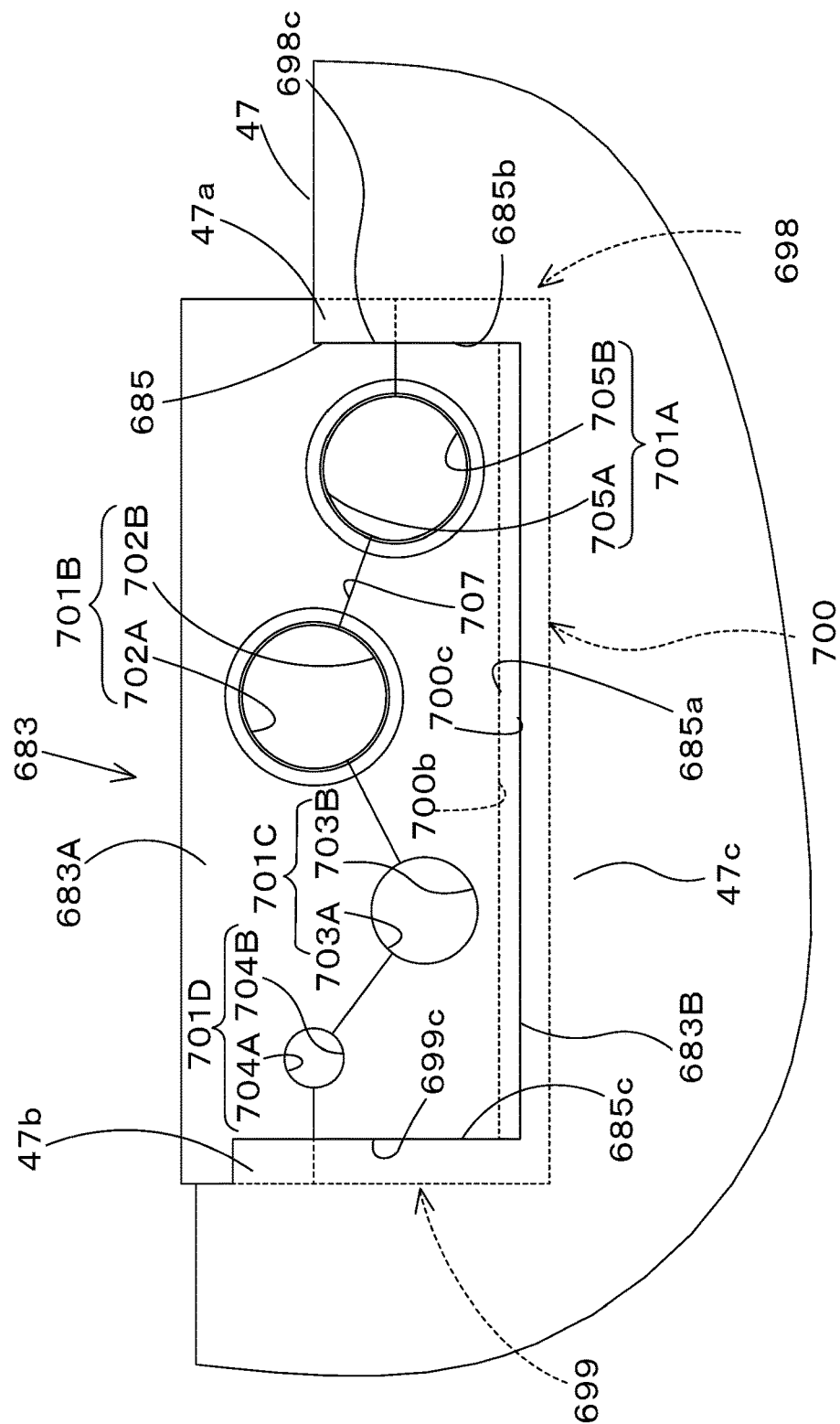
FIG. 44 is an elevational view of the part in which the clamp is attached.

As illustrated in FIG. 39, the clamp 683 is disposed below a substantially middle portion of the access opening 71 in the machine body-width direction K2. As illustrated in FIGS. 42 and 43, there is a cutout recess 685 in a portion of the partition plate 47 in which the clamp 683 is located. The cutout recess 685 is in the form of a groove which has an open top in elevational view. Specifically, the cutout recess 685 has a bottom surface 685a which extends along the machine body-width direction K2, one side surface 685b which extends upward from one of opposite edges of the bottom surface 685a in the machine body-width direction K2 (left edge of the bottom surface 685a), and an opposite side surface 685c which extends upward from the other of the opposite edges of the bottom surface 685a in the machine body-width direction K2 (right edge of the bottom surface 685a). As illustrated in FIGS. 43 and 44, the partition plate 47 includes a first wall portion 47a with the one side surface 685b, a second wall portion 47b with the opposite side surface 685c, and a third wall portion 47c with the bottom surface 685a. The clamp 683 is in the form of a quadrangular block made of an elastic body such as rubber, and is inserted into the cutout recess 685 from above.

As illustrated in FIGS. 42 and 43, the clamp 683 is fixed to the partition plate 47 with stays 686 fixed to the back surface of the partition plate 47 and a holding member 687 which is attached to the stays 686 from above and which holds the clamp 683.

As illustrated in FIGS. 42 and 43, the stays 686 include a first stay 686L provided at one of the opposite sides (left side) of the clamp 683 (cutout recess 685), and a second stay 686R provided at the other of the opposite sides (right side) of the clamp 683. The stays 686 each include a fixed wall 686a fixed to the back surface of the partition plate 47, and a support wall 686b which extends rearward from the upper edge of the fixed wall 686a. Each support wall 686b has, in a rear portion thereof, an insertion hole 688 passing therethrough. Such insertion holes 688 include a first insertion hole 688L in the first stay 686L, and a second insertion hole 688R in the second stay 686R. Furthermore, each support wall 686b has, fixed to the lower surface of the rear portion thereof, a nut 689 which has a threaded hole (internally threaded hole) that is in communication with the insertion hole 688. Such nuts include a first nut 689L fixed to the first stay 686L, and a second nut 689R fixed to the second stay 686R.

The holding member 687 is formed by bending a plate member. The holding member 687 includes an upper wall 691, a holding portion 692, side walls 693, restricting portions 694, and mounting walls 695. The upper wall 691 has plate surfaces facing up and down, and is disposed rearward of the upper edge of the clamp 683. The holding portion 692 extends forward from the upper wall 691 and abuts on the upper surface of the clamp 683. The side walls 693 include a first side wall 693L which extends downward from the left edge of the upper wall 691, and a second side wall 693R which extends downward from the right edge of the upper wall 691. The restricting portions 694 include a first restricting portion 694L which extends downward from a front portion of the left edge of the upper wall 691, and a second restricting portion 694R which extends downward from a front portion of the right edge of the upper wall 691. The first restricting portion 694L is integral with the front portion of the first side wall 693L, and the second restricting portion 694R is integral with the front portion of the second side wall 693R. The restricting portions 694 project downward relative to the side walls 693. Furthermore, the restricting portions 694 abut on the back surface of the clamp 683. Specifically, the first restricting portion 694L abuts on a left portion of the back surface of the clamp 683, and the second restricting portion 694R abuts on a right portion of the back surface of the clamp 683. The mounting walls 695 include a first mounting wall 695L which extends leftward from a rear portion of the first side wall 693L, and a second mounting wall 695R which extends rightward from a rear portion of the second side wall 693R. The first mounting wall 695L has a first through hole 696L, and the second mounting wall 695R has a second through hole 696R.

The holding member 687 is attached to the stays 686 with the clamp 683 inserted in the cutout recess 685. Specifically, the holding member 687 has the holding portion 692 abut on the upper surface of the clamp 683 and the restricting portions 694 abut on the back surface of the clamp 683, and has the first mounting wall 695L superimposed on the support wall 686*b* of the first stay 686L and the second mounting wall 695R superimposed on the support wall 686*b* of the second stay 686R. In such a situation, a first bolt 697L is passed through the first through hole 696L and the first insertion hole 688L and screwed into the first nut 689L from above, and a second bolt 697R is passed through the second through hole 696 and the second insertion hole 688R and screwed into the second nut 689R. With this, the clamp 683 is attached to the partition plate 47 with the holding member 687.

Figure 46:
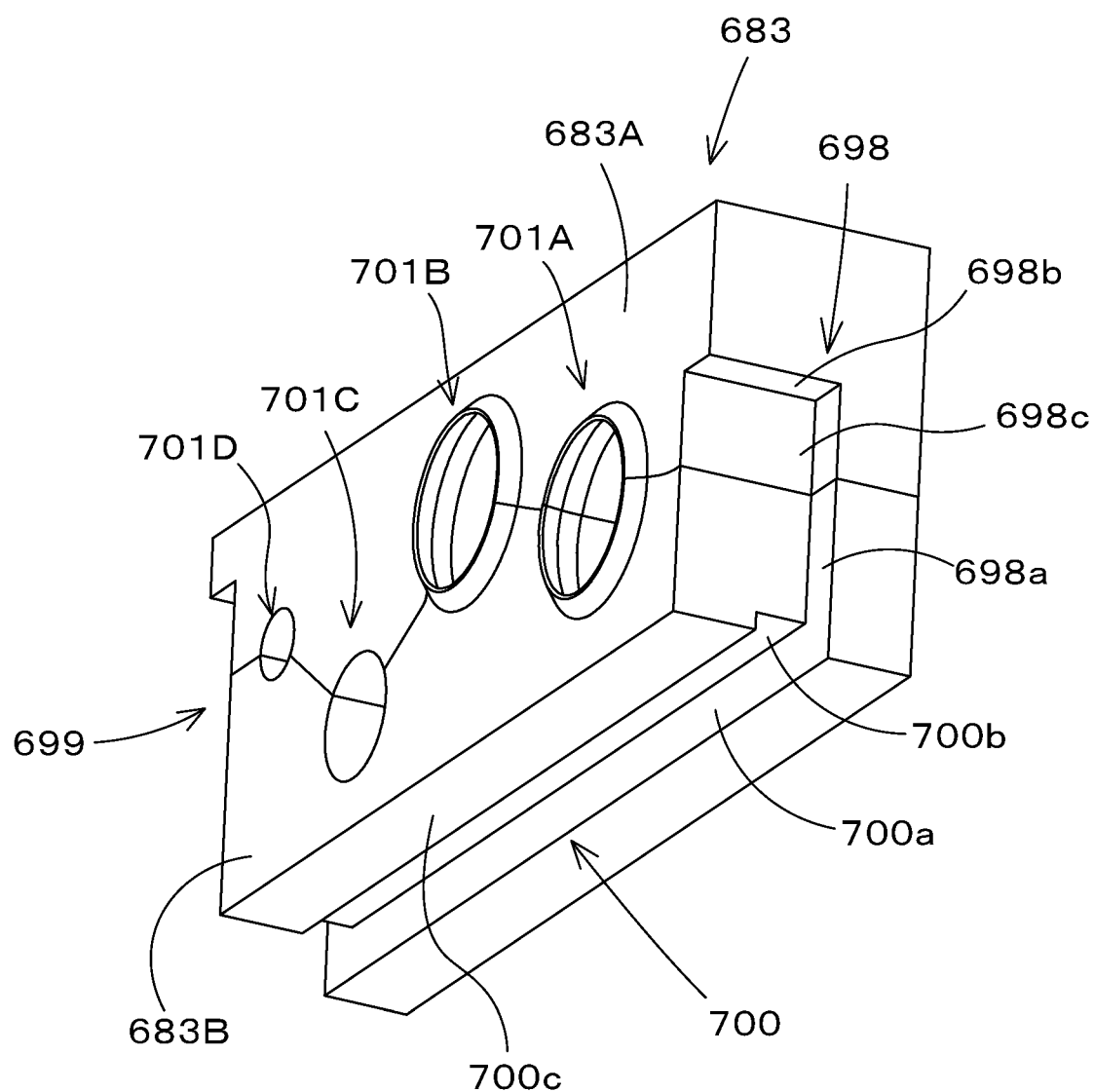
FIG. 46 is a perspective view of the clamp.
Figure 47:
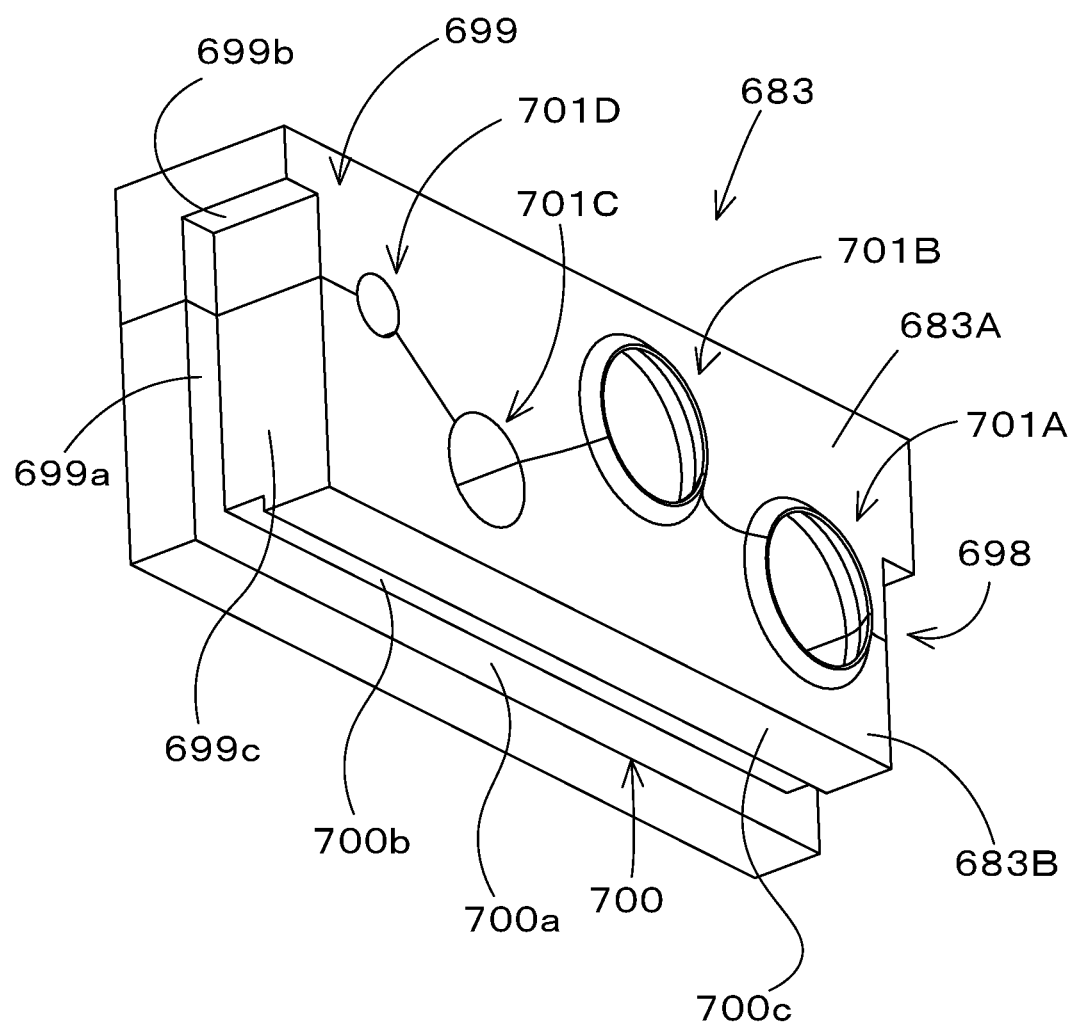
FIG. 47 is a perspective view of the clamp.

As illustrated in FIGS. 46 and 47, the clamp 683 has a first recess 698 in a side facing the one side surface 685*b*, a second recess 699 in a side facing the opposite side surface 685*c*, and a third recess 700 in a side facing the bottom surface 685*a*.

As illustrated in FIGS. 44 and 46, the first recess 698 has a first forward-facing surface 698*a*, a first downward-facing surface 698*b*, and a first side-facing surface 698*c*. The first forward-facing surface 698*a* abuts on a back surface of the first wall portion 47*a*. The first downward-facing surface 698*b* extends forward from an upper edge of the first forward-facing surface 698*a*, and abuts on an upper surface of the first wall portion 47*a*. The first side-facing surface 698*c* extends forward from one of opposite edges of the first forward-facing surface 698*a* that is closer to the one side surface 685*b*, and abuts on the one side surface 685*b*.

As illustrated in FIGS. 44 and 47, the second recess 699 has a second forward-facing surface 699*a*, a second downward-facing surface 699*b*, and a second side-facing surface 699*c*. The second forward-facing surface 699*a* abuts on a back surface of the second wall portion 47*b*. The second downward-facing surface 699*b* extends forward from an upper edge of the second forward-facing surface 699*a*, and abuts on an upper surface of the second wall portion 47*b*. The second side-facing surface 699*c* extends forward from one of opposite edges of the second forward-facing surface 699*a* that is closer to the opposite side surface 685*c*, and abuts on the opposite side surface 685*c*.

As illustrated in FIGS. 44, 46, and 47, the third recess 700 has a third forward-facing surface 700*a*, a third downward-facing surface 700*b*, and a fourth downward-facing surface 700*c*. The third forward-facing surface 700*a* connects lower portions of the first forward-facing surface 698*a* and the second forward-facing surface 699*a* together, and abuts on a back surface of the third wall portion 47*c*. The third downward-facing surface 700*b* extends forward from an upper edge of the third forward-facing surface 700*a*, and abuts on the bottom surface 685*a*. The fourth downward-facing surface 700*c* is located forward of the third downward-facing surface 700*b* and located lower than the third downward-facing surface 700*b*.

As illustrated in FIG. 42, the clamp 683 has a plurality of pipe passage portions for passage of pipes (a first pipe passage portion 701A, a second pipe passage portion 701B, a third pipe passage portion 701C, and a fourth pipe passage portion 701D). Each pipe passage portion passes through the clamp 683 along the machine body front-rear direction K1. The first pipe passage portion 701A is a hole for passage of the first pipe 684A. The second pipe passage portion 701B is a hole for passage of the second pipe 684B, is adjacent to the first pipe passage portion 701A along the machine body-width direction K2, and is located higher than the first pipe passage portion 701A. The third pipe passage portion 701C is a hole for passage of the third pipe 684C, is adjacent to the second pipe passage portion 701B along the machine body-width direction K2, and is located lower than the second pipe passage portion 701B. The fourth pipe passage portion 701D is a hole for passage of the fourth pipe 684D, is adjacent to the third pipe passage portion 701C along the machine body-width direction K2, and is located higher than the third pipe passage portion 701C. That is, the plurality of pipe passage portions are provided such that pipe passage portions adjacent to each other along the machine body-width direction K2 are displaced from each other along the top-bottom direction. This makes it possible to form the clamp 683 in a compact manner in the machine body-width direction K2.

As illustrated in FIGS. 42 and 44, the clamp 683 is divided into two: an upper first member 683A and a lower second member 683B. The first pipe passage portion 701A is composed of a recess 705A in the first member 683A and a recess 705B in the second member 683B. The second pipe passage portion 701B is composed of a recess 702A in the first member 683A and a recess 702B in the second member 683B. The third pipe passage portion 701C is composed of a recess 703A in the first member 683A and a recess 703B in the second member 683B. The fourth pipe passage portion 701D is composed of a recess 704A in the first member 683A and a recess 704B in the second member 683B. That is, the clamp 683 is divided into upper and lower parts by a dividing surface 707 which divides each of the plurality of pipe passage portions into two. Accordingly, the clamp 683 holds the pipes by clamping the pipes between the first member 683A and the second member 683B.

Figure 45:
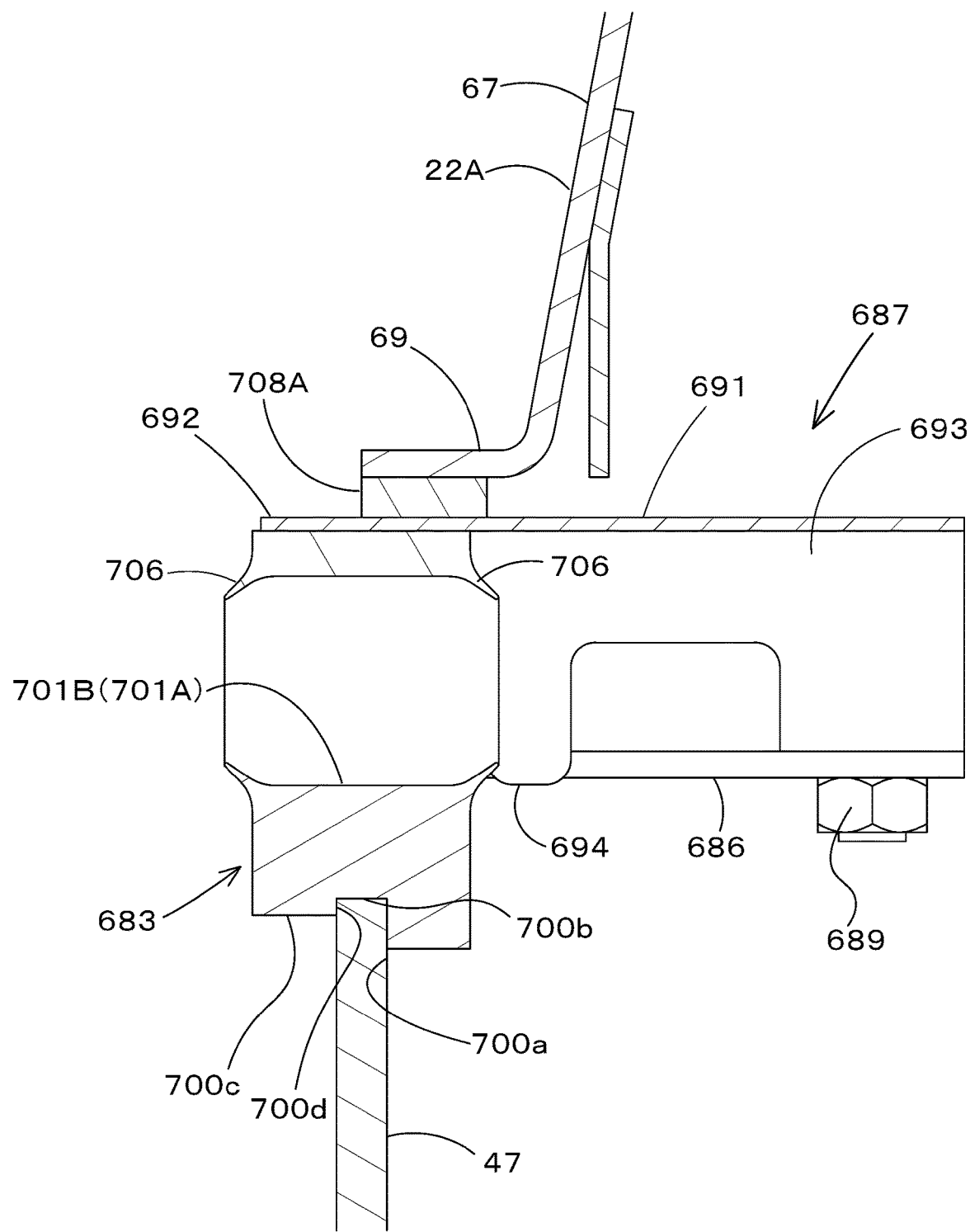
FIG. 45 is a cross-sectional view of the part in which the clamp is attached, as seen from a side.

As illustrated in FIG. 45, the first pipe passage portion 701A has, provided at each of the opposite ends in the axial direction (machine body front-rear direction K1), a flange portion 706 which extends over the first pipe passage portion 701A along the circumferential direction. The first pipe 684A is formed of a hose capable of elastic deformation such as rubber, and therefore, if the entire inner surface of the first pipe passage portion 701A is brought into contact with the first pipe 684A, the first pipe passage portion 701A would be squeezed when clamped between the first member 683A and the second member 683B. In view of this, the first pipe passage portion 701A has the flange portion 706 at each of the opposite ends in the axial direction, making it possible to prevent the first pipe 684A from being squeezed. Similarly, the second pipe passage portion 701B also has a flange portion 706 at each of the opposite ends in the axial direction. This makes it possible to prevent the second pipe 684B from being squeezed by the second pipe passage portion 701B.

As illustrated in FIGS. 46 and 47, the dividing surface 707 is provided in an intermediate portion in the top-bottom direction of the first recess 698 and the second recess 699. That is, the clamp 683 is divided into upper and lower parts at the dividing surface which divides each of the first and second recesses 698 and 699 into upper and lower parts.

As illustrated in FIG. 42, each restricting portion 694 abuts on the back surface of the clamp 683 in an area extending from the first member 683A to an upper portion of the second member 683B. As illustrated in FIGS. 39 and 42, a plurality of sealing members 708A and 708B are provided on a lower portion of the partition wall member 22A. The sealing member 708A abuts on the holding portion 692 and a seal abutment member 709 provided rightward of the cutout recess 685 of the partition plate 47, and the sealing member 708B abuts on a seal abutment member 710 provided leftward of the cutout recess 685 of the partition plate 47.

With regard to the clamp 683, the first member 683A abuts on the partition plate 47 from the rear, and is configured to move rearward. The rearward movement of the first member 683A is restricted by the restricting portions 694. The first member 683A is also held from above by the holding portion 692. After detachment of the holding member 687, the first member 683A is no longer restricted. This makes it possible to detach the first member 683A rearward (toward the prime mover chamber E2). After detachment of the first member 683A, it is possible to replace pipes, for example, replace the first pipe 684A and the second pipe 684B composed of hoses. Furthermore, the clamp 683 and the holding member 687 can be accessed through the access opening 71. An operator can detach the holding member 687 by putting their hand in the access opening 71. After the detachment of the holding member 687, the first member 683A can be moved rearward. This makes it possible for the operator to detach the first member 683A (clamp 683) rearward (toward the prime mover chamber E2) through the access opening 71. This makes it possible to replace pipes without having to detach the partition wall member 22A.

As illustrated in FIG. 45, the fourth downward-facing surface 700c is located lower than the third downward-facing surface 700b, and therefore a groove 711, which fits an upper portion of the third wall portion 47c, is defined by an upper portion of the third forward-facing surface 700a, the third downward-facing surface 700b, and a rearward-facing surface 700d between a front edge of the third downward-facing surface 700b and a rear edge of the fourth downward-facing surface 700c. With this, the second member 683B is engaged with the partition plate 47, and forward and rearward movements of the second member 683B are restricted. When the second member 683B is moved upward and the groove 711 is detached from the third wall portion 47c, the second member 683B can also be detached.

As illustrated in FIG. 5, the operator's seat 6 is disposed forward of the partition wall member 22A. Specifically, the operator's seat 6 is mounted forward of the prime mover E1 and rearward of the floor step 52.

Figure 48:
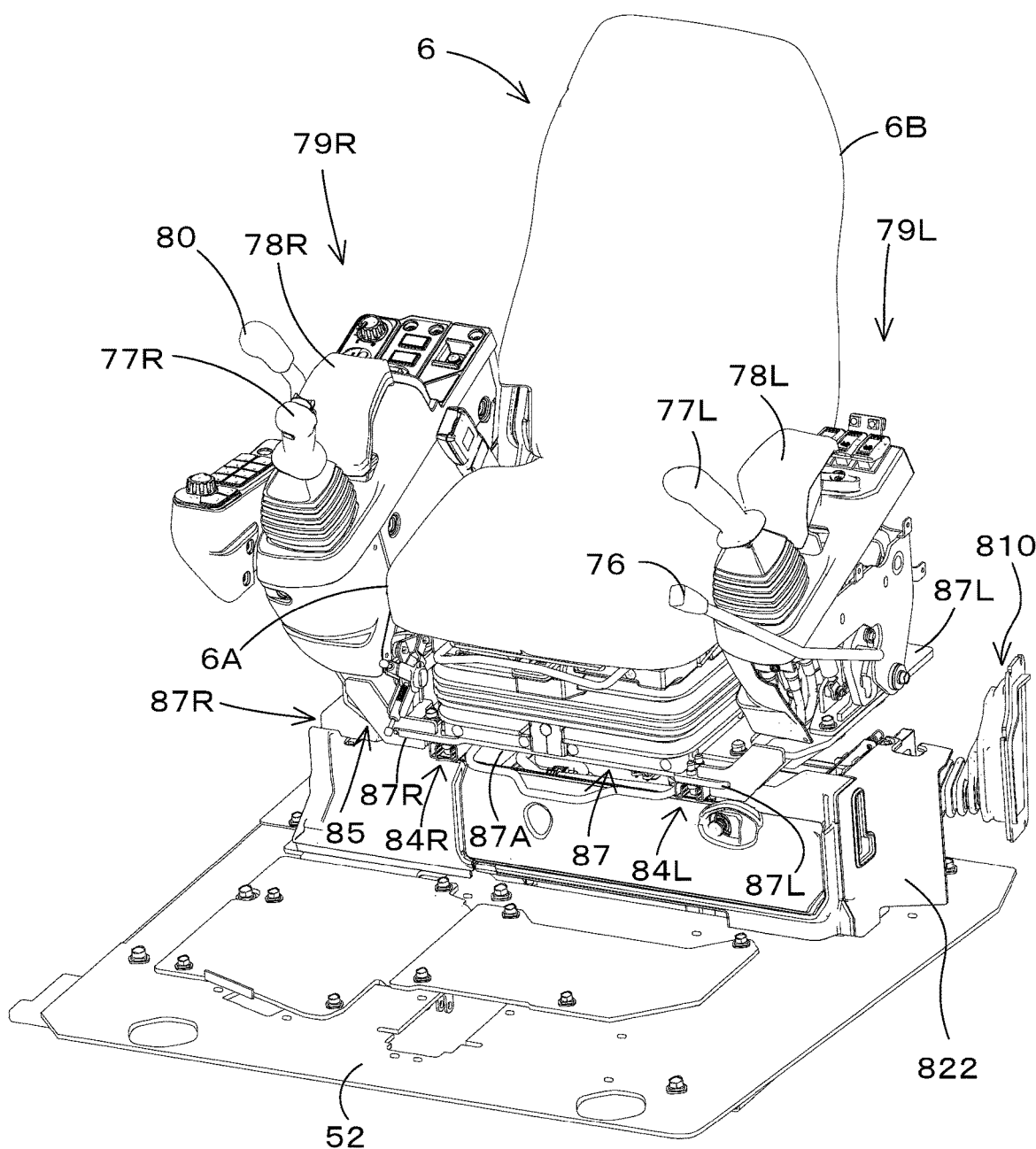
FIG. 48 is a perspective view of the operator's seat and its surroundings.

As illustrated in FIG. 48, a left console 79L is disposed at one of the opposite sides (left side) of the operator's seat 6. A right console 79R is disposed at the other of the opposite sides (right side) of the operator's seat 6. That is, the consoles 79L and 79R are disposed at both sides of the operator's seat 6. The console 79L is provided with an unloading lever 76, a left operation lever 77L, a left armrest 78L, and/or the like. The console 79R is provided with a right operation lever 77R, a right armrest 78R, a dozer lever (lever member) 80, and/or the like.

The operator's seat 6 includes a seat part 6A which supports the buttocks of the operator, and a backrest part 6B which supports the back of the operator.

The unloading lever 76 is a lever for switching between the following states: a state in which hydraulic fluid is allowed to flow to hydraulic equipment (for example, a hydraulic cylinder to drive the working device 4, the swivel motor M1 to cause the machine body 2 to turn, and/or the like), and a state in which hydraulic fluid is not allowed to flow to the hydraulic equipment. When the unloading lever 76 is in the state as illustrated in FIG. 48, hydraulic fluid is allowed to flow to the hydraulic equipment. Upon upward swinging movement of the unloading lever 76 from the above state, hydraulic fluid is no longer allowed to flow to the hydraulic equipment. Furthermore, upward swinging movement of the unloading lever 76 causes the console 79L to swing upward about a lower portion of a rear portion thereof. With this, the operation lever 77L and the console 79L do not hinder the operator when entering or exiting the cabin 5, allowing the operator to easily enter and exit the cabin 5. As illustrated in FIG. 1, the cabin 5 has, on the left side thereof, an entry/exit opening 29 for the operator to enter and exit the cabin 5. The entry/exit opening 29 is configured to be opened and closed with a door 28.

The operation lever 77L is configured for operation of two to-be-operated objects. For example, the operation lever 77L is configured to be operated to cause the machine body 2 to turn and cause the arm 16 to swing. The operation lever 77R is also configured for operation of two to-be-operated objects. For example, the operation lever 77R is configured to be operated to cause the boom 15 to swing and cause the bucket 17 to swing. The operation lever 77L is used to operate a pilot valve, disposed in a front portion of the console 79L, to operate the machine body 2 and the arm 16. The operation lever 77R is used to operate a pilot valve, disposed in a front portion of the console 79R, to operate the boom 15 and the bucket 17.

The dozer lever 80 is a lever for operation of the dozer 7. The dozer lever 80 is used to operate a pilot valve, disposed in an intermediate portion of the console 79R, to operate the dozer 7.

The pilot valves operated using the operation lever 77L, the operation lever 77R and the dozer lever 80 are connected to a control valve V1 via hydraulic hoses, hydraulic fittings, and/or the like.

Figure 49:
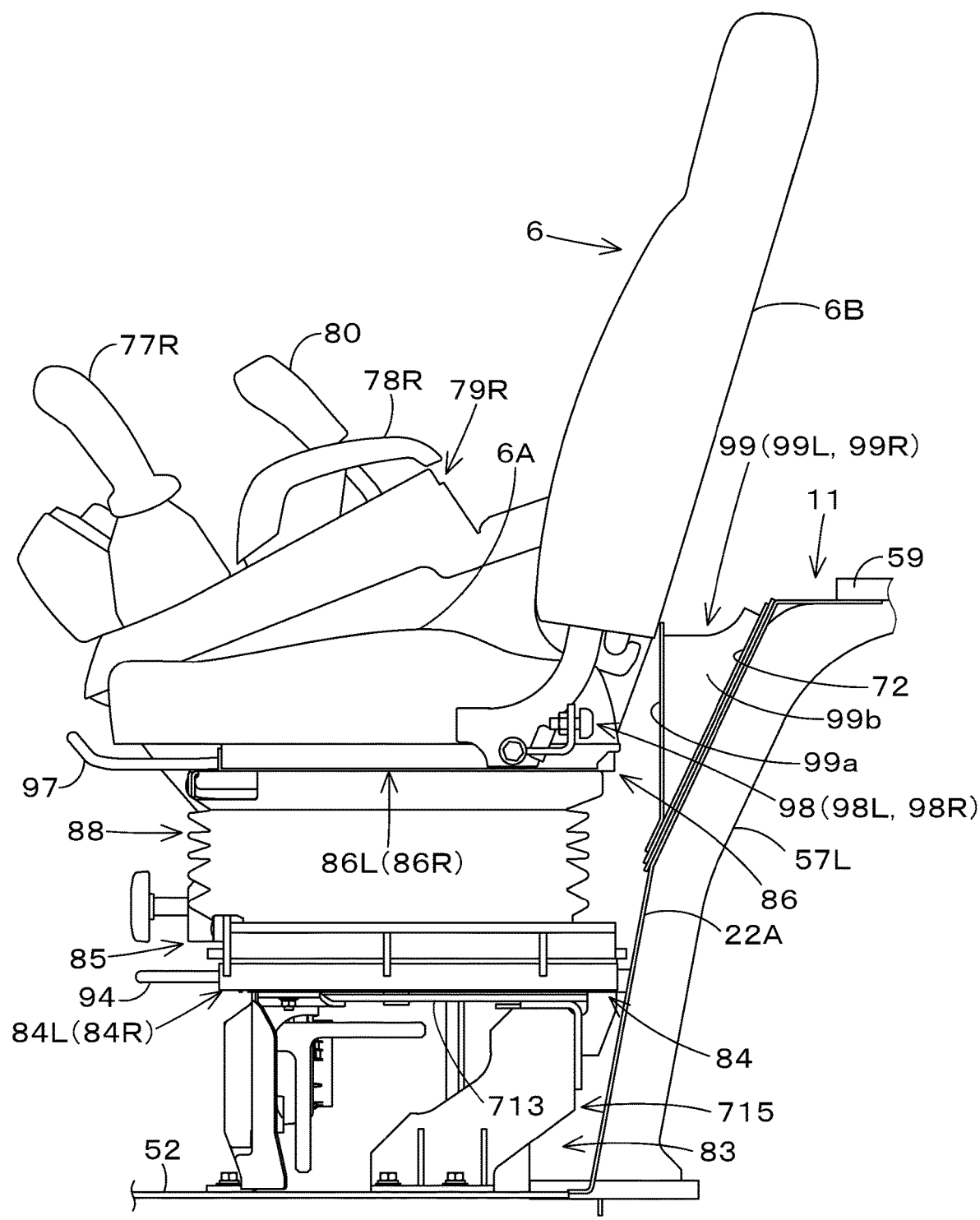
FIG. 49 is a side view of the operator's seat and its surroundings.
Figure 50:
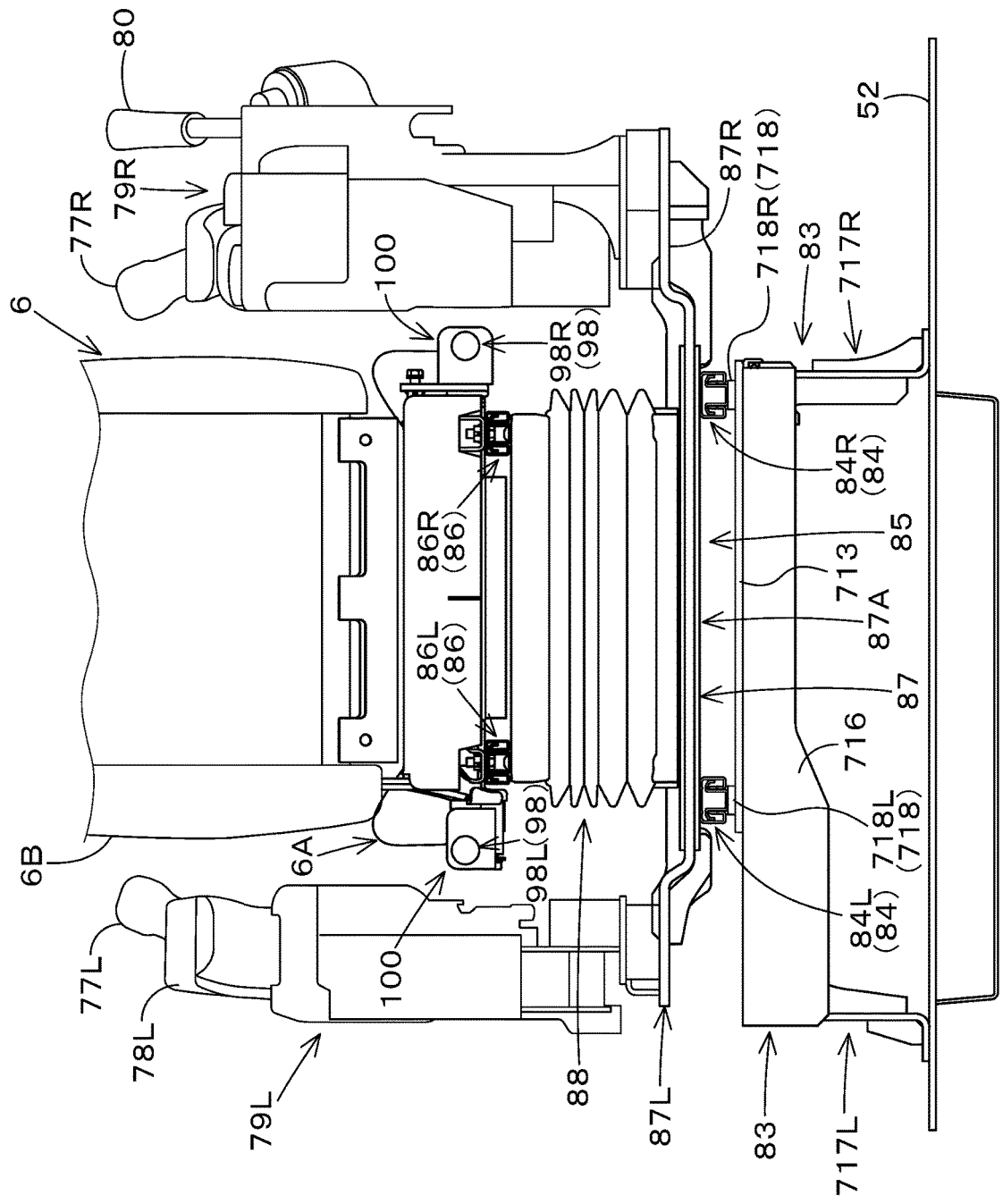
FIG. 50 is a rear view of the surroundings of the operator's seat.

As illustrated in FIGS. 49 and 50, a seat base 83 is provided below the operator's seat 6. The seat base 83 is attached to the floor step 52 (machine body 2). On the seat base 83, a movable body 85 is supported via a first rail device (rail device) 84 such that the movable body 85 is adjustable in position along the front-rear direction. The first rail device 84 includes a left first slide rail 84L and a right first slide rail 84R. The console 79L and the console 79R are attached to the movable body 85.

The operator's seat 6 is mounted on the movable body 85. Specifically, on the movable body 85, the operator's seat 6 is supported via a second rail device (another rail device) 86 such that the operator's seat 6 is adjustable in position along the front-rear direction. The second rail device 86 includes a left second slide rail 86L and a right second slide rail 86R. The operator's seat 6, together with the movable body 85, is adjustable in position along the front-rear direction with the first rail device 84. That is, the first rail device 84 supports the operator's seat 6 via the movable body 85 such that the operator's seat 6 is adjustable in position along the front-rear direction.

The movable body 85 includes a slide frame 87 attached to the seat base 83 via the first slide rails 84L and 84R, and a suspension (support) 88 attached on the slide frame 87. The slide frame 87 includes a first mounting portion (main mounting portion) 87A for attachment of the suspension 88, a second mounting portion (opposite mounting portion) 87L which extends leftward from the first mounting portion 87A, and a third mounting portion (one mounting portion) 87R which extends rightward from the first mounting portion 87A. The console 79L is attached to the second mounting portion 87L, and the console 79R is attached to the third mounting portion 87R.

The suspension 88 hat attached thereto the operator's seat 6 via the second slide rails 86L and 86R such that the operator's seat 6 is adjustable in position along the front-rear direction. The suspension 88 is a shock absorber which supports the load of the operator acting on the operator's seat 6 and which buffers vibration and shock from below transmitted to the operator's seat 6. Furthermore, the suspension 88 may include a height adjustment mechanism to adjust the height of the operator's seat 6.

Figure 51:
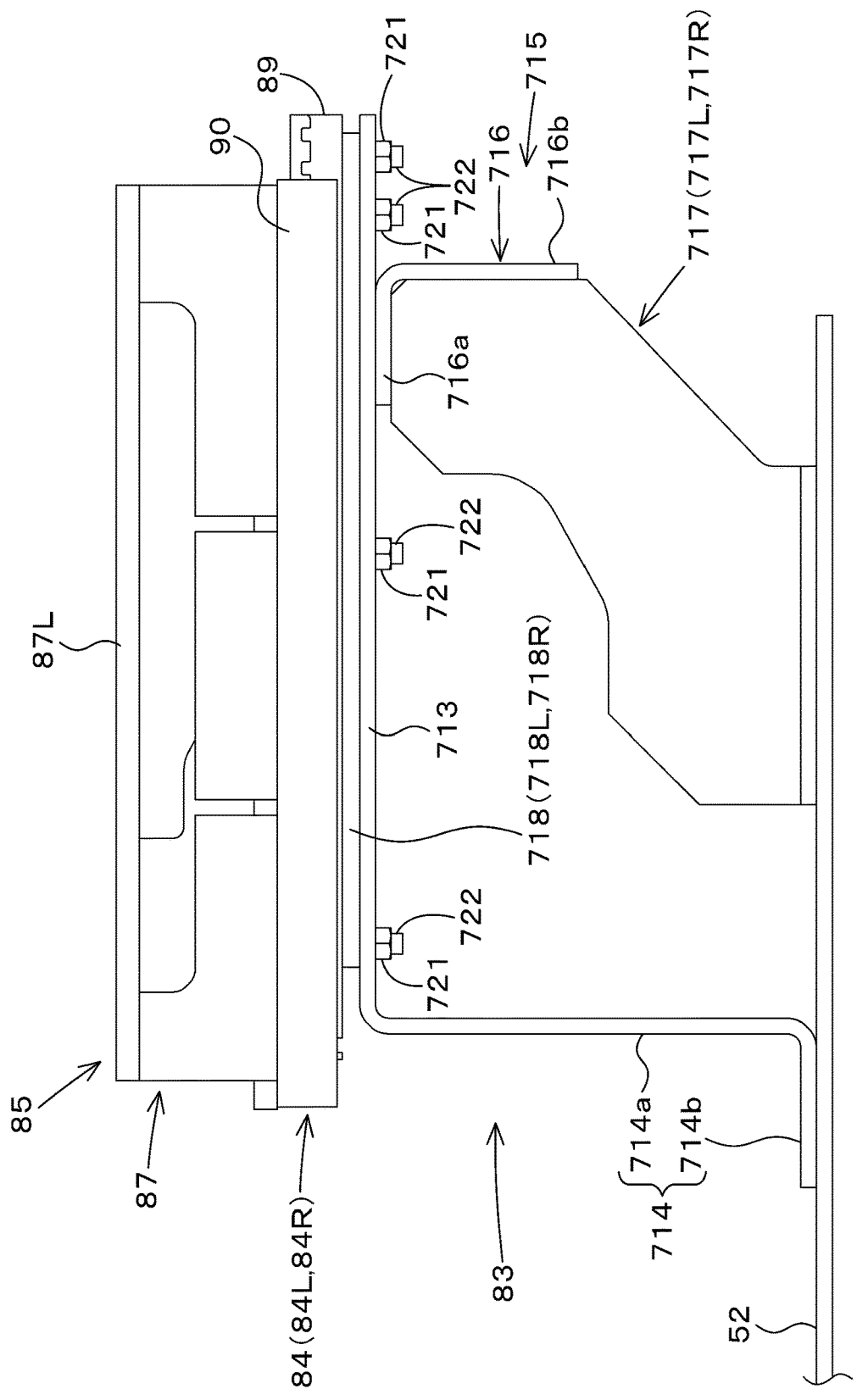
FIG. 51 is a side view of the surroundings of a seat base.
Figure 52:
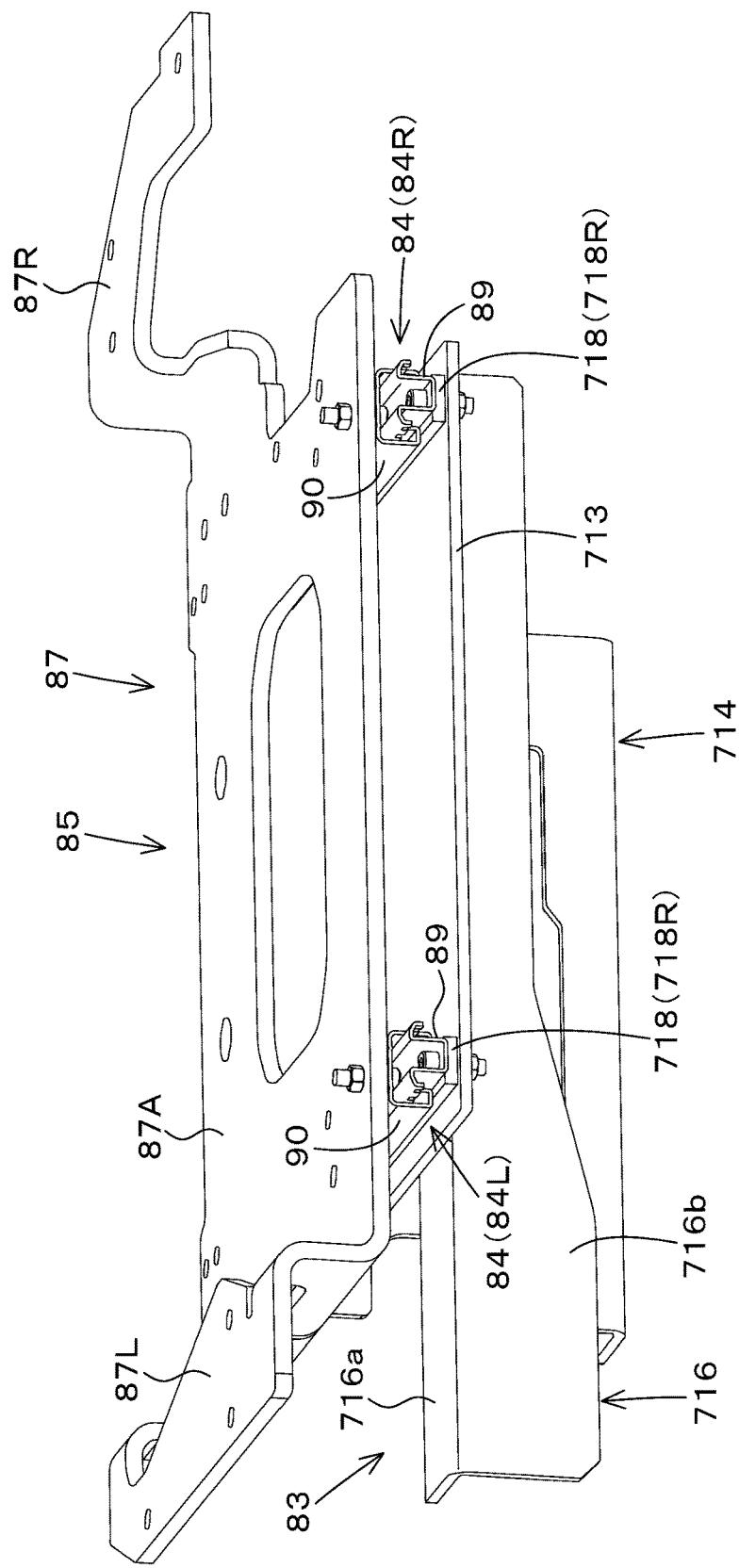
FIG. 52 is a perspective view of the surroundings of a slide frame.

As illustrated in FIGS. 51 and 52, the seat base 83 includes a top panel 713, a front support leg 714 which supports a front portion of the top panel 713, and a rear support leg 715 which supports a rear portion of the top panel 713. The top panel 713 is disposed below the operator's seat 6 and the movable body 85 and above the floor step 52 with plate surfaces facing up and down. The front support leg 714 includes a front wall portion 714*a* which extends downward from a front edge of the top panel 713, and a mounting wall portion 714*b* which extends forward from a lower edge of the front wall portion 714*a* and which is placed on and attached to the floor step 52. The air conditioner main body 136 is disposed within the seat base 83 (below the top panel 713 and rearward of the front wall portion 714*a*) (see FIG. 5). The air conditioner main body 136 is attached to the floor step 52.

As illustrated in FIGS. 51 and 52, the rear support leg 715 includes a support plate 716 fixed to a rear portion of the top panel 713, and leg parts 717 which are fixed to the support plate 716 and which are attached to the floor step 52. The support plate 716 is fixed to a lower surface of the top panel 713. Specifically, the support plate 716 includes an upper wall 716*a* which is fixed by welding to a lower surface of the rear portion of the top panel 713, and a rear wall 716*b* which extends downward from a rear edge of the upper wall 716*a*. Furthermore, the support plate 716 extends over the top panel 713 along the machine body-width direction K2 and projects leftward from the top panel 713. The leg parts 717 include a first leg part 717L fixed to a left portion of the support plate 716, and a second leg part 717R fixed to a right portion of the support plate 716. The first leg part 717L and the second leg part 717R are placed on and attached to the step.

Figure 53:
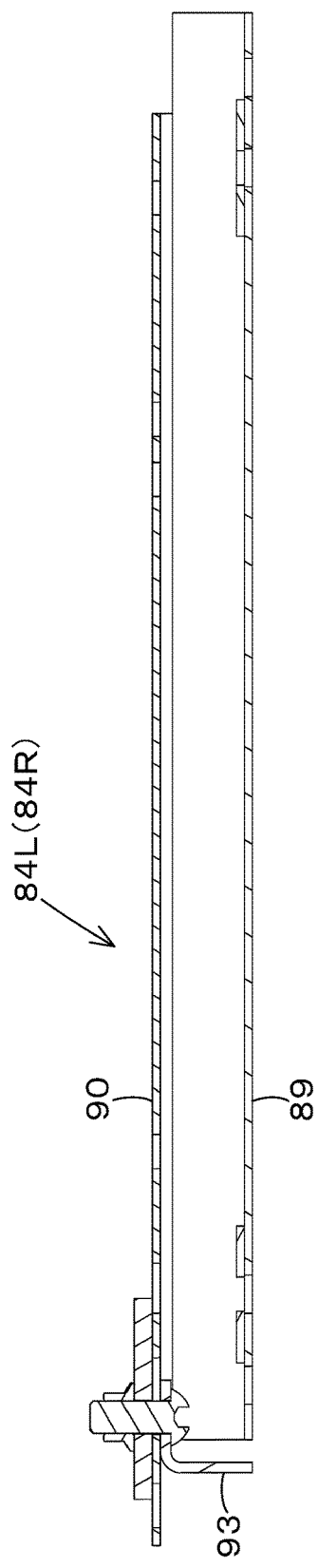
FIG. 53 is a cross-sectional view of a first slide rail, as seen from a side.
Figure 54:
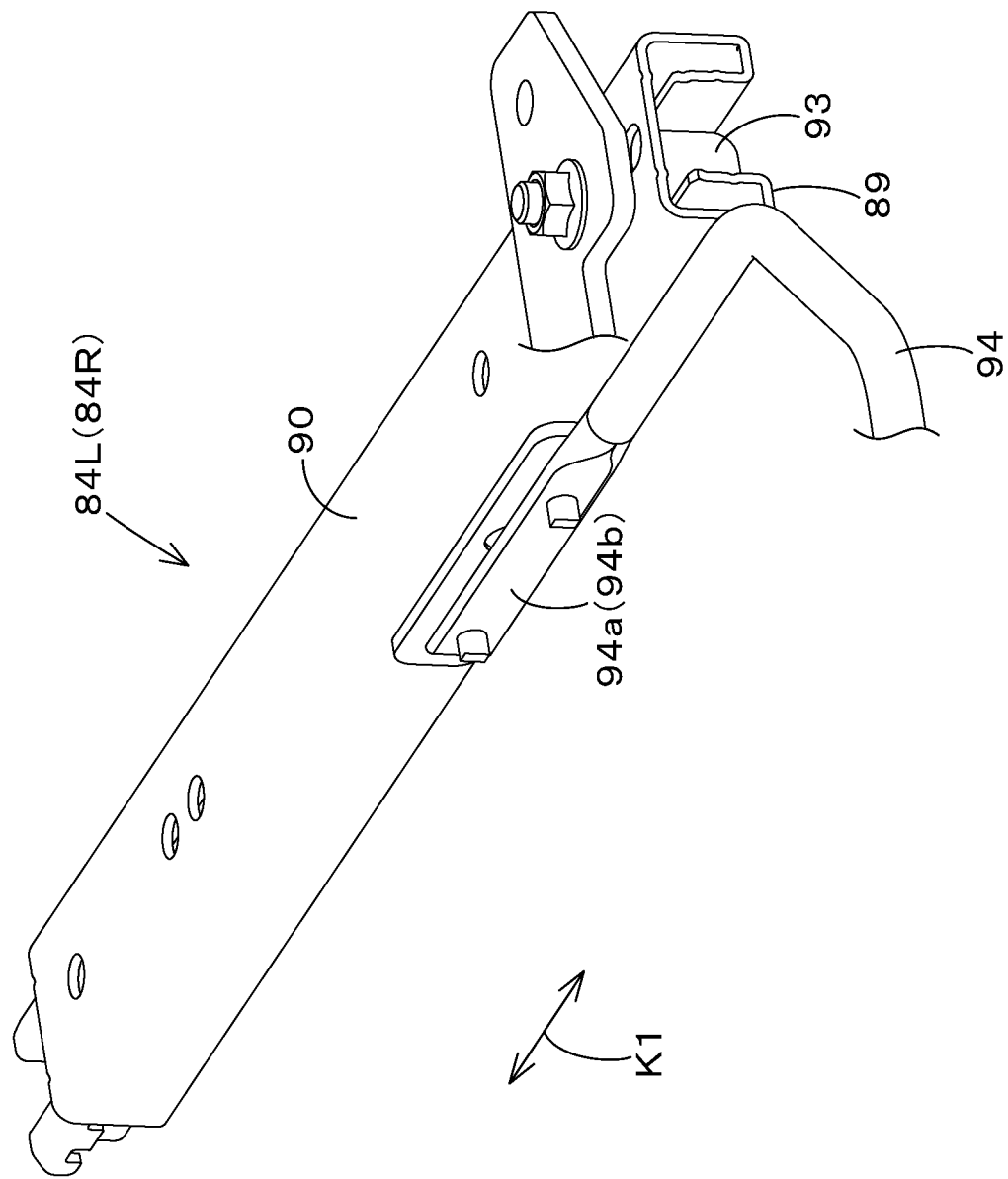
FIG. 54 is a perspective view of the first slide rail.

As illustrated in FIGS. 53 and 54, each of the first slide rails 84L and 84R is elongated along the front-rear direction K1 and includes a lower rail 89 at a lower portion and an upper rail 90 at an upper portion. As illustrated in FIGS. 51 and 52, the lower rail 89 is attached to the seat base 83. The upper rail 90 is fitted with the lower rail 89 such that the upper rail 90 is movable along the front-rear direction K1 and supported by the lower rail 89, and is attached to the slide frame 87. With this, the movable body 85 is movable along the front-rear direction K1 relative to the seat base 83.

As illustrated in FIG. 53, the upper rail 90 has, attached to a front portion thereof, a restricting member 93 which abuts on a front end of the lower rail 89 to restrict the rearward movement of the upper rail 90 relative to the lower rail 89.

Figure 55:
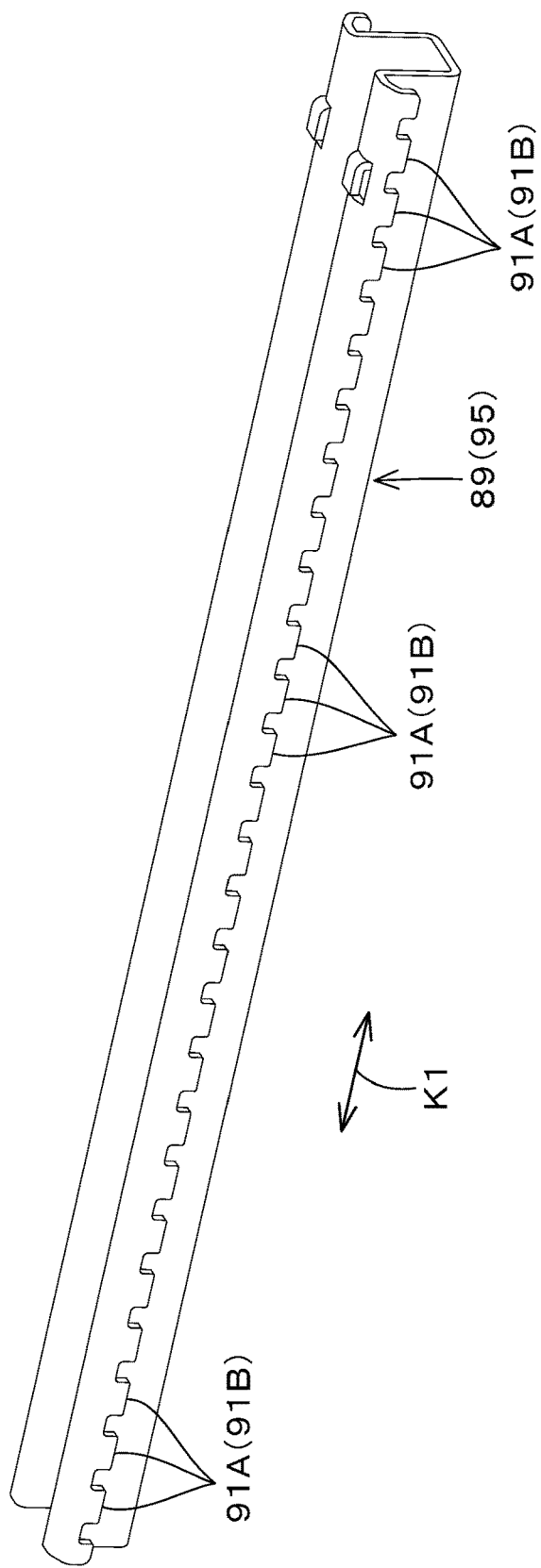
FIG. 55 is a perspective view of a lower rail.
Figure 56:
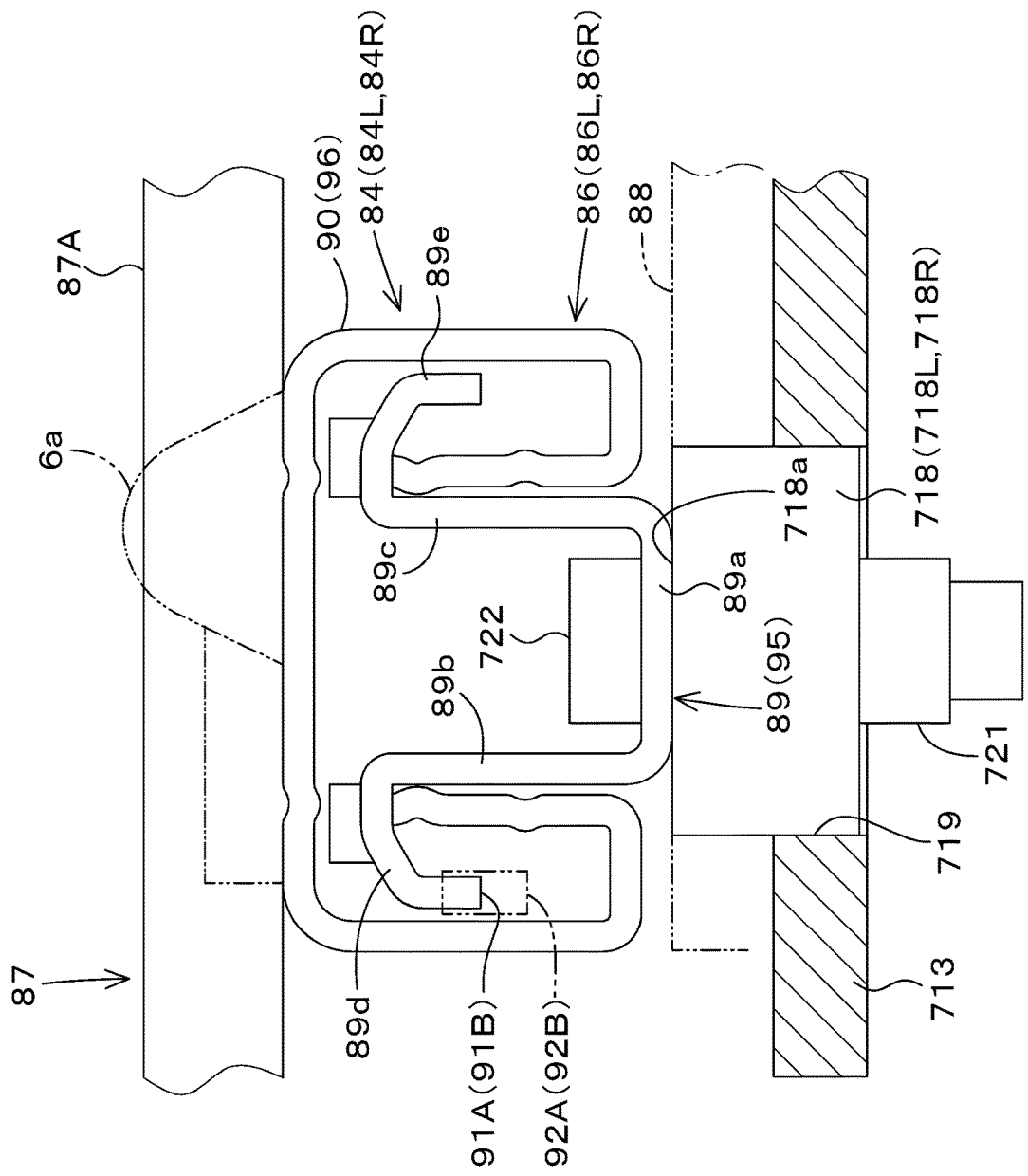
FIG. 56 is a cross-sectional view of a part in which the first slide rail is attached, as seen from the rear.

As illustrated in FIG. 55, the lower rail 89 includes multiple engaging portions 91A which are arranged along the front-rear direction K1 at intervals and which are arranged over an area extending from the front to the rear of the lower rail 89. As illustrated in FIG. 56, the upper rail 90 has provided therein engaging members 92A which engage with the engaging portions 91A. When the engaging members 92A are in engagement with the engaging portions 91A, the forward and rearward movements of the upper rail 90 relative to the lower rail 89 are restricted (the first slide rails 84L and 84R are locked).

As illustrated in FIG. 54, an operation rod 94 is attached to the upper rail 90. One end portion 94*a* of the operation rod 94 is attached to the upper rail 90 of the left first slide rail 84L, and the opposite end portion 94*b* of the operation rod 94 is attached to the upper rail 90 of the right first slide rail 84L. The operation rod 94 is configured to move together with the engaging members 92A. Raising the operation rod 94 causes the engaging members 92A to move away from the engaging portions 91A. With this, the forward and rearward movements of the upper rail 90 relative to the lower rail 89 are permitted. When the force to operate the operation rod 94 stops being applied, the operation rod 94 is lowered by the biasing force of a spring, causing the engaging members 92A to engage with the engaging portions 91A.

Figure 57:
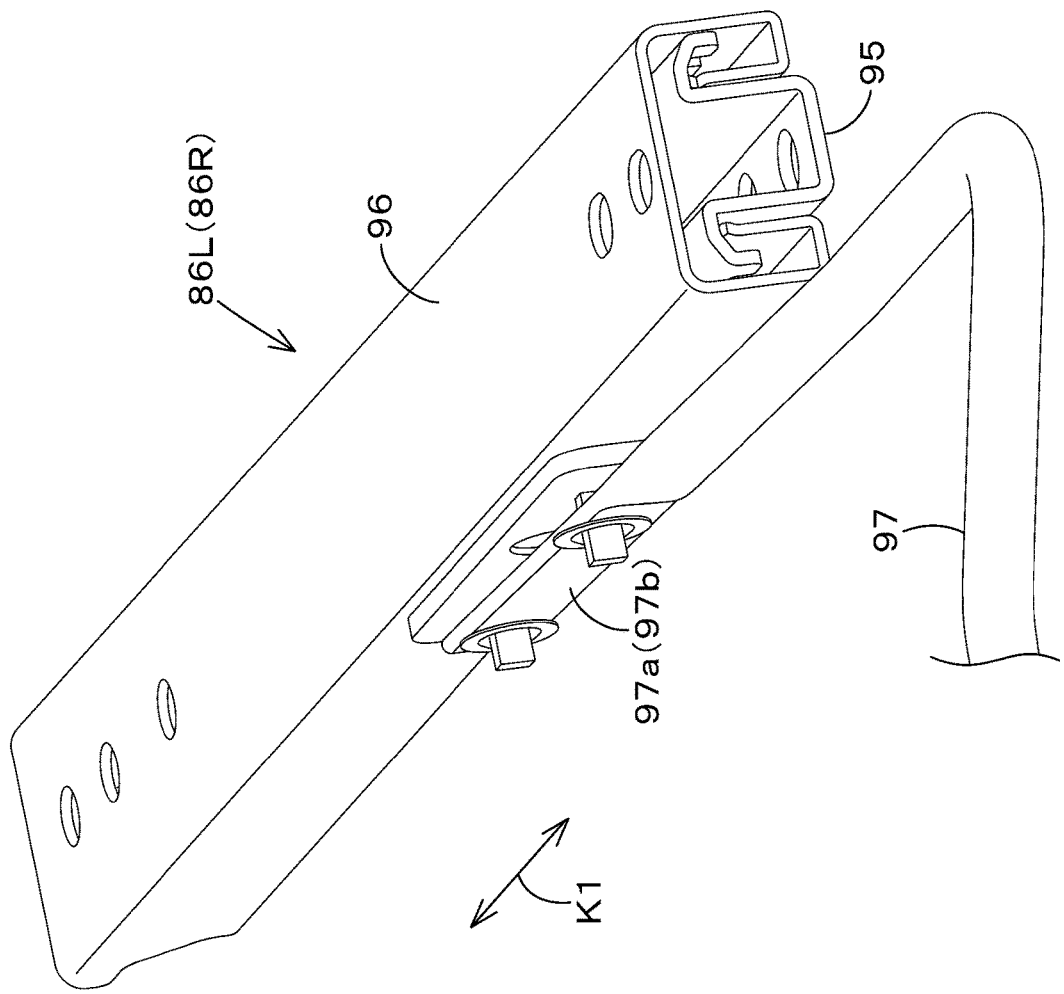
FIG. 57 is a perspective view of a second slide rail.

As illustrated in FIG. 57, each of the second slide rails 86L and 86R is elongated along the front-rear direction K1 and includes a lower rail 95 and an upper rail 96.

As illustrated in FIG. 56, the lower rail 95 is attached to the suspension 88. The upper rail 96 is fitted with the lower rail 95 such that the upper rail 96 is movable along the front-rear direction K1, and is attached to a bracket member 6*a* fixed to the operator's seat 6. With this, the operator's seat 6 is movable along the front-rear direction K1 relative to the movable body 85.

As illustrated in FIG. 55, the lower rail 95 includes multiple engaging portions 91B which are arranged along the front-rear direction K1 at intervals and which are arranged over an area extending from the front to the rear of the lower rail 95. As illustrated in FIG. 56, the upper rail 96 has provided therein engaging members 92B which engage with the engaging portions 91B. When the engaging members 92B are in engagement with the engaging portions 91B, the forward and rearward movements of the upper rail 96 relative to the lower rail 95 are restricted (the second slide rails 86L and 86R are locked).

As illustrated in FIG. 57, an operation rod 97 is attached to the upper rail 96. One end portion 97*a* of the operation rod 97 is attached to the upper rail 96 of the left first slide rail 84L, and the opposite end portion 97*b* of the operation rod 97 is attached to the upper rail 96 of the right first slide rail 84L. The operation rod 97 is configured to move together with the engaging members 92B. Raising the operation rod 97 causes the engaging members 92B to move away from the engaging portions 91B. With this, the forward and rearward movements of the upper rail 96 relative to the lower rail 95 are permitted. When the force to operate the operation rod 97 stops being applied, the operation rod 97 is lowered by the biasing force of the spring, causing the engaging members 92B to engage with the engaging portions 91B.

As illustrated in FIGS. 51 and 52, rail mounting plates 718 are provided on the top panel 713 of the seat base 83. The lower rails 89 of the first rail device 84 are attached to the rail mounting plates 718.

As illustrated in FIG. 50, the rail mounting plates 718 include a first rail mounting plate 718L to which the first slide rail 84L is attached, and a second rail mounting plate 718R to which the first slide rail 84R is attached.

Figure 58:
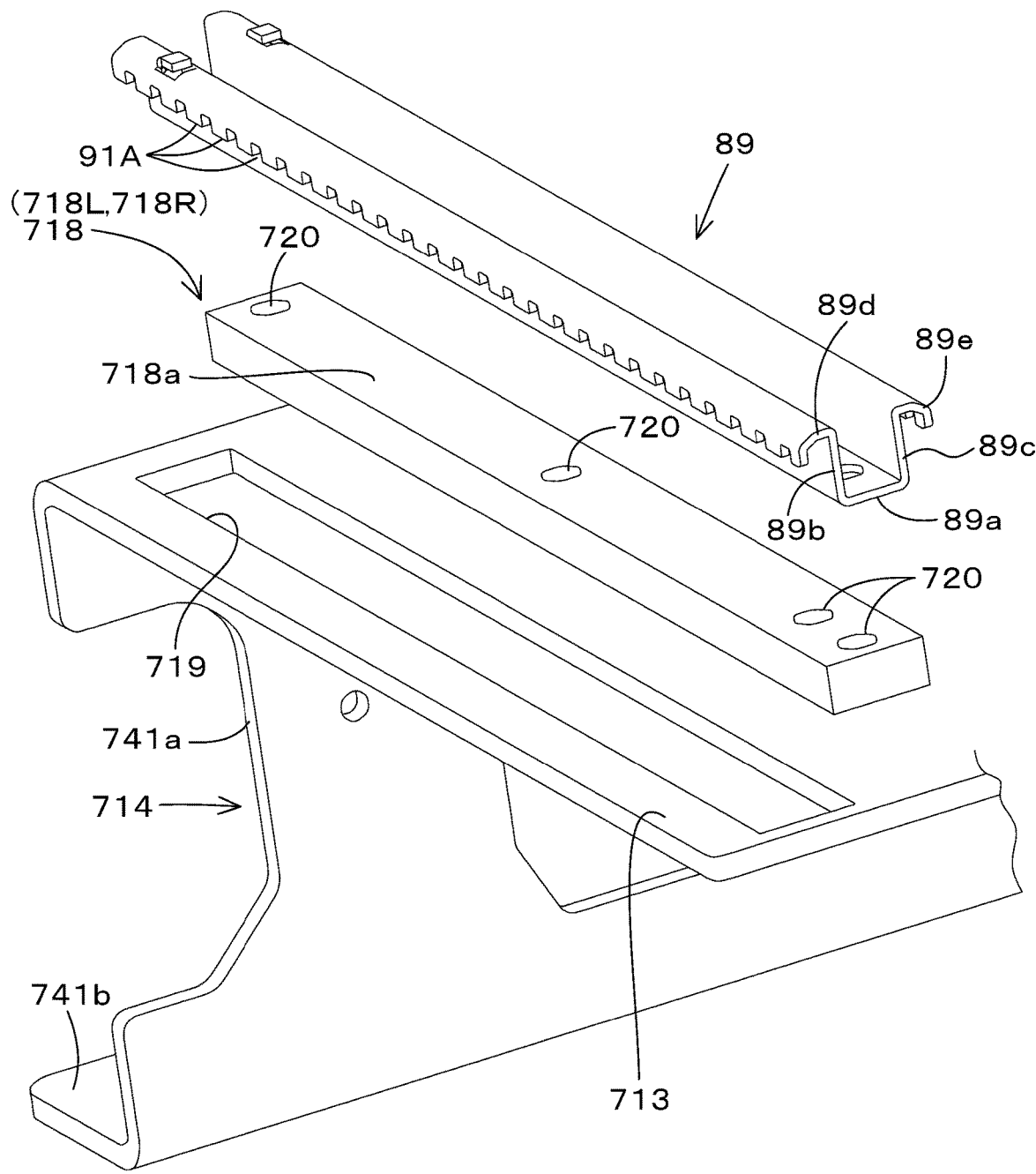
FIG. 58 is an exploded perspective view of a part in which the lower rail is attached.

As illustrated in FIGS. 56 and 58, each of the rail mounting plates 718 is formed of a quadrangular thick plate (flat bar) which is elongated in the front-rear direction. The top panel 713 has, in a portion thereof in which the rail mounting plate 718 is placed, a mounting hole 719 passing through the top panel 713 along the top-bottom direction. The mounting hole 719 is substantially the same in shape as the rail mounting plate 718 in plan view, and is configured to have the rail mounting plate 718 inserted therein. Furthermore, the mounting hole 719 extends from a front edge portion to a rear edge portion of the top panel 713. The support plate 716 (upper wall) is fixed to a lower surface of the top panel 713 such that the support plate 716 intersects the mounting hole 719 in plan view.

As illustrated in FIG. 56, the rail mounting plate 718 is greater in plate thickness than the top panel 713, and, in the present embodiment, the rail mounting plate 718 is substantially twice as great in plate thickness as the top panel 713. The rail mounting plate 718 has a lower portion thereof inserted in the mounting hole 719 to reach the vicinity of the lower surface of the top panel 713. Furthermore, a lower surface of the rail mounting plate 718 is located somewhat higher than the lower surface of the top panel 713. Accordingly, an upper portion of the rail mounting plate 718 projects upward from the top panel 713. The rail mounting plates 718 are fixed by welding to the top panel 713. The welded portions are present in a dotted manner around each rail mounting plate 718 (along the edge of the mounting hole 719).

As illustrated in FIG. 56, each rail mounting plate 718 has a plurality of insertion holes 720 each passing through the rail mounting plate 718 along the top-bottom direction. The insertion holes 720 are in a front portion, an intermediate portion, and a rear portion of the rail mounting plate 718. Mounting nuts 721 for attachment of the lower rail 89 are fixed to portions of the lower surface of the rail mounting plate 718 that correspond to the respective insertion holes 720. The lower rail 89 includes a bottom wall 89a, one side wall 89b which extends upward from one of opposite edges of the bottom wall 89a in the machine body-width direction K2, the opposite side wall 89c which extends upward from the other of the opposite edges of the bottom wall 89a in the machine body-width direction K2, one protruding wall 89d which protrudes from an upper edge of the one side wall 89b in the machine body-outward direction, and the opposite protruding wall 89e which protrudes from an upper edge of the opposite side wall 89c in the machine body-inward direction. The one protruding wall 89d and the opposite protruding wall 89e each include engaging portions 91A.

The lower rail 89 is placed on an upper surface (mounting surface) 718a of the rail mounting plate 718 and attached with mounting bolts 722. Specifically, the lower rail 89 is attached to the rail mounting plate 718 by passing the mounting bolts 722 through the bottom wall 89a and the insertion holes 720 from above and screwing the mounting bolts 722 into the mounting nuts 721.

It is noted here that, without the flatness of an object on which the lower rail 89 is mounted, the upper rail 90 is difficult to slide. For example, if the lower rail 89 is directly attached to the top panel 713 of the seat base 83, the flatness of the mounting surface to which the lower rail 89 is attached is not enough due to welding distortion that would occur when the support plate 716 is welded to the top panel 713. Therefore, the first rail device 84 does not slide.

In the present embodiment, the flatness of the mounting surface 718a can be achieved in the following manner. The rail mounting plate 718 is inserted in the mounting hole 719 in the top panel 713 and fixed by welding to the top panel 713, and the upper surface of the rail mounting plate 718, which is formed of a thick plate, is used as the mounting surface 718a to which the first rail device 84 is attached.

The rail mounting plate 718 is fixed by welding to the top panel 713 in the following manner. While the rail mounting plate 718 is inserted in the mounting hole 719, the rail mounting plate 718 is supported from below with a jig such that the upper surface of the rail mounting plate 718 is horizontal, and the rail mounting plate 718, which is supported with the jig, is fixed by welding to the top panel 713.

In the present embodiment, the flatness of the mounting surface 718a is achieved by welding accuracy of the rail mounting plate 718 instead of smoothing the mounting surface for the first rail device 84 using a milling cutter. Furthermore, since a structure in which the rail mounting plate 718 is inserted in the mounting hole 719 and fixed by welding to the top panel 713 is used, a material greater in plate thickness than the top panel 713 can be used as the rail mounting plate 718, making it possible to achieve sufficient strength for supporting heavy objects such as the operator's seat 6, the movable body 85, and the like.

Furthermore, since the support plate 716 is fixed to the lower surface of the top panel 713 such that the support plate 716 intersects the mounting hole 719 in plan view, the mounting hole 719 can be extended to the vicinity of the rear edge of the top panel 713. Furthermore, since the lower surface of the rail mounting plate 718 is located higher than the lower surface of the top panel 713, the support plate 716 can be brought into surface contact with the lower surface of the top panel 713.

With regard to the structure by which the operator's seat 6 is adjustable in position along the front-rear direction, by adjusting the position of the operator's seat 6 relative to the movable body 85 in the front-rear direction K1, it is possible to adjust the relative positions of the operator and the operator operation levers 77L and 77R in the front-rear direction K1. This makes it possible to set the position of the operator's seat 6 such that the operator can operate the operation levers 77L and 77R in a comfortable position in which their elbows are slightly bent. Furthermore, by adjusting the position of the movable body 85 in the front-rear direction, it is possible to adjust the position of the operator's seat 6 in the front-rear direction while keeping the relative positions of the operator and the operator operation levers 77L and 77R in the front-rear direction K1.

As illustrated in FIG. 49, the stoppers 98 are provided at the rear of the operator's seat 6. The stoppers 98 are disposed forward of the abutment members 99. Since the stoppers 98 abut on the abutment members 99, the rearward movement of the operator's seat 6 can be restricted. Furthermore, the stoppers 98 abut on the abutment members 99 before the operator's seat 6 interferes with the partition wall member 22A. This makes it possible to prevent the operator's seat 6 from interfering with the partition wall member 22A.

Figure 59:
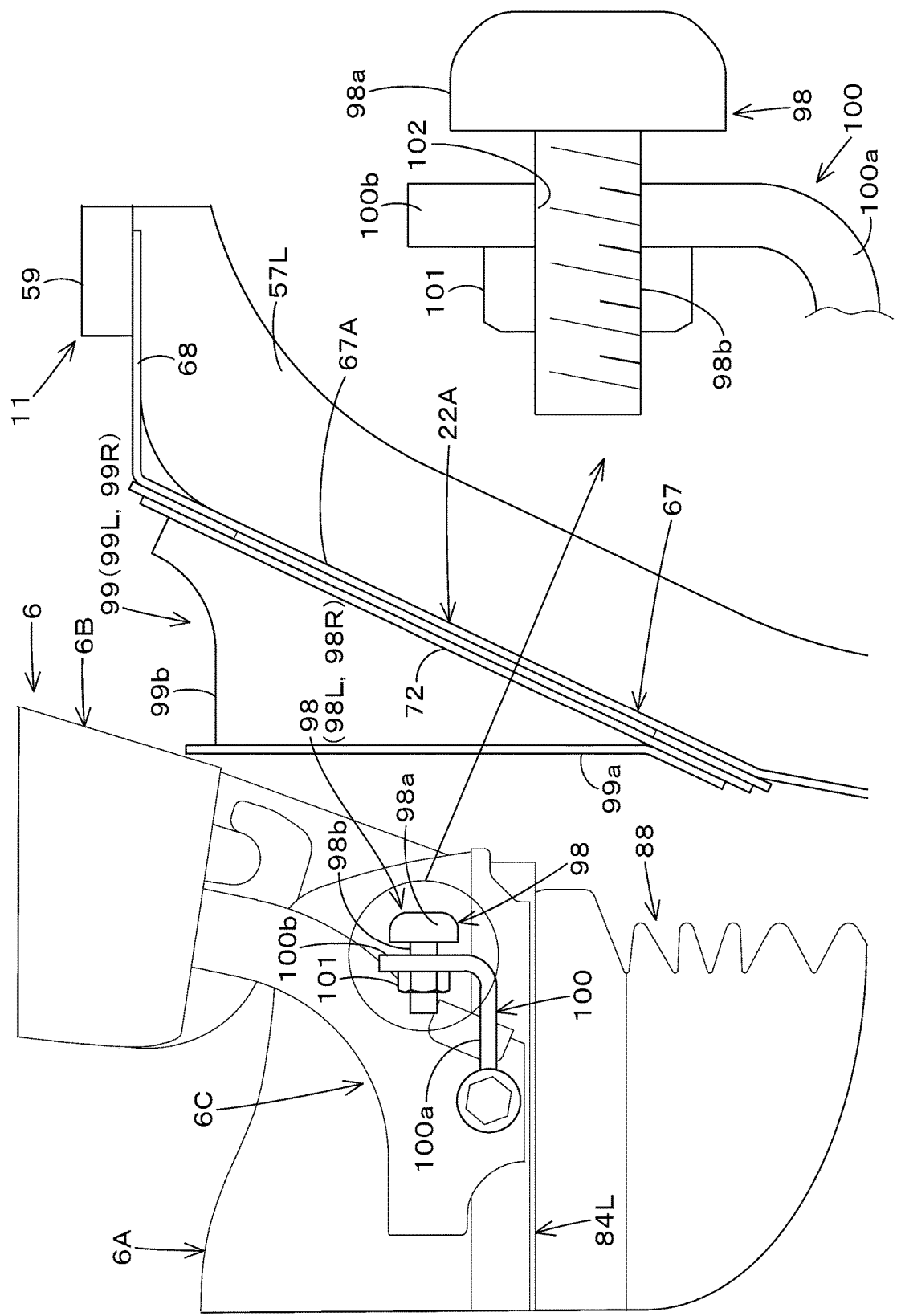
FIG. 59 is an enlarged side view of a rear portion of the operator's seat.

As illustrated in FIG. 59, each stopper 98 is attached to a support bracket 100 fixed to a seat frame 6C constituting a framework of the operator's seat 6 such that the stopper 98 is adjustable in position along the front-rear direction K1. Each stopper 98 includes an abutting part 98a which abuts on a corresponding abutment member 99, and a threaded shaft 98b which projects forward from the abutting part 98a. The threaded shaft 98b is a member composed of a rod member having an external thread on its outer peripheral surface. Specifically, the threaded shaft 98b is composed of a bolt, and the head of the bolt is inserted in the abutting part 98a.

Each support bracket 100 includes a first section 100a attached to the seat frame 6C, and a second section 100b which extends upward from a rear edge of the first section 100a. The second section 100b has a threaded hole 102 having an axis extending along the front-rear direction K1. The threaded hole 102 is a through hole passing through the support bracket 100 and having an internal thread on its inner peripheral surface. The threaded hole 102 has the threaded shaft 98b threaded therein. When the threaded shaft 98b is screwed into the threaded hole 102 (turned into the threaded hole 102) or unscrewed from the threaded hole 102

(loosened), a corresponding stopper 98 can be changed in position relative to a corresponding abutment member 99 in the front-rear direction K1. A locknut 101 to keep the stopper 98 in a fixed position is screwed on the threaded shaft 98*b*.

As illustrated in FIG. 50, in the present embodiment, the stoppers 98 include a first stopper 98L provided leftward of a rear portion of the seat part 6A, and a second stopper 98R provided rightward of the rear portion of the seat part 6A. The first stopper 98L is located forward of the first abutment member 99L, and the second stopper 98R is located forward of the second abutment member 99R. The first stopper 98L abuts on the first abutment member 99L, and the right second stopper 98R abuts on the second abutment member 99R.

If the stoppers 98 are not in abutment with the abutment members 99 when the movable body 85 is fully moved rearward, the rearward movement of the movable body 85 and the operator's seat 6 is restricted by the restricting members 93. If the stoppers 98 are in abutment with the abutment members 99 when the movable body 85 is fully moved rearward, the rearward movement of the movable body 85 and the operator's seat 6 is restricted by the stoppers 98. When the operator's seat 6 alone is moved rearward, the rearward movement of the operator's seat 6 is restricted by the stoppers 98. That is, the stoppers 98 restrict positions both when the movable body 85 is moved rearward and when the operator's seat 6 alone is moved rearward.

When the movable body 85 is fully moved rearward and the rearward movement of the stoppers 98 are restricted by the abutment members 99, the operator's seat 6 is still capable of being adjusted in position rearward relative to the movable body 85. Therefore, when the movable body 85 in such a state is moved forward, the operator's seat 6 can be moved rearward. Then, by moving the operator's seat 6 rearward, it is possible to increase the distance between the operation levers 77L and 77R and the operator's seat 6 along the front-rear direction. This makes it possible for the operator to perform operation in a comfortable position in which the operator can easily operate the operation levers 77L and 77R (with their elbows slightly bent and arms stretched moderately).

Furthermore, when the operator enters or exits the cabin 5, by adjusting the position of the operator's seat 6 in the front-rear direction relative to the movable body 85 so that the stoppers 98 abut on the abutment members 99 with the movable body 85 in a fully moved rearward position, it is possible to achieve a state in which the operator's seat 6 and the movable body 85 are close to the partition wall member 22A. That is, when the operator enters or exits the cabin 5, it is possible to slide the operator's seat 6 and the operation lever 77L close to the partition wall member 22A in order to prevent the operation lever 77L from hindering the operator when entering or exiting the cabin 5.

Furthermore, after the movable body 85 is moved rearward and the stoppers 98 abut on the abutment members 99, the first slide rails 84L and 84R are locked such that the first slide rails 84L and 84R are not allowed to move forward or rearward while providing a gap between the stoppers 98 and the abutment members 99. That is, when the stoppers 98 are in abutment with the abutment members 99, the engaging members 92A are not brought into engagement with the engaging portions 91A, whereas, when the movable body 85 is moved slightly forward in the state in which the stoppers 98 are in abutment with the abutment members 99, the engaging members 92A are brought into engagement with the engaging portions 91A and the first slide rails 84L and 84R are locked.

Since the operator's seat 6 is supported by the suspension 88, the machine body 2 and the operator's seat 6 move up and down relative to each other when the operator is seated on the operator's seat 6 or due to vertical vibration of the machine body 2. If the first slide rails 84L and 84R are locked while the stoppers 98 are in abutment with the abutment members 99, the stoppers 98 and the abutment members 99 rub against each other. In view of this, a gap is provided between the stoppers 98 and the abutment members 99, making it possible to prevent the stoppers 98 and the abutment members 99 from rubbing against each other.

Furthermore, for the same reasons as those describe above, after the stoppers 98 abut on the abutment members 99, the second slide rails 86L and 86R are locked such that the second slide rails 86L and 86R are not allowed to move forward or rearward while providing a gap between the stoppers 98 and the abutment members 99.

Furthermore, when the closing plate 72 is detached to open the access opening 71, the operator's seat 6 and the movable body 85 are fully moved forward.

Figure 60:
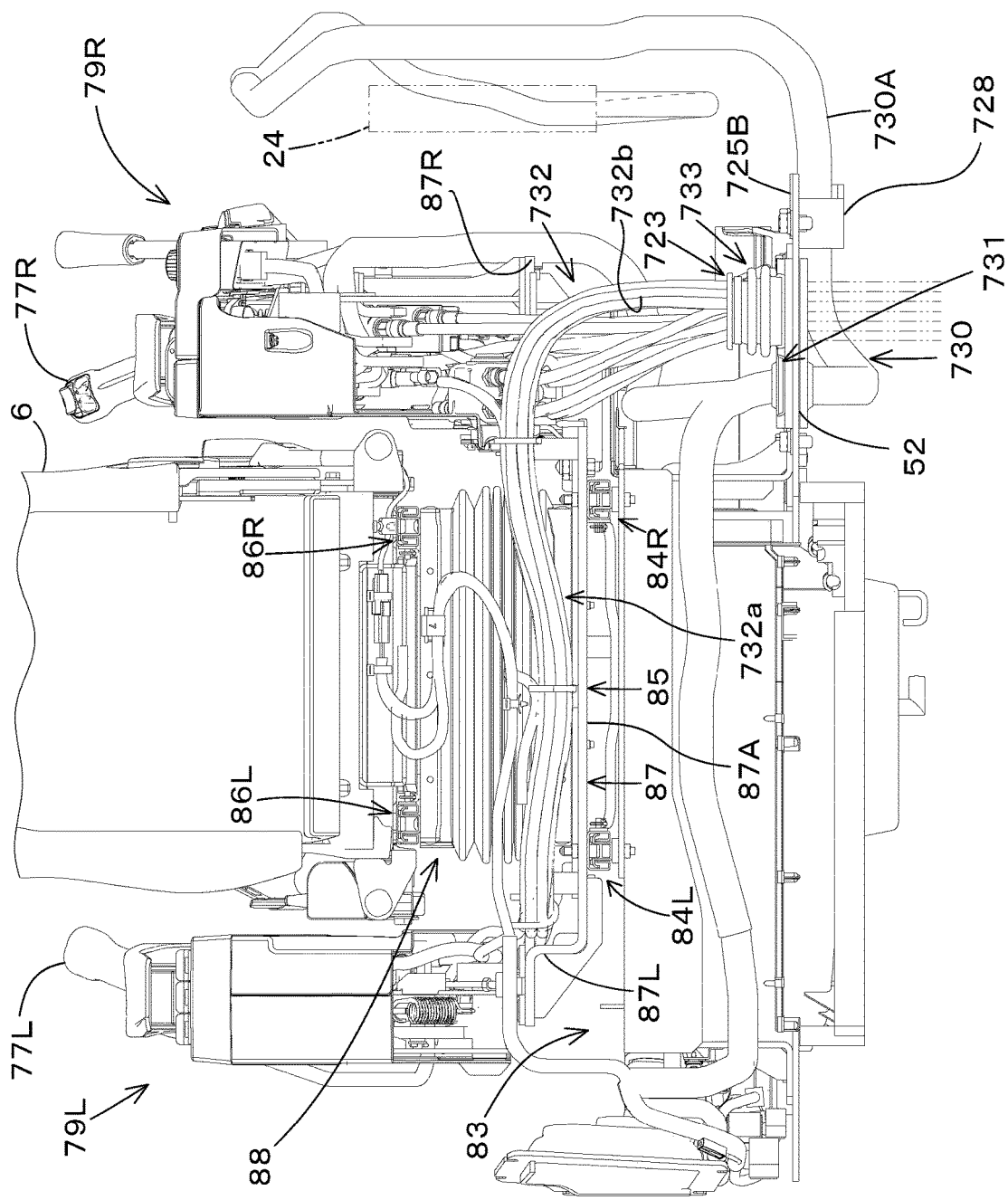
FIG. 60 is a rear view of the surroundings of the operator's seat.
Figure 61:
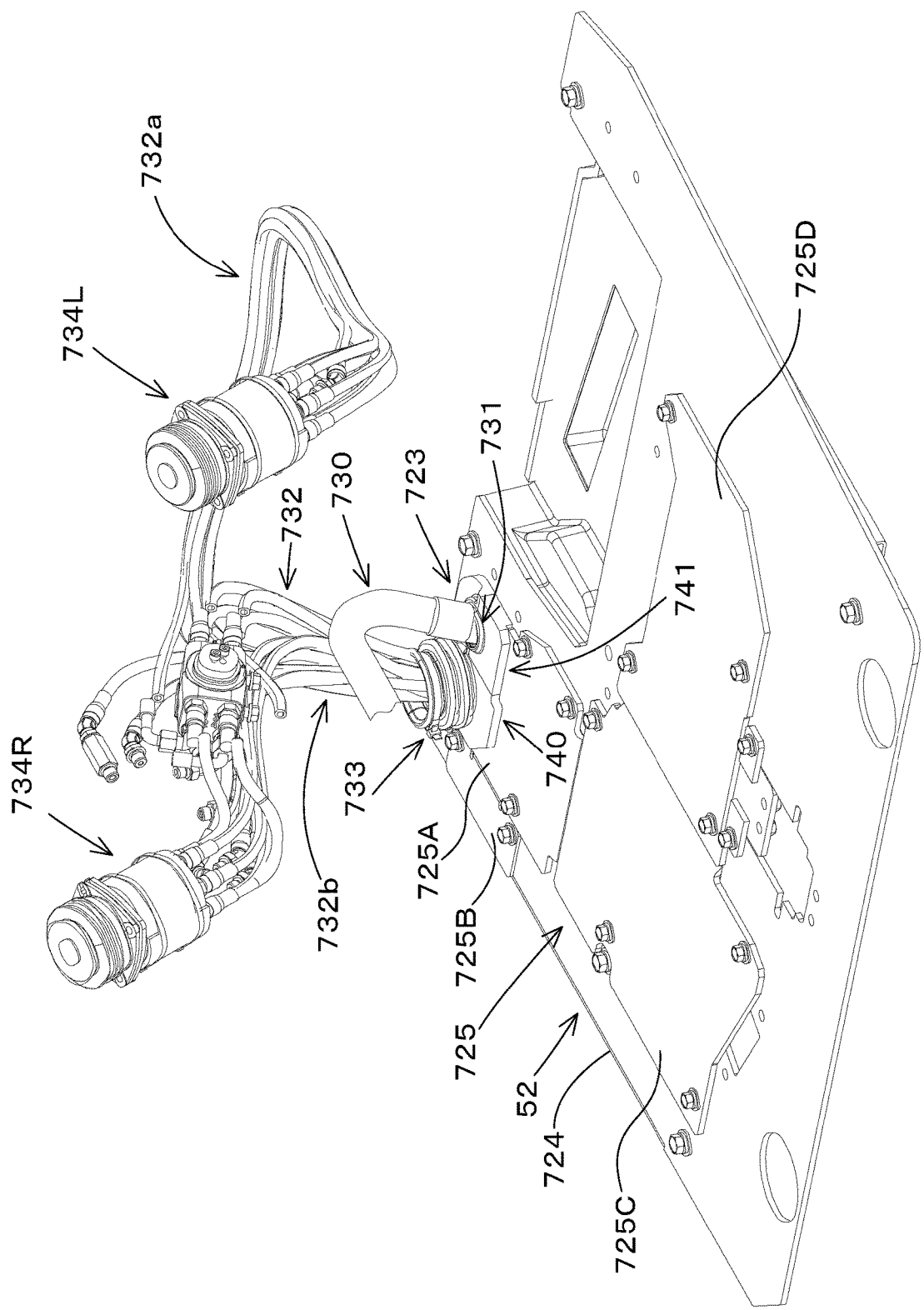
FIG. 61 is a perspective view of the surroundings of a grommet body.

As illustrated in FIG. 60, a grommet body 723 is attached to the part of the floor step 52 that is located at a lateral side of the seat base 83. Specifically, the grommet body 723 is disposed rightward of rear portions of the operator's seat 6 and the seat base 83. As illustrated in FIG. 61, the grommet body 723 is attached to a right rear portion of the floor step 52. The grommet body 723 is formed of an elastic body such as rubber.

Figure 62:
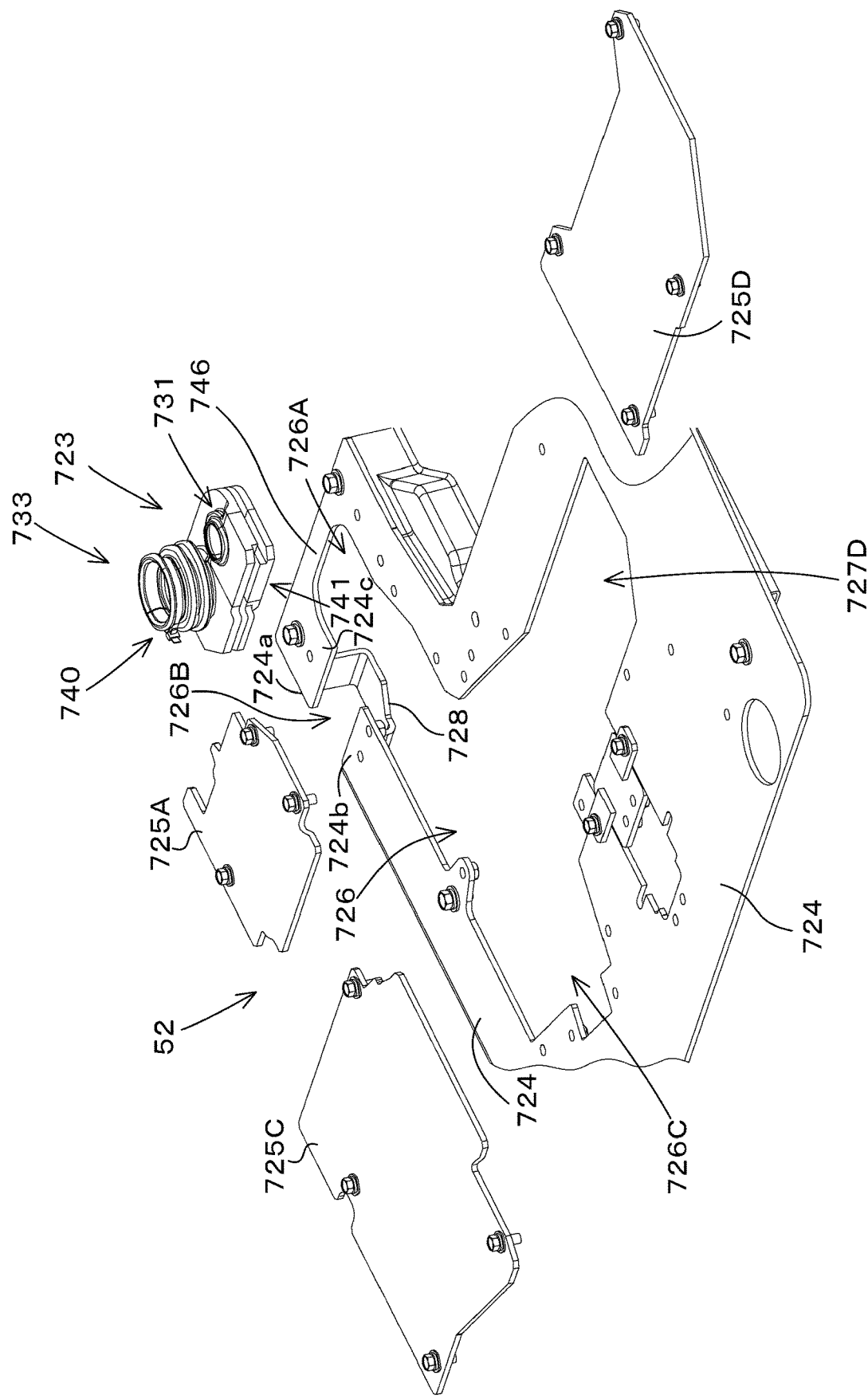
FIG. 62 is an exploded perspective view of a floor step and the grommet body.

As illustrated in FIGS. 61 and 62, the floor step 52 includes a main plate 724 which defines the floor surface of the machine body 2, and a cover plate 725 composed of a plurality of plate members (first to fourth plates 725A to 725D) detachably attached to the main plate 724. The main plate 724 is formed of a single flat plate member.

As illustrated in FIG. 62, the main plate 724 has an opening 726 which passes through the main plate 724 in the top-bottom direction. Through the opening 726, the apparatus and the like (for example, the swivel motor M1 and the like) located below the floor step 52 can be inspected. The opening 726 includes a first opening 726A, a second opening 726B, a third opening 726C, and a fourth opening 726D. The first opening 726A is formed in a rear portion of a right portion of the main plate 724. The second opening 726B is formed in an area extending from a front portion of the first opening 726A to a right outer peripheral portion 724*a* (peripheral portion near the controller 24) of the main plate 724. The third opening 726C is in communication with the front portion of the first opening 726A and extends forward from the first opening 726A. The fourth opening 726D extends leftward from the third opening 726C.

As illustrated in FIGS. 61 and 62, the opening 726 is closed with the cover plate 725 and the grommet body 723. Specifically, the first plate 725A closes the front portion of the first opening 726A. A rear portion of the first opening 726A is closed with the grommet body 723. The second plate 725B closes the second opening 726B. Specifically, the second plate 725B connects a first section 724*b* and a second section 724*c*, which define the second opening 726B, at the upper surface of the floor step 52. The lower surfaces of the first section 724*b* and the second section 724*c* are connected by a connecting member 728 which is in the form of a groove having an open top. The third plate 725C closes the third opening 726C. The fourth plate 725D closes the fourth opening 726D. The cover plate 725 is attached to the main plate 724 with bolts. Specifically, the first to fourth plates 725A to 725D are fixed to the upper surface of the main plate 724 with bolts such that the first to fourth plates 725A to 725D are superimposed from above on the upper surface of the main plate 724, a rear edge portion of the third plate 725C is placed on a font edge portion of the first plate 725A, and a right edge portion of the fourth plate 725D is placed on a left edge portion of the third plate 725C.

Figure 63:
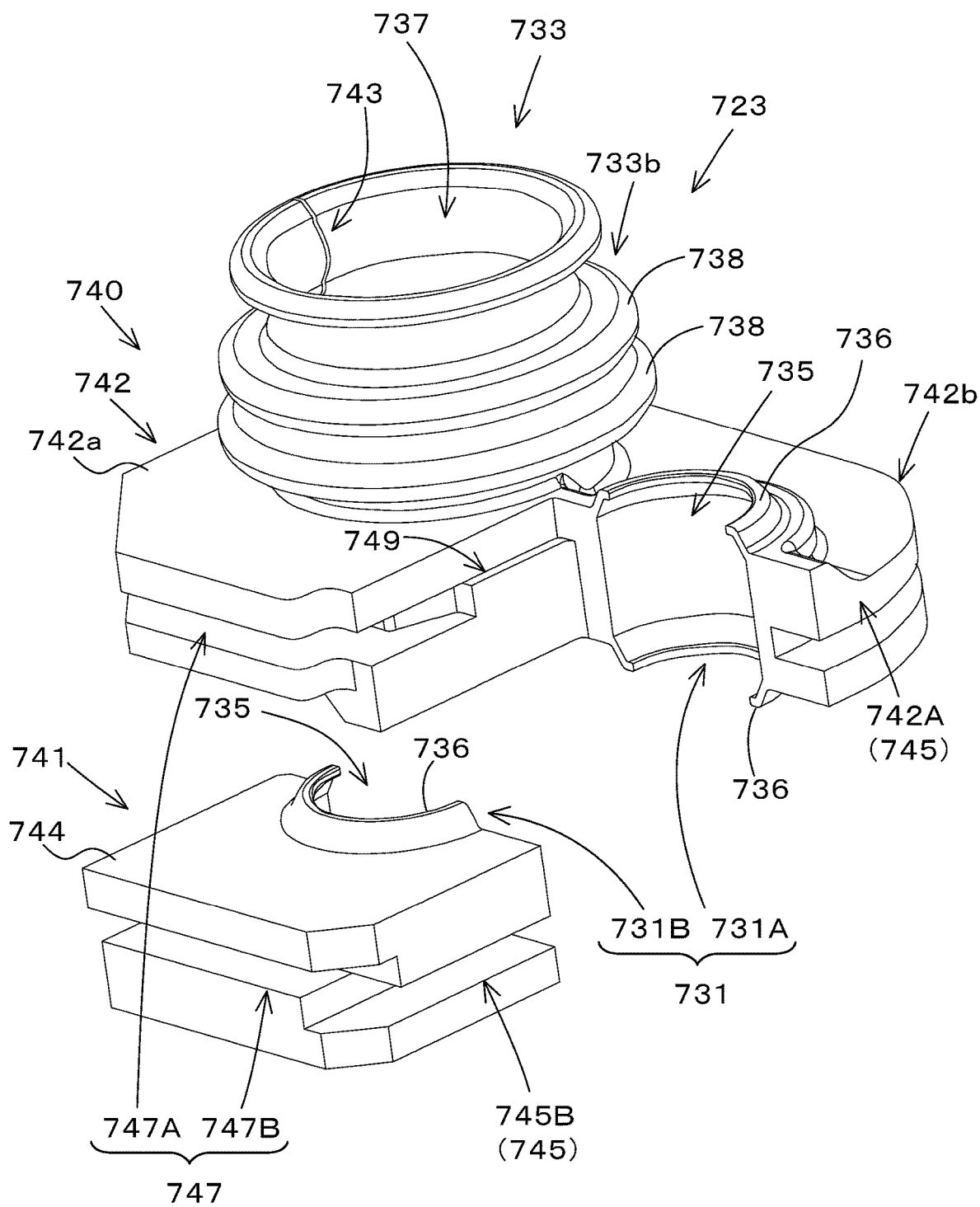
FIG. 63 is an exploded perspective view of the grommet body.

As illustrated in FIG. 63, the grommet body 723 is composed of (divided into) a grommet main body 740 and a grommet part 741 which is separate from the grommet main body 740.

Furthermore, as illustrated in FIG. 61, the grommet body 723 includes a harness grommet portion 731 for passage of a harness of electrical wires (main harness) 730. As illustrated in FIG. 60, the harness 730 is routed from the controller 24 through the space between the second plate 725B and the connecting member 728 to the lower surface side of the floor step 52, and then is routed through the harness grommet portion 731 (through the opening 726) to an area above the floor step 52. The harness 730, after passed through the harness grommet portion 731, is divided and routed to electrical apparatuses in the cabin 5.

Figure 66:
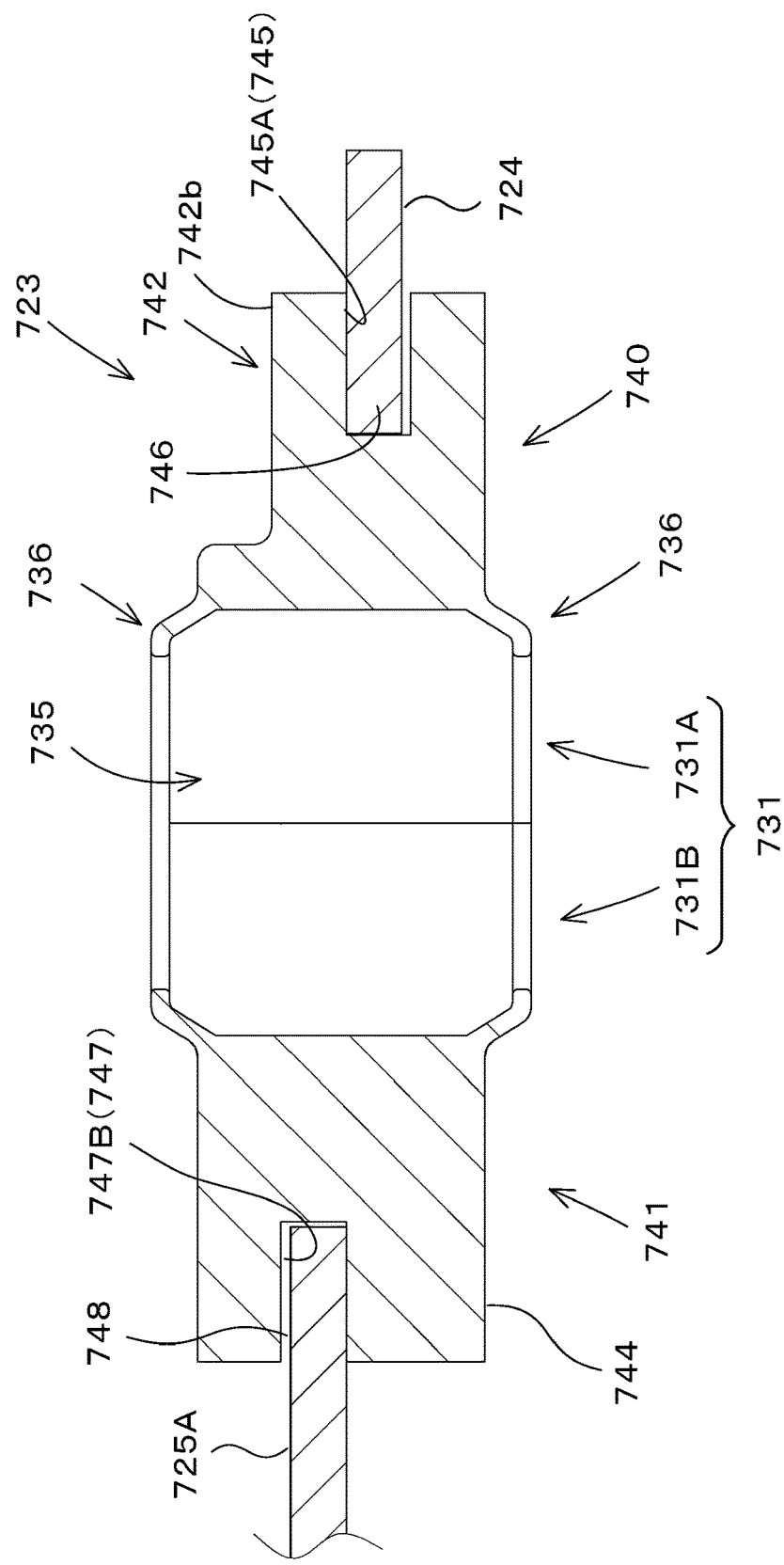
FIG. 66 is a cross-sectional view of a part in which the grommet part is attached, as seen from a side.

As illustrated in FIG. 66, the harness grommet portion 731 has a harness through-hole 735 which is for passage of the harness 730 and which passes through the harness grommet portion 731 along the top-bottom direction. The harness grommet portion 731 has an axis along the top-bottom direction, and includes lip-shaped portions 736 at upper and lower ends thereof. Each of the lip-shaped portions 736 is in the form of a ring along the circumferential direction centered on the axis of the harness grommet portion 731. The lip-shaped portions 736 provide improved sealability.

As illustrated in FIG. 63, the harness grommet portion 731 is divided such that the harness through-hole 735 for passage of the harness 730 is divided into two. In the present embodiment, the harness grommet portion 731 is divided into front and rear parts. One of the parts into which the harness grommet portion 731 is divided (such a part is referred to as a first part) 731A is integral with the grommet main body 740. Specifically, the grommet main body 740 includes a base part (referred to as a first base part) 742, the first base part 742 includes a first section 742a and a second section 742b which projects leftward from a rear portion of the first section 742a, and the first part 731A is integral with the second section 742b (grommet main body 740) with its inner surface (inner surface of the harness through-hole 735) facing forward. The other of the parts into which the harness grommet portion 731 is divided (such a part is referred to as a second part) 731B is integral with the grommet part 741. Specifically, the grommet part 741 includes a base part (referred to as a second base part) 744, and the second part 731B is integral with a rear portion of the second base part 744. The second part 731B is integral with the second base part 744 with its inner surface (inner surface of the harness through-hole 735) facing rearward.

As illustrated in FIG. 61, the grommet body 723 includes a hose grommet portion 733 for passage of the plurality of hydraulic hoses 732. The plurality of hydraulic hoses 732 are pilot hoses routed from the control valve V1 to an area below the floor step 52. The hose grommet portion 733 is integral with the grommet main body 740. Specifically, the entire hose grommet portion 733 is integral with the first base part 742 such that the hose grommet portion 733 projects upward.

As illustrated in FIG. 60, the plurality of hydraulic hoses 732 are routed from the lower surface side of the floor step 52 through the hose grommet portion 733 (through the opening 726) to an area above the floor step 52. As illustrated in FIG. 61, the plurality of hydraulic hoses 732, routed to the area above the floor step 52, include a plurality of hydraulic hoses 732a which are connected to a left pilot valve 734L (routed to the left console 79L), and a plurality of hydraulic hoses 732b which are connected to a right pilot valve 734R (routed to the right console 79R). The left pilot valve 734L is provided in a front portion of the left console 79L, and is operated with the left operation lever 77L. The right pilot valve 734R is provided in a front portion of the right console 79R, and is operated with the right operation lever 77L. The plurality of hydraulic hoses 732a, which are connected to the left pilot valve 734L, extend upward from the hose grommet portion 733, are routed leftward through an area higher than the slide frame 87 (first mounting portion 87A) and behind a lower portion of the suspension 88, and then pass through an area at a lateral side of the second mounting portion 87L and extend upward at the front portion of the left console 79L. The plurality of hydraulic hoses 732b, which are connected to the right pilot valve 734R, extend upward from the hose grommet portion 733 and are routed to the front portion of the right console 79R.

Figure 65:
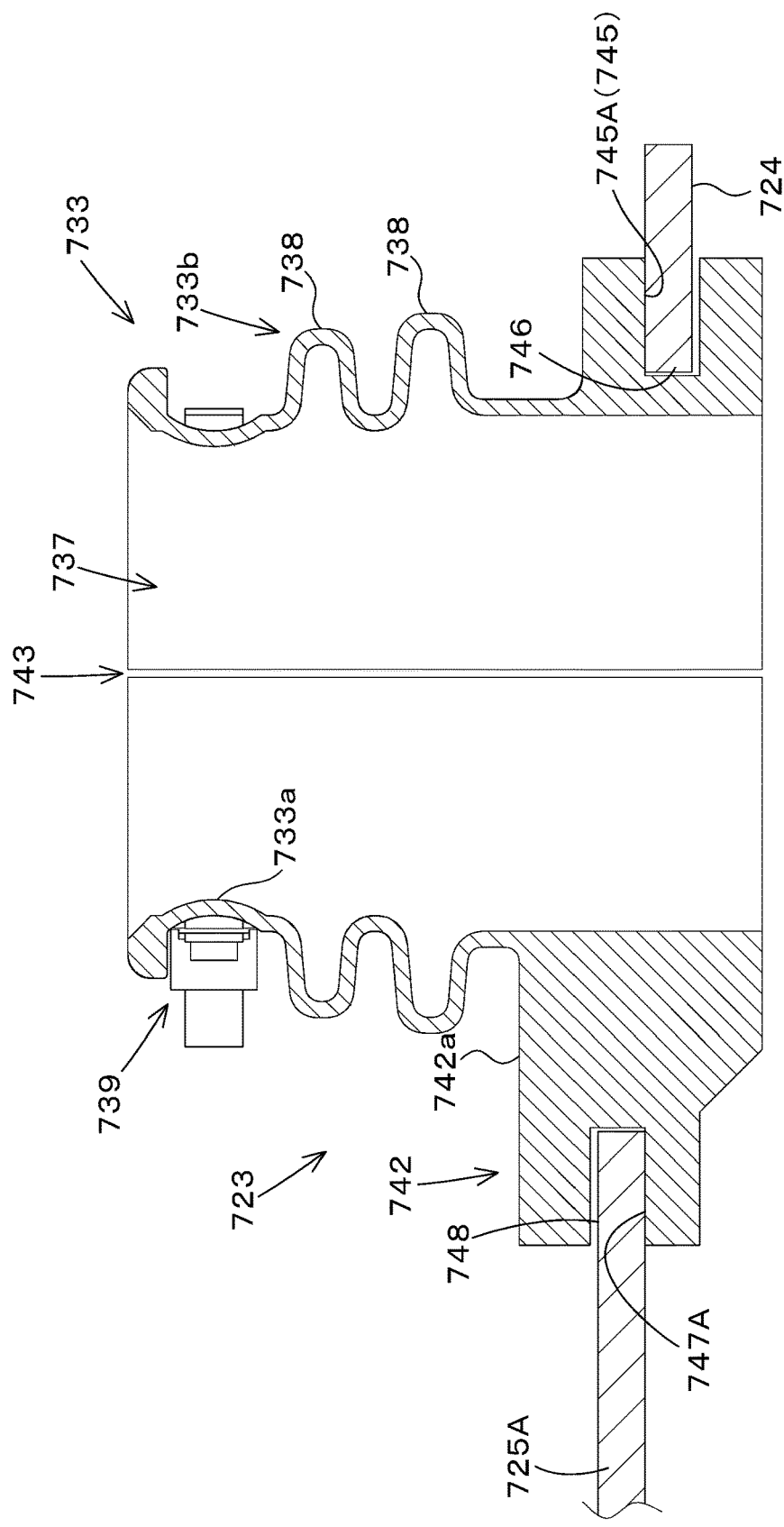
FIG. 65 is a cross-sectional view of a part in which a grommet main body is attached, as seen from a side.

As illustrated in FIG. 65, the hose grommet portion 733 has a hose through-hole 737 which is for passage of the hydraulic hoses 732 and which passes through the hose grommet portion 733 in the top-bottom direction. Furthermore, the hose grommet portion 733 is in a corrugated form which expands and contracts along the top-bottom direction. Specifically, the hose grommet portion 733 has an axis extending along the top-bottom direction, and includes a corrugated portion 733b having two annular upper and lower elongated protrusions 738 along the circumferential direction centered on the axis. The elongated protrusions 738 bulge out in a curved form. The expansion or contraction of the elongated protrusions 738 along the top-bottom direction causes the hose grommet portion 733 to expand or contract along the top-bottom direction.

A ring-shaped clamping member (holder) 739 is provided on a neck portion 733a of an upper portion of the hose grommet portion 733. The clamping member 739 is located higher than the corrugated portion 733b (upper elongated protrusion 738). The clamping member 739 presses the part of the hose grommet portion 733 that is located higher than the corrugated portion 733b toward the hydraulic hoses 732. Therefore, the plurality of hydraulic hoses 732 passed through the hose grommet portion 733 are held at the upper portion of the hose grommet portion 733 (above the corrugated portion 733b) with the clamping member 739.

n the present embodiment, when the position of the movable body 85 is adjusted along the front-rear direction, the pilot valves 734L and 734R also move along the front-rear direction together with the operator's seat 6. The hydraulic hoses 732 also move with the forward or rearward movement of the pilot valves 734L and 734R. The hydraulic hoses 732 move up and down in the hose grommet portion 733, and the corrugated shape of the hose grommet portion 733 follows the upward or downward movement of the hydraulic hoses 732. If the hose grommet portion 733 does not have a corrugated shape, the hydraulic hoses 732 would go down below the floor step 52 as they move. If the hydraulic hoses 732 go down below the floor step 52, the hydraulic hoses 732 may hinder the movement of the movable body 85 or may be broken. In the present embodiment, the corrugated shape makes it possible to prevent the hydraulic hoses 732 from going down below the floor step 52.

As illustrated in FIG. 60, the harness grommet portion 731 and the hose grommet portion 733 are arranged on the grommet body 723 along the machine body-width direction K2. Specifically, the harness grommet portion 731 is provided between the seat base 83 and the hose grommet portion 733. That is, the hose grommet portion 733 is provided at the opposite side of the harness grommet portion 731 from the operator's seat 6 (at the right side of the harness grommet portion 731). The hydraulic hoses 732 are routed from the hose grommet portion 733 toward the operator's seat 6 in a curved manner. In this regard, by placing the grommet portion 733 away from the operator's seat 6, it is possible to allow the hydraulic hoses 732 to have a large radius of curvature. Furthermore, assembling is performed in the following manner. The hydraulic hoses 732 are mounted before the harness 730 is mounted, and, when the movable body 85 is mounted on the seat base 83 and an assembly of the movable body 85 and the consoles 79L and 79R mounted on the movable body 85 is mounted on the floor step 52 with the hydraulic hoses 732 inserted in the hose grommet portion 733, the harness 730 subassembled on the consoles 79L and 79R is passed through the harness grommet portion 731. As such, since the harness grommet portion 731 is located near 's seat 6), the harness 730 can be mounted easily even after the hydraulic hoses 732 are fixed to the hose grommet portion 733.

Figure 67:
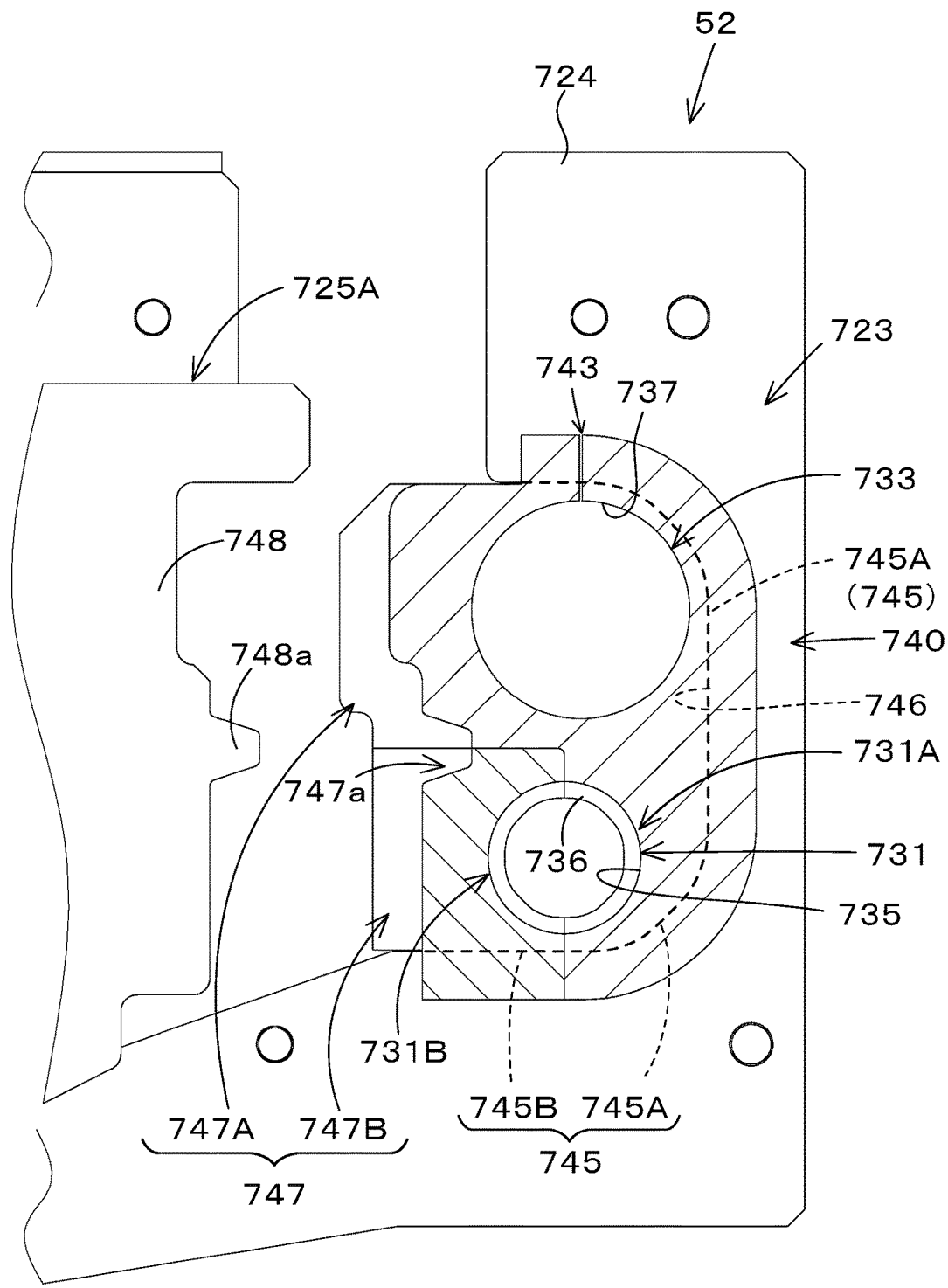
FIG. 67 is a plan view partially in section showing a first plate not in engagement with the grommet body.

As illustrated in FIGS. 65 and 67, the grommet main body 740 has a slit 743. The slit 743 is formed in a right portion of the grommet main body 740. Specifically, the slit 743 is formed such that the hose grommet portion 733 and a right portion of the first section 742a are divided into front and rear parts. Therefore, by widening the slit 743, it is possible to insert the hydraulic hoses 732 into the hose grommet portion 733 (into the hose through-hole 737) through the widened slit 743.

As illustrated in FIGS. 63 and 65 to 68, the grommet body 723 has a holding groove 745 which fits an edge portion 746 of the opening 726. In the present embodiment, the edge portion 746 of the opening 726 on which the holding groove 745 is fitted is a part of the edge portion 746 at the rear of the first opening 726A. The holding groove 745 is a continuous groove formed in the right side surface and the rear surface of the first base part 742 and the left side surface of the second base part 744. That is, the holding groove 745 includes a first holding groove 745A in the right side surface, rear surface, and left side surface of the first base part 742, and a second holding groove 745B in the left side surface of the second base part 744. Fitting the holding groove 745 on the edge portion 746 makes it possible to hold the grommet body 723 on the floor step 52.

Figure 68:
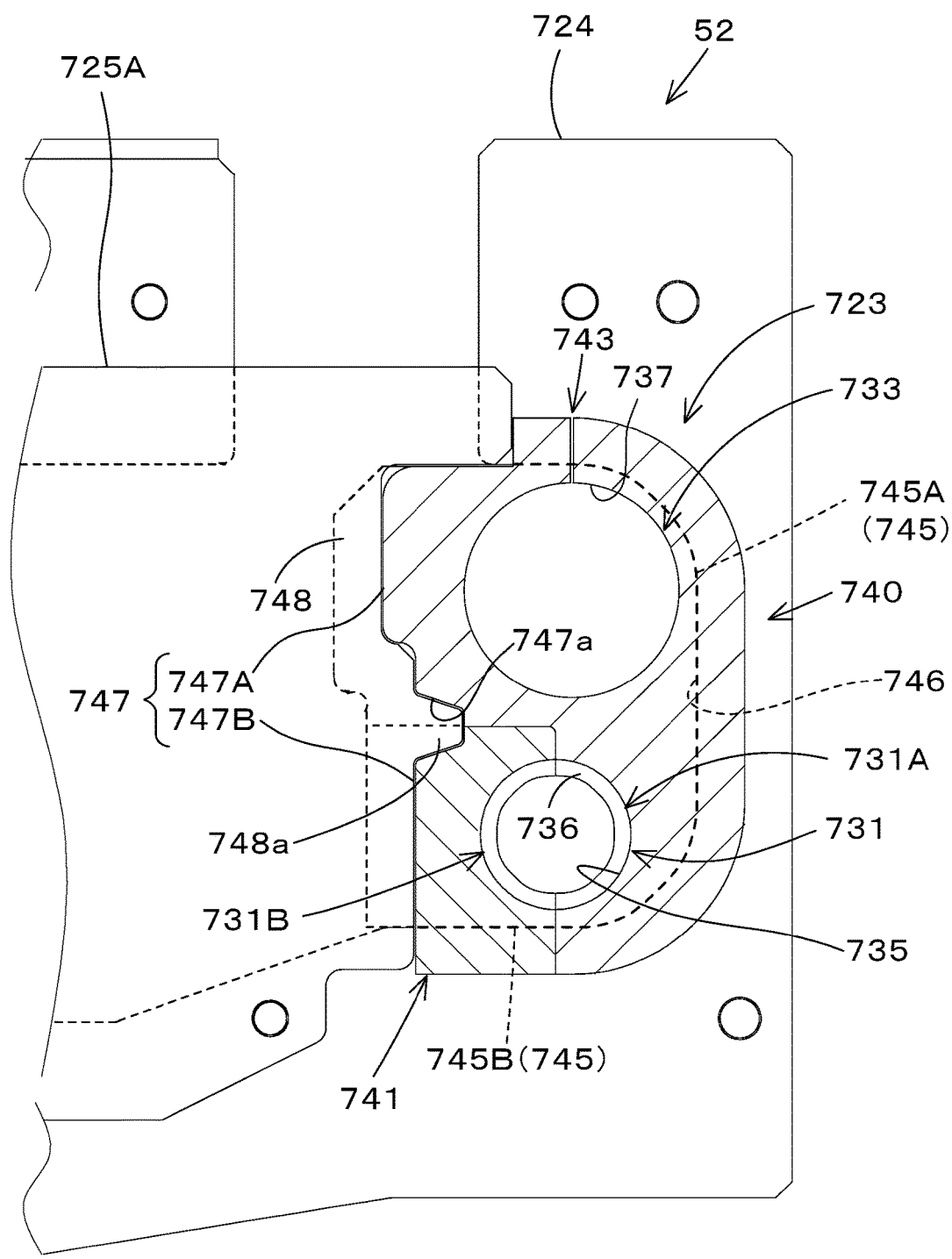
FIG. 68 is a plan view partly in section showing the first plate in engagement with the grommet body.

As illustrated in FIGS. 63 to 68, the grommet body 723 has an insertion groove 747. As illustrated in FIGS. 63, 67, and 68, the insertion groove 747 is formed in a front portion of the grommet body 723 and has an open front. Furthermore, the insertion groove 747 is a continuous groove formed in the grommet main body 740 and the grommet part 741. That is, the insertion groove 747 includes a first insertion groove 747A in the grommet main body 740, and a second insertion groove 747B in the grommet part 741. The insertion groove 747 is located higher than the holding groove 745. Furthermore, the insertion groove 747 has an engaging groove 747a in an intermediate portion thereof in the machine body-width direction K2. The engaging groove 747a is a continuous groove formed in the grommet main body 740 and the grommet part 741 in a portion in which the grommet main body 740 and the grommet part 741 meet each other along the machine body-width direction K2. The engaging groove 747a is tapered such that the width along the machine body-width direction K2 decreases in the rearward direction.

As illustrated in FIGS. 67 and 68, the first plate 725A (cover plate 725) includes, at the rear thereof, an insertion portion 748 inserted into the insertion groove 747. The insertion portion 748 includes, in an intermediate portion thereof in the machine body-width direction K2, an engaging projection 748a inserted into the engaging groove 747a. The engaging projection 748a is tapered such that the groove width along the machine body-width direction K2 decreases. The tapered shape of the engaging projection 748a matches the tapered shape of the engaging groove 747a.

Figure 64:
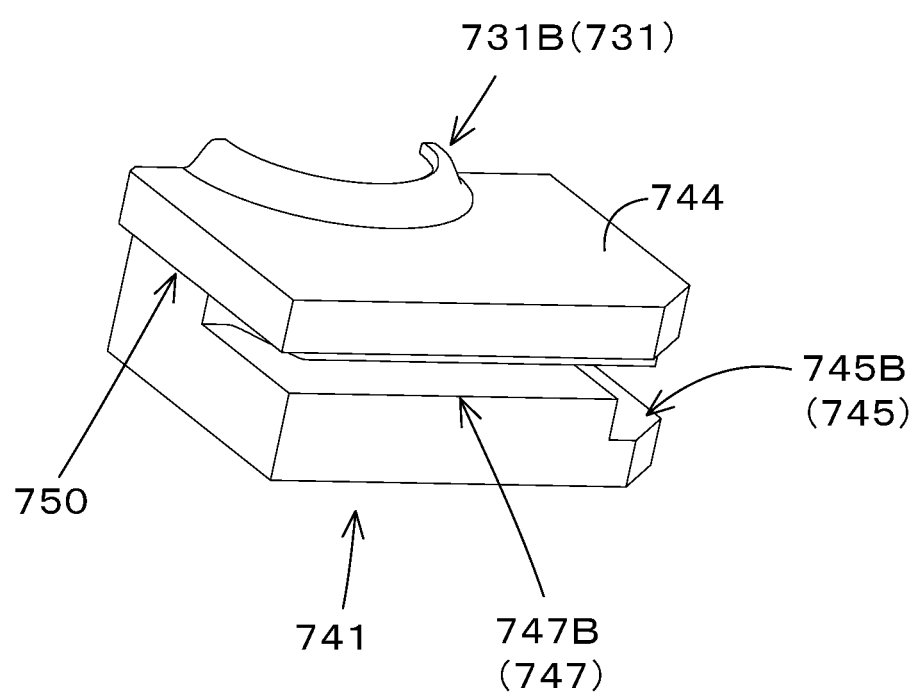
FIG. 64 is a perspective view of a grommet part.

As illustrated in FIG. 63, the grommet main body 740 includes a stepped portion (referred to as a first stepped portion) 749 in a rear portion of the left side surface of the first section 742a. As illustrated in FIG. 64, the grommet part 741 has a stepped portion (referred to as a second stepped portion) 750 which engages with the first stepped portion 749 from above. When the grommet part 741 is combined with the grommet main body 740, the second stepped portion 750 engages with the first stepped portion 749, making it possible to prevent the grommet part 741 from being displaced downward relative to the grommet main body 740.

The hydraulic hoses 732, the harness 730, and the grommet body 723 are mounted in the following manner, for example.

First, the hydraulic hoses 732 passed through the opening 726 are inserted into the hose grommet portion 733, and the grommet main body 740 is fixed to the hydraulic hoses 732 with the clamping member 739. Next, the holding groove 745 (first holding groove 745A) of the grommet main body 740 is fitted on the edge portion 746 of the opening 726 to hold the grommet main body 740 on the main plate 724 of the floor step 52. Next, an assembly of the seat base 83, the movable body 85, and the consoles 79L and 79R on which the harness 730 is subassembled is attached to the floor step 52. Next, the harness 730 is inserted into the harness through-hole 735 of the first part 731A of the harness grommet portion 731 from the front. Next, the grommet part 741 subassembled on the first plate 725A is pressed against the grommet main body 740 from the machine body-forward side toward the machine body-rearward side to combine them and to fit the holding groove 745 (second holding groove 745B) of the grommet part 741 onto the edge portion 746 of the opening 726, and the insertion portion 748 of the first plate 725A is inserted into the insertion groove 747 (first insertion groove 747A) of the grommet main body 740 from the machine body-forward side. In this state, the first plate 725A is fixed with bolt(s) to the main plate 724. With this, the hydraulic hoses 732, the harness 730, and the grommet body 723 are mounted.

The first plate 725A is fixed with bolt(s) to the main plate 724 in the following manner. The grommet body 723 is pressed rearward with the first plate 725A to press the grommet body 723 against the edge portion 746, and the first plate 725A is fixed to the main plate 724 while the grommet body 723 is pressed against the edge portion 746. This makes it possible to prevent the grommet body 723 from wobbling. Furthermore, the engagement of the engaging projection 748a with the engaging groove 747a makes it possible to prevent the wobbling along the machine body-width direction K2.

Note that the first plate 725A may be fixed with bolt(s) to the main plate 724 in the following manner. The insertion portion 748 of the first plate 725A is inserted into the insertion groove 747 while the grommet part 741 is combined with the grommet main body 740.

Figure 69:
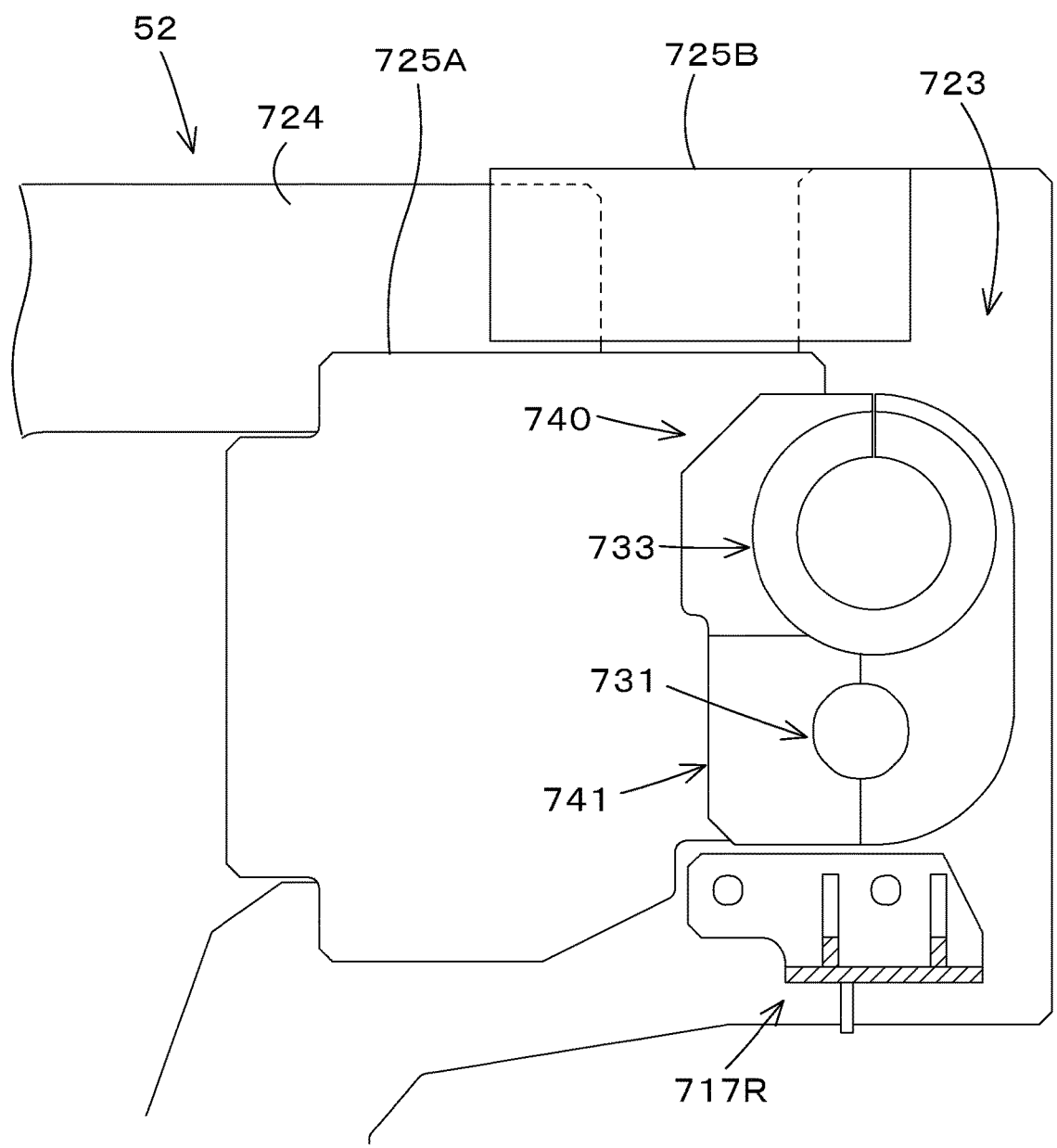
FIG. 69 is a plan view of a part in which the grommet body is attached.

As illustrated in FIG. 69, the second leg part 717R of the seat base 83 is attached to the floor step 52 at the left side of the grommet body 723. Furthermore, the hose grommet portion 733 is provided at the right side of the harness grommet portion 731. Furthermore, the grommet body 723 is mounted at the rear of the floor step 52, and the partition wall member 22A is provided rearward of the floor step 52. Therefore, it is difficult to mount the grommet part 741 from the left side, right side, or rear side. In the present embodiment, the grommet part 741 can be mounted from the front side, making it possible to easily mount the grommet part 741. Furthermore, since the grommet main body 740 includes a part of the harness grommet portion 731 and the hose grommet portion 733 which are integral with each other, it is possible to mount the grommet body 723 in a small space.

The following description discusses the route of the harness 730.

As illustrated in FIGS. 70 to 73, the harness 730 includes first to third harness portions 730A to 730C.

As illustrated in FIG. 60, the first harness portion 730A is routed from the controller 24 to the lower surface side of the floor step 52, and is routed upward from the lower surface side of the floor step 52 through the harness grommet portion 731. Specifically, the first harness portion 730A is routed upward from the lower surface side of the floor step through the opening 726 at the same side of the seat base 83 as the console 79R which is the right console (one of the consoles) (through the opening 726).

Figure 70:
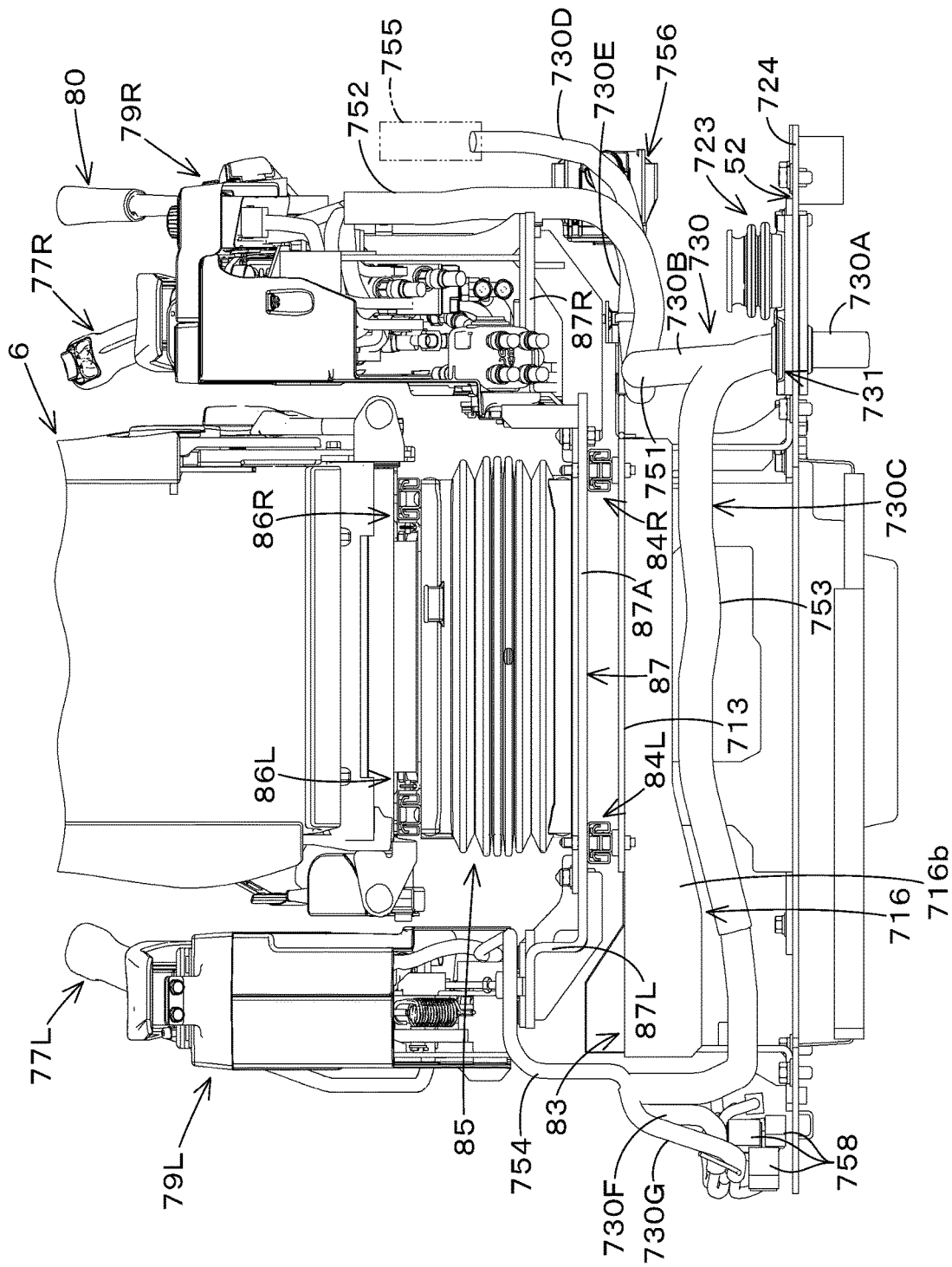
FIG. 70 is a rear view of the surroundings of the operator's seat.
Figure 72:
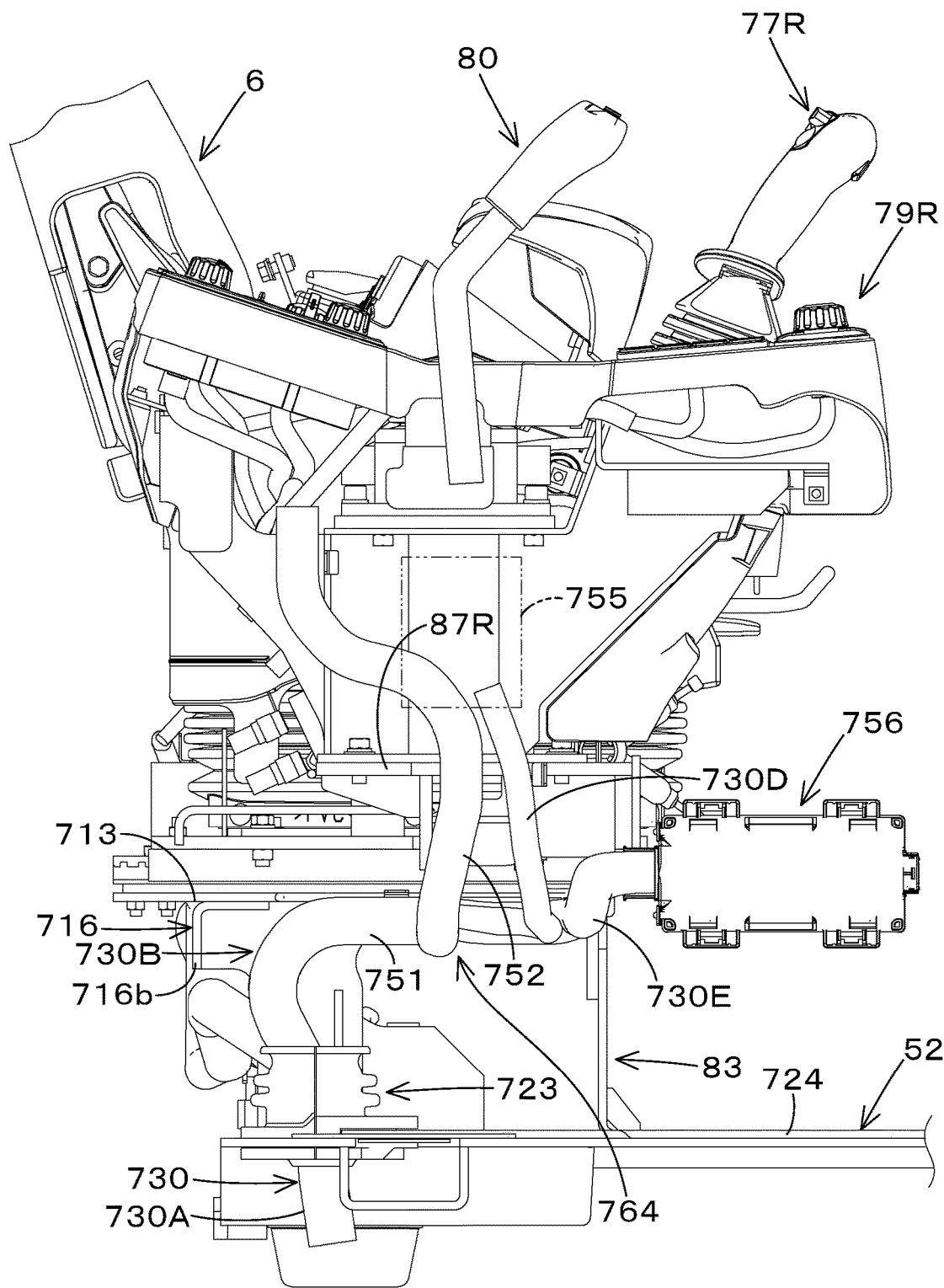
FIG. 72 is a right side view of the surroundings of the operator's seat.

As illustrated in FIG. 70, the second harness portion 730B and the third harness portion 730C branch off from the first harness portion 730A at a position lower than the upper edge of the seat base 83 (upper surface of the top panel 713). As illustrated in FIG. 72, the second harness portion 730B extends upward at a position rightward of the seat base 83 and is routed to the right console 79R (one of the consoles). Specifically, the second harness portion 730B includes a main portion (referred to as a first main portion) 751, and a routed-to-console portion (referred to as a first routed-to-console portion) 752. The first main portion 751 branches off from the first harness portion 730A, is bent forward, and extends forward at a position lower than the upper edge of the seat base 83. Furthermore, the first main portion 751 is disposed below the third mounting portion 87R (one mounting portion) which extends from the first mounting portion 87A of the slide frame 87 in one machine body-width direction. The first routed-to-console portion 752 extends from a front end portion of the first main portion 751 in the machine body-outward direction (rightward), and then extends upward at the machine body-outward side of the third mounting portion 87R and is routed to the right console 79R. The first routed-to-console portion 752 is further divided into a plurality of harnesses at the rear of the console 79R and are connected to electrical apparatuses such as switches mounted on the console 79R.

Figure 71:
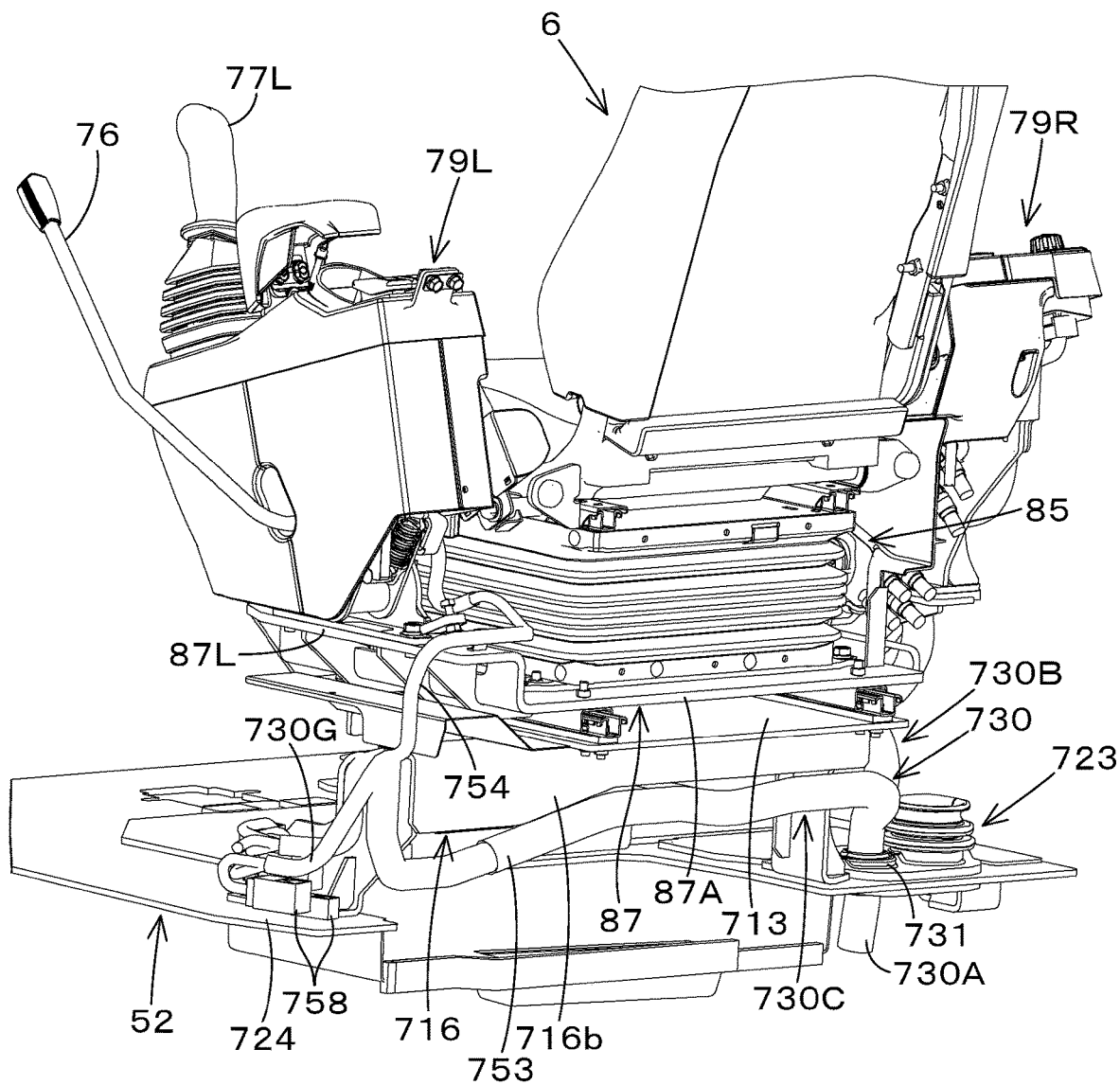
FIG. 71 is a perspective view of the surroundings of the operator's seat, as seen from the rear.

As illustrated in FIGS. 70 and 71, the third harness portion 730C extends toward the left console 79L (the other of the consoles) between the upper edge of the seat base 83 and the upper surface of the floor step 52, and extends upward at the left side of the seat base 83 (at the opposite side of the seat base 83 from the console 79R which is one of the consoles) and routed to the console 79L. Specifically, the third harness portion 730C includes a main portion (second main portion) 753 and a routed-to-console portion (second routed-to-console portion) 754. The second main portion 753 is bent leftward from the first harness portion 730A, is routed leftward through an area below a rear portion of the top panel 713 and the support plate 716, and then is bent upward at the machine body-outward side of the support plate 716. The second routed-to-console portion 754 extends upward from an upper end portion of a left portion of the second main portion 753 at the machine body-outward side of the second mounting portion 87L (opposite mounting portion) extending in the opposite machine body-width direction from the first mounting portion 87A of the slide frame 87, and then extends in the machine body-inward direction above the second mounting portion 87L and is routed to the console 79L. The second routed-to-console portion 754 is connected to electrical apparatuses such as switches mounted on the console 79L.

The plate width along the top-bottom direction of the rear wall 716b of the support plate 716 is greater in the left portion than in the right and intermediate portions. The second main portion 753 is routed along the shape of the lower edge of the rear wall 716b.

Figure 74:
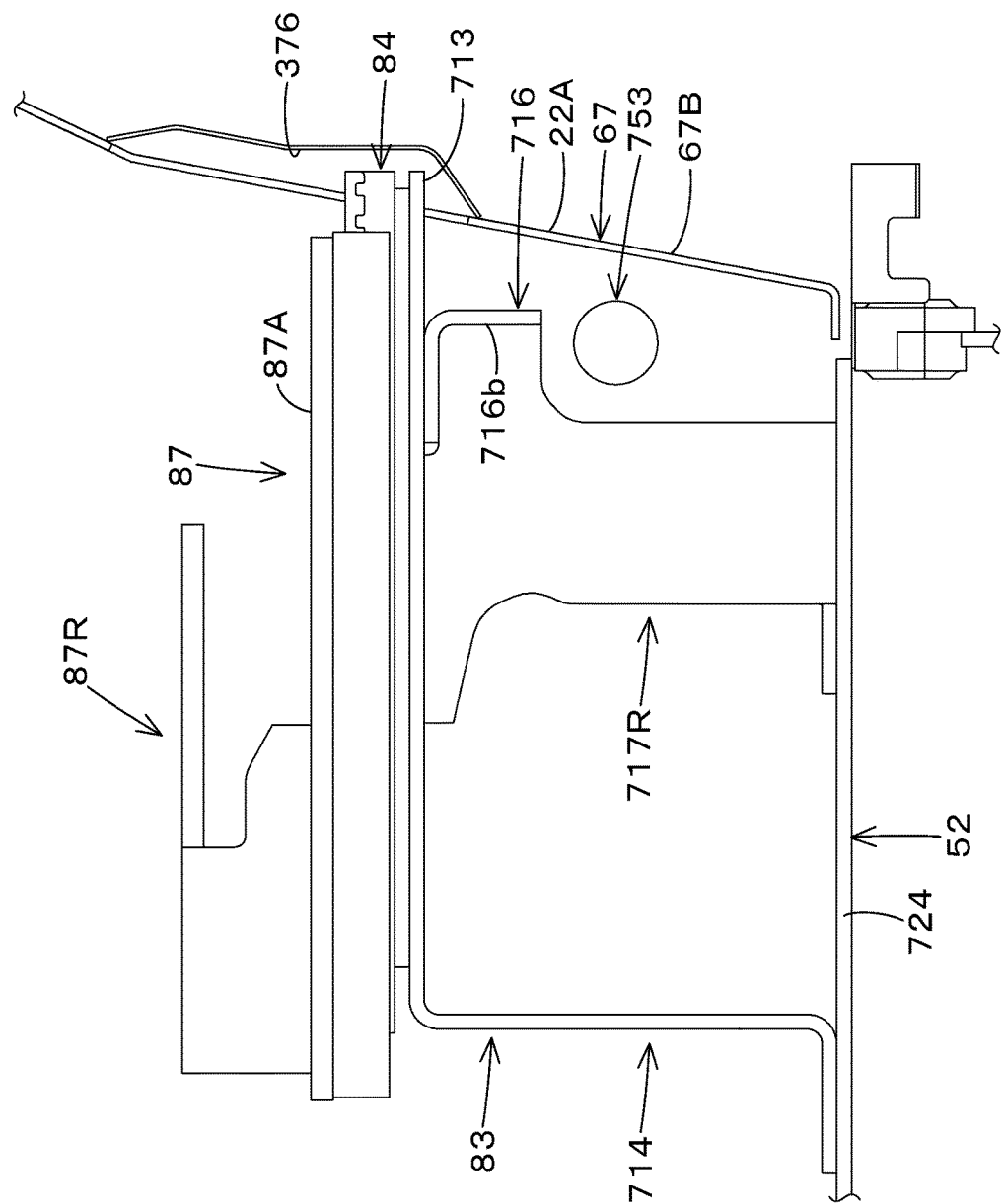
FIG. 74 is a left side view of the surroundings of the seat base.

As illustrated in FIG. 74, the third harness portion 730C is routed in an area forward of the partition wall member 22A and below the rear portion of the top panel 713. That is, the third harness portion 730C is routed in a space in front of the partition wall member 22A and blow the rear portion of the top panel 713.

Figure 73:
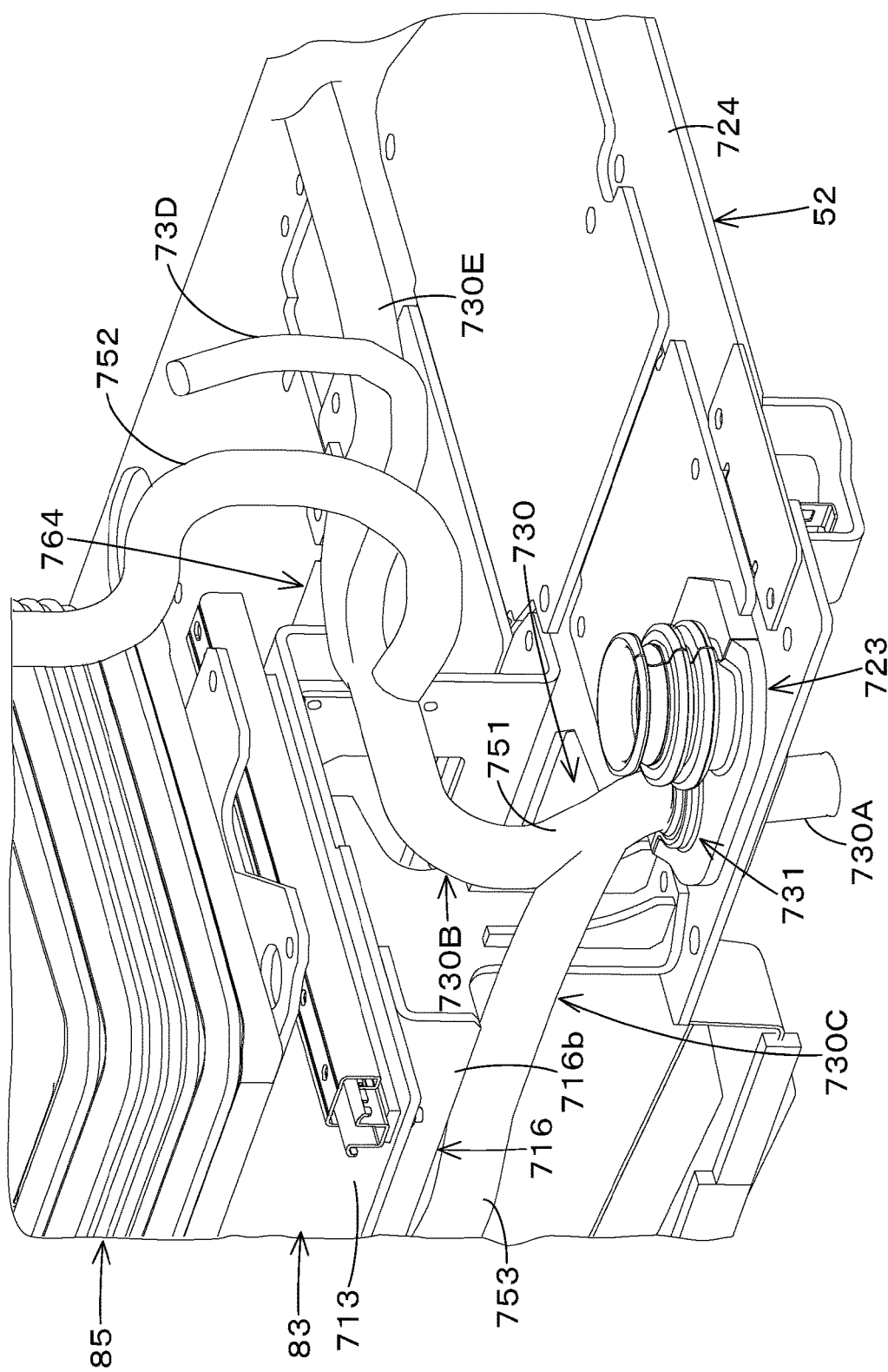
FIG. 73 is a perspective view of a furcation of a harness at the right side of the seat base.

As illustrated in FIGS. 72 and 73, the harness 730 includes a fourth harness portion 730D and a fifth harness portion 730E branching off from the second harness portion 730B. Specifically, the fourth harness portion 730D and the fifth harness portion 730E branch off from a front end portion of the first main portion 751. Accordingly, the first main portion 751 extends from the first harness portion 730A toward a portion 764 at which the fourth harness portion 730D and the fifth harness portion 730E branch off As illustrated in FIG. 72, the first routed-to-console portion 752, the fourth harness portion 730D, and the fifth harness portion 730E are arranged along the front-rear direction. The fourth harness portion 730D is connected to a display controller (meter ECU) 755. The fifth harness portion 730E is connected to a relay fuse box 756. The display controller 755 is a controller for a display device 859 provided diagonally rightward and forward of the operator's seat 6 as illustrated in FIG. 10, and is an electronic control unit configured using a microcomputer including a CPU, EEPROM, and/or the like.

Since the first routed-to-console portion 752, the fourth harness portion 730D, and the fifth harness portion 730E are arranged along the front-rear direction, when cabins 5 differing from each other in dimension along the front-rear direction are to be mounted, such differences in dimension along the front-rear direction of the cabins 5 can be absorbed.

Figure 75:
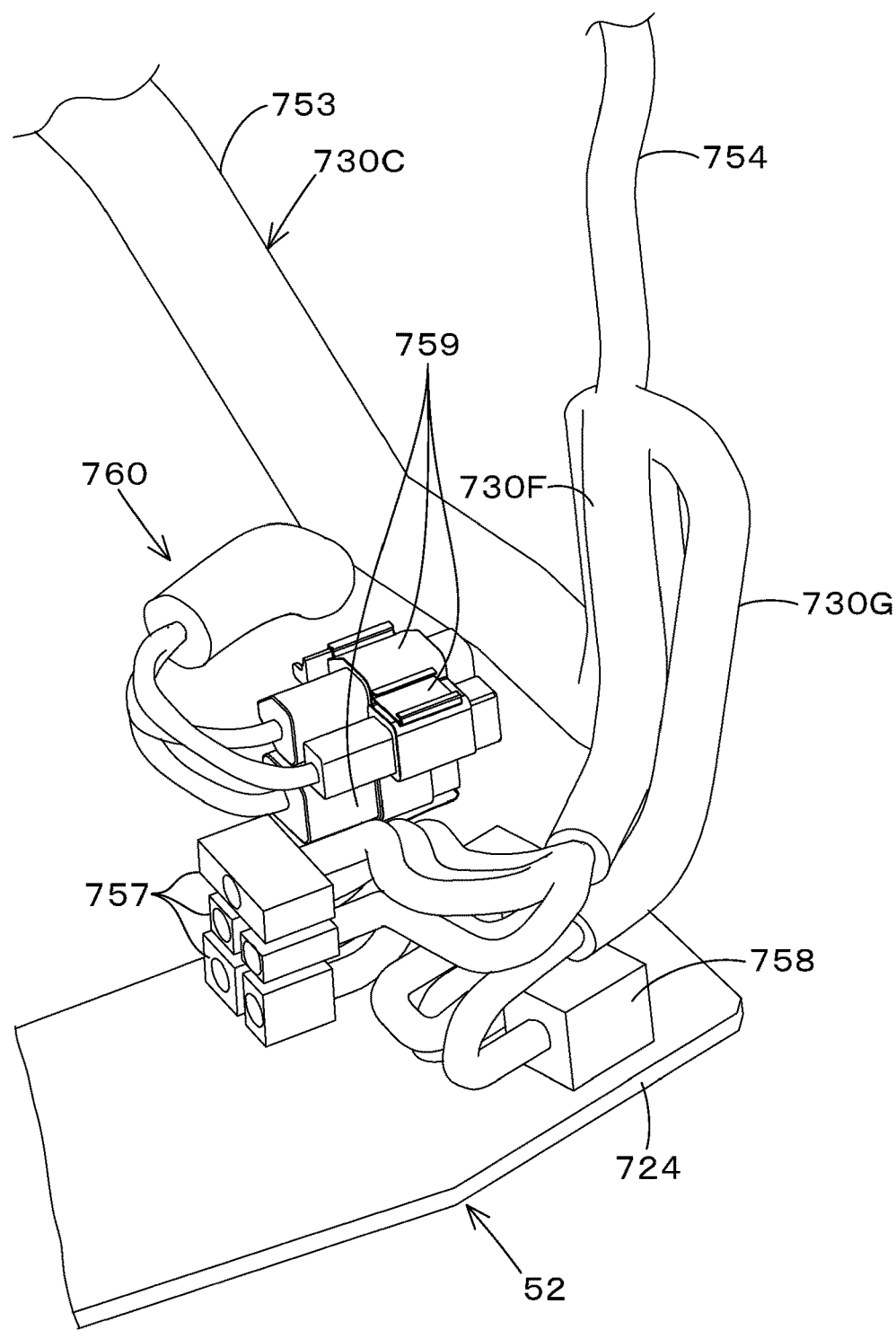
FIG. 75 is a perspective view of a furcation of a harness at the left side of the seat base.

As illustrated in FIG. 75, the harness 730 includes a sixth harness portion 730F and a seventh harness portion 730G which branch off from a left end portion of the second main portion 753 (portion at which the second routed-to-console portion 754 branches off from the second main portion 753). The sixth harness portion 730F has a plurality of connectors (main-harness-side connectors) 757 provided at its end. The sixth harness portion 730F (connectors 757) is connected to cabin-harness-side connector(s) 826 attached to a cabin harness 827 (see FIG. 94) routed from an electrical apparatus mounted on the cabin 5.

The seventh harness portion 730G has a plurality of connectors (AC connector on an opposite side) 758 provided at its end. The seventh harness portion 730G is connected to an air conditioner harness 760 connected to the air conditioner main body 136. The air conditioner harness 760 is disposed leftward of the seat base 83. The connectors 758 on the seventh harness portion 730G are connected, at the left side of the seat base 83, to connectors (AC connectors on one side) 759 attached to the air conditioner harness 760 before the cabin 5 is mounted.

Figure 76:
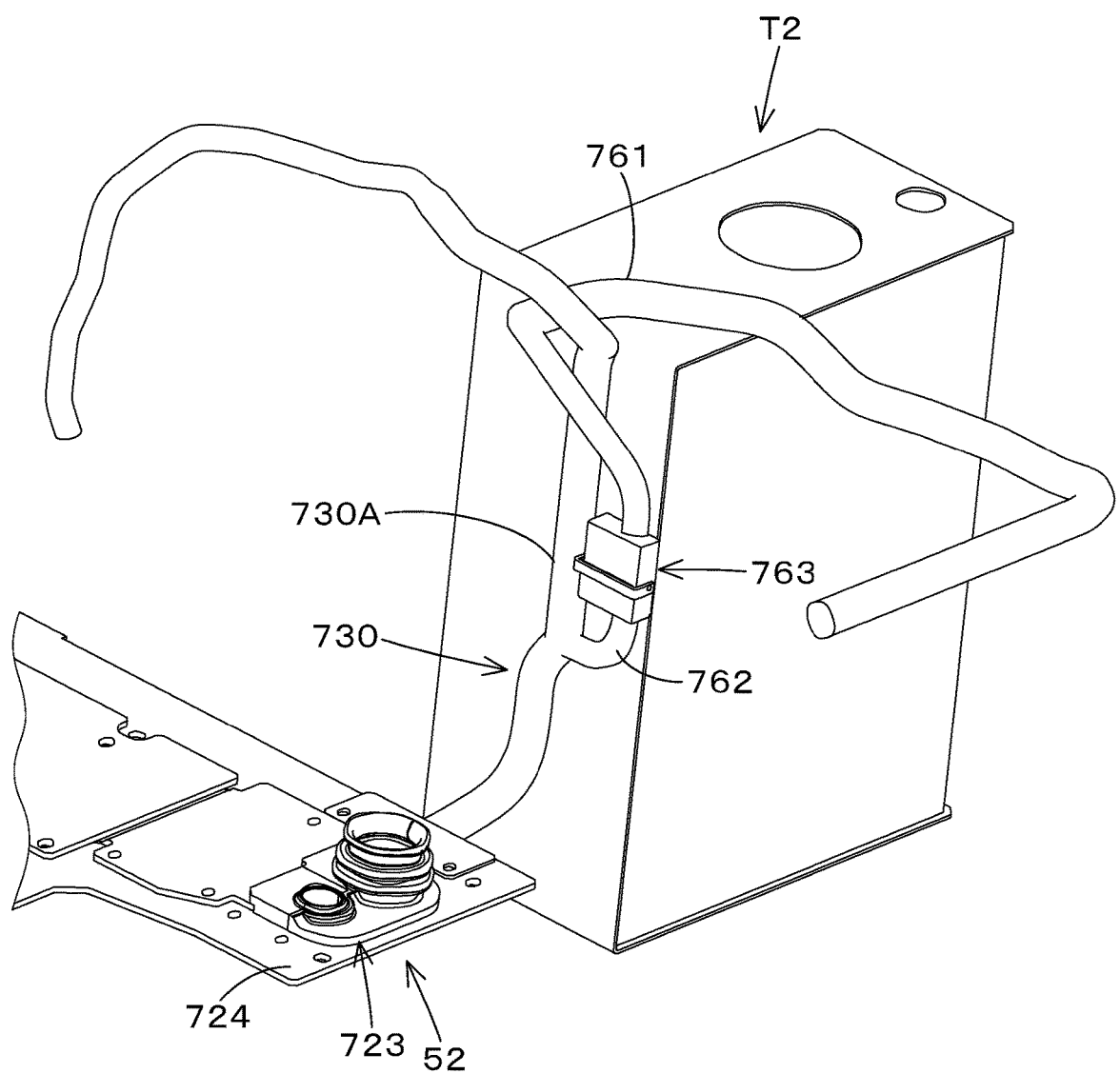
FIG. 76 is a perspective view showing a part in which a main harness and a prime mover-side harness are connected together.

As illustrated in FIG. 76, a coupler 763 is provided on the same side of the hydraulic fluid tank T2 as the operator's seat 6 (on the left side of the hydraulic fluid tank T2). The coupler 763 disconnectably connects a prime-mover-side harness 761 routed toward the prime mover E1 and a branched harness 762 branching off from the harness 730 (first harness portion 730A) connected to the controller 24. The harness 730 routed toward the operator's seat 6 and the harness 761 routed toward the prime mover E1 are disconnectably connected together, making it possible to eliminate the likelihood that, when the seat base 83 or the like is to be lifted up, the seat base 83 is difficult to lift up or the harness is difficult to manage. Furthermore, since the harness can be divided at the border between the area in which the operator's seat 6 is located (interior of the cabin 5) and there are many connections and the area in which the prime mover chamber E2 is located, it is possible to reduce, for example, the time taken for mounting components around the operator's seat 6 and the time taken to mount the prime mover E1.

Figure 77:
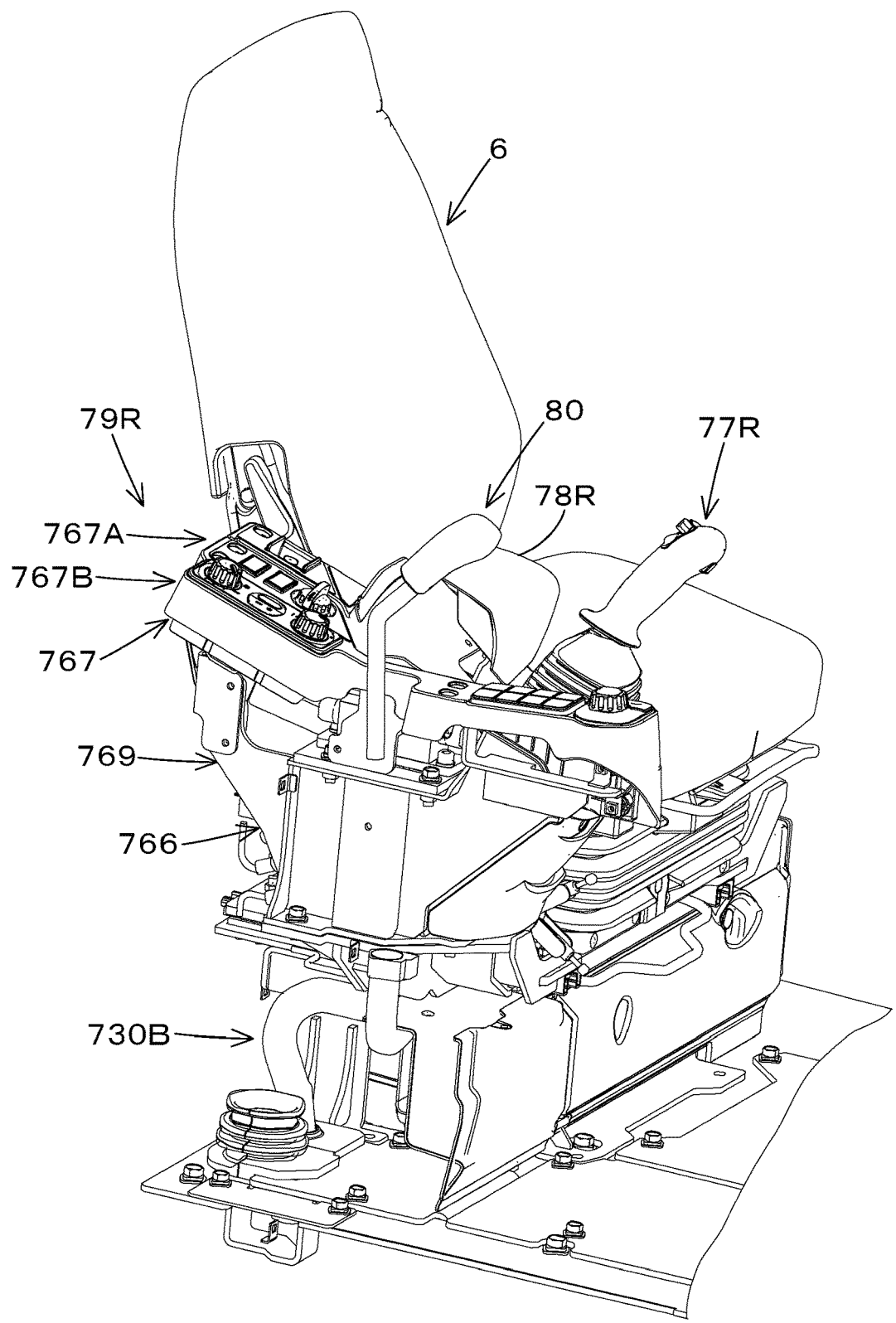
FIG. 77 is a perspective view of the surroundings of the operator's seat, as seen from the front right side.

As illustrated in FIG. 77, the right console 79R includes a console support 766 attached to the third mounting portion 87R of the slide frame 87, and a console cover 767 attached to the console support 766.

Figure 78:
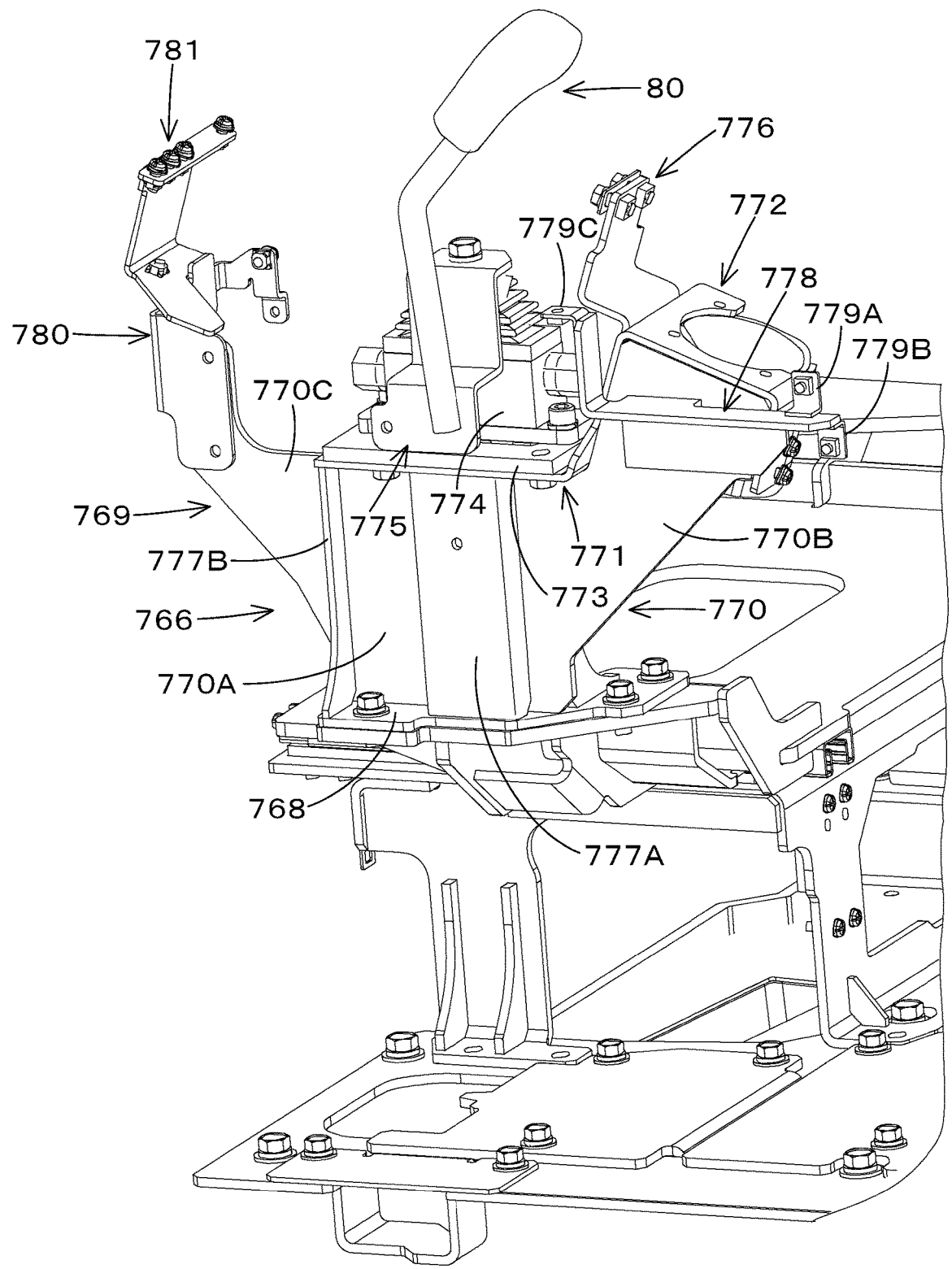
FIG. 78 is a perspective view of the surroundings of a console support.

As illustrated in FIG. 78, the console support 766 includes a base plate 768 attached to the third mounting portion 87R with bolt(s), and a standing frame 769 which extends upward from the base plate 768. The standing frame 769 includes a vertical plate 770. The vertical plate 770 includes a middle portion 770A having a lower edge fixed to the base plate 768, a front portion 770B extending diagonally forward from the middle portion 770A, and a rear portion 770C which extends rearward from the middle portion 770A and then extends upward. A mounting plate 771 is fixed on an upper edge of the middle portion 770A and an upper edge of the front portion 770B. The front portion of the mounting plate 771 serves as a valve mounting portion 772. The right pilot valve 734R is attached to the valve mounting portion 772. An arm stay 776 to which the armrest 78R is attached is provided rearward of the valve mounting portion 772. The mounting plate 771 has, attached to a rear portion thereof, a valve mounting base 773 composed of a thick plate, and the valve mounting base 773 has attached thereto a dozer valve (valve) 774 operated with the dozer lever 80. The dozer valve 774 is a pilot valve for pilot operation of a dozer control valve. The dozer control valve controls a dozer cylinder to raise and lower the dozer 7. The dozer lever 80 is connected to the dozer valve 774 via a lever stay 775. The dozer lever 80 is swingable forward and rearward. For example, forward tilting of the dozer lever 80 causes the dozer 7 to swing downward, and rearward tilting of the dozer lever 80 causes the dozer 7 to swing upward. The middle portion 770A has, attached to a right side surface thereof, a plurality of reinforcing members 777A and 777B fixed to the base plate 768.

As illustrated in FIG. 78, a front support plate 778 is fixed to a right side surface the front portion 770B of the vertical plate 770. Stay members 779A, 779B, and 779C are fixed to a front portion and a rear portion of the front support plate 778. A rear support plate 780 is fixed to the rear portion 770C of the vertical plate 770. A rear mounting part 781 is provided on an upper portion of the rear support plate 780.

Figure 79:
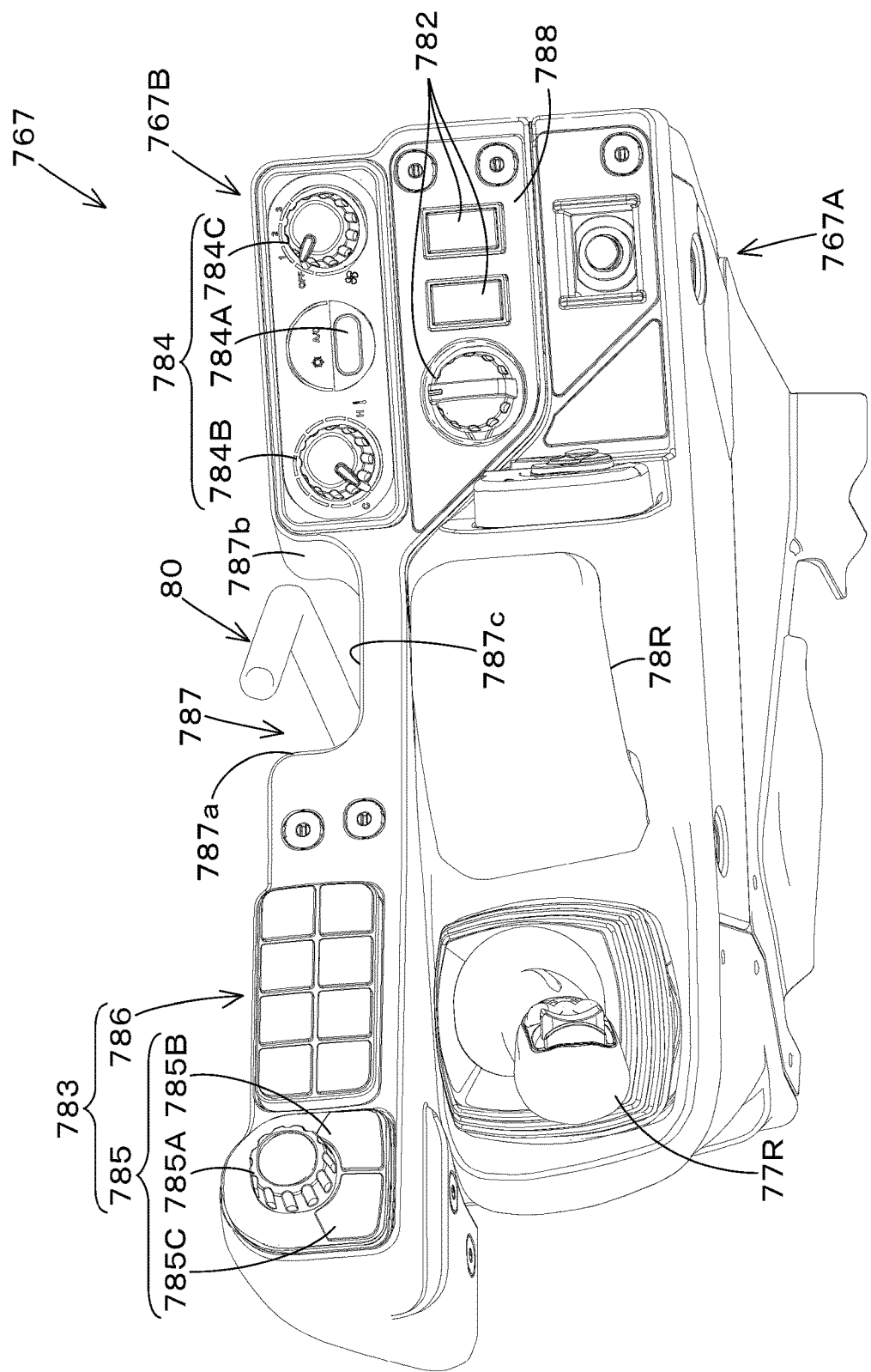
FIG. 79 is a planar perspective view of a right console cover.

As illustrated in FIG. 79, the console cover 767 includes a first console cover 767A and a second console cover 767B. As illustrated in FIG. 77, the first console cover 767A is disposed at a lateral side of the operator's seat 6 (at a machine body-outward side of the operator's seat 6). The second console cover 767B is disposed at a machine body-outward side of the first console cover 767A (the opposite side of the first console cover 767A from the operator's seat 6). The dozer lever 80 is disposed on the opposite side of the second console cover 767B from the first console cover 767A. That is, the second console cover 767B is disposed between the first console cover 767A and the dozer lever 80.

Figure 80:
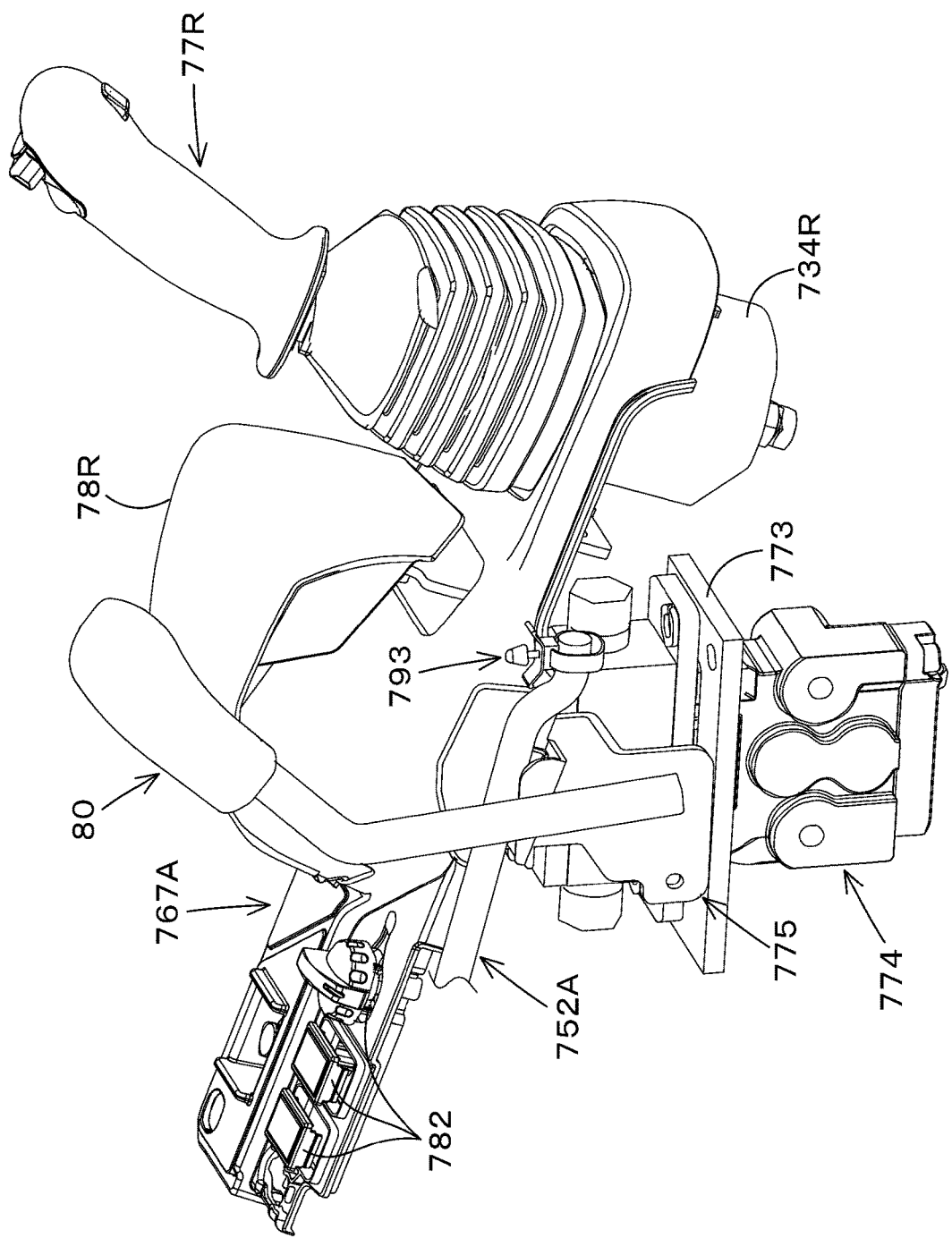
FIG. 80 is a perspective view of the surroundings of a first console cover.

As illustrated in FIGS. 79 and 80, the operation lever 77R is disposed on a front portion of the first console cover 767A, and an armrest is disposed rearward of the operation lever 77R. The first console cover 767A is provided with, on a rear portion thereof, an operation member 782 for operation of the working machine 1. The operation member 782 includes a plurality of switches and/or operation dials. The first console cover 767A is attached to the standing frame 769.

Figure 81:
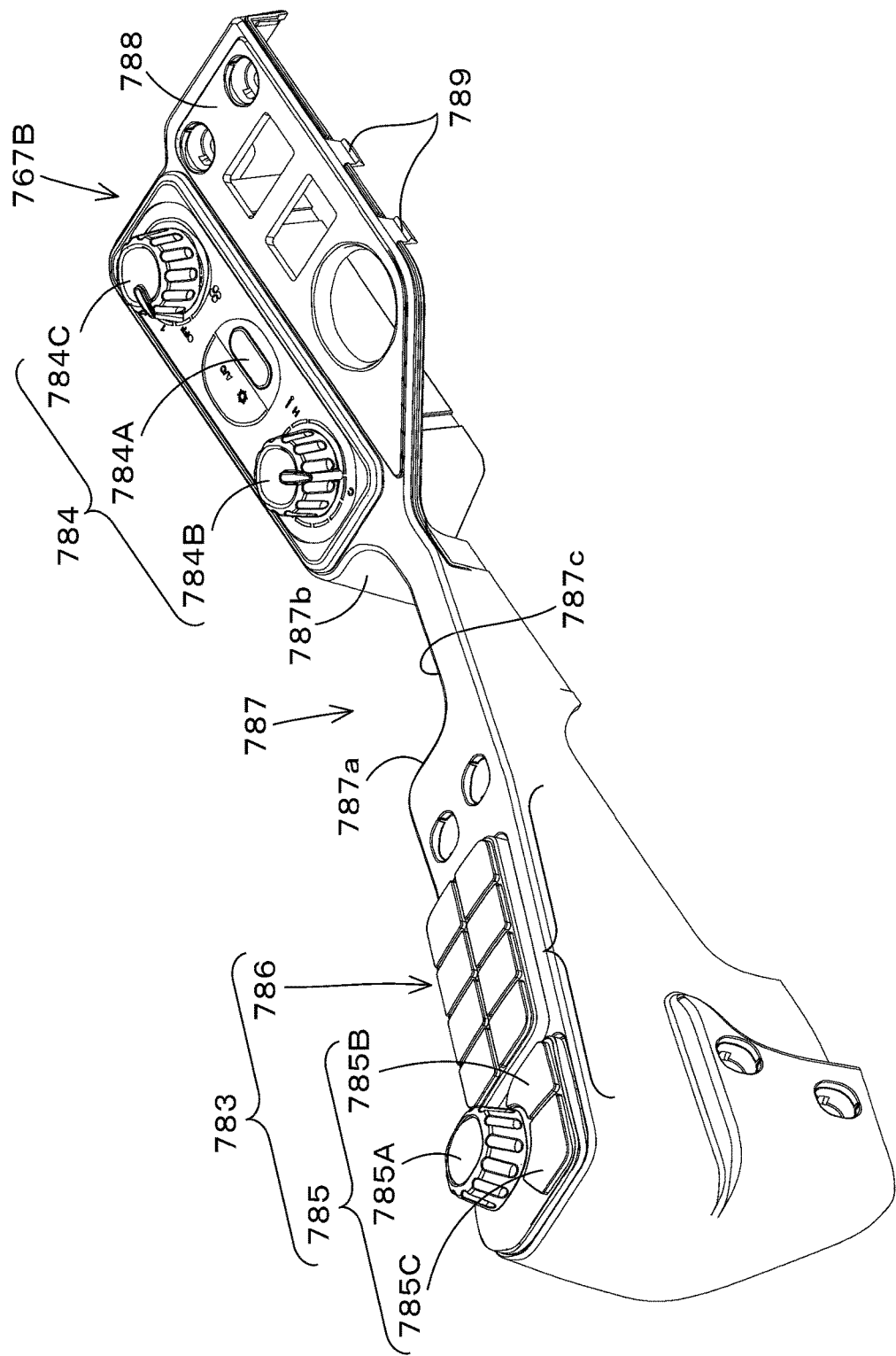
FIG. 81 is a perspective view of a second console cover.

As illustrated in FIGS. 79 and 81, the second console cover 767B is provided with an operation unit (first operation unit) 783 on a front portion thereof. The first operation unit 783 includes a first operation member 785 and a second operation member 786. The first operation member 785 includes a jog dial 785A, a first switch 785B, and a second switch 785C. The second operation member 786 is a keypad switch including a plurality of buttons. The first operation unit 783 is an operation unit for operation of a display device 859 (see FIG. 100, described later).

The second console cover 767B is provided with an operation unit (second operation unit) 784 also on a rear portion thereof. The second operation unit 784 is an operation unit for operation of the air conditioner equipped on the working machine 1, and includes a power switch 784A for turning ON and OFF the air conditioner, a temperature dial 784B for temperature adjustment, and an air volume dial 784C for air volume adjustment.

Figure 83:
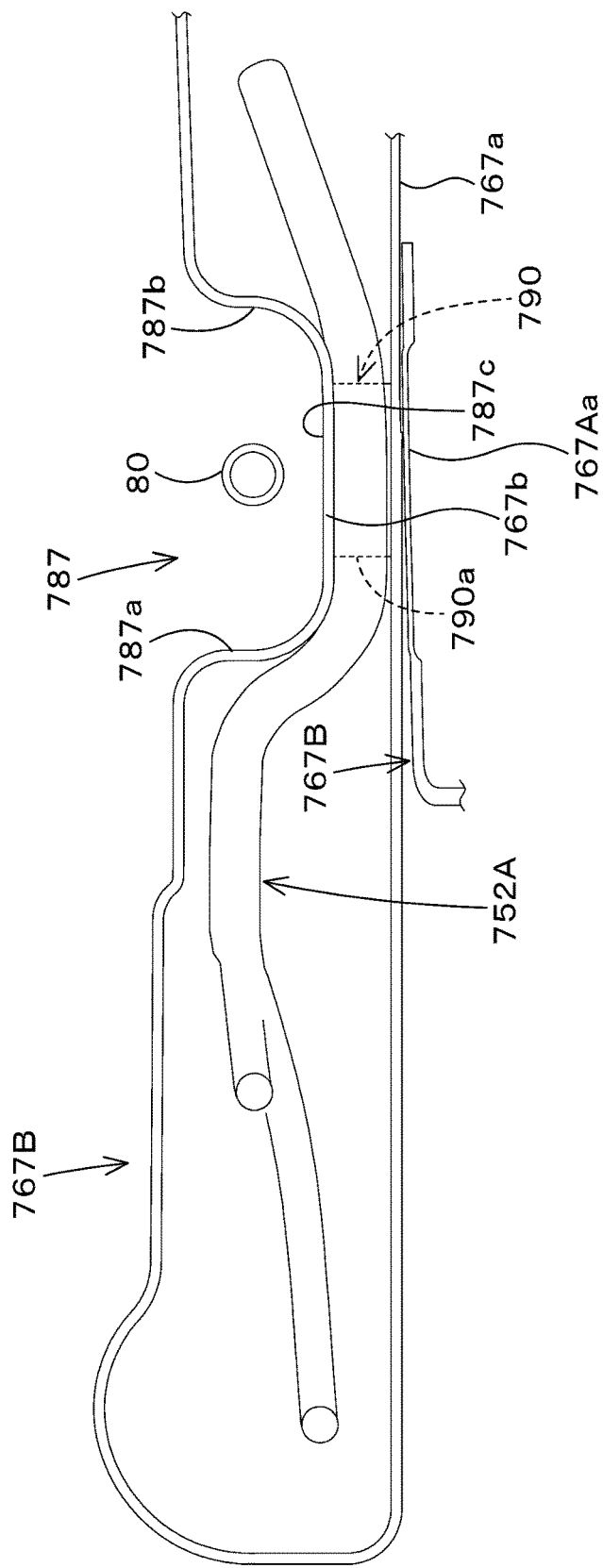
FIG. 83 is a planar cross-sectional view of the second console cover and a wire member.

As illustrated in FIGS. 79 and 81, the second console cover 767B has a recessed groove 787 formed between the first operation unit 783 and the second operation unit 784. A lower portion of the dozer lever 80 is inserted in the recessed groove 787. The recessed groove 787 is in the form of a groove that is open in the machine body-outward direction. Specifically, as illustrated in FIGS. 79 and 83, the recessed groove 787 is defined by a front surface portion 787a located forward of the dozer lever 80, a rear surface portion 787b located rearward of the dozer lever 80, and a side surface portion 787c located at a machine body-inward side of the dozer lever 80. The recessed groove 787 has a dimension along the front-rear direction (space between the front surface portion 787a and the rear surface portion 787b) greater than the swinging range of the dozer lever 80.

As illustrated in FIGS. 79 and 81, the second console cover 767B has, on a rear portion thereof, a switch cover (cover part) 788 which projects leftward from the second operation unit 784. The switch cover 788 covers an area around the operation member 782 such as switch(es) and/or dial(s) provided on the first console cover 767A. The switch cover 788 includes engaging nails 789 engaged with the first console cover 767A. The engaging nails 789 are engaged with the first console cover 767A from above.

A front portion of the second console cover 767B is fixed to the stay members 779A and 779B of the front support plate 778 with screw(s) from the machine body-outward side, and fixed to the stay member 779C with screw(s) from above. A rear portion of the second console cover 767B is fixed to the rear mounting part 781 with screw(s) from above.

Figure 82:
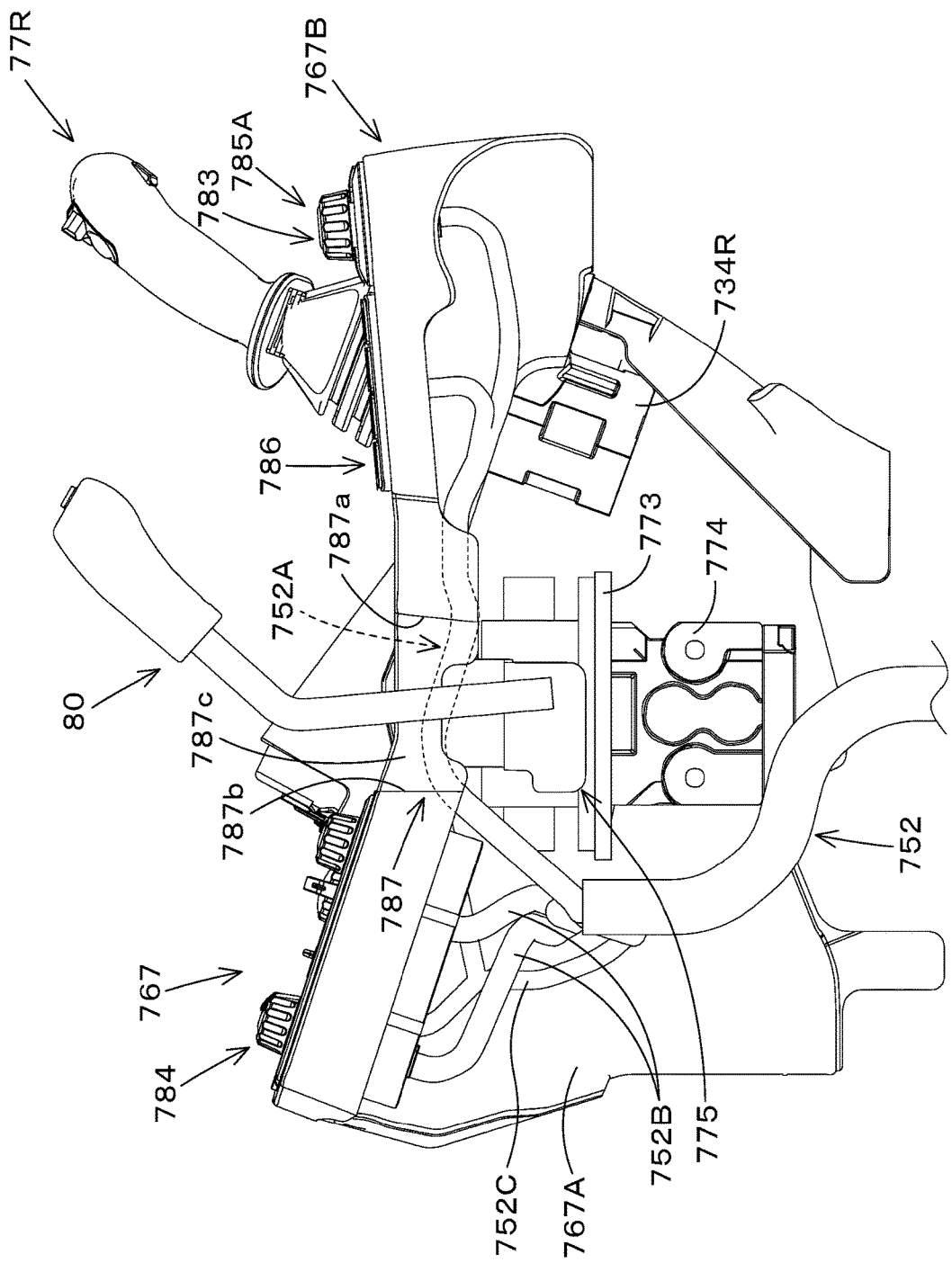
FIG. 82 is a side view of an upper portion of a right console.

As illustrated in FIG. 82, the first routed-to-console portion 752 is divided into a plurality of wire members (first to third wire members 752A to 752C) at a position below the rear portion of the second console cover 767B. Each wire member is composed of one or more electrical wires. The first wire member 752A is routed from the rear toward the front within the second console cover 767B and connected to the first operation unit 783 (jog dial, keypad switch). The second wire member 752B is routed upward and connected to the second operation unit 784. The third wire member 752C is connected to the operation member 782 provided on the first console cover 767A.

Figure 84:
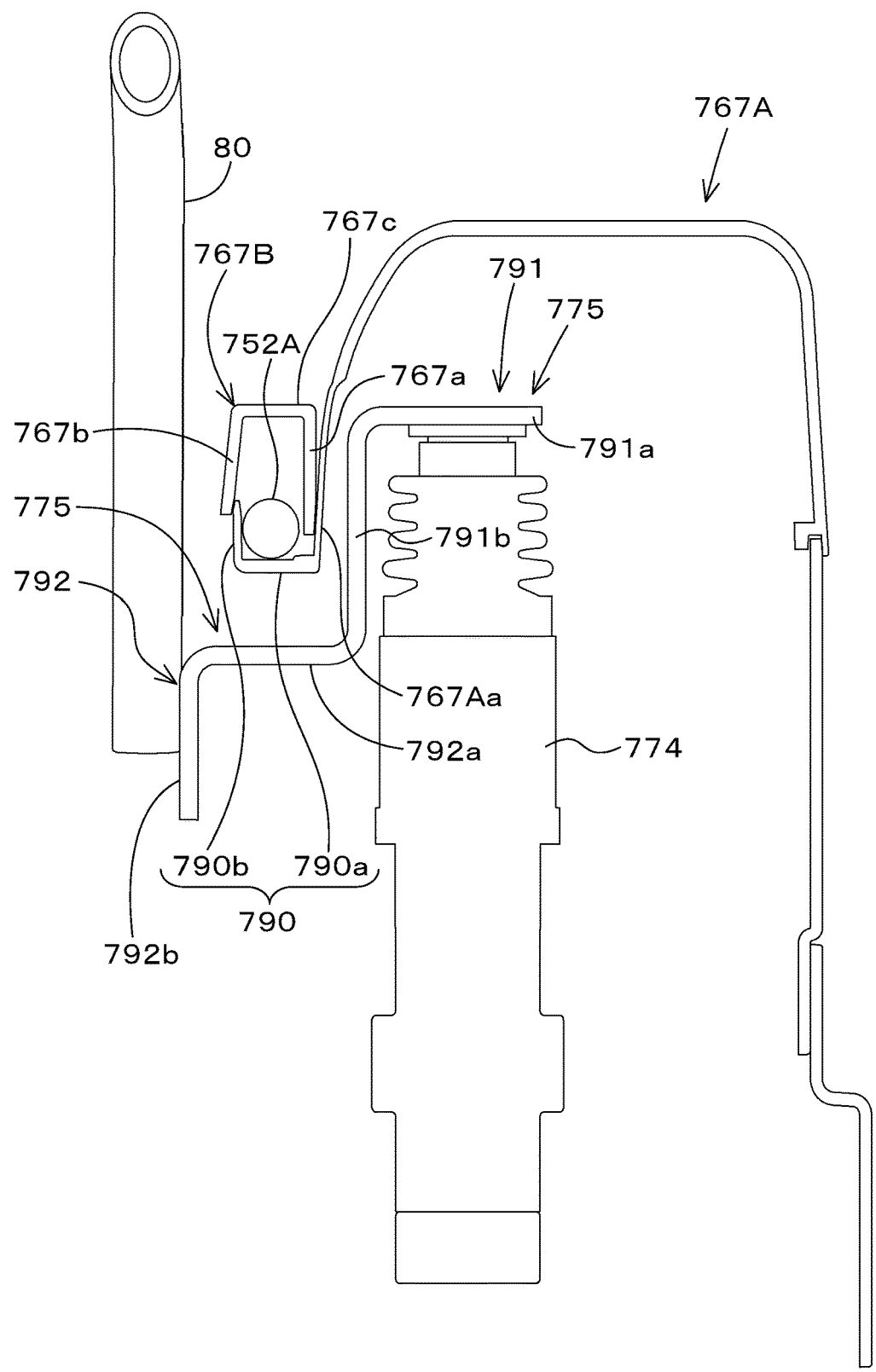
FIG. 84 is a cross-sectional view of the surroundings of the second console cover, as seen from the front.

As illustrated in FIGS. 83 and 84, the first wire member 752A passes between the dozer lever 80 and the first console cover 767A and is routed in a rear-to-front direction in the second console cover 767B. Furthermore, the first wire member 752A passes between a medial wall 767a of the second console cover 767B and a wall portion 767b which defines the side surface portion 787c of the recessed groove 787. The medial wall 767a and the wall portion 767b are connected by an upper wall 767c of the second console cover 767B.

Figure 85:
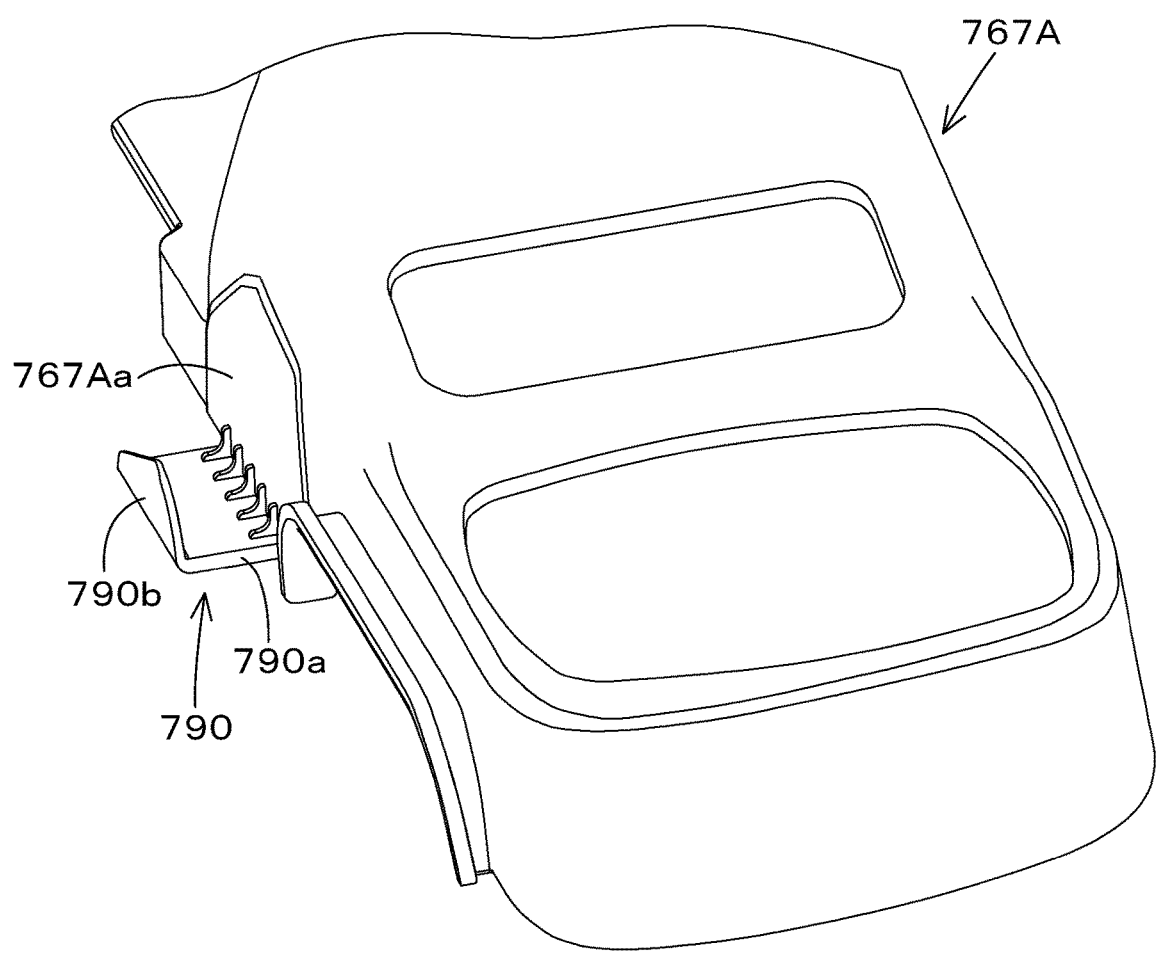
FIG. 85 is a perspective view of a front portion of the first console cover.

As illustrated in FIGS. 80, 83, and 84, the first console cover 767A has a wire receiver 790 which receives the first wire member 752A from below. As illustrated in FIGS. 84 and 85, the wire receiver 790 includes a receiver wall 790a and a lateral wall 790b. As illustrated in FIG. 84, the receiver wall 790a extends in the machine body-outward direction from a lower edge of an outer wall portion 767Aa of the first console cover 767A and is located below the first wire member 752A. The lateral wall 790b extends upward from the receiver wall 790a at the machine body-outward side of the first wire member 752A. Specifically, the lateral wall 790b extends upward from a machine body-outward side edge of the receiver wall 790a, and is located rightward of the first wire member 752A.

As illustrated in FIG. 84, the lever stay 775 includes a valve mounting portion 791 attached to the dozer valve 774, and a lever fixing portion 792 to which the dozer lever 80 is fixed. The valve mounting portion 791 includes an upper wall 791a attached to an upper portion of the dozer valve 774, and a downward extending wall 791b which extends downward from a machine body-outward side edge of the upper wall 791a. The lever fixing portion 792 includes a projecting wall 792a which extends from a lower edge of the downward extending wall 791b in the machine body-outward direction below the wire receiver 790 toward the dozer lever 80, and a vertical wall 792b which extends downward from a machine body-outward side edge of the projecting wall 792a. The vertical wall 792b has a lower portion of the dozer lever 80 fixed thereto.

As illustrated in FIG. 80, the first wire member 752A is supported on the second console cover 767B in a hanging manner by a hanger 793.

The second console cover 767B is lowered from above such that the first wire member 752A passes between the lever member and the first console cover 767A, and is attached to the console support 766, under the conditions in which the first console cover 767A, the dozer lever 80, and the like are mounted on the console support 766. With this, the second console cover 767B is disposed at a lateral side of the first console cover 767A. As such, the second console cover 767B, with the first wire member 752A and the second wire member 752B connected thereto, can be attached to the console support 766, making it possible to reduce working time.

Furthermore, since the first wire member 752A is routed above the lever stay 775, the second console cover 767B can be mounted with the dozer lever 80 mounted thereon. Furthermore, since the wire receiver 790 to receive the first wire member 752A is provided, it is possible to prevent the first wire member 752A from interfering with the lever stay 775. Furthermore, since the second console cover 767B has the recessed groove 787 through which the dozer lever 80 passes, the dozer lever 80 can be included within the width of the second console cover 767B along the machine body-width direction K2 and, even in the case where the front portion and the rear portion of the second console cover 767B are integral with each other, the second console cover 767B can be mounted on the console support 766 with the dozer lever 80 mounted on the console support 766.

Furthermore, the cabin 5 is lowered from above to be mounted on the machine body 2 with the operator's seat 6 and members around the operator's seat 6 mounted thereon. Under the conditions in which the cabin 5 is mounted on the machine body 2, the space between the console 79R and the cabin 5 is small, and therefore it is difficult to mount the cabin 5 under the conditions in which the console 79R is attached near the operator's seat 6. In view of this, the second console cover 767B is detached when the cabin 5 is mounted, and, after the cabin 5 is mounted, the second console cover 767B is attached to the console support 766. This makes it possible to prevent a right side wall portion of the cabin 5 from interfering with the second console cover 767B, and possible to efficiently mount the cabin 5. Furthermore, since the second console cover 767B can be attached to the console support 766 from above, the second console cover 767B can be easily attached even in a small space between the first console cover 767A and the cabin 5. Also with regard to maintenance, since the second console cover 767B can be detached upward, the maintenance can be easily performed.

As illustrated in FIG. 1, the cabin 5 includes an outside air intake portion 163 for intake of outside air supplied to the air conditioner main body 136. The outside air intake portion 163 is provided on a left side surface of the cabin. Specifically, a left side surface portion of the cabin 5 includes a door 28 and a rear side surface portion 170 which defines a surface rearward of the door 28, and the outside air intake portion 163 is provided on a lower portion of the front portion of the rear side surface portion 170.

Figure 86:
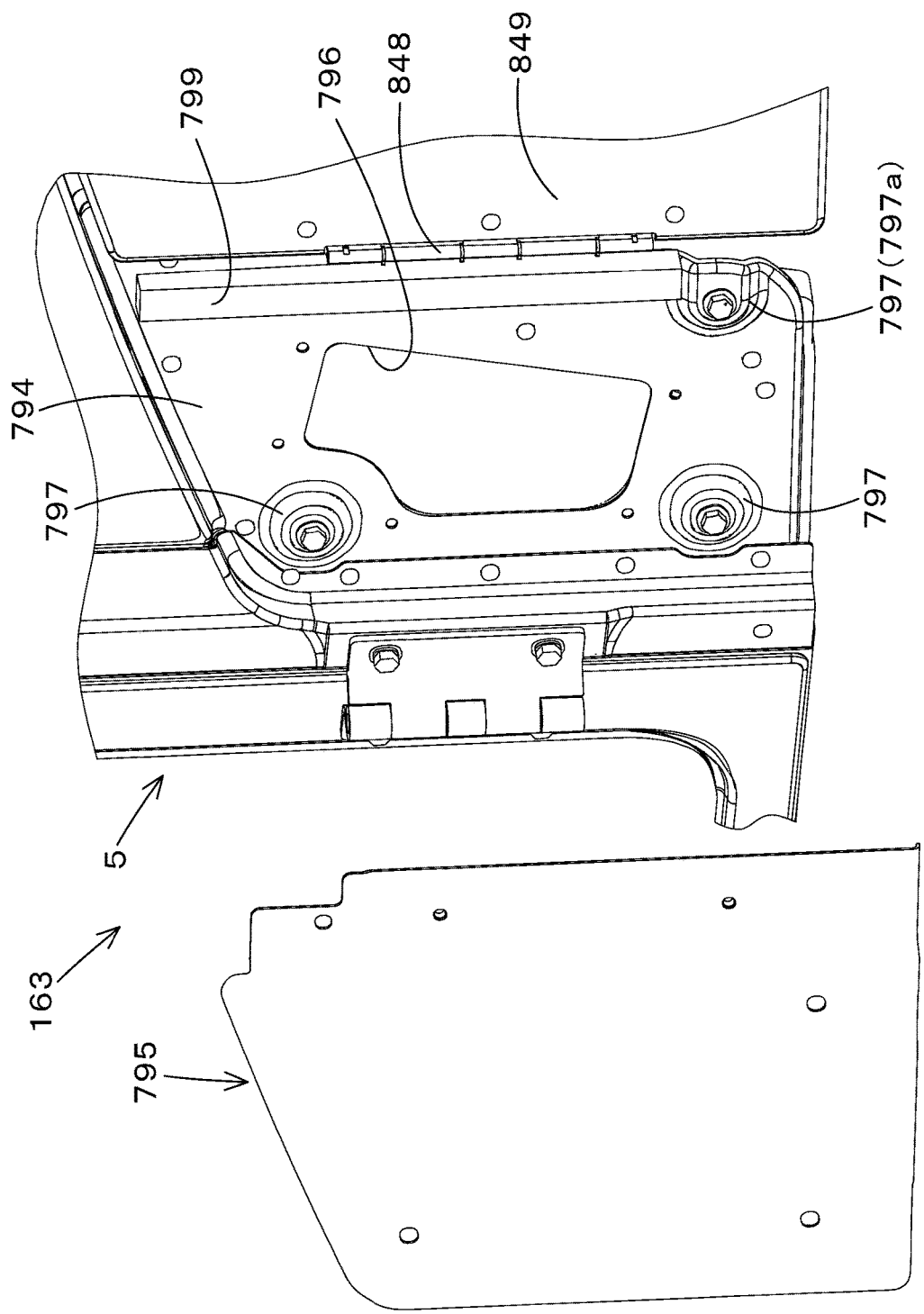
FIG. 86 is an exploded perspective view of an outside air intake portion.

As illustrated in FIG. 86, the outside air intake portion 163 includes a side wall (wall body) 794 and a cover wall 795 disposed so as to face an outward side (machine body-outward side) of the side wall 794. The side wall 794 has a mounting opening (referred to as a first mounting opening) 796. The first mounting opening 796 passes through the side wall 794 along the machine body-width direction K2. The side wall 794 has a plurality of mounting parts 797 which project in the machine body-outward direction. The mounting parts 797 include two top and bottom mounting parts 797 provided forward of the first mounting opening 796, and one mounting portion 797 provided on a lower portion of an area rearward of the first mounting opening 796.

Figure 87:
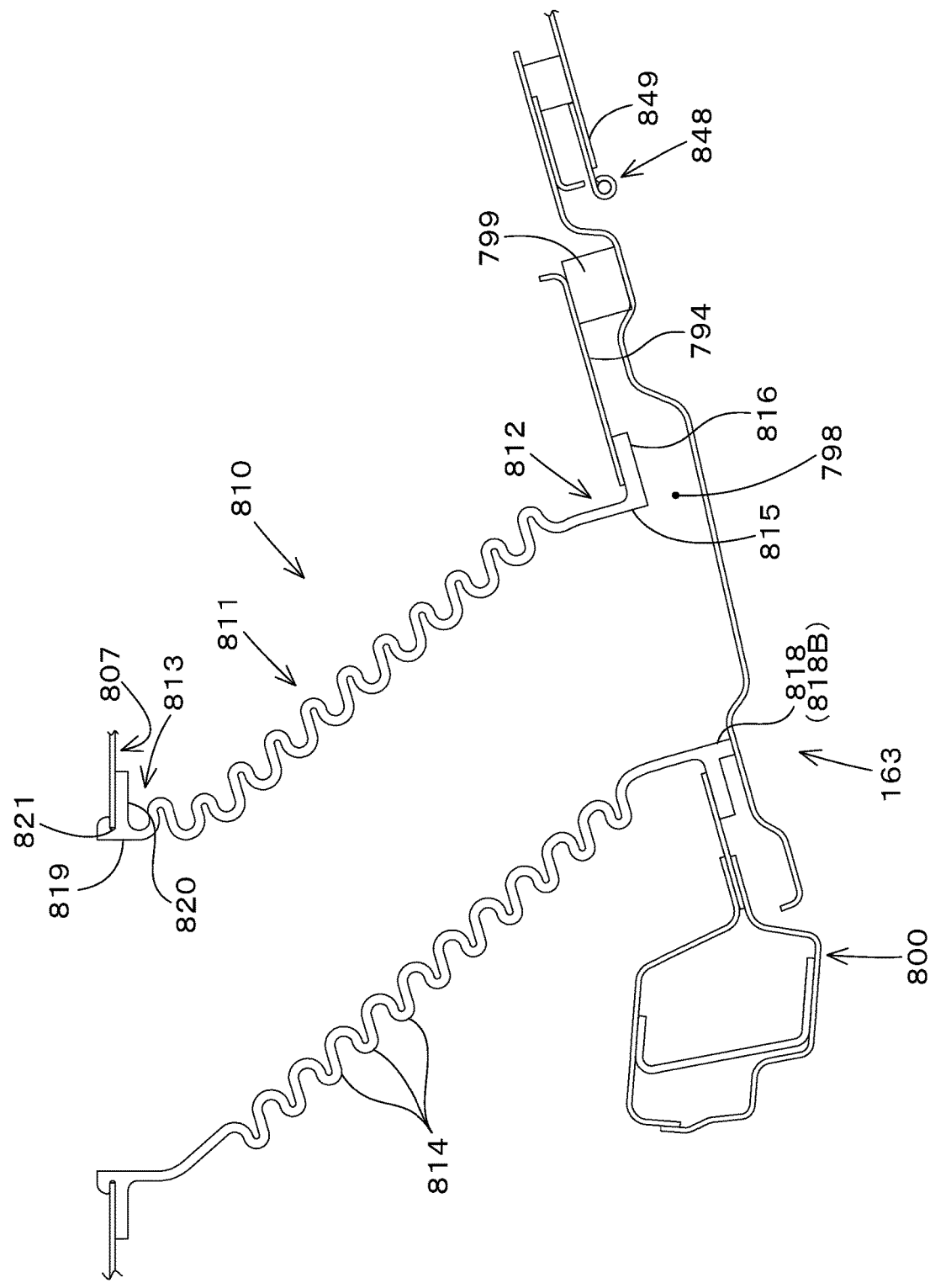
FIG. 87 is a planar cross-sectional view of the outside air intake portion and an outside air intake duct.
Figure 88:
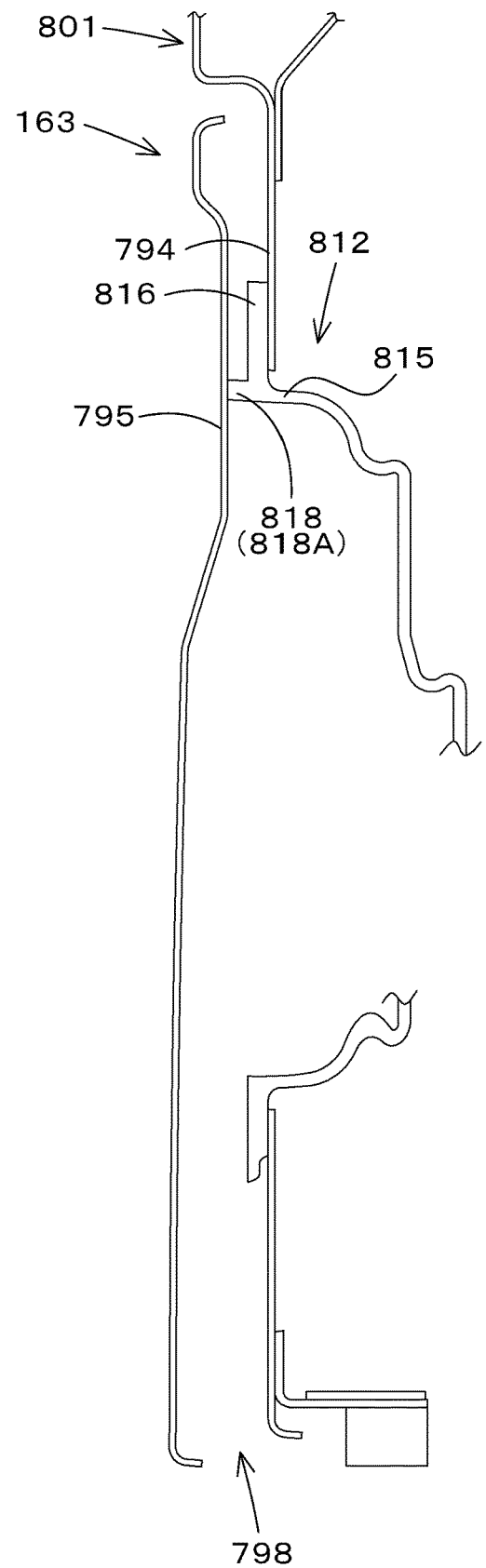
FIG. 88 is a cross-sectional view of the outside air intake portion and an outside-air-entrance-side connection portion, as seen from the rear.

The cover wall 795 is provided so as to entirely cover the side wall 794, and is attached to the plurality of mounting parts 797 with blots. Therefore, as illustrated in FIGS. 87 and 88, the cover wall 795 is attached to the side wall 794 with a space between itself and the side wall 794. As illustrated in FIGS. 86 and 87, a fuel inlet cover 849 which covers a fuel inlet of the fuel tank T1 is attached to a rear portion of the cover wall 795 a hinge 848. The cover wall 795, with the fuel inlet cover 849 attached thereto, is attached to the side wall 794.

As illustrated in FIGS. 87 and 88, an outside air inlet 798 for intake of outside air is formed between lower edges of the side wall 794 and the cover wall 795. The outside air inlet 798 is a gap between the lower edges of the side wall 794 and the cover wall 795, and outside air is taken into the space between the side wall 794 and the cover wall 795 through the gap (below). As illustrated in FIG. 86, a sealing member 799, which has a cross section in a quadrangular shape elongated along the top-bottom direction, is disposed rearward of the first mounting opening 796. The sealing member 799 extends from the mounting part 797a at the rear of the first mounting opening 796 to an upper edge of the side wall 794. As illustrated in FIG. 87, the sealing member 799 is present between the side wall 794 and the cover wall 795.

As illustrated in FIG. 87, a front edge portion of the cover wall 795 is disposed near a rear portion of a center pillar 800 of the cabin 5. As illustrated in FIG. 88, an upper edge portion of the cover wall 795 is disposed near a lower portion of the wall portion 801 which extends upward from the side wall 794.

Figure 89:
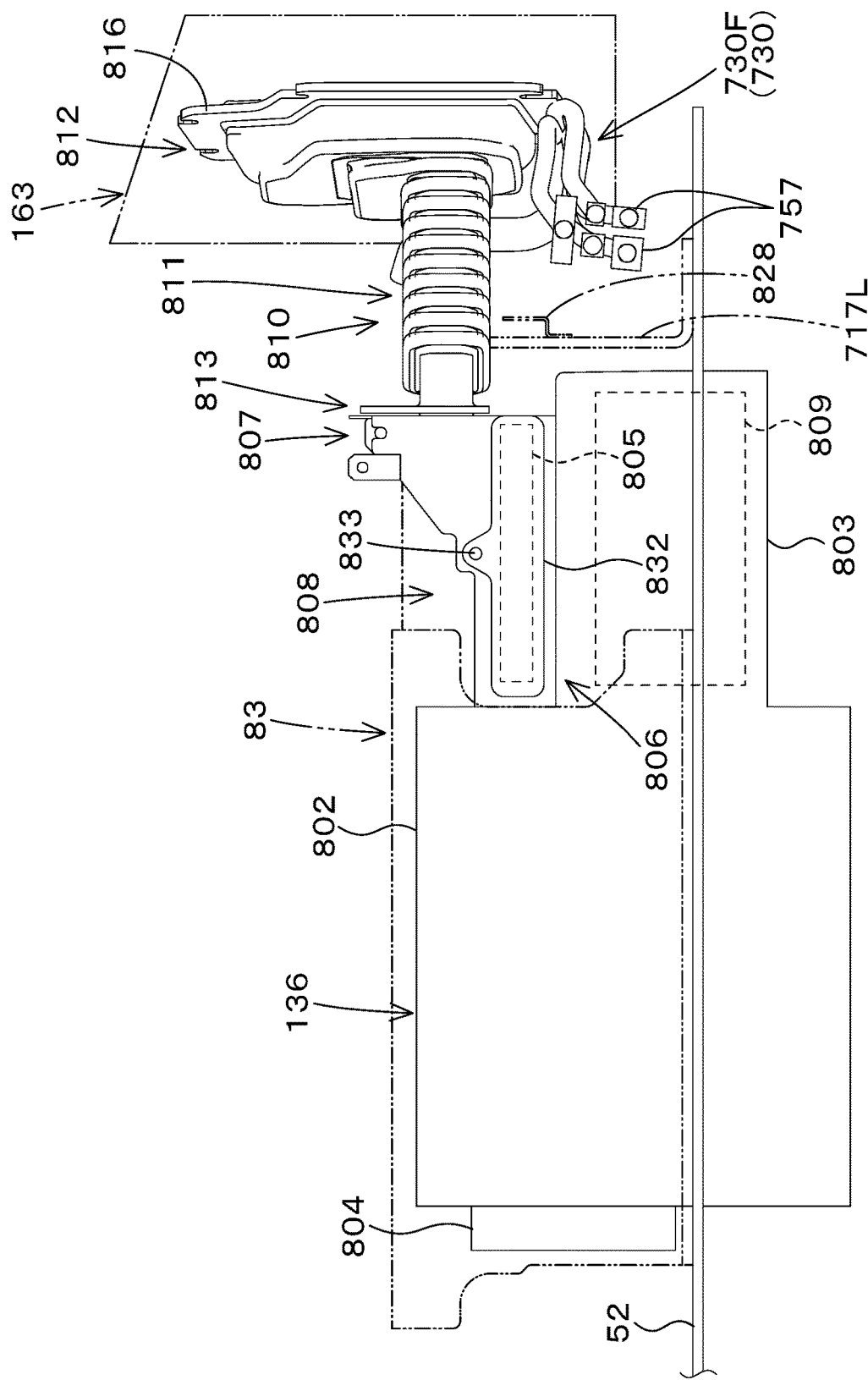
FIG. 89 is an elevational view showing an air conditioner main body and a portion through which outside air is introduced.

As illustrated in FIG. 89, the air conditioner main body 136 includes a main body case 802 which houses a heat exchanger, and a fan case 803 which houses a blower (blower fan) 809. The fan case 803 projects leftward from the main body case 802. The main body case 802 has, in a right side thereof, an air outlet 804 through which conditioned air is discharged outward. An inside/outside air intake device 808 is provided at the upper surface side of the fan case 803. The inside/outside air intake device 808 includes a filter housing portion 806 which houses a filter 805, and an inside/outside air switching unit 807 which switches between a state in which outside air is taken in and a state in which outside air is not taken in.

As illustrated in FIG. 89, an outside air intake duct 810 for intake of outside air into the air conditioner main body 136 is provided to bridge the inside/outside air intake device 808 and the outside air intake portion 163. The outside air intake duct 810 is formed of an elastic body such as rubber. Furthermore, the outside air intake duct 810 is formed of a corrugated structure such that the outside air intake duct 810 is expandable and contractable.

As illustrated in FIG. 87, the outside air intake duct 810 includes a body portion 811, an outside-air-entrance-side connection portion 812, and an outside-air-exit-side connection portion 813. The body portion 811 constitutes an intermediate portion of the outside air intake duct 810 in the lengthwise direction. The outside-air-entrance-side connection portion 812 is connected to the outside air intake portion 163. That is, the outside-air-entrance-side connection portion 812 is provided on the outside-air-entrance side of the outside air intake duct 810. The outside-air-exit-side connection portion 813 is connected to the inside/outside air switching unit 807. That is, the outside-air-exit-side connection portion 813 is provided on the outside-air-exit side of the outside air intake duct 810.

The body portion 811 is in a corrugated form expandable and contractable along the lengthwise direction. Specifically, the body portion 811 includes a plurality of elongated protrusions 814 which are annular along the circumference direction. The elongated protrusions 814 bulge out in a curved from. The expansion or contraction of the elongated protrusions 814 causes the body portion 811 (outside air intake duct 810) to expand or contract.

The outside-air-entrance-side connection portion 812, with the body portion 811 (outside air intake duct 810) in an expanded state, is connected to the part of the side wall 794 that has the first mounting opening 796. Specifically, the outside-air-entrance-side connection portion 812 includes an outside air intake 815 inserted in the first mounting opening 796, and a flange (referred to as a first flange) 816 which protrudes from the outside air intake 815 to abut on the outer surface of the side wall 794.

Figure 90:
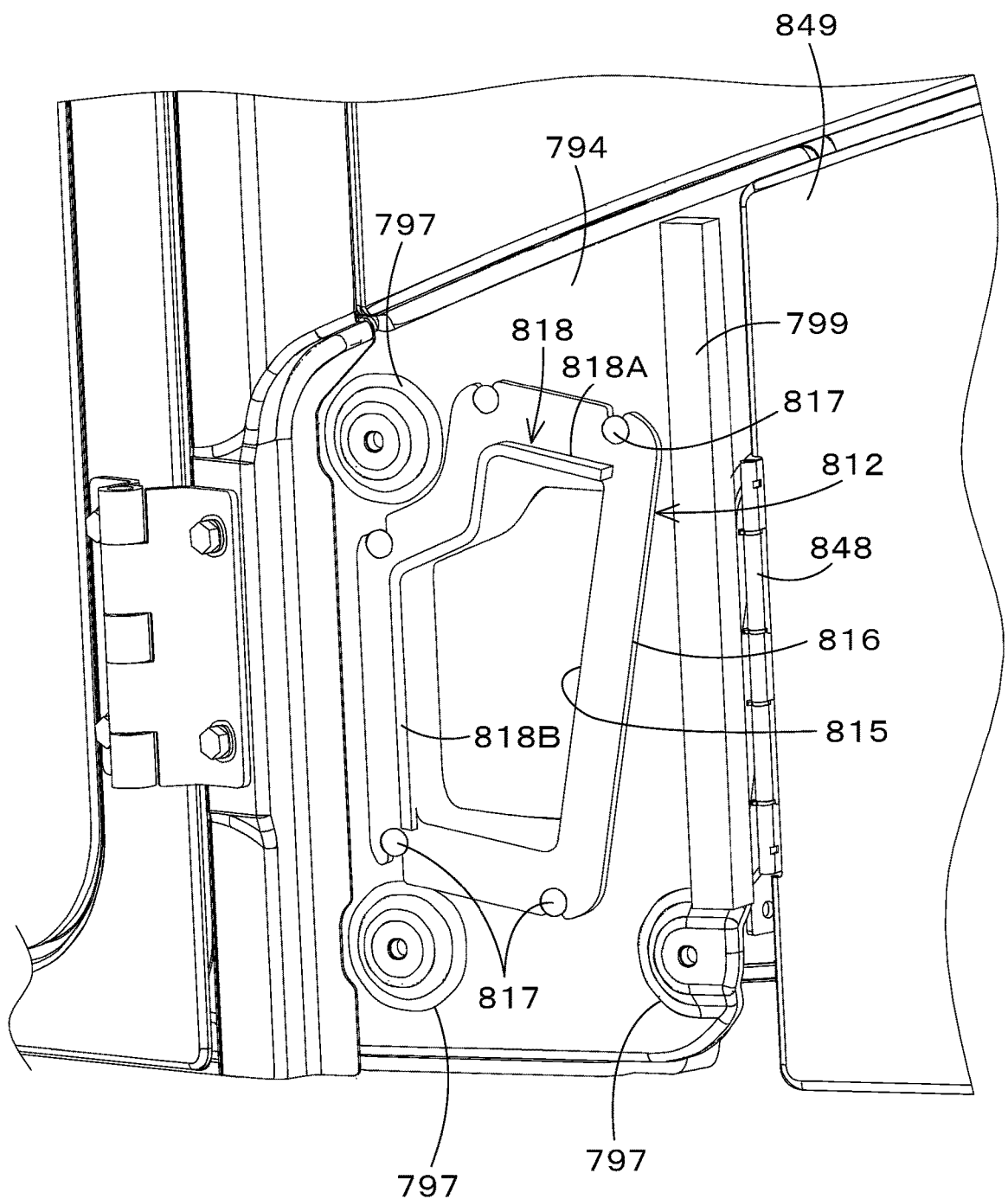
FIG. 90 is a perspective view showing the outside-air-entrance-side connection portion in an attached state.

As illustrated in FIG. 90, the first flange 816 is fixed to an area around the first mounting opening 796 with holder(s) 817 such as resin rivet(s). The outside air intake duct 810 is formed of an elastic body, and therefore elastic deformation of the outside-air-entrance-side connection portion 812 makes it possible to bring the outside air intake duct 810 out from the inner side of the side wall 794 to the outer side of the side wall 794 through the first mounting opening 796.

As illustrated in FIG. 90, the outside-air-entrance-side connection portion 812 includes a partition wall 818. The partition wall 818 includes a first section 818A provided above the outside air intake 815, and a second section 818B provided forward of the outside air intake 815. The first section 818A and the second section 818B are continuous with each other. There is no partition wall in portions rearward and downward of the outside air intake 815.

As illustrated in FIGS. 87 and 88, the partition wall 818 projects from the first flange 816 toward the cover wall 795 and abuts on the cover wall 795. The partition wall 818 makes it possible to prevent water such as rainwater or wash water from entering the outside air intake duct 810 from the portions upward and forward of the outside air intake 815. The sealing member 799 prevents air (inside air) in the cabin 5 from entering the outside air intake duct 810. Outside air taken through the outside air inlet 798 into the space between the side wall 794 and the cover wall 795 is introduced into the outside air intake duct 810 through the portions downward and rearward of the outside air intake 815.

As illustrated in FIG. 87, the outside-air-exit-side connection portion 813 includes an outside air outlet 819 and a flange (referred to as a second flange) 820. The outside air outlet 819 is inserted in a mounting opening (referred to as a second mounting opening) 821 in the inside/outside air switching unit 807. The second flange 820 abuts on and is fixed to a left side surface of the inside/outside air switching unit 807 with rivet(s) or the like.

Figure 91:
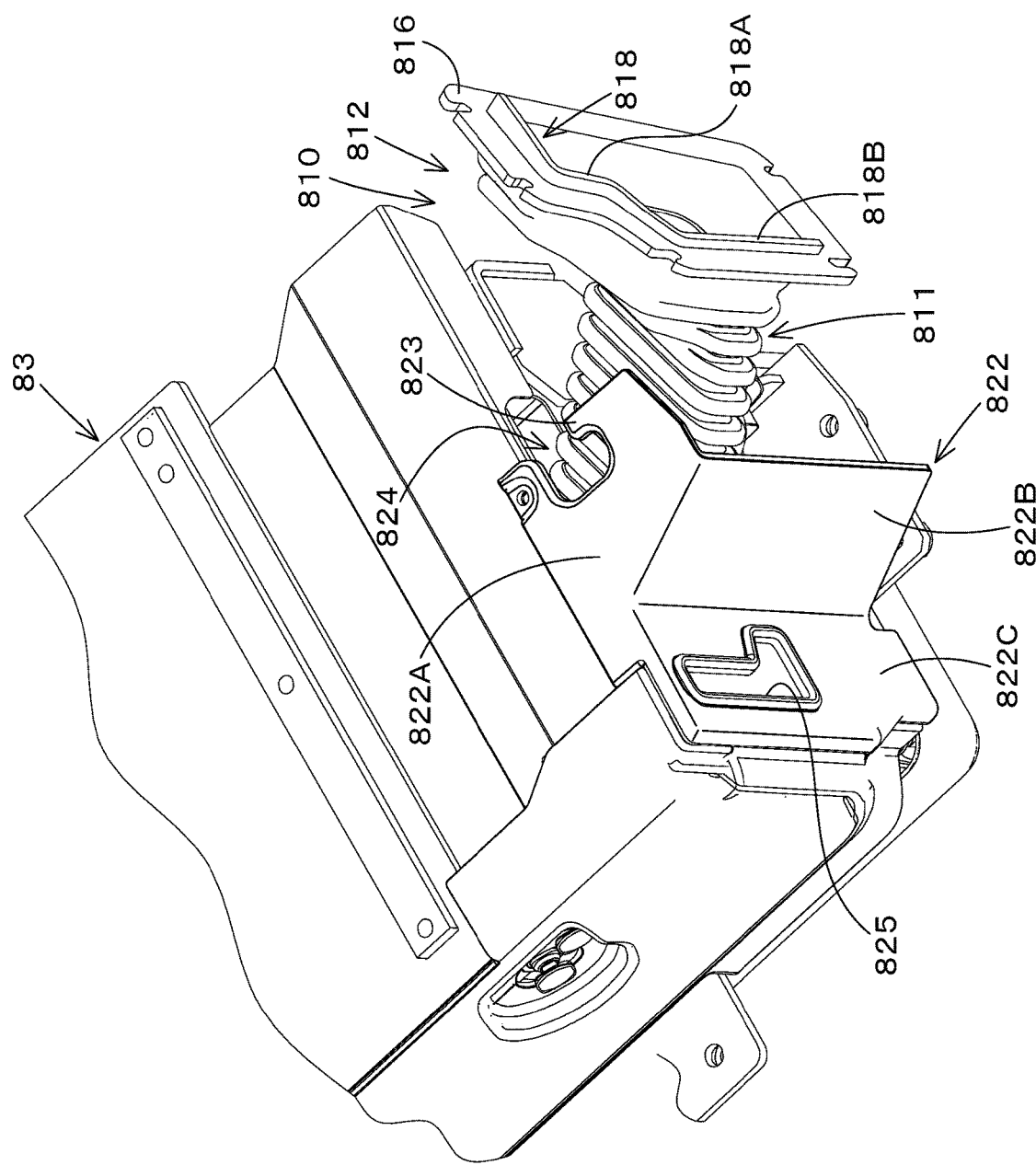
FIG. 91 is a perspective view showing the outside air intake duct and an engaging portion.
Figure 92:
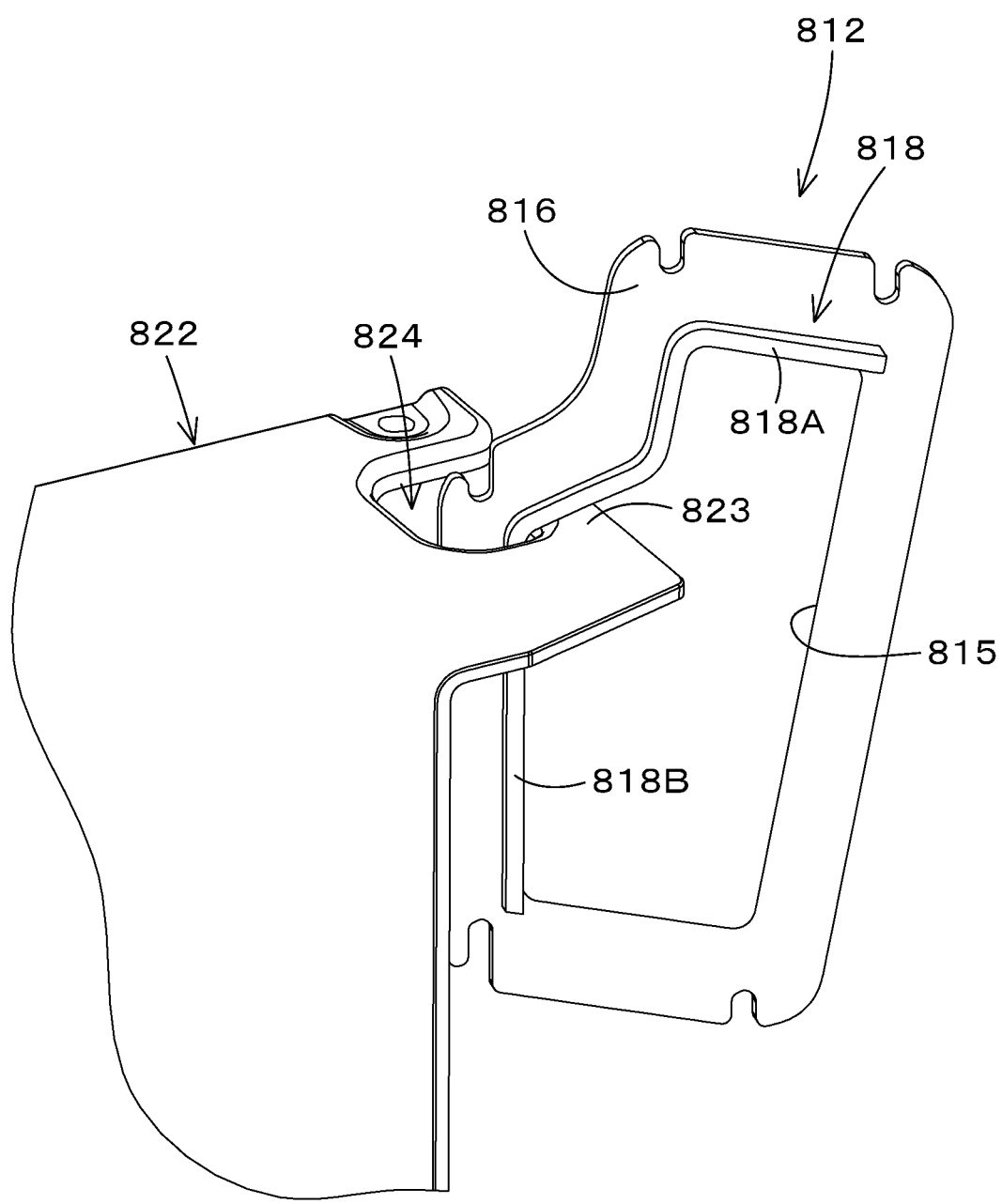
FIG. 92 is a perspective view showing the outside air intake duct in engagement with the engaging portion.

As illustrated in FIG. 91, a cover member 822 is provided forward of the outside air intake duct 810. The cover member 822 includes an upper wall 822A, a first vertical wall 822B, and a second vertical wall 822C. The upper wall 822A is located above a front portion of the outside air intake duct 810. The first vertical wall 822B is located forward of the outside air intake duct 810. The second vertical wall 822C is located at a lateral side of a front portion of the seat base 83. The upper wall 822A includes an engaging portion 823 in a rear portion thereof. The engaging portion 823 is configured to engage with the outside air intake duct 810 in the state in which the outside air intake duct 810 is contracted in a direction away from the first mounting opening 796. Specifically, the engaging portion 823 is in the form of a hook defined by a cutout groove 824 in the upper wall 822A, and is configured to have hung thereon the outside-air-entrance-side connection portion 812 (the outside-air-entrance-side of the outside air intake duct 810). Specifically, as illustrated in FIG. 92, the first flange 816 and the partition wall 818 are inserted into the cutout groove 824 and hung on the engaging portion 823. The first mounting opening 796 allows access to the outside air intake duct 810 (outside-air-entrance-side connection portion 812) engaged with the engaging portion 823 from the outside of the cabin 5. That is, the first mounting opening 796 has a size which allows access to the outside air intake duct 810 engaged with the engaging portion 823 from the outside of the cabin 5. As illustrated in FIG. 91, the second vertical wall 822C has a lever insertion hole 825.

It is noted that the cabin 5 is mounted on the floor step 52 and the support frame 11 after components around the operator's seat 6 such as the seat base 83 and the movable body 85 are mounted on the floor step 52. Conventionally it is difficult to mount the outside air intake duct before mounting the cabin 5, and therefore the outside air intake duct is mounted after the cabin 5 is mounted. However, the work of mounting the outside air intake duct is done within a narrow space inside the cabin 5, resulting in poor mountability. In the present embodiment, it is possible to temporarily attach the outside air intake duct 810 before mounting the cabin 5, by connecting the outside-air-exit-side connection portion 813 of the outside air intake duct 810 to the inside/outside air switching unit 807 and engaging the outside-air-entrance-side connection portion 812 with the engaging portion 823 with the outside air intake duct 810 in its contracted state. This makes it possible to improve efficiency in mounting the outside air intake duct 810. After the cabin 5 is mounted, the outside-air-entrance-side connection portion 812 is accessed from the outside of the cabin 5 through the first mounting opening 796 and detached from the engaging portion 823, and the outside air intake duct 810 is expanded and the first flange 816 is taken out of the side wall 794 through the first mounting opening 796. Then, the first flange 816, which has been taken out of the side wall 794, is fixed to the side wall 794 with the holder(s) 817. Since it is possible to perform the mounting of the outside-air-entrance-side connection portion 812 from the outside of the cabin 5, it is possible to easily mount the outside-air-entrance-side connection portion 812. Furthermore, since the mounting of the outside air intake duct 810 (outside-air-entrance-side connection portion 812) can be performed from the outside of the cabin 5, the mounting of the outside air intake duct 810 can be performed by a worker different from a worker working within the cabin 5. That is, the mounting of the outside air intake duct 810 can be performed separately from work within the cabin 5, making it possible to improve efficiency of the mounting work.

Figure 93:
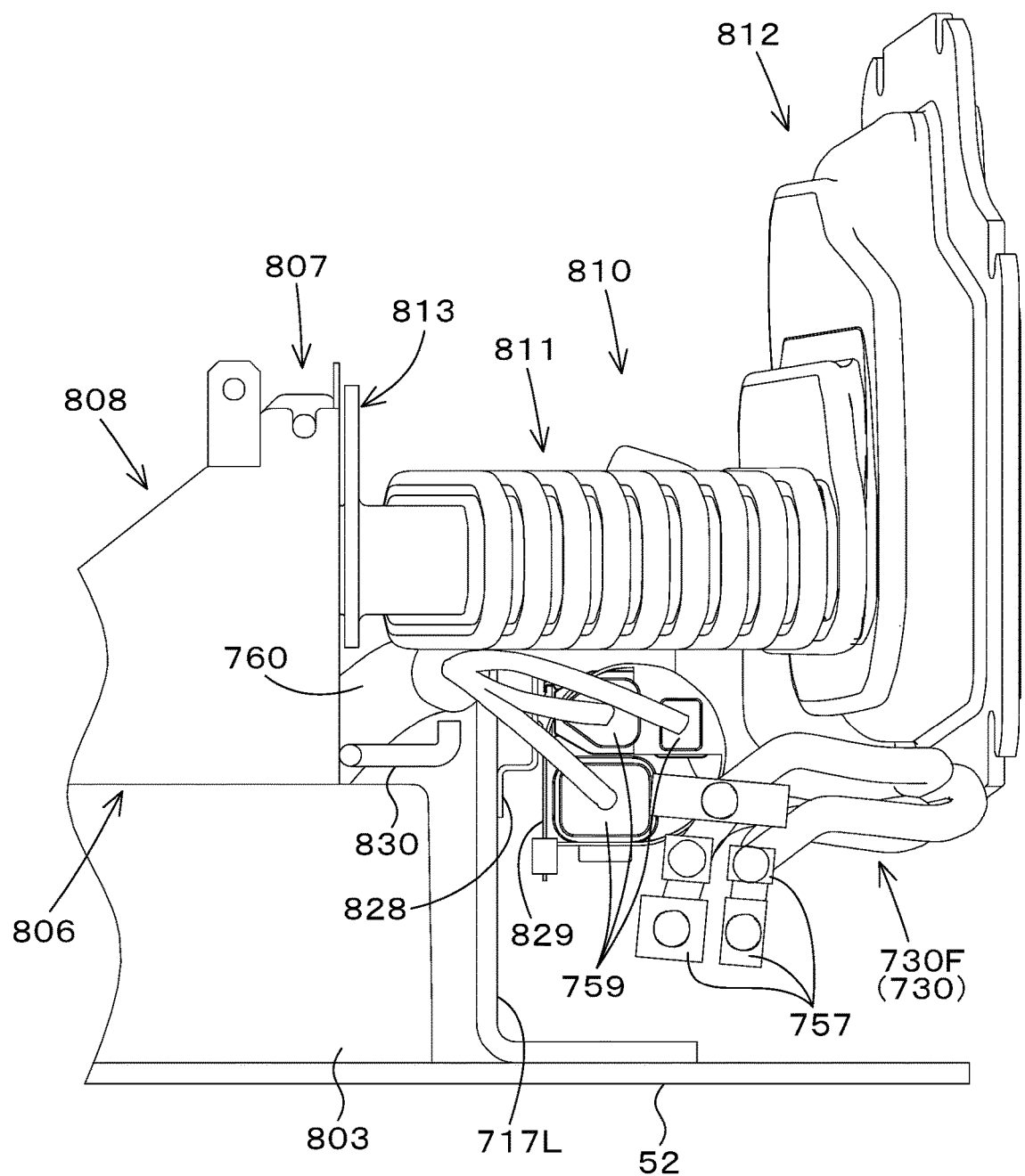
FIG. 93 is a perspective view of the surroundings of the outside air intake duct.
Figure 94:
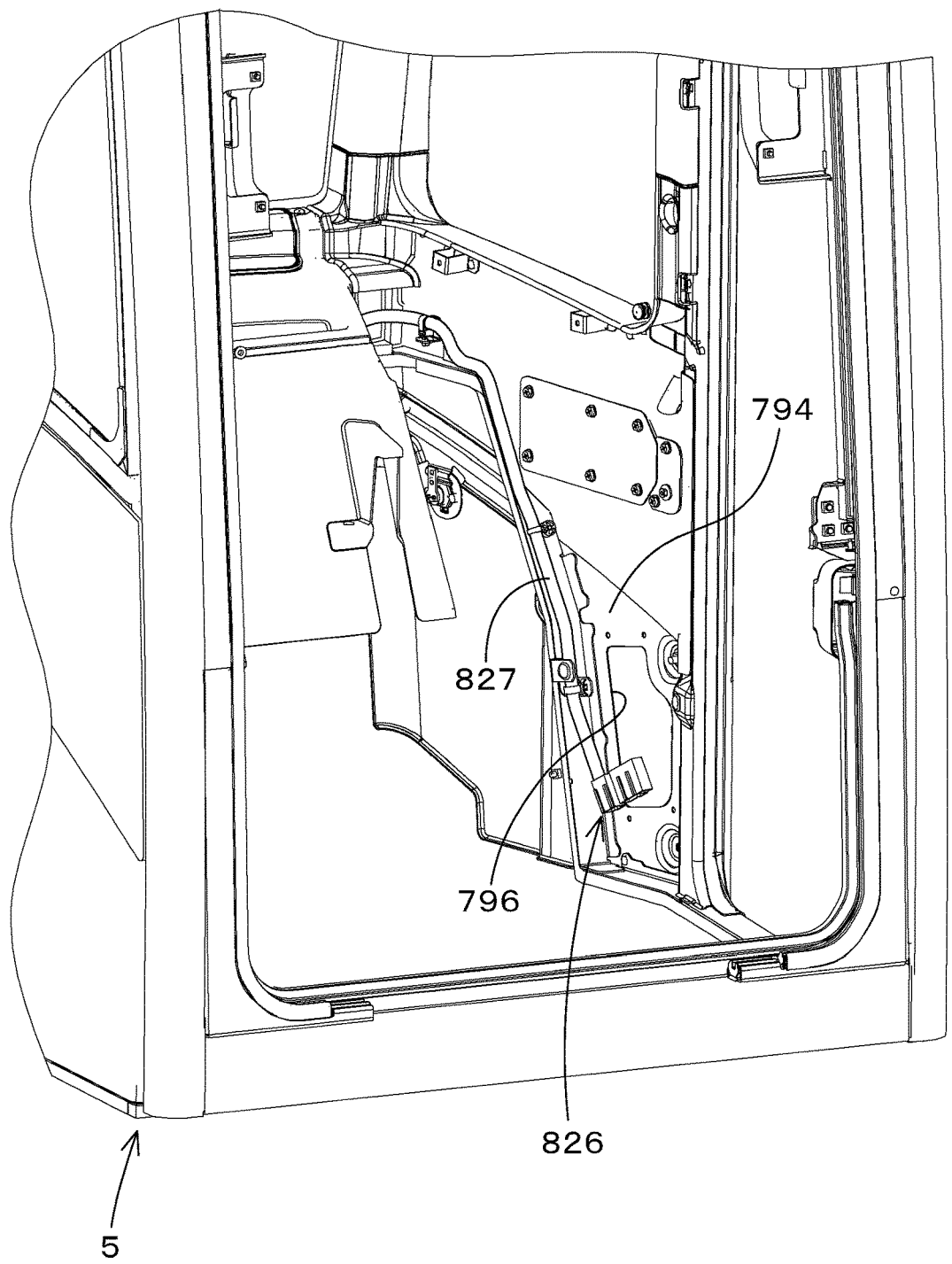
FIG. 94 is a perspective view showing a route of a cabin harness.

As illustrated in FIG. 93, the connectors 757 connected to the sixth harness portion 730F (main harness 730) are disposed below the outside air intake duct 810. That is, the sixth harness portion 730F is routed in the vicinity of the first mounting opening 796, and the connectors 757 are disposed in the vicinity of the first mounting opening 796. Furthermore, as illustrated in FIG. 94, the connector(s) (cabin-harness-side connector(s)) 826 to be connected to the connectors 757 is/are disposed in the vicinity of the first mounting opening 796. The cabin harness 827, to which the connector(s) 826 is/are attached, is routed from an apparatus (such as a working lamp and/or wiper device) equipped on the cabin 5 to the first mounting opening 796.

The connectors 757 and the connector(s) 826 are connected before the outside-air-entrance-side connection portion 812 is attached. That is, while the outside air intake duct 810 is in its contracted state and the outside-air-entrance-side connection portion 812 is in engagement with the engaging portion 823, connection of the connectors 757 and the connector(s) 826 can be performed outside the cabin 5 through the first mounting opening 796. Since the connection of the connectors 757 and the connector(s) 826 can be performed also from the outside of the cabin 5, good workability is achieved and an operator different from an operator working within the cabin 5 can perform the connection. This makes it possible to efficiently perform the work of connecting the connectors 757 and the connector(s) 826.

As illustrated in FIGS. 89 and 93, a stay member 828 is fixed on the left side of the seat base 83. Specifically, the stay member 828 is fixed on the left side surface of the first leg part 717L of the seat base 83. As illustrated in FIG. 93, the connectors 759 attached to the air conditioner harness 760, which have connected thereto the connectors 758 attached to the seventh harness portion 730G, are attached to the stay member 828 via a clamp member 829.

The connectors 759 and the connectors 758 are connected in the following manner.

Under the conditions in which the air conditioner main body 136 is attached to the floor step 52 and the air conditioner harness 760 is subassembled on the air conditioner main body 136, the seat base 83 with the harness 730 subassembled thereon is lowered from above and attached to the floor step 52. After the seat base 83 is mounted, the connectors 759 and the connectors 758 are connected.

When the seat base 83 is mounted, if the connectors 759 make contact with the seat base 83 or a component in the vicinity of the seat base 83 or if the connectors 759 are caught between the floor step 52 or the like and the seat base 83 or the like, the connectors 759 may be damaged. In view of this, in the present embodiment, as illustrated in FIG. 93, an engagement member 830 for temporary placement of the connectors 759 is provided on the air conditioner main body 136. Specifically, the engagement member 830 is in the form of a hook made of a bent rod-shaped member, and is fixed on a lateral side surface (left side surface) of the filter housing portion 806. When the seat base 83 is lowered, temporary placing the connectors 759 on the engagement member 830 makes it possible to prevent the connectors 759 from being damaged.

Furthermore, the floor step 52 is lowered to a main line and mounted on the machine body under the conditions in which the air conditioner main body 136 is attached to the floor step 52 and the air conditioner harness 760 is subassembled on the air conditioner main body 136. Also in such a case, temporary placing the connectors 759 on the engagement member 830 makes it possible to prevent the connectors 759 from making contact with a nearby component or being caught in nearby components.

Note that the following configuration may be used: the first mounting opening 796 allows access to the connectors 759 and the connectors 758 from the outside of the cabin 5. This facilitates the maintenance of the connectors 759 and the connectors 758 from the outside of the machine body 2.

Figure 95:
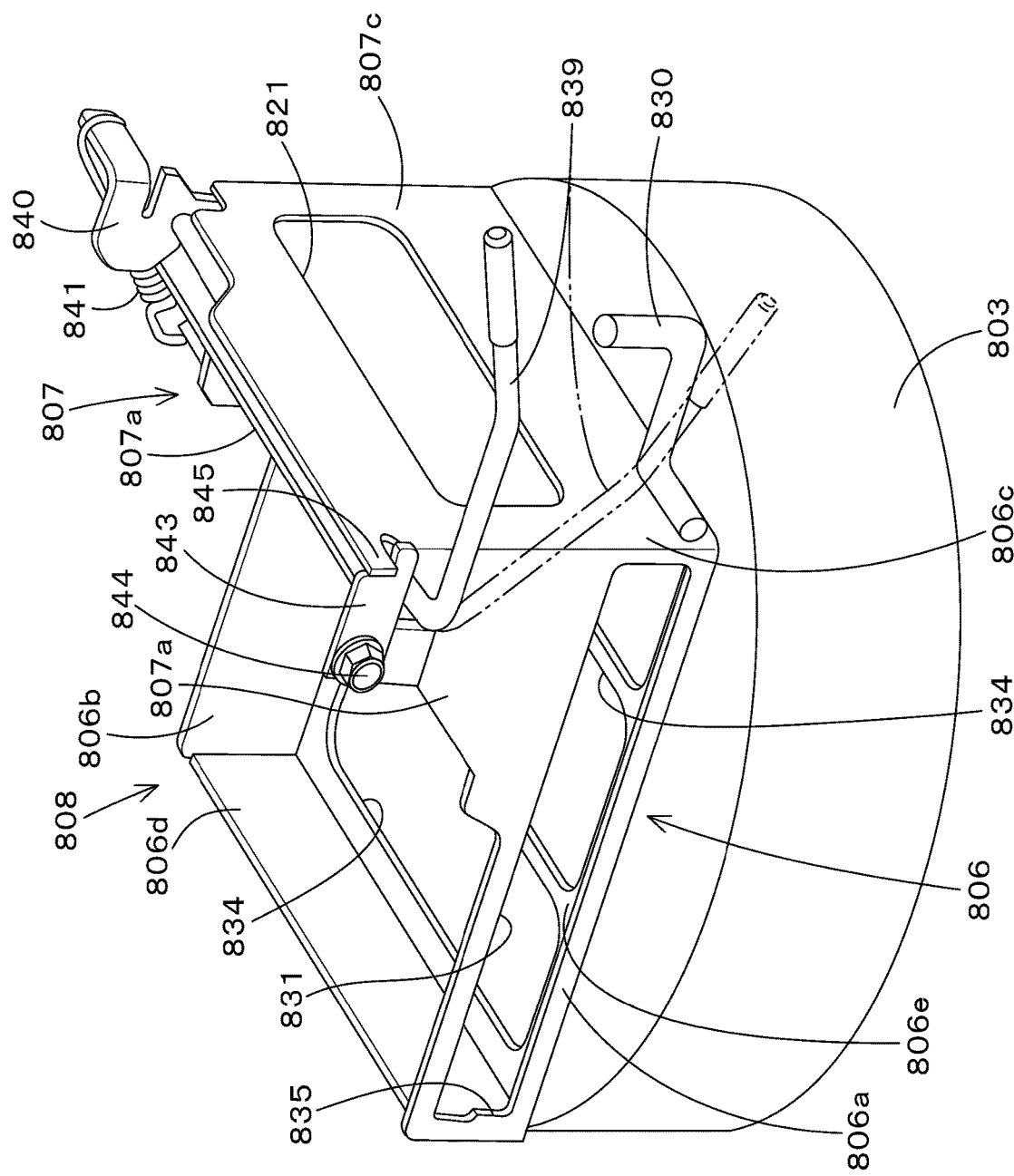
FIG. 95 is a perspective view of an inside/outside air intake device.
Figure 96:
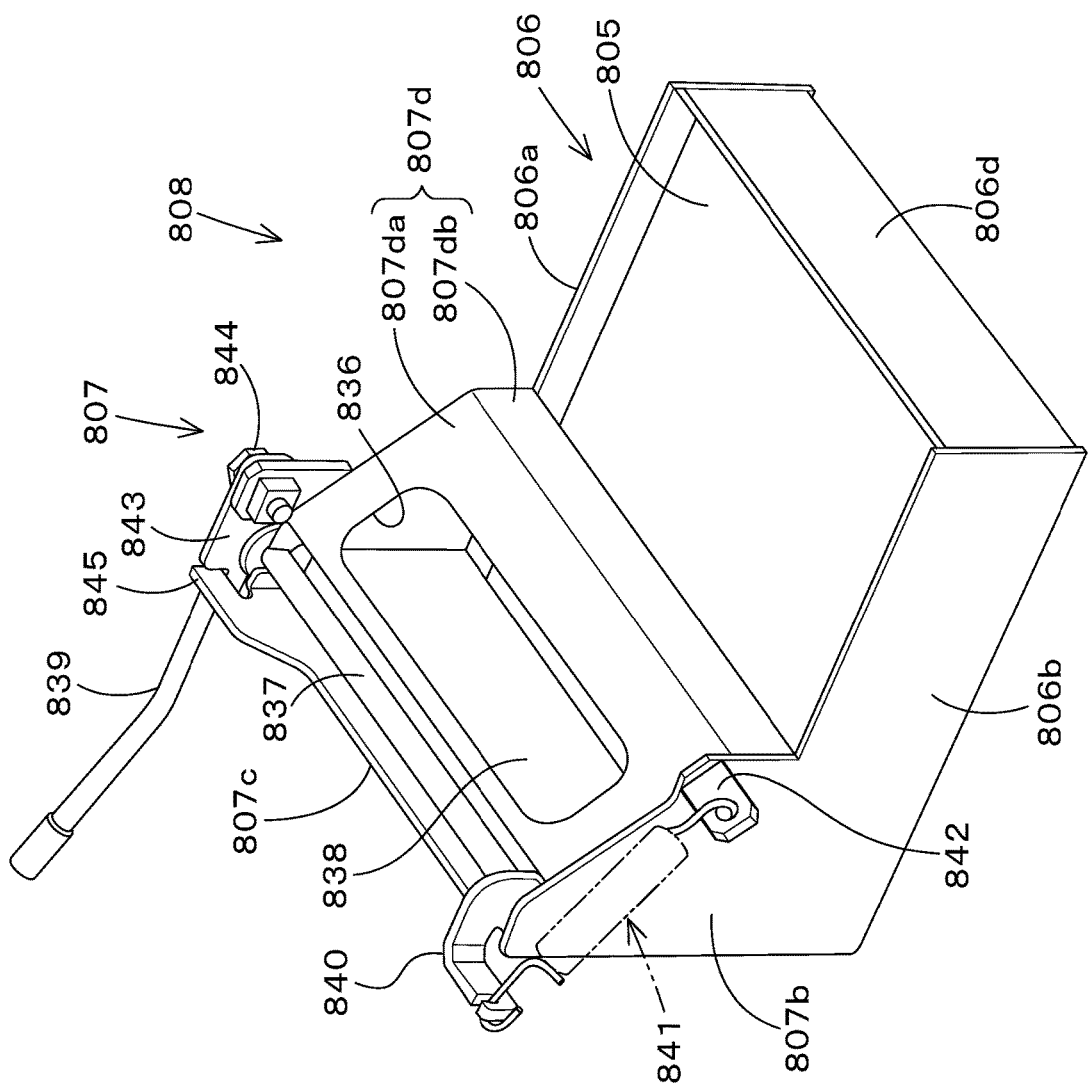
FIG. 96 is a perspective view of the inside/outside air intake device.

As illustrated in FIGS. 95 and 96, the filter housing portion 806 includes a front plate portion 806a having an insertion opening 831, a rear plate portion 806b which is disposed rearward of the front plate portion 806a with a gap therebetween, a first side plate portion 806c which connects together left edges of the front plate portion 806a and the rear plate portion 806*b*, a second side plate portion 806*d* which connects together right edges of the front plate portion 806*a* and the rear plate portion 806*b*, and a base plate portion 806*e* provided between lower edges of the front plate portion 806*a* and the rear plate portion 806*b*. The filter housing portion 806 has a shape with an open top. The filter 805 is inserted into the filter housing portion 806 from the front through the insertion opening 831 and placed on the base plate portion 806*e*.

As illustrated in FIG. 89, the insertion opening 831 is closed with a lid member 832. The lid member 832 is attached to the front plate portion 806*a* with a screw member 833. The base plate portion 806*e* has a plurality of openings 834 which are in communication with the interior of the fan case 803 and which are arranged along the machine body-width direction K2. When the blower 809 is turned ON, inside air and outside air are drawn into the fan case 803 through the filter 805 and the openings 834.

As illustrated in FIG. 95, the insertion opening 831 has an abutting portion 835 at a lower right portion thereof. The filter 805 has a cutout groove corresponding to the abutting portion 835, and is configured such that, when the filter 805 is to be inserted upside down, the filter 805 makes contact with the abutting portion 835 and cannot be inserted. The engagement member 830 is fixed on a left side surface of the first side plate portion 806*c*.

As illustrated in FIGS. 95 and 96, the inside/outside air switching unit 807 includes a front plate portion 807*a* which extends upward from a left portion of an upper edge of the front plate portion 806*a*, a rear plate portion 807*b* which extends upward from a left portion of an upper edge of the rear plate portion 806*b*, a first side plate portion 807*c* which extends upward from the first side plate portion 806*c*, and a second side plate portion 807*d* which is disposed rightward of the first side plate portion 807*c* with a gap therebetween. The first side plate portion 807*c* has the second mounting opening 821, and the second flange 820 of the outside air intake duct 810 is attached to the first side plate portion 807*c*.

As illustrated in FIG. 96, the second side plate portion 807*d* is disposed in a left portion of the filter housing portion 806. The second side plate portion 807*d* includes an upper section 807*da* and a lower section 807*db*. The upper section 807*da* is inclined rightward in the downward direction. The upper section 807*da* has an opening 836. The lower section 807*db* extends downward from a lower edge of the upper section 807*da* to an upper edge of the filter housing portion 806.

Figure 97:
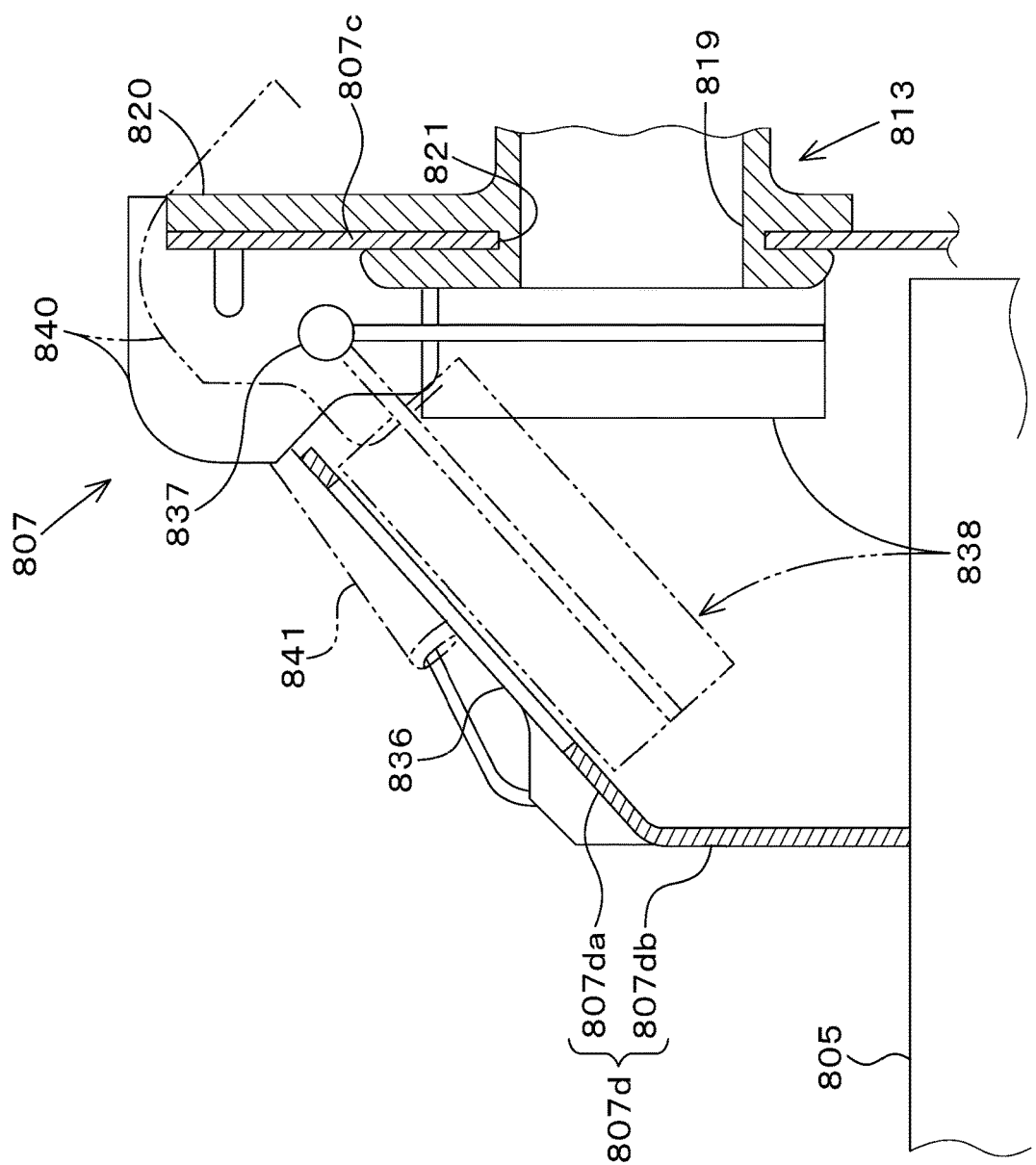
FIG. 97 is a cross-sectional view of an inside/outside air switching unit as seen from the front.

As illustrated in FIG. 96, a pivot shaft 837 is provided between upper portions of the front plate portion 807*a* and the rear plate portion 807*b*. As illustrated in FIG. 97, the pivot shaft 837 has fixed thereto a switching damper 838 disposed between the first side plate portion 807*c* and the second side plate portion 807*d*. As illustrated in FIG. 95, the pivot shaft 837 has a switch lever 839 fixed to a front end thereof. The switch lever 839 is inserted into the lever insertion hole 825 illustrated in FIG. 91 and projects outward from the cover member 822. This makes it possible for the operator seated on the operator's seat 6 to operate the switch lever 839.

As illustrated in FIG. 96, the pivot shaft 837 has a spring hooking member 840 fixed to a rear end thereof. One end of a tension spring (biasing member) 841 is hooked on the spring hooking member 840. The other end of the tension spring 841 is hooked on a spring hooking member 842 fixed to the rear plate portion 807*b*. The biasing force of the tension spring 841 acts in a direction in which the switching damper 838 is closed when the switching damper 838 is in the state in which it closes the outside air outlet 819, as indicated by solid lines in FIG. 97. When the switch lever 839 is raised while the switching damper 838 is in the closed state, the pivot shaft 837 rotates and, as indicated by dot-dot-dash lines in FIG. 97, the switching damper 838 swings in a direction in which the outside air outlet 819 is opened, and closes the opening 836. When the switching damper 838 is in the state in which it opens the outside air outlet 819, the biasing force of the tension spring 841 acts in a direction in which the switching damper 838 is opened.

When the switching damper 838 is in the state in which it closes the outside air outlet 819, inside air is drawn into the fan case 803 from a right portion of the filter housing portion 806, and inside air is drawn into the fan case 803 from a left portion of the filter housing portion 806 through the opening 836. When the switching damper 838 is in the state in which it opens the outside air outlet 819, outside air is drawn into the fan case 803 from the outside air outlet 819 through a left portion of the filter housing portion 806 and inside air is drawn into the fan case 803 from a right portion of the filter housing portion 806.

As illustrated in FIG. 95, a restricting member 843 which restricts upward swinging movement of the switch lever 839 is attached with a bolt 844 to an upper portion of the front plate portion 807*a*. Furthermore, a pivot stopping portion 845 which restricts upward pivoting movement of the restricting member 843 about the bolt 844 is provided at an upper edge of a front portion of the first side plate portion 807*c*.

Figure 98:
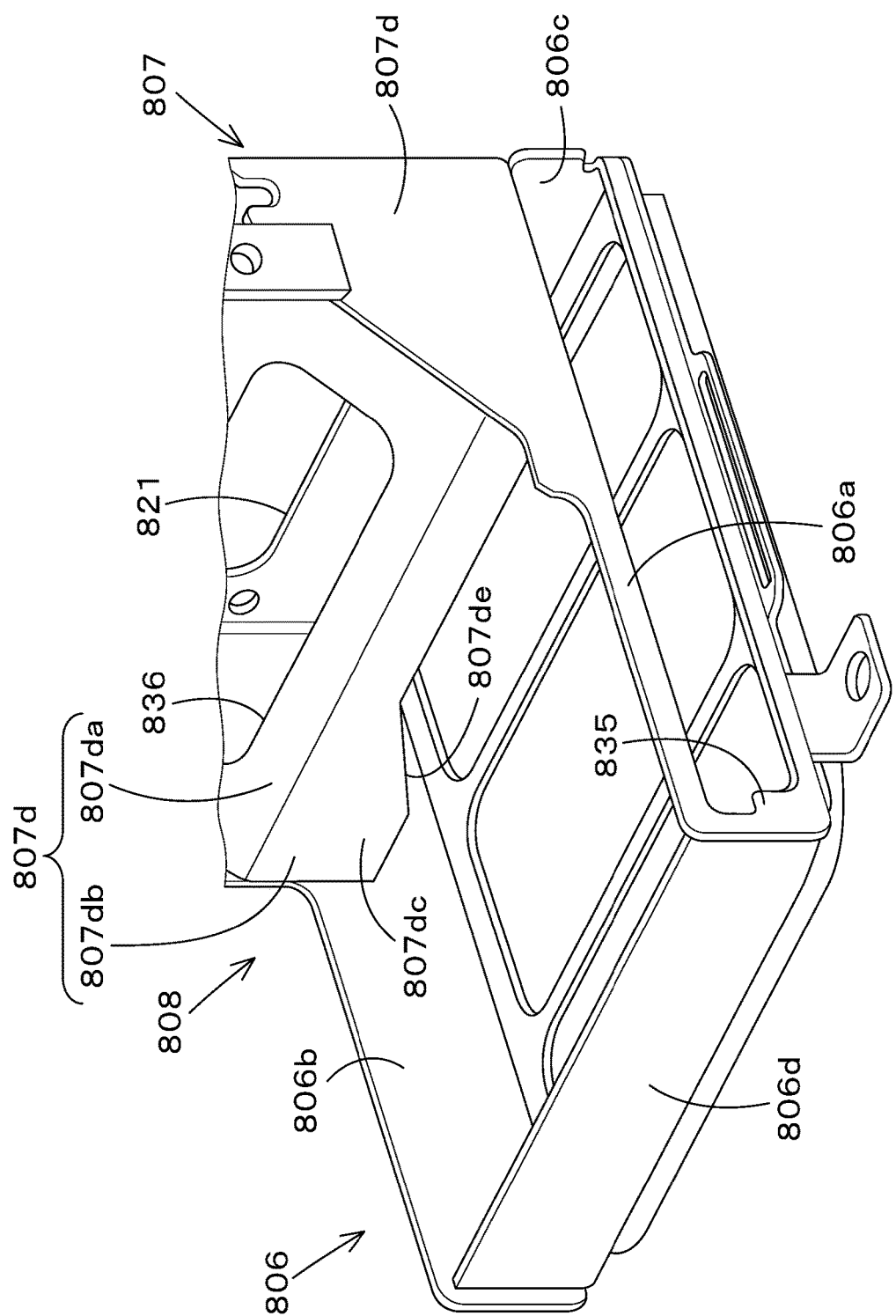
FIG. 98 is a perspective view of a filter housing portion.

FIG. 98 shows another example of the inside/outside air intake device 808. In the other example, a rear portion 807*dc* of the lower section 807*db* of the second side plate portion 807*d* has a width along the top-bottom direction wider than that of the front portion, and a front edge 807*de* of the rear portion 807*dc* of the lower section 807*db* is inclined downward toward the rear. With the front edge 807*de* (inclined portion), when the filter 805 is inserted in the filter housing portion 806, the rear portion of the filter 805 is guided downward and is pressed against the base plate portion 806*e*.

Figure 99:
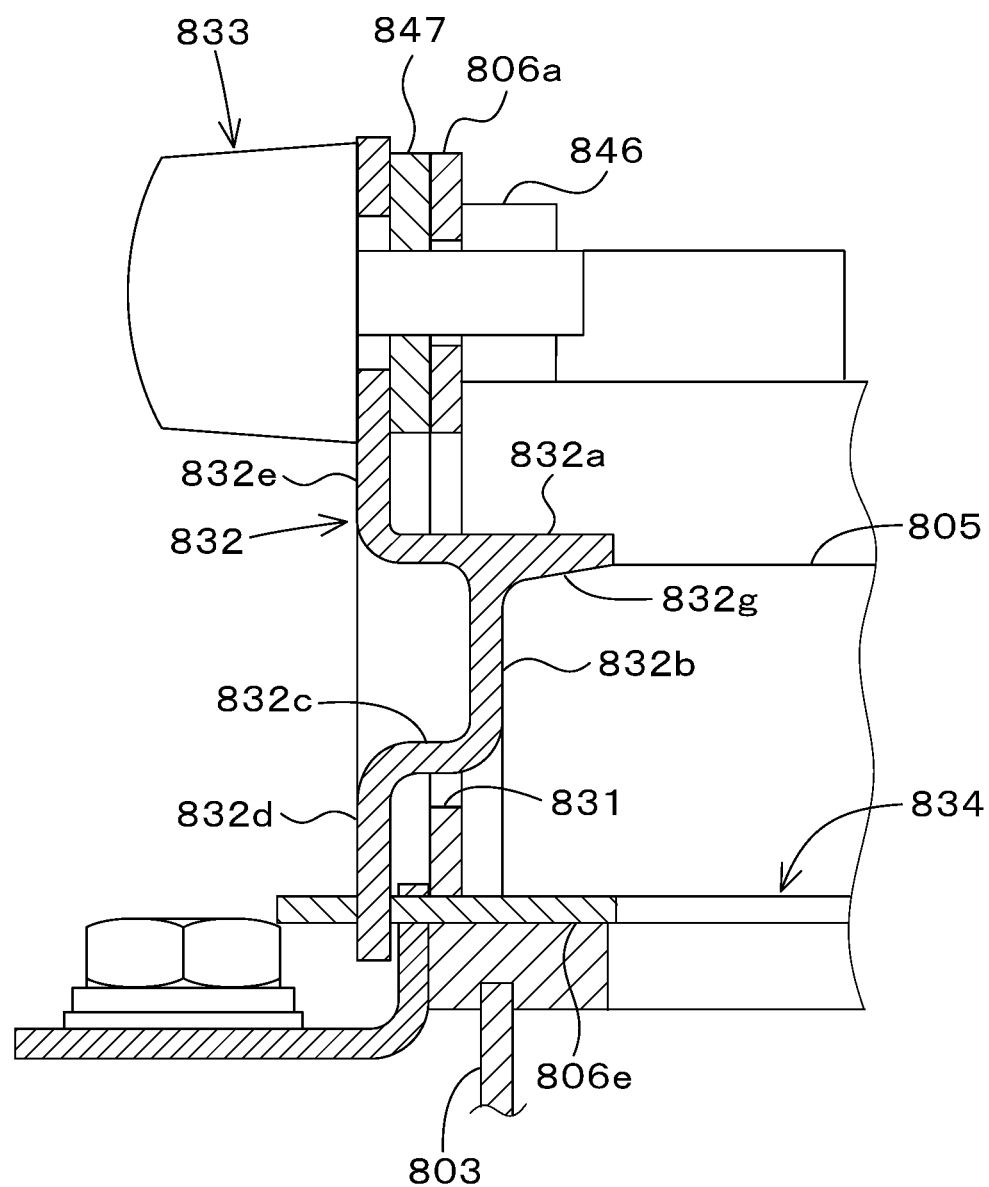
FIG. 99 is a cross-sectional view of a part in which a filter is inserted, as seen from a side.

As illustrated in FIG. 99. the lid member 832 includes an upper wall 832*a*, a pressing wall 832*b* which extends downward from an intermediate portion in the front-rear direction of the upper wall 832*a*, a horizontal wall 832*c* which extends forward from the pressing wall 832*b*, a vertical wall 832*d* which extends downward from a front edge of the horizontal wall 832*c*, and a mounting wall 832*e* which extends upward from the upper wall 832*a*. A lower surface 832*g* of the upper wall 832*a*, located rearward of the pressing wall 832*b*, is inclined upward toward the rear. The mounting wall 832*e* is attached with the screw member 833 to the front plate portion 806*a*. Screwing the screw member 833 into a nut member 846 causes a front portion of the filter 805 to be pressed downward by the upper wall 832*a* and pressed from the front by the pressing wall 832*b*.

The filter 805 is pressed against and held on the base plate portion 806*e* by the rear portion 807*dc* of the lower section 807*db* of the second side plate portion 807*d* and the lid member 832. This makes it possible to prevent air leakage.

Furthermore, as illustrated in FIG. 99, the screw member 833 is made of resin. The mounting wall 832*e* and the front plate portion 806*a* have a washer (stopper) 847 made of resin disposed therebetween. The screw member 833 made of resin and the washer 847 made of resin prevent the screw member 833 from becoming loose and prevent noise from being generated when the working machine 1 is in operation.

As illustrated in FIG. 98, a left edge of the insertion opening 831 extends to a left edge of the front plate portion 806a. This makes it easier to insert the filter 805.

Figure 100:
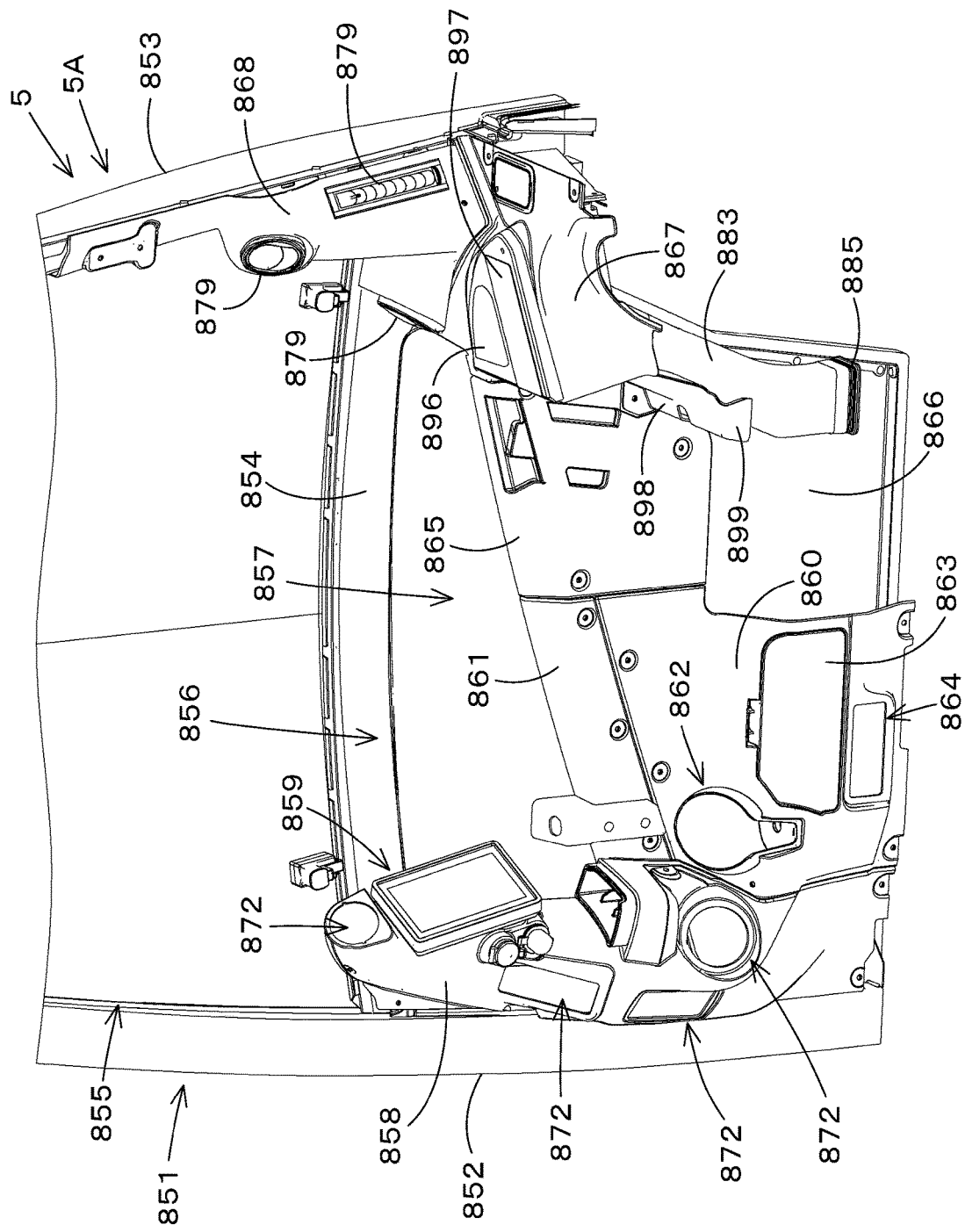
FIG. 100 is a perspective view of a right side surface of the cabin as seen from the inside of the cabin.
Figure 101:
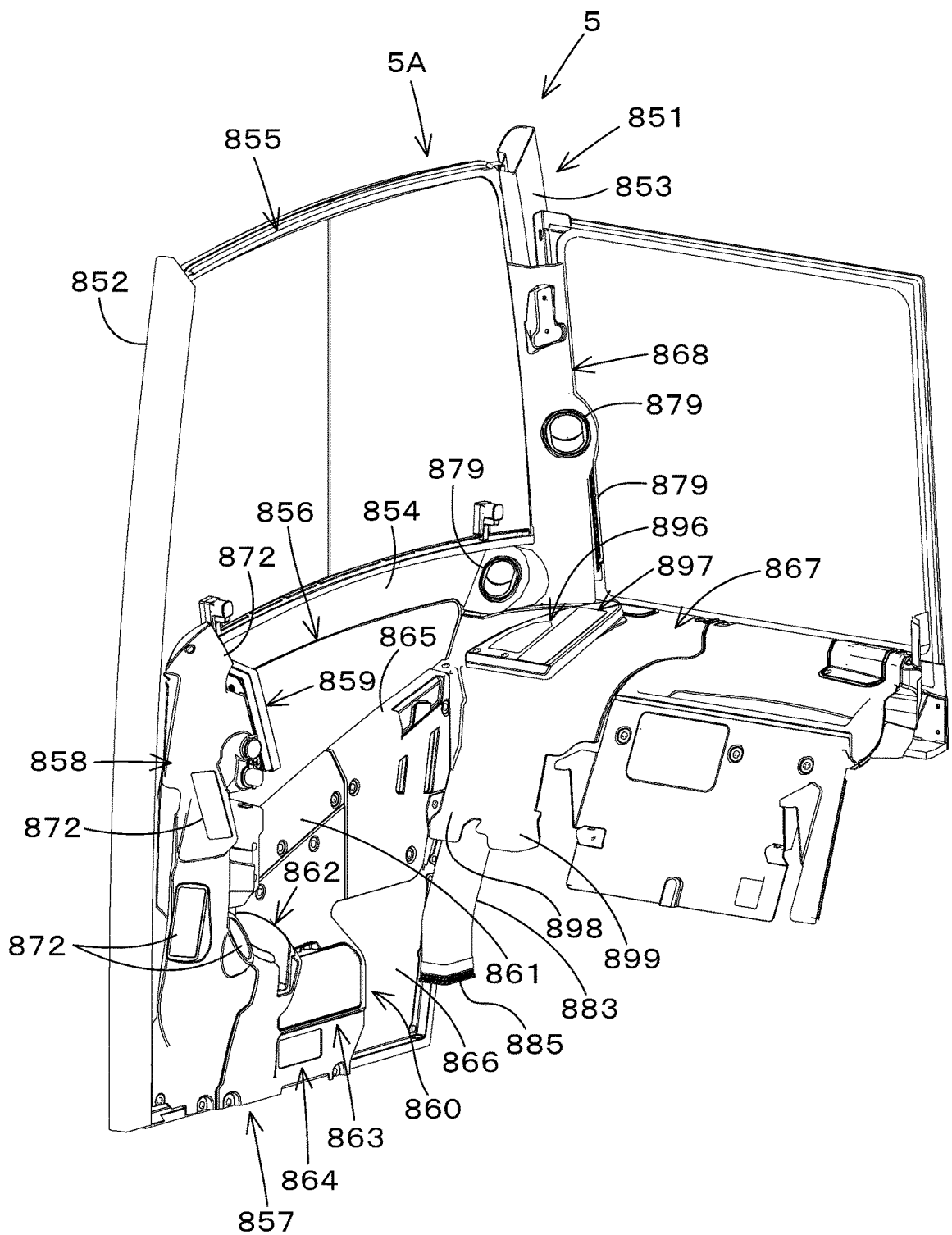
FIG. 101 is a perspective view of the right side surface of the cabin as seen from the front of the interior of the cabin.

FIGS. 100 and 101 illustrate a right side surface portion 5A of the cabin 5 as viewed from the interior of the cabin 5.

As illustrated in FIGS. 100 and 101, the cabin 5 includes a cabin frame 851 which constitutes a framework. The cabin frame 851 includes a front pillar 852, a rear pillar 853, and a connection frame 854 which connects the front pillar 852 and the rear pillar 853. The connection frame 854 is provided on an intermediate portion in the top-bottom direction of the right side surface portion 5A of the cabin 5. A side window 855 which is configured to be opened and closed is provided above the connection frame 854. Furthermore, a fixed sash see-through window 856 is provided below the connection frame 854.

The right side surface portion 5A of the cabin 5 is provided with an interior cover 857 extending from a front portion to a rear portion. The interior cover 857 includes a front duct cover 858 provided on a front portion of the side surface portion 5A. The front duct cover 858 is provided with a display device (meter panel) 859 at its upper portion. The display device 859 includes a panel such as a liquid crystal panel. The panel displays items such as images of a surrounding area, operation conditions, mode changes, various settings, and/or warning regarding the working machine, and displays, as information relating to the working machine, information necessary for machine settings such as fuel level, time (a time of day), settings on height control, settings on automatic idling (AI) control, and/or arm restriction settings. The items displayed on the display unit are examples, and do not imply limitation.

As illustrated in FIGS. 100 and 101, the interior cover 857 includes a first front cover (first interior cover) 860 and a second front cover 861 provided rearward of the front duct cover 858. The first front cover 860 is located below the second front cover 861, and the second front cover 861 is provided below the see-through window 856. The first front cover 860 has a drink holder 862 to hold a beverage container, an openable/closable lid 863 configured to be opened and closed, and an opening 864. The drink holder 862 is provided on an upper front portion of the first front cover 860. The openable/closable lid 863 is provided on an intermediate portion in the top-bottom direction of a rear portion of the first front cover 860. The opening 864 is formed below the openable/closable lid 863.

As illustrated in FIGS. 100 and 101, the interior cover 857 includes a middle cover 865 provided rearward of the first front cover 860 and the second front cover 861. The middle cover 865 is disposed diagonally upward and rearward of the first front cover 860 and rearward of the second front cover 861. There is no interior cover 857 below the middle cover 865. That is, the middle cover 865 includes an open bottom portion (portion rearward of a lower portion of the first front cover 860), and a side plate 866 of the cabin frame 851 to which the interior cover 857 is attached is exposed.

As illustrated in FIGS. 100 and 101, the interior cover 857 includes a rear cover (second interior cover) 867 and a rear duct cover 868 provided rearward of the side surface portion 5A. The rear duct cover 868 is disposed above the rear cover 867.

Figure 102:
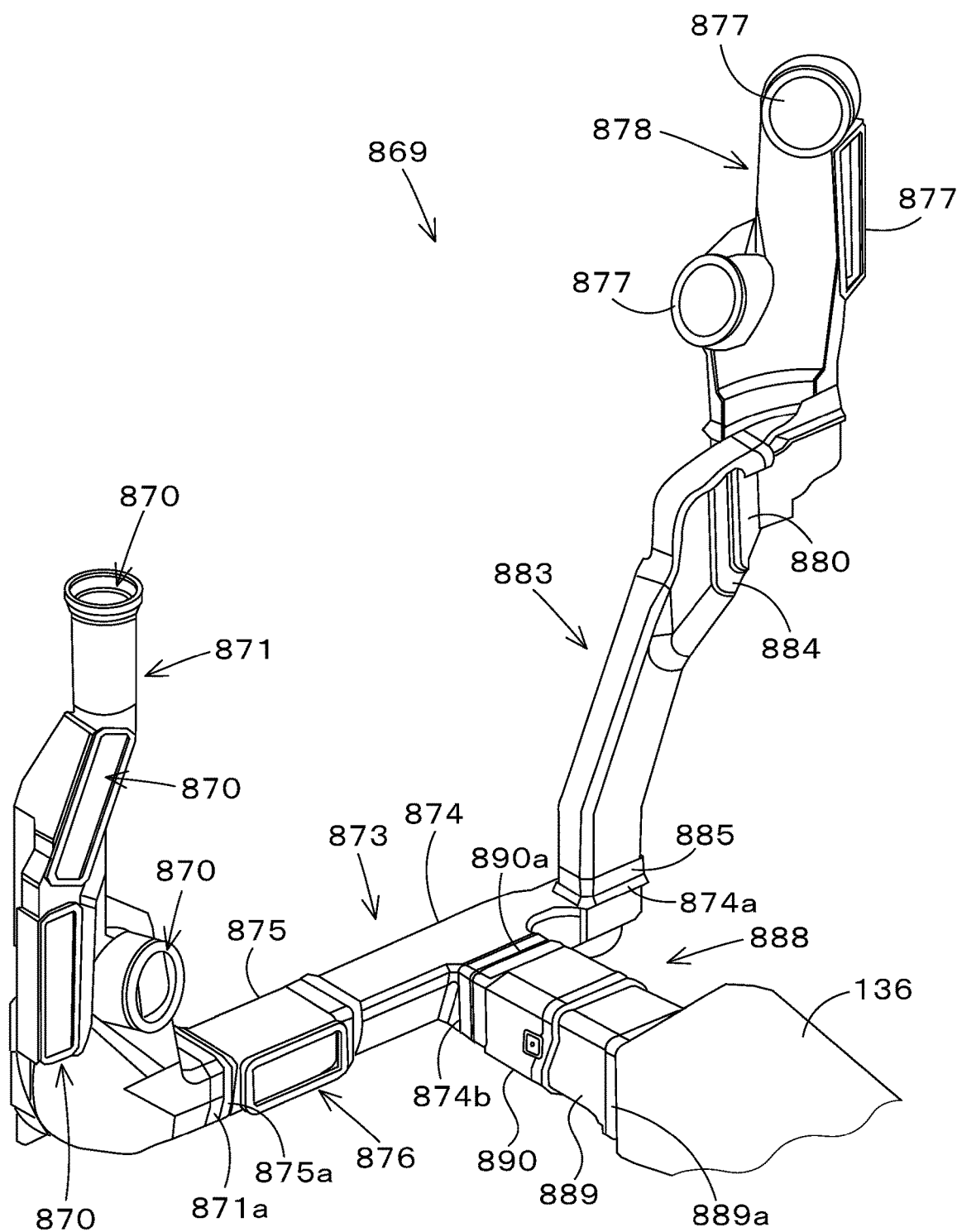
FIG. 102 illustrates an assembled duct device.
Figure 103:
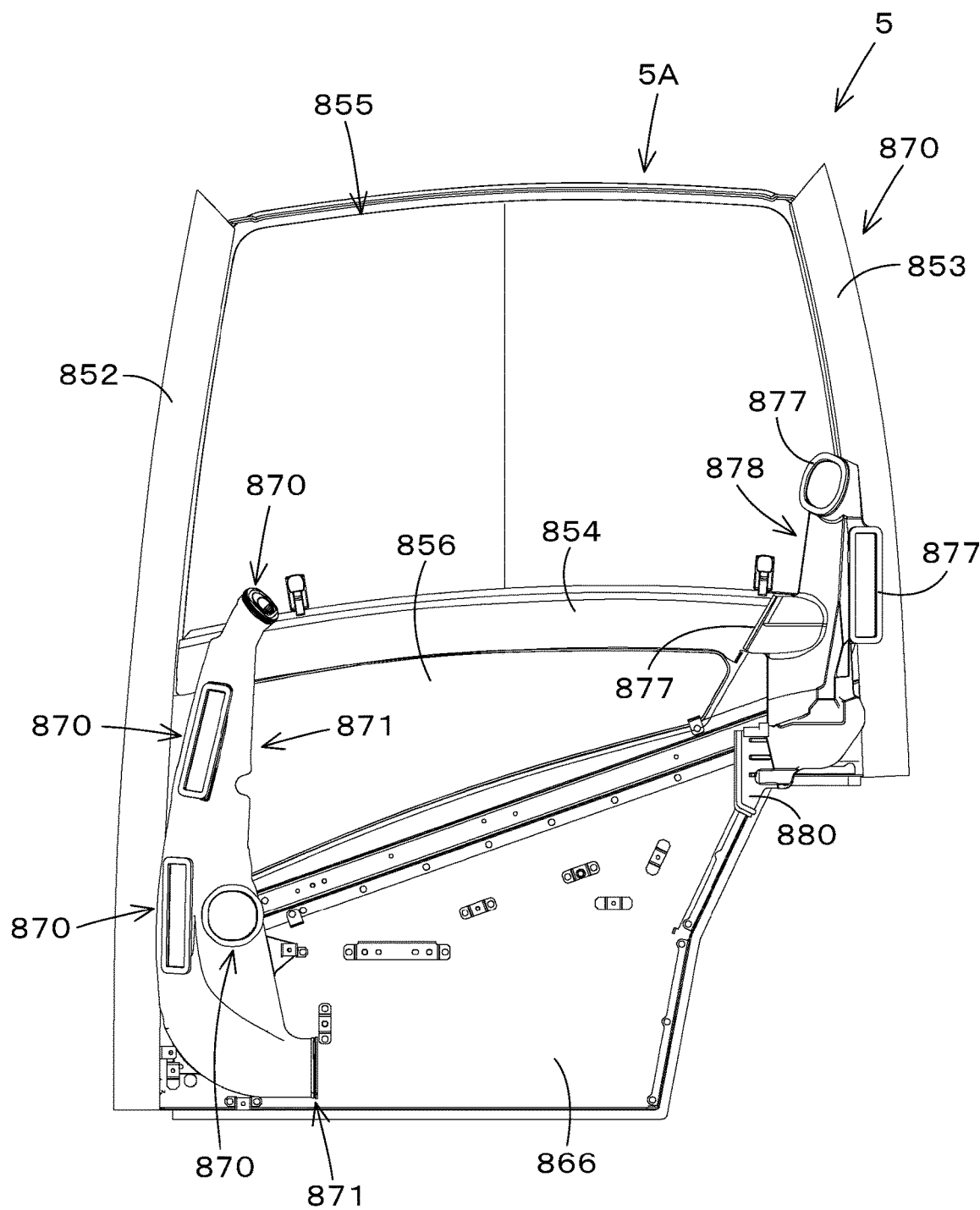
FIG. 103 is a side view of the right side surface of the cabin as seen from the inside of the cabin.

As illustrated in FIG. 102, the working machine 1 includes a duct device 869 which causes circulation of conditioned air discharged from the air conditioner main body 136. The duct device 869 includes a first flow duct 871 including a plurality of first air outlets 870 through which conditioned air from the air conditioner main body 136 is discharged. The first flow duct 871 constitutes a front portion of the duct device 869. As illustrated in FIG. 103, the first flow duct 871 is disposed on a front portion of the side surface portion 5A. Furthermore, the first flow duct 871 is covered with the front duct cover 858. The front duct cover 858 includes a plurality of air outlet portions 872 corresponding to the plurality of first air outlets 870 (see FIG. 100). Conditioned air discharged from the plurality of first air outlets 870 is discharged into the cabin 5 through the plurality of air outlet portions 872. The first flow duct 871 has a connection opening 871a in a rear portion of a lower portion thereof. The connection opening 871a is open toward the rear.

As illustrated in FIG. 102, the duct device 869 includes a first connection duct 873 which guides conditioned air from the air conditioner main body 136 to the first flow duct 871. The first connection duct 873 is disposed rearward of a lower portion of the first flow duct 871. Specifically, the first connection duct 873 is disposed rearward of the connection opening 871a of the first flow duct 871. Furthermore, the first connection duct 873 is substantially in the form of a straight line extending along the machine body front-rear direction K1. The first connection duct 873 is covered with the first front cover 860.

Figure 104:
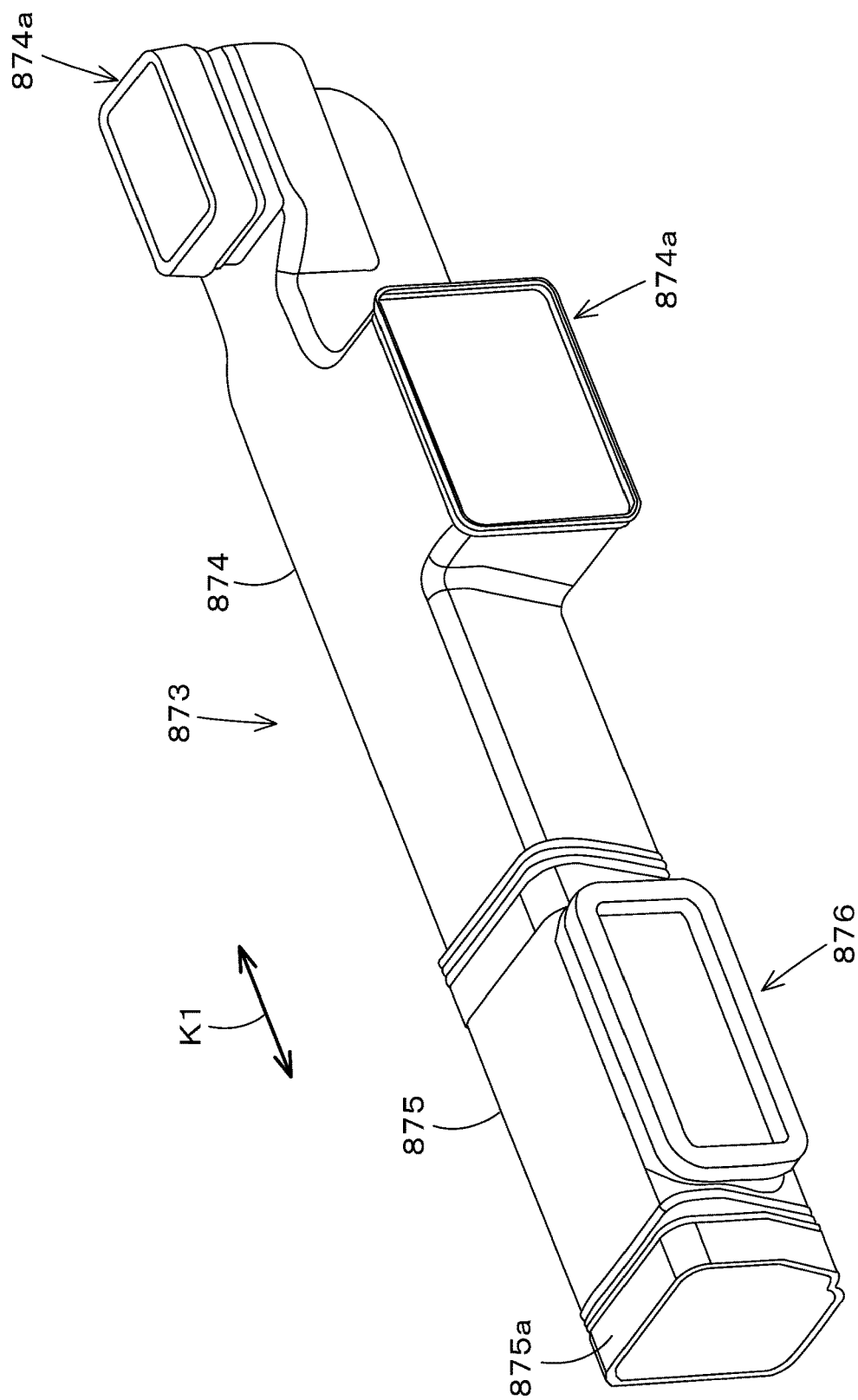
FIG. 104 is a perspective view of a first connection duct.

As illustrated in FIG. 104, the first connection duct 873 includes a main duct 874 and a sub-duct 875. The main duct 874 is in the form of a tube extending along the front-rear direction K1. The front end of the main duct 874 along the lengthwise direction is open in a forward direction, and the rear end of the main duct 874 is closed. The main duct 874 has, in a rear portion thereof, a first connection opening (fourth connection portion) 874a and a second connection opening 874b. The first connection opening 874a is formed in a rear edge portion of an upper surface of the main duct 874, and is in the form of a quadrangle which is open in upward direction. The second connection opening 874b is formed forward of the first connection opening 874a. The second connection opening 874b is formed in a left side surface (side surface) of the main duct 874, and is in the form of a quadrangle that is open in a leftward direction. A rear portion of the main duct 874 projects rearward relative to a rear edge of a lower portion of the first front cover 860. That is, the first connection opening 874a and the second connection opening 874b are located rearward of the first front cover 860. Note that a rear edge portion of the main duct 874 is disposed rearward of the floor step and rightward of the grommet body 723, and the second connection opening 874b is disposed so as to face the air outlet 804 of the air conditioner main body 136 along the machine body-width direction K2 (this is not illustrated).

The sub-duct 875 is in communication with a front portion of the main duct 874. The sub-duct 875 includes a connection opening 875a which is connected to the connection opening 871a of the first flow duct 871. Furthermore, the sub-duct 875 is fitted on a font portion of the main duct 874 such that the sub-duct 875 is movable along the front-rear direction K1, and is configured to move toward and away from the connection opening 871a of the first flow duct 871. That is, the first connection duct 873 is expandable and contractable along the front-rear direction K1 (lengthwise direction). Furthermore, the first connection duct 873 guides conditioned air from the rear toward the front. Thus, the first connection duct 873 is expandable and contractable along a direction in which air is guided (direction of flow of the conditioned air). The sub-duct 875 includes a side air outlet 876 which is open in a leftward direction in a left side surface (side surface). The side air outlet 876 corresponds to the opening 864 of the first front cover 860. Conditioned air discharged from the side air outlet 876 is discharged into the cabin 5 through the opening 864 of the first front cover 860.

As illustrated in FIG. 102, the duct device 869 includes a second flow duct 878 including a plurality of second air outlets 877 through which conditioned air from the air conditioner main body 136 is discharged. The second flow duct 878 constitutes a rear portion of the duct device 869. As illustrated in FIG. 103, the second flow duct 878 is disposed on a rear portion of the side surface portion 5A of the cabin 5. Specifically, the second flow duct 878 is disposed on a lower portion of the rear pillar 853. The second flow duct 878 is covered with the rear duct cover 868. The rear duct cover 868 includes a plurality of air outlet portions 879 corresponding to the plurality of second air outlets 877 (see FIG. 100). Conditioned air discharged from the plurality of second air outlets 877 is discharged into the cabin 5 via the plurality of air outlet portions 879. A connection opening (third connection portion) 880 is formed in a lower portion of the second flow duct 878.

Figure 105:
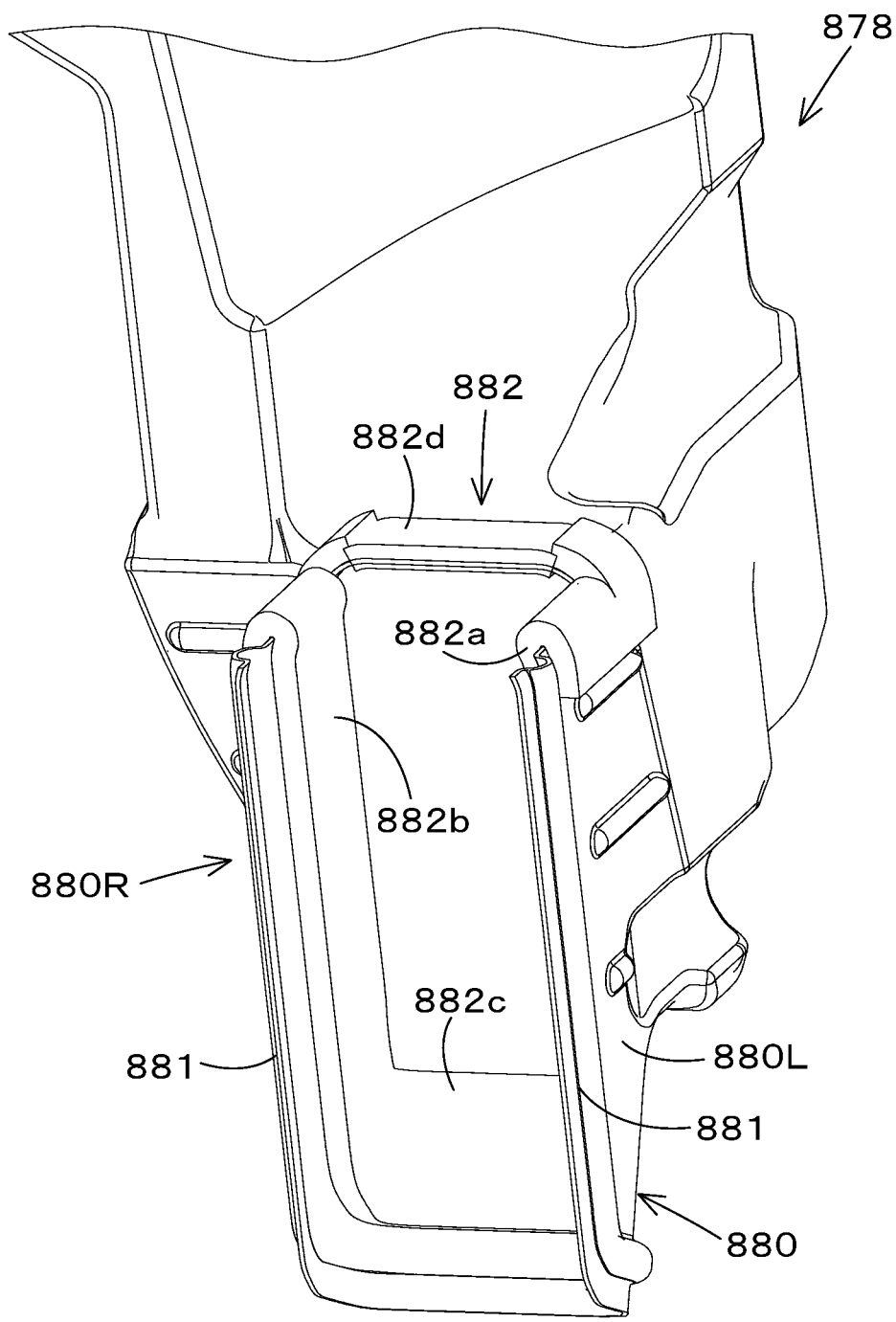
FIG. 105 is a perspective view of a lower portion of a second flow duct.

As illustrated in FIG. 105, the connection opening 880 of the second flow duct 878 is open in a forward direction (horizontal direction). Furthermore, an upper portion of the connection opening 880 is open in an upward direction. Specifically, there is a cutout between upper portions of one side wall 880L of the connection opening 880 and an opposite side wall 880R opposite the one side wall 880L. The one side wall 880L has a guide portion 881L on a front portion thereof. The opposite side wall 880R also has a guide portion 881R on a front portion thereof. The guide portions 881L and 881R extend throughout the connection opening 880 in the top-bottom direction. The connection opening 880 is provided with a sealing member 882. The sealing member 882 includes a first section 882a which extends from an upper edge to a lower edge of the one side wall 880L, a second section 882b which extends from an upper edge to a lower edge of the opposite side wall 880R, a third section 882c which connects together lower edges of the first section 882a and the second section 882b, and a fourth section 882d which connects together rear portions of the first section 882a and the second section 882b.

As illustrated in FIG. 102, the duct device 869 includes a second connection duct 883 which connects the second flow duct 878 and the first connection duct 873. The second connection duct 883 is covered with the rear cover 867 (see FIG. 100). The second connection duct 883 extends from the first connection opening 874a of the main duct 874 to the connection opening 880 of the second flow duct 878. A lower portion of the second connection duct 883 is in the form of a tube extending along the top-bottom direction. Furthermore, the second connection duct 883 is inclined rearward in a bottom-to-top direction. The second connection duct 883 include, in an upper portion thereof, an upper connection opening (first connection portion) 884 connected to the connection opening 880 of the second flow duct 878, and includes, in a lower portion thereof, a lower connection opening (second connection portion) 885 connected to the first connection opening 874a of the first connection duct 873. The upper connection opening 884 is open in a rearward direction (horizontal direction), and the lower connection opening 885 is open in a downward direction.

Figure 106:
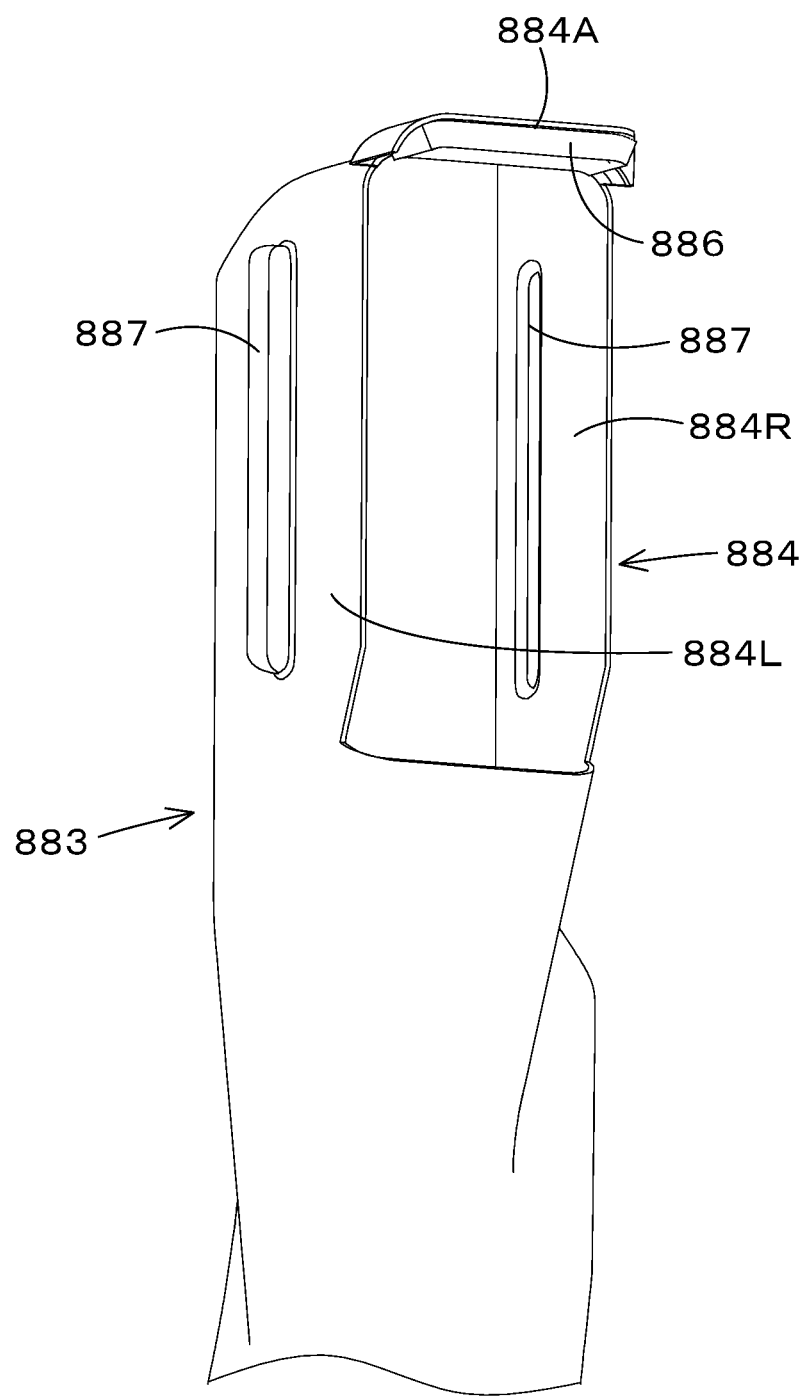
FIG. 106 is a perspective view of an upper portion of a second connection duct.

As illustrated in FIG. 106, the upper connection opening 884 includes, at an upper portion thereof, an upper wall 884A which projects rearward. The upper wall 884A has a sealing member 886 adhering to a lower surface thereof. The upper connection opening 884 includes one side wall 884L and an opposite side wall 884R opposite the one side wall 884L. The one side wall 884L and the opposite side wall 884R have a rib 887. The rib 887 projects outward and extends along the top-bottom direction.

Figure 107:
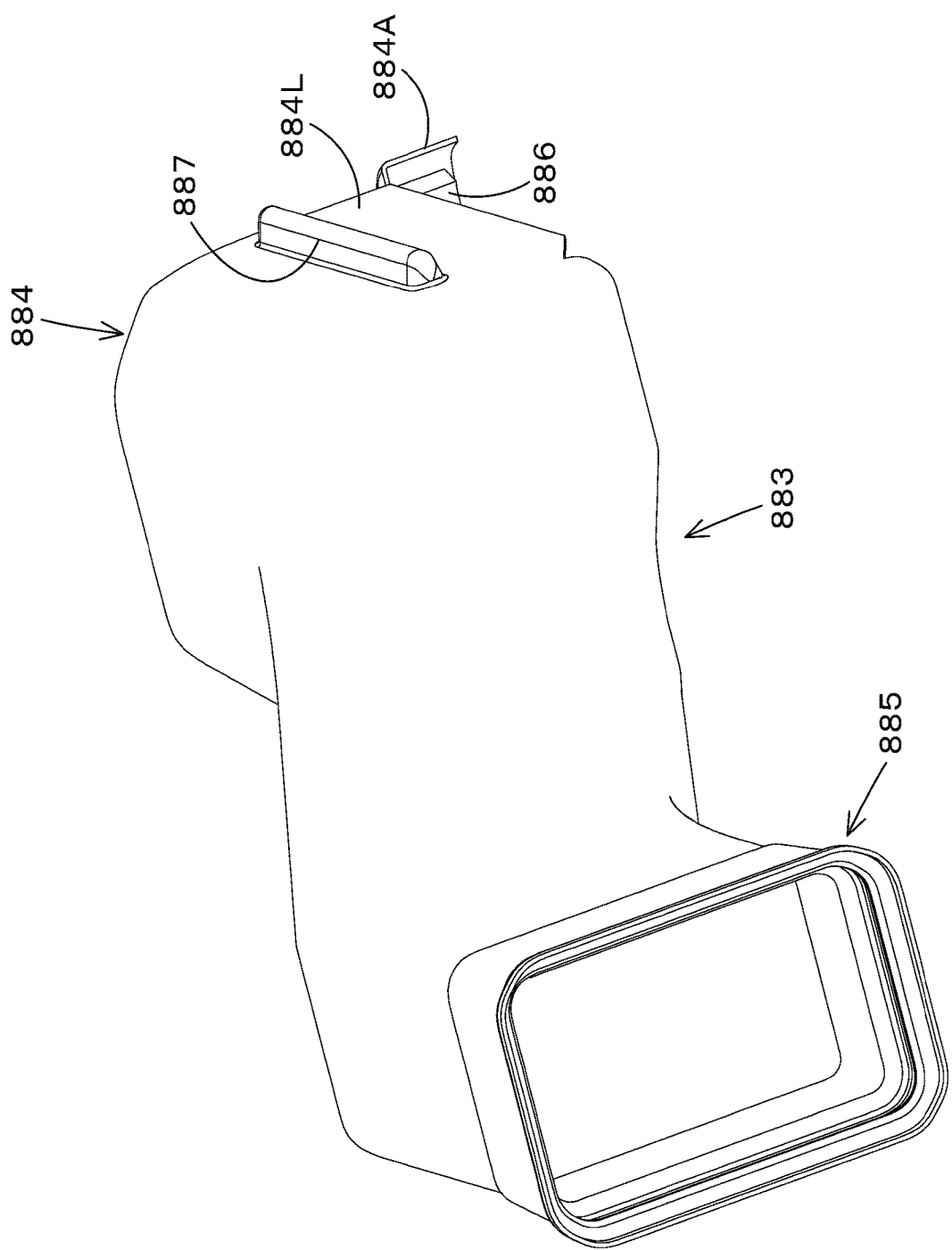
FIG. 107 is a perspective view of the second connection duct as seen from below.

As illustrated in FIG. 107, the lower connection opening 885 is in the form of a quadrangle corresponding to the first connection opening 874a of the main duct 874.

Figure 108:
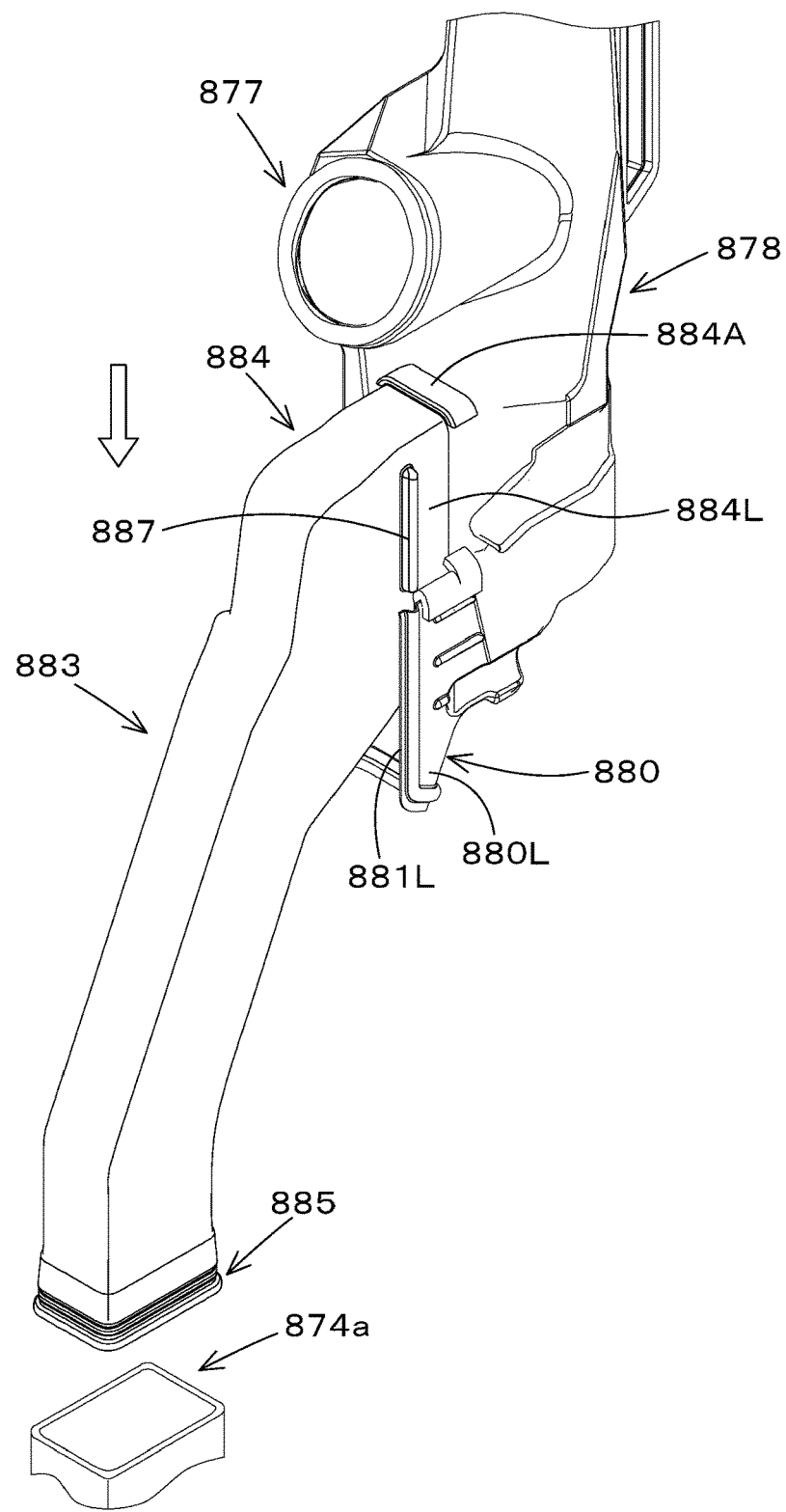
FIG. 108 is a perspective view showing a manner in which the second connection duct is connected.

As illustrated in FIG. 108, the second connection duct 883 is lowered from above, so that the upper connection opening 884 is connected to the connection opening 880 of the second flow duct 878 and the lower connection opening 885 is connected to the first connection opening 874a of the first connection duct 873. Specifically, the upper connection opening 884 is inserted between the one side wall 880L and the opposite side wall 880R of the connection opening 880 from above and engaged (inserted and engaged). In so doing, the ribs 887 are brought into engagement with the guide portions 881. With this, the downward movement of the second connection duct 883 is guided, and, after the engagement, the upper connection opening 884 and the connection opening 880 are prevented from separating from each other. Furthermore, the one side wall 884L of the upper connection opening 884 is brought into contact with the first section 882a of the sealing member 882, and the opposite side wall 884R is brought into contact with the second section 882b. Furthermore, a lower portion of the upper connection opening 884 is brought into contact with the third section 882c, and the sealing member 886 on the lower surface of the upper wall 884A is brought into contact with the fourth section 882d. As such, sealing between the upper connection opening 884 and the connection opening 880 is achieved.

Furthermore, the lower connection opening 885 is connected to the first connection opening 874a by fitting the first connection opening 874a from above. The lower connection opening 885 fits the first connection opening 874a with the sealing member therebetween. The second connection duct 883 can be easily connected to the second flow duct 878 and the first connection duct 873 merely by lowering the second connection duct 883 from above, making it possible to reduce working time. It is also possible to connect the second connection duct 883 even in a small space.

As illustrated in FIG. 102, the duct device 869 includes a third connection duct 888 which connects the first connection duct 873 (main duct 874) and the air conditioner main body 136. The third connection duct 888 includes a first duct portion 889 which is connected to the air conditioner main body 136, and a second duct portion 890 which is connected to the main duct 874. The first duct portion 889 has a connection opening 889a which is connected to the air outlet 804 of the air conditioner main body 136, and the second duct portion 890 has a connection opening 890a which is connected to the second connection opening 874b of the main duct 874. The first duct portion 889 and the second duct portion 890 are in the form of a tube extending along the machine body-width direction K2.

Figure 109:
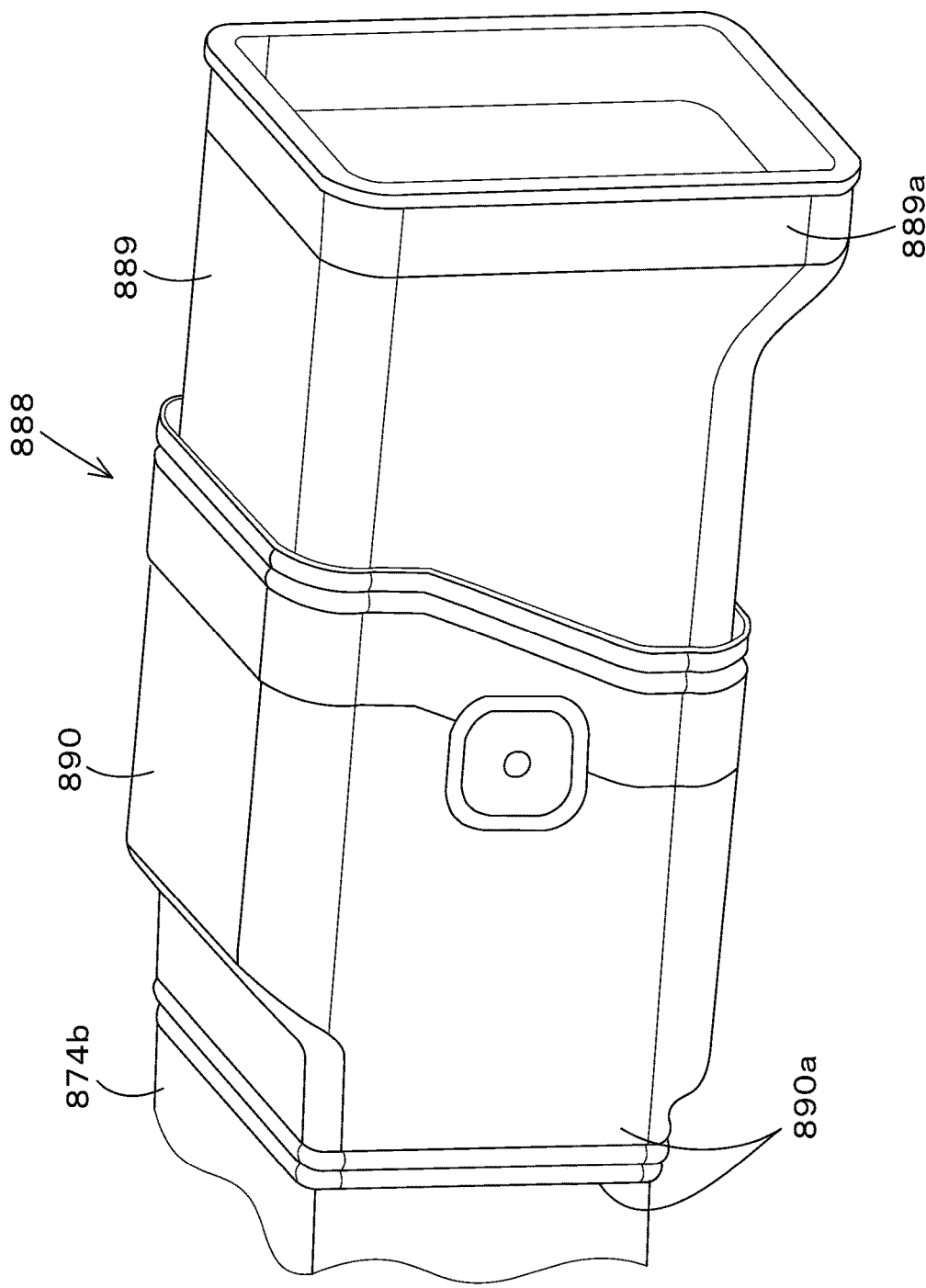
FIG. 109 is a perspective view showing a third connection duct in an expanded state.
Figure 110:
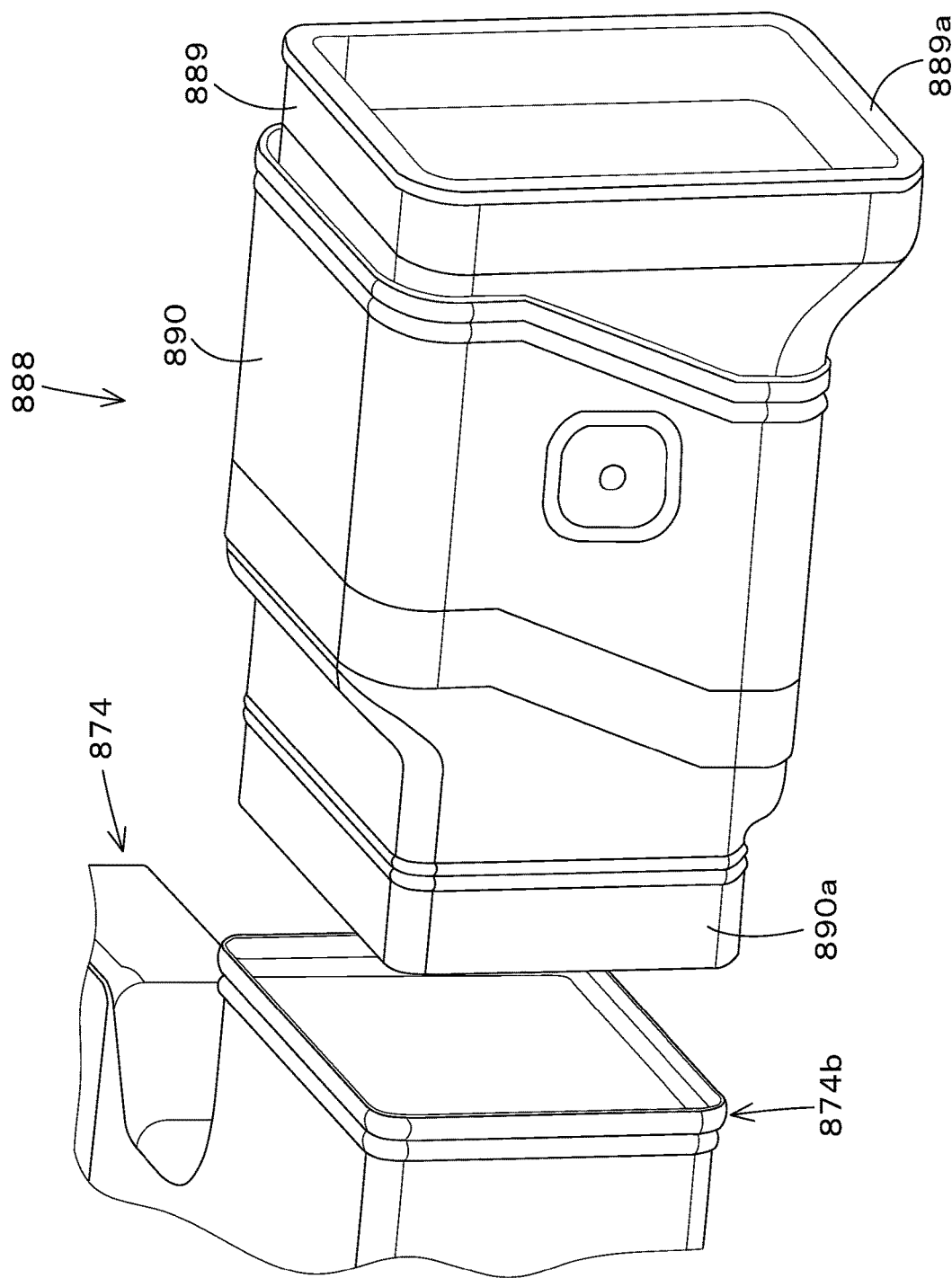
FIG. 110 is a perspective view showing the third connection duct in a contracted state.

As illustrated in FIGS. 109 and 110, the second duct portion 890 fits the first duct portion 889 such that the second duct portion 890 is movable along the machine body-width direction K2 (lengthwise direction), and is configured to move toward and away from the second connection opening 874b (main duct 874). That is, the third connection duct 888 is expandable and contractable along the machine body-width direction K2. Furthermore, the third connection duct 888 guides conditioned air from left to right. Thus, the third connection duct 888 is expandable and contractable along a direction in which air is guided.

Figure 111:
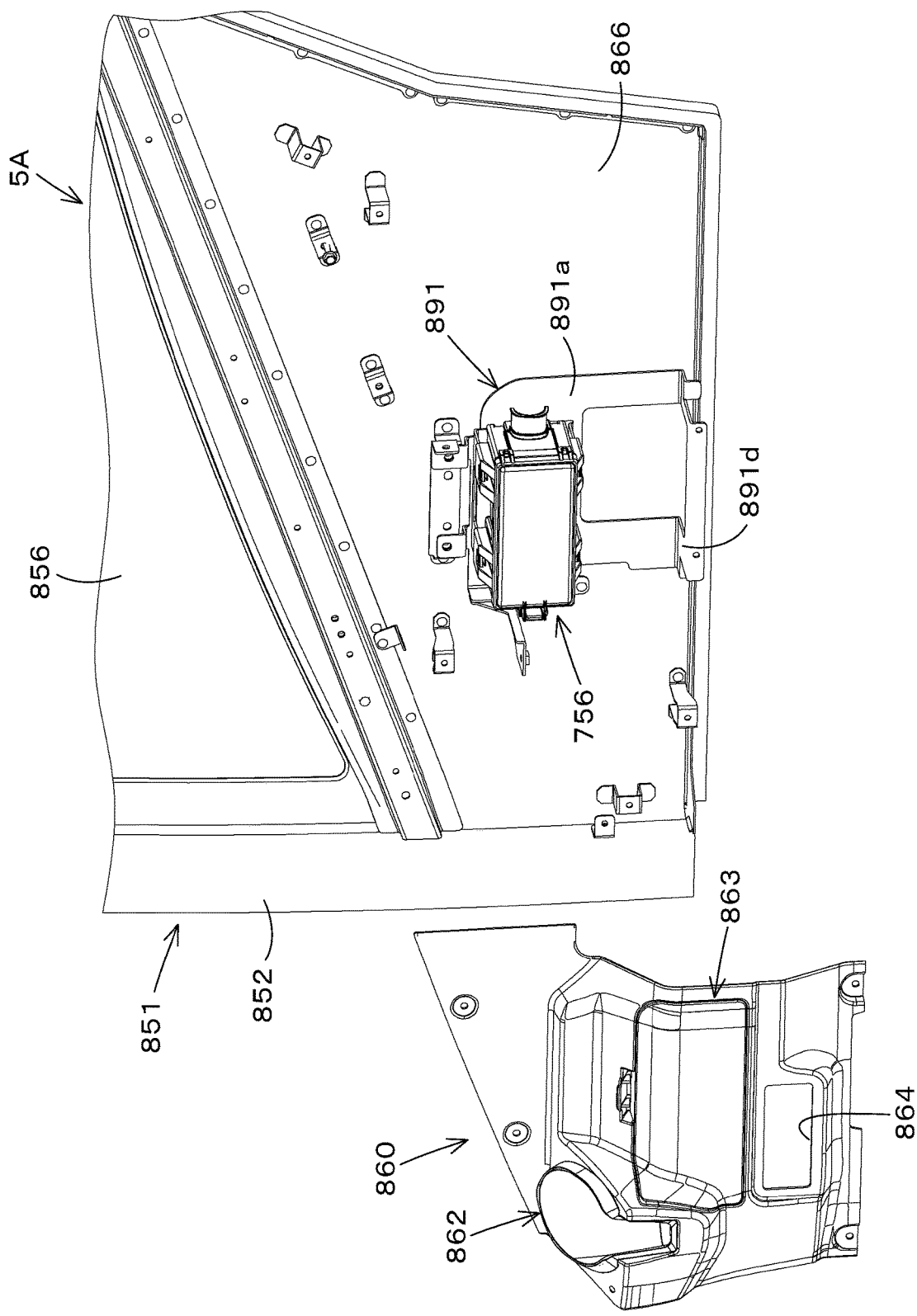
FIG. 111 is an exploded perspective view showing a part in which a relay fuse box is attached.

As illustrated in FIG. 111, a relay fuse box (apparatus) 756 is disposed between the first front cover 860 and the side plate 866 of the cabin frame 851. The relay fuse box 756 is attached to a box bracket 891. The box bracket 891 is attached to the side plate 866. The relay fuse box 756 is disposed at a position corresponding to the openable/closable lid 863, and can be accessed by opening the openable/closable lid 863.

Figure 112:
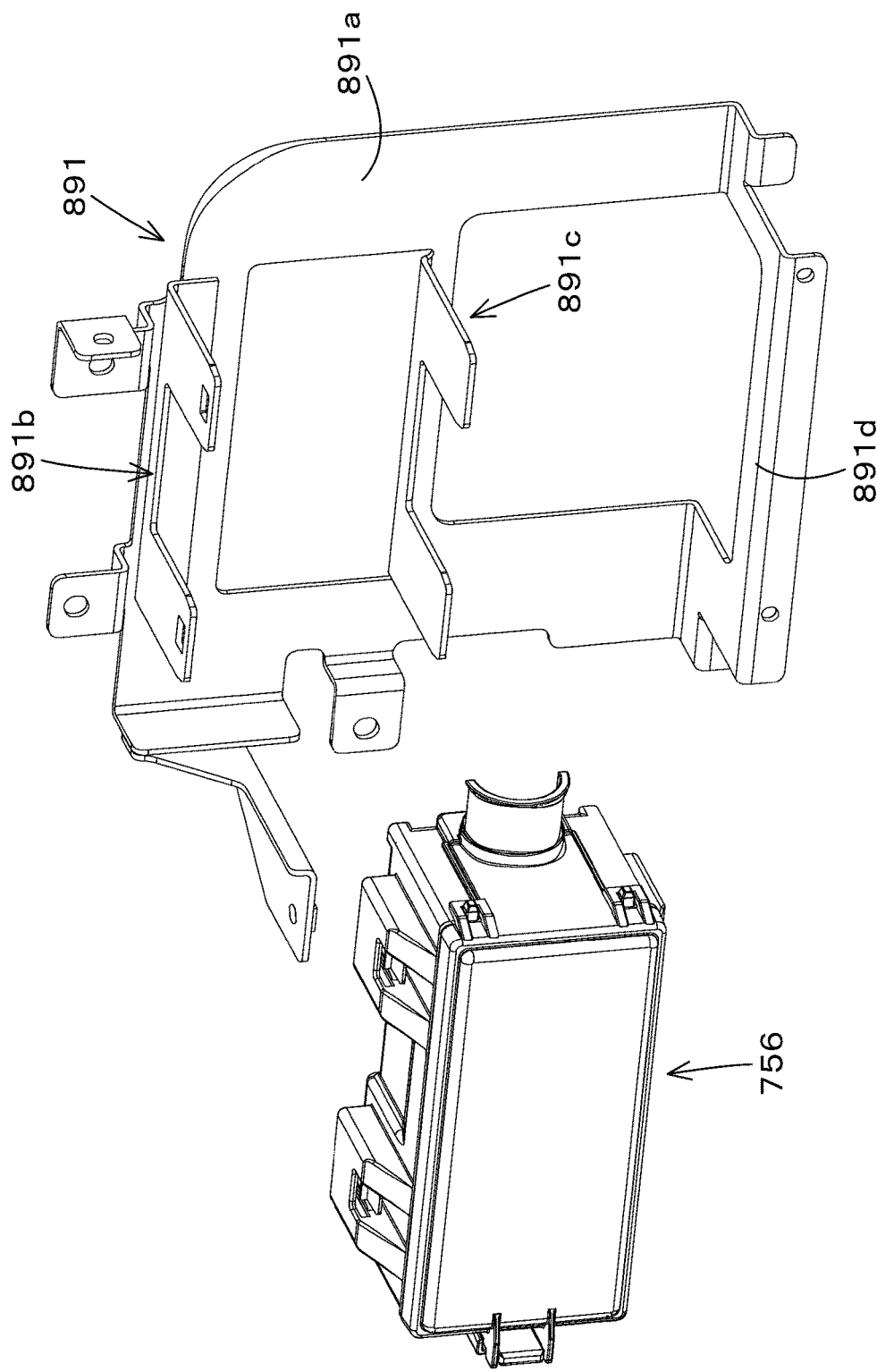
FIG. 112 is a perspective view of the relay fuse box and a box bracket.

As illustrated in FIG. 112, the box bracket 891 includes an upright plate portion 891a. The upright plate portion 891a has, fixed to an upper portion thereof, a pair of box stays 891b and 891c which are arranged along the top-bottom direction with a space therebetween. The relay fuse box 756 is attached between the pair of box stays 891b and 891c. The upright plate portion 891a is provided with, at a lower portion thereof, a rest plate 891d which extends leftward. There is a space between the rest plate 891d and the lower box stay 891c so that the first connection duct 873 can be placed. That is, the first connection duct 873 is placed on the rest plate 891d, and the relay fuse box 756 is disposed above the first connection duct 873.

The cabin 5, the duct device 869, the relay fuse box 756, and the like are mounted in the following manner.

First, the first flow duct 871 and the second flow duct 878 are mounted on the cabin 5 (subassembled), and the front duct cover 858, the second front cover 861, the middle cover 865, and the rear duct cover 868 are mounted on the cabin 5 (subassembled). Furthermore, the third connection duct 888 in its contracted state is connected to the air outlet 804 of the air conditioner main body 136. The air conditioner main body 136, the seat base 83, the movable body 85, the operator's seat 6, and the like are mounted on the floor step 52 before the cabin 5 is mounted.

Next, the cabin 5 is mounted, and then the relay fuse box 756, the first connection duct 873, the second connection duct 883, the first front cover 860, and the rear cover 867 are attached.

Figure 113:
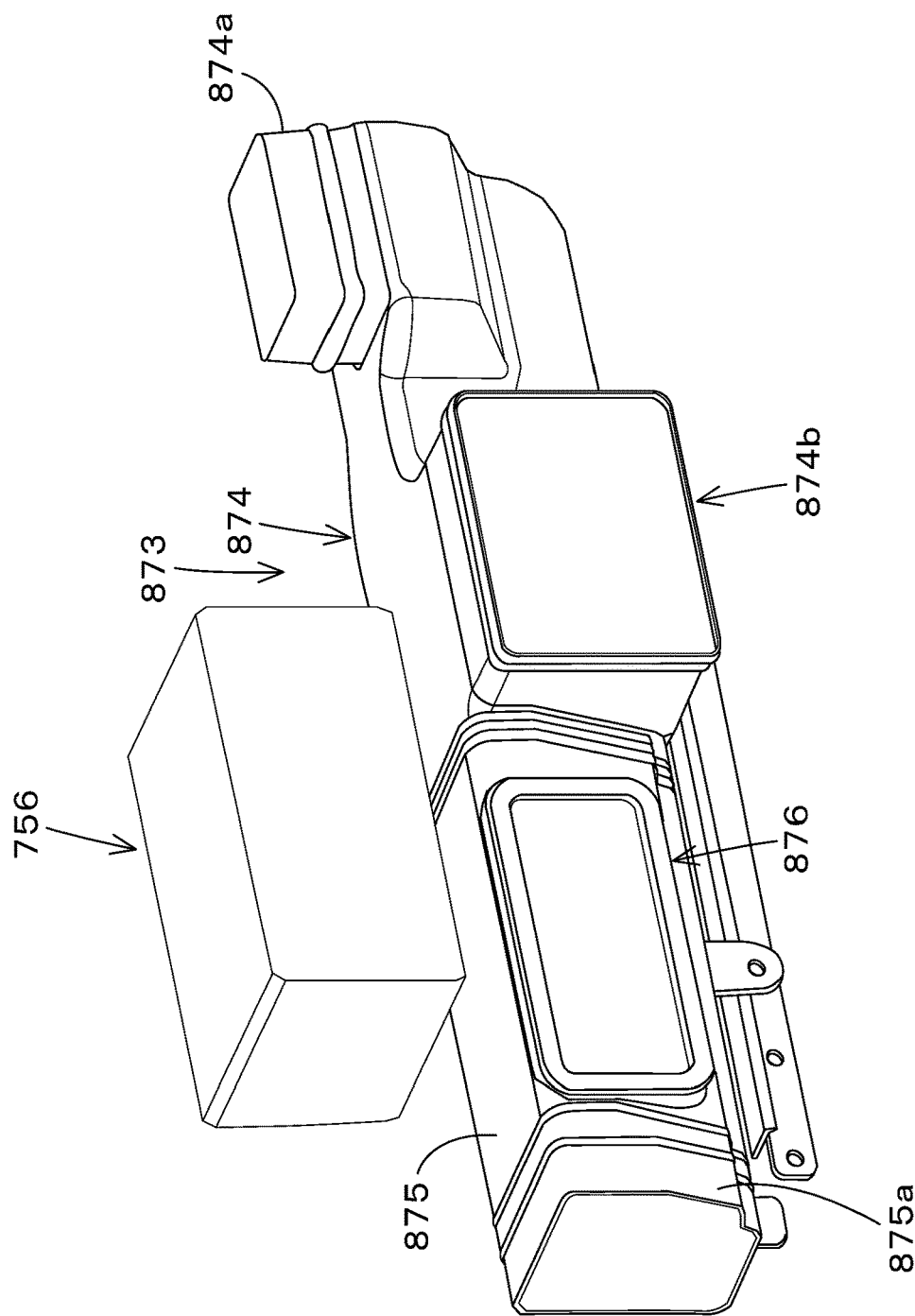
FIG. 113 is a perspective view showing the first connection duct in a contracted state.

First, the box bracket 891 with the relay fuse box 756 attached thereto is attached to the side plate 866 of the cabin 5. Next, the fifth harness portion 730E is connected to the relay fuse box 756. Next, as illustrated in FIG. 113, the first connection duct 873 in the contracted state is disposed below the relay fuse box 756 and placed on the rest plate 891d. Next, the main duct 874 is attached to the box bracket 891 and the side plate 866, and the sub-duct 875 is moved forward toward the connection opening 871a of the first flow duct 871, and connected to the connection opening 871a. Next, the second connection duct 883 is connected to the second flow duct 878 and the main duct 874, and the second duct portion 890 of the third connection duct 888 is moved rightward toward the second connection opening 874b of the first connection duct 873 and connected to the second connection opening 874b. Then, the first front cover 860 is attached and the rear cover 867 is attached.

With the above configuration, the first flow duct 871, the second flow duct 878, and the third connection duct 888, and the front duct cover 858, the rear duct cover 868, the second front cover 861, and the middle cover 865 of the interior cover 857 can be subassembled before the cabin 5 is mounted. This makes it possible to reduce the time for mounting in the main line of the production line of the working machine 1.

Figure 114:
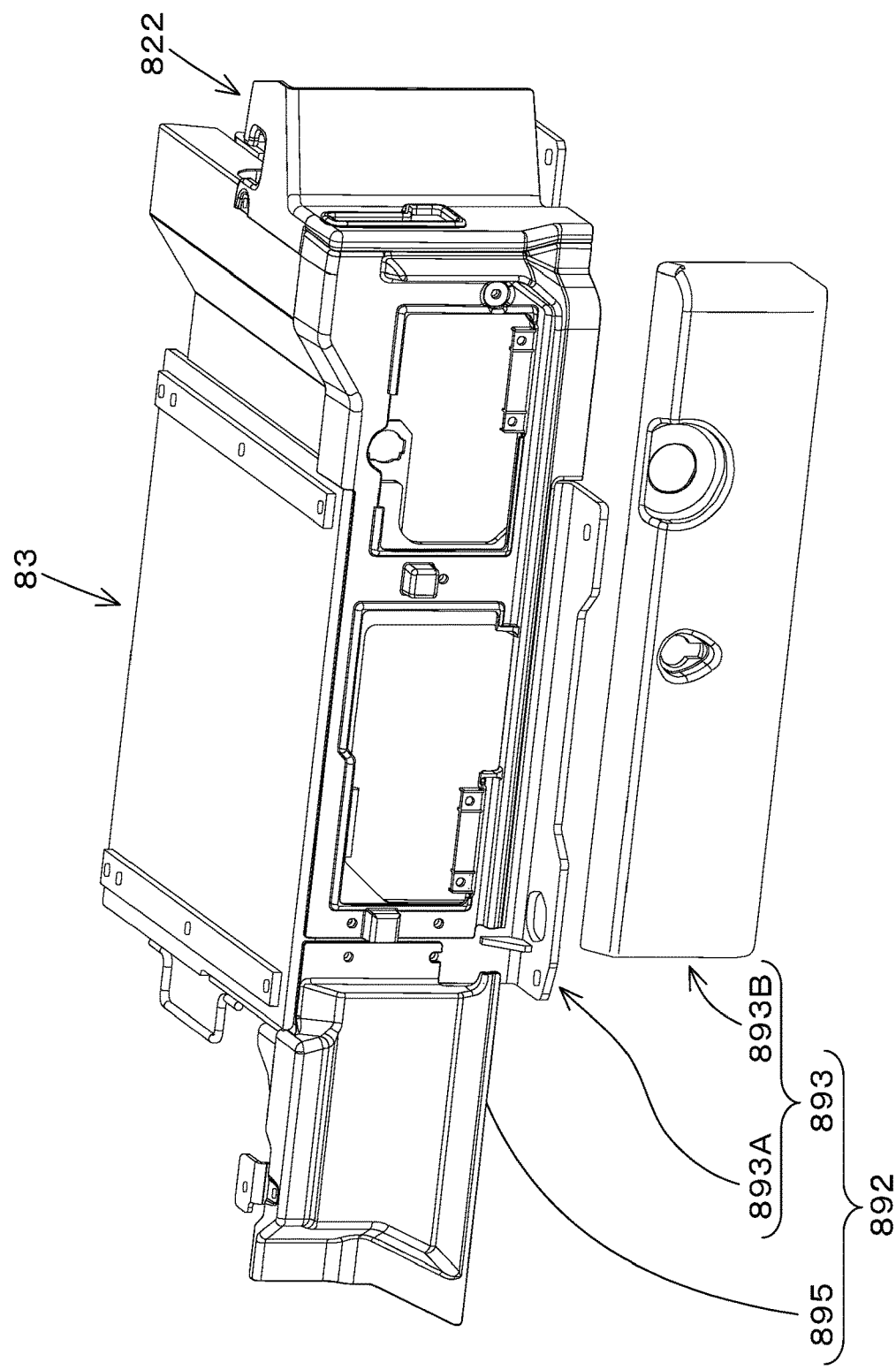
FIG. 114 is a perspective view of a front cover.

As illustrated in FIG. 114, the seat base 83 is provided with a front cover 892 at a front portion thereof. The front cover 892 includes a main cover 893 and a sub-cover 895. The main cover 893 includes a cover frame 893A and an openable/closable cover 893B. The cover frame 893A is attached to the seat base 83, and the openable/closable cover 893B is attached to the cover frame 893A such that the openable/closable cover 893B is openable and closable. The main cover 893 is disposed at a front portion of the seat base 83, and covers the front side of the air conditioner main body 136.

The sub-cover 895 is disposed rightward of the main cover 893. The sub-cover 895 has a left portion attached to the seat base 83, and projects rightward from the seat base 83. The sub-cover 895 covers the front side of the third connection duct 888. The sub-cover 895 and the openable/closable cover 893B are attached after the third connection duct 888 is mounted.

As such, the front cover 892 is divided into the main cover 893 corresponding to the front side of the air conditioner main body 136 and the sub-cover 895 corresponding to the front side of the third connection duct 888. Since the portion of the front cover 892 that corresponds to the third connection duct 888 is a separate cover, the cover frame 893A can be subassembled on the seat base 83 before the cabin 5 is mounted. This makes it easy to do the work of mounting. Furthermore, by simply performing the replacement of the sub-cover 895, this configuration can be easily applied to cabins 5 having different lengths.

Figure 115:
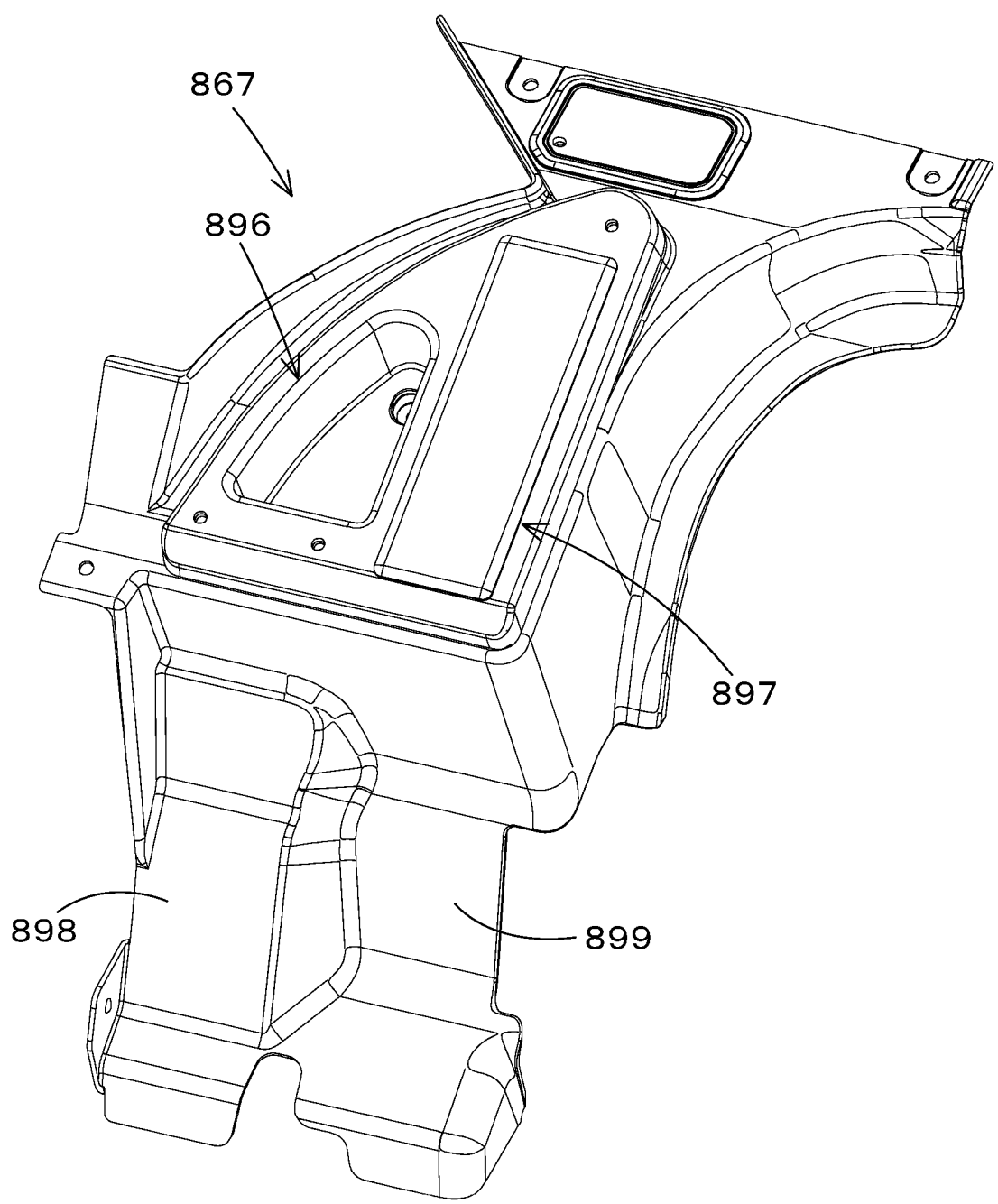
FIG. 115 is a perspective view of a rear cover.

FIG. 115 illustrates the rear cover 867. The rear cover 867 is provided with, at an upper portion thereof, a mounting portion 897 to which a glove compartment 896, audio equipment (radio unit), and/or the like can be mounted. The rear cover 867 is provided with, on the right side of a front portion thereof, a duct cover part 898 which covers an upper portion of the second connection duct 883 (see FIG. 100). The rear cover 867 is provided with, on the left side of the front portion thereof, a hose cover part 899 disposed above the hydraulic hose 732.

Figure 116:
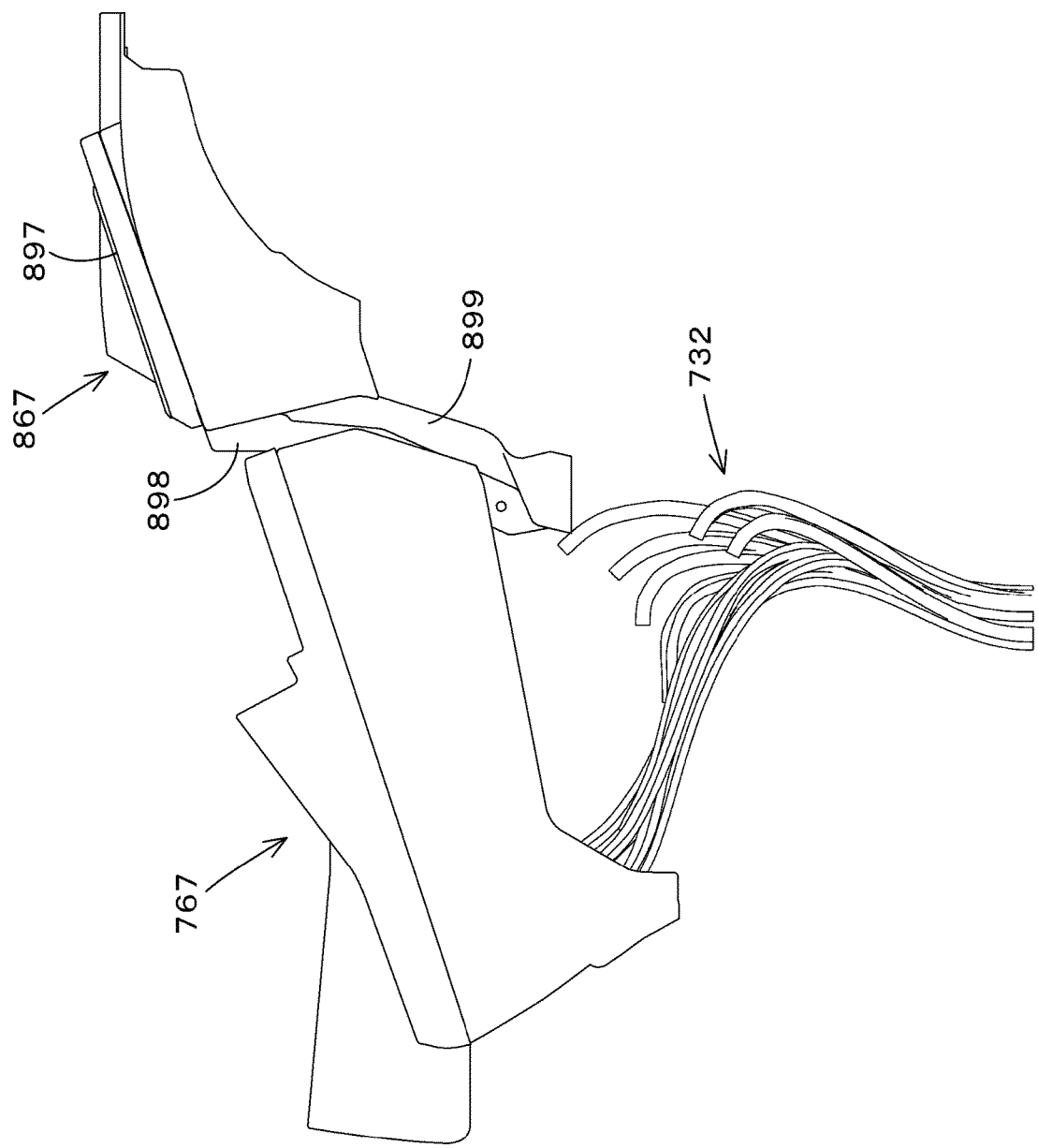
FIG. 116 is a side view showing a relationship between the rear cover and a console cover.

As illustrated in FIG. 116, a rear portion of the console cover 767 is located within an upper portion of the hose cover part 899. That is, the console cover 767 is disposed above the hydraulic hose 732 and is positioned such that the console cover 767 overlaps the hydraulic hose 732 and the interior cover 857 (hose cover part 899) when seen from the operator seated on the operator's seat 6. With this, even when the console 79R is moved forward or rearward together with the operator's seat 6, the hydraulic hose 732 is hidden by the hose cover part 899 from the operator.

A working machine 1 of the present embodiment includes a floor step 52 which defines a floor surface, and a grommet body 723 which is attached to the floor step 52 and which is for passage of a harness 730 of electrical wires and a hydraulic hose 732, wherein the grommet body 723 is divided into a grommet main body 740 which is composed of a part (first part 731A) of a harness grommet portion 731 for passage of the harness 730 and a hose grommet portion 733 for passage of the hydraulic hose 732 which are integral with each other, and a grommet part 741 having another part (second part 731B) which together with the part 731A forms the harness grommet portion 731.

With this configuration, since the grommet main body 740 includes the part 731A of the harness grommet portion 731 and the hose grommet portion 733 which are integral with each other and the grommet part 741 has the other part 731B of the harness grommet portion 731, it is possible to mount the grommet body 723 in a small space and possible to easily mount the harness 730.

The harness grommet portion 731 is divided into the part 731A and the other part 731B such that a harness through-hole 735 for passage of the harness 730 is divided into two.

With this configuration, by joining the other part 731B of the harness grommet portion 731 to the part 731A of the harness grommet portion 731 under the conditions in which the harness 730 is in contact with the part 731A, it is possible to easily pass the harness 730 through the harness grommet portion 731.

The working machine 1 further includes an operator's seat 6 mounted on the floor step 52 such that the operator's seat 6 is adjustable in position along a front-rear direction, and pilot valves 734L and 734R to which the hydraulic hose 732 is connected, wherein the pilot valves 734L and 734R move along the front-rear direction together with the operator's seat 6, the hose grommet portion includes a corrugated portion 733b in a corrugated form which expands and contracts along a top-bottom direction, and the hose grommet portion includes a clamping member 739 to clamp a part of the hose grommet portion 733 which part is located higher than the corrugated portion 733b toward the hydraulic hose 732.

With this configuration, as the hydraulic hose 732 moves as the operator's seat 6 is adjusted in position, the hose grommet portion 733 in the corrugated form expands or contracts to follow that movement. This makes it possible to prevent the hydraulic hose 732 from going down below the hose grommet portion 733 and hindering the position adjustment of the operator's seat 6.

The floor step 52 includes a main plate 724 which has an opening 726, and a cover plate 725 which is detachably attached to the main plate 724 and which closes the opening 726, and the grommet body 723 has a holding groove 745 which fits an edge portion of the opening 726 and is fixed to the main plate 724 with the cover plate 725.

With this configuration, the cover plate 725 which closes the opening 726 also serves as a member to fix the grommet body 723, making it possible to achieve a simpler configuration.

The holding groove 745 is a continuous groove formed in the grommet main body 740 and the grommet part 741, the grommet body 723 has an insertion groove 747 which is a continuous groove formed in the grommet main body 740 and the grommet part 741, and the cover plate 725 has an insertion portion 748 to be inserted into the insertion groove 747.

With this configuration, it is possible to fix the grommet body 723 with a simple configuration.

The grommet part 742 is pressed against the grommet main body 740 from a machine body-forward side toward a machine body-rearward side, and the cover plate 725 is inserted into the insertion groove 747 from the machine body-forward side and attached to the main plate 724.

This configuration makes it possible to easily attach the grommet part 742 to the grommet main body 740.

The working machine 1 further includes an operator's seat 6 mounted on the floor step 52, wherein the grommet body 723 is disposed on one of opposite sides of the operator's seat 6 in a machine body-width direction K2 such that the harness grommet portion 731 and the hose grommet portion 733 are arranged along the machine body-width direction K2, and the hose grommet portion 733 is provided on the opposite side of the harness grommet portion 731 from the operator's seat 6.

With this configuration, the harness grommet portion 731 is disposed more distant from the operator's seat 6, making it possible to increase the curvature of the hydraulic hose 732. Furthermore, the harness grommet portion 731 is disposed closer to the operator's seat 6, making it possible to easily pass the harness 730 through the harness grommet portion 731 under the conditions in which the hydraulic hose 732 is passed through the hose grommet portion 733.

A working machine 1 includes a machine body 2, a cabin 5 mounted on the machine body 2, an air conditioner main body 136 provided in the cabin 5, an outside air intake duct 810 for intake of outside air into the air conditioner main body 136, and an engaging portion 823 configured to engage with the outside air intake duct 810, wherein the cabin 5 has a mounting opening 796 for attachment of an outside air-entrance portion of the outside air intake duct 810, the outside air intake duct 810 is expandable and contractable, and the engaging portion 823 is configured to engage with the outside air intake duct 810 in a contracted state in which the outside air intake duct 810 is contracted in a direction away from the mounting opening 796.

With this configuration, it is possible to mount the outside air intake duct 810 on the machine body 2 while keeping the outside air intake duct 810 in the contracted state, making it possible to mount the outside air intake duct 810 on the machine body 2 before mounting the cabin 5 on the machine body 2. This makes it possible to improve mountability of the outside air intake duct 810.

The mounting opening 796 has a size which allows access to the outside air intake duct 810 engaged with the engaging portion 823 from outside of the cabin 5 in order to attach the outside air intake duct 810 to the mounting opening 796.

With this configuration, the attachment of the outside air intake duct 810 to the mounting opening 796 can be performed from the outside of the cabin 5, making it possible for an operator different from an operator within the cabin 5 to perform the attachment of the outside air intake duct 810.

The cabin 5 includes a wall body (side wall 794) which has the mounting opening 796, the outside air intake duct 810 includes a body portion 811 formed of an elastic body and expandable and contractable and an outside-air-entrance-side connection portion 812 to be connected to a part of the wall body 794 that has the mounting opening 796 with the body portion 811 in an expanded state, the outside-air-entrance-side connection portion 812 includes an outside air intake 815 inserted in the mounting opening 796 and a flange 816 which protrudes from the outside air intake 815 to abut on an outer surface of the wall body 794, and the flange 816 is configured to be taken out of the wall body 794 through the mounting opening 796.

With this configuration, the flange 816 can be held on the part of the wall body around the mounting opening 796, making it easy to perform the attachment of the outside-air-entrance-side connection portion 812.

The cabin 5 includes a cover wall 795 which is disposed outward of the wall body 794 so as to face the wall body 794 and which covers the outside-air-entrance-side connection portion 812 and an outside air inlet 798 which is defined by the wall body 794 and the cover wall 795 and which is for intake of outside air, and the outside-air-entrance-side connection portion 812 includes a partition wall 818 which projects from the flange 816 and which abuts on the cover wall 795 at portions upward and forward of the outside air intake 815.

This configuration makes it possible to prevent water from entering the outside air intake duct 810 from the portions upward and forward of the outside-air-entrance-side connection portion 812.

The working machine 1 further includes a main harness 730 routed on the machine body 2, a cabin harness 827 routed on the cabin 5, a main-harness-side connector 757 which is attached to the main harness 730 and which is disposed in the vicinity of the mounting opening 796 within the cabin 5, and a cabin-harness-side connector 826 which is attached to the cabin harness 827 and which is configured to be connected to the main-harness-side connector 757 through the mounting opening 796 from outside of the cabin 5.

This configuration makes it possible to easily connect the main-harness-side connector 757 and the cabin-harness-side connector 826 through the mounting opening 796. Furthermore, it is possible for an operator different from an operator within the cabin 5 to connect the connector 757 and the connector 826.

The working machine 1 further includes a floor step 52 which defines a floor surface at an upper portion of the machine body 2 and to which the air conditioner main body 136 is attached, a seat base 83 which is attached to the floor step 52 and to which the main harness 730 is attached, an air conditioner harness 760 connected to the air conditioner main body 136, an AC connector on one side 759 attached to the air conditioner harness 760, an AC connector on an opposite side 758 which is attached to the main harness 730 and which is connected to the AC connector on one side 759, and an engagement member 830 which is provided on the air conditioner main body 136 and which is for temporary placement of the AC connector on one side 759 before the seat base 83 is attached to the floor step 52.

With this configuration, since the AC connector on one side 759 is temporarily placed on the engagement member 830, it is possible to prevent the AC connector on one side 759 from being damaged when the seat base 83 is mounted.

A working machine 1 includes a machine body 2, a cabin 5 mounted on the machine body 2, a floor step 52 which defines a floor surface at an upper portion of the machine body 2, an air conditioner main body 136 attached to the floor step 52, a first flow duct 871 attached to the cabin 5 and including a first air outlet 870 through which conditioned air from the air conditioner main body 136 is discharged, a first connection duct 873 to guide the conditioned air from the air conditioner main body 136 to the first flow duct 871, and an interior cover 857 which covers the first flow duct 871 and the first connection duct 873 within an interior of the cabin 5, wherein the first connection duct 873 is detachably attached to the first flow duct 871, and the interior cover 857 includes a first interior cover (first front cover 860) which is a separate part that corresponds to the first connection duct 873.

With this configuration, since the first connection duct 873 is detachable from and attachable to the first flow duct 871 and the part of the interior cover 857 that corresponds to the first connection duct 873 is a separate part, it is possible to subassemble the first flow duct 871 and the part of the interior cover 857 that coves the first flow duct 871 on the cabin 5 before mounting the cabin 5. This makes it possible to reduce the time for the work of mounting the duct and the interior cover 857 which covers the duct.

The working machine 1 further includes a second flow duct 878 which includes a second air outlet 877 through which conditioned air from the air conditioner main body 136 is discharged, and a second connection duct 883 which connects the second flow duct 878 and the first connection duct 873, wherein the second connection duct 883 includes a first connection portion (upper connection opening 884) connected to the second flow duct 878 by being lowered from above and a second connection portion (lower connection opening 885) connected to the first connection duct 873 by being lowered from above.

This configuration makes it possible to subassemble the second flow duct 878 on the cabin 5 before mounting the cabin 5, and also possible to easily connect the second flow duct 878 and the first connection duct 873 with the second connection duct 883.

The second flow duct 878 includes a third connection portion (connection opening 880) which is open in a horizontal direction, the first connection duct 873 includes a fourth connection portion (first connection opening 874a) which is open in an upward direction, the first connection portion 884 is open in a/the horizontal direction and is brought into communication with the third connection portion 880 by being inserted into the third connection portion 880 from above, and the second connection portion 885 is open in a downward direction and is brought into communication with the fourth connection portion 874a by fitting the fourth connection portion 874a from above.

This configuration makes it possible to easily connect the second connection duct 883 to the second flow duct 878 and the first connection duct 873 in a small space.

The first connection duct 873 includes a main duct 874 to which the second connection duct 883 is connected and a sub-duct 875 connected to the first flow duct 871, and the sub-duct 875 is configured to move toward and away from the first flow duct 871.

This configuration makes it possible to easily connect the first connection duct 873 to the first flow duct 871 in a small space.

The working machine 1 further includes a third connection duct 888 which connects the main duct 874 and the air conditioner main body 136, the third connection duct 888 includes a first duct portion 889 connected to the air conditioner main body 136 and a second duct portion 890 connected to the main duct 874, and the second duct portion 890 is configured to move toward and away from the main duct 874.

This configuration makes it possible to achieve a simple configuration of the first connection duct 873, making it possible to improve mountability.

The interior cover 857 includes a second interior cover (rear cover 867) which is a separate part that corresponds to the second connection duct 883.

This configuration makes it possible to subassemble the part of the interior cover 857 that includes the second interior cover 867 before mounting the cabin 5, making it possible to improve mountability.

The working machine 1 further includes an operator's seat 6, a seat base 83 on which the operator's seat 6 is mounted and which is attached to the floor step 52, a harness 730 of electrical wires supported on the seat base 83, and an apparatus (relay fuse box 756) to which the harness 730 is connected, wherein the apparatus 756 is disposed above the first connection duct 873 and is covered with the first interior cover 860.

Since the apparatus 756 to be mounted is disposed within the first interior cover 860 after the cabin 5 is mounted, mountability is improved.

A working machine 1 includes an operator's seat 6, a first console cover 767A disposed at a lateral side of the operator's seat 6, a second console cover 767B disposed on the opposite side of the first console cover 767A from the operator's seat 6, a wire member (first wire member 752A) which is connected to an operation unit 783 provided in a front portion of the second console cover 767B, and a lever member (dozer lever 80) which is disposed rearward of the operation unit 783, wherein the wire member 752A is routed within the second console cover 767B in a rear-to-front direction, and the second console cover 767B is disposed at a lateral side of the first console cover 767A by being lowered from above such that the wire member 752A passes between the lever member 80 and the first console cover 767A.

With this configuration, since the wire member 752A is routed within the second console cover 767B in the rear-to-front direction and then the second console cover 767B is disposed at a lateral side of the first console cover 767A by being lowered from above such that the wire member 752A passes between the lever member 80 and the first console cover 767A, it is possible to efficiently mount the console cover.

The first console cover 767A includes a wire receiver 790 to receive the wire member 752A from below.

This configuration makes it possible to prevent the wire member 752A from interfering with a component below the wire member 752A.

The wire receiver 790 includes a receiver wall 790a located below the wire member 752A and a lateral wall 790b which extends upward from the receiver wall 790a at a machine body-outward side of the wire member 752A.

With this configuration, the lateral wall 790b prevents the wire member 752A from being displaced from the wire receiver 790.

The working machine 1 further includes a valve (dozer valve 774) which is disposed below the first console cover 767A and which is to be operated with the lever member 80, and a lever stay 775 which connects the valve 774 and the lever member 80, wherein the lever stay 775 includes a valve mounting portion 791 which is attached to the valve 774 and a lever fixing portion 792 which extends from the valve mounting portion 791 toward the lever member 80 through an area below the wire receiver 790 and to which the lever member 80 is fixed.

With this configuration, since the wire member 752A passes through an area above the lever stay 775, it is possible to dispose the second console cover 767B at a lateral side of the first console cover 767A by lowering the second console cover 767B from above.

The second console cover 767B has a recessed groove 787 which is open in a machine body-outward direction and which is defined by a front surface portion 787a located forward of the lever member 80, a rear surface portion 787b located rearward of the lever member 80, and a side surface portion 787c located at a machine body-inward side of the lever member 80, and the lever member 80 is disposed in the recessed groove 787.

With this configuration, even when the second console cover 767B is composed of a front portion and a rear portion which are integral with each other, it is possible to dispose the second console cover 767B with the lever member 80 mounted thereon at a lateral side of the first console cover 767A.

A working machine 1 incudes a machine body 2, a floor step 52 which defines a floor surface at an upper portion of the machine body 2 and which has an opening 726, a seat base 83 attached to the floor step 52, a movable body 85 supported on the seat base 83 such that the movable body 85 is adjustable in position along a front-rear direction, an operator's seat 6 mounted on the movable body 85, consoles 79L and 79R which are disposed at opposite sides of the operator's seat 6 and which are attached to the movable body 85, and a harness 730 of electrical wires, wherein the harness 730 includes a first harness portion 730A which is routed upward from a lower surface side of the floor step 52 through the opening 726 at the same side of the seat base 83 as the console 79R that is one of the consoles, and a second harness portion 730B and a third harness portion 730C each of which branches off from the first harness portion 730A at a position lower than an upper edge of the seat base 83, the second harness portion 730B extends upward at the same side of the seat base 83 as the console 79R that is one of the consoles and is routed to the console 79R that is the one of the consoles, the third harness portion 730C extends between the upper edge of the seat base 83 and an upper surface of the floor step 52 toward the console 79L that is the other of the consoles, extends upward at the opposite side of the seat base 83, and is routed to the console 79L that is the other of the consoles.

With this configuration, the first harness portion 730A, which is routed upward from the lower surface side of the floor step 52, is divided into the second harness portion 730B and the third harness portion 730C at a position lower than the upper edge of the seat base 83, the second harness portion 730B extends upward at the same side of the seat base 83 as the console 79R that is one of the consoles and is routed to the console 79R that is the one of the consoles, and the third harness portion 730C extends between the upper edge of the seat base 83 and the upper surface of the floor step 52 toward the console 79L that is the other of the consoles, extends upward at the same side of the seat base 83 as the console 79L that is the other of the consoles, and is routed to the console 79L that is the other of the consoles. This makes it possible to provide an extra length for the harness 730 to move in the working machine 1 in which the operator's seat 6 and the consoles 79L and 79R are adjustable in position together along the front-rear direction.

The working machine 1 further includes a prime mover E1 provided rearward of the operator's seat 6, and a partition wall member 22A which separates a prime mover chamber E2 housing the prime mover E1 and an area where the operator's seat 6 is, wherein the seat base 83 includes a top panel 713 which is disposed above the floor step 52 with a space therebetween and which supports the movable body 85, and the third harness portion 730C is routed in an area forward of the partition wall member 22A and below a rear portion of the top panel 713.

This configuration makes it possible to route the third harness portion 730C in a space in front of the partition wall member 22A and below the rear portion of the top panel 713.

The movable body 85 includes a support (suspension 88) on which the operator's seat 6 is supported such that the operator's seat 6 is adjustable in position along the front-rear direction, and a slide frame 87 which is supported on the seat base 83 such that the slide frame 87 is adjustable in position along the front-rear direction, the slide frame 87 includes a main mounting portion (first mounting portion 87A) for attachment of the support 88, one mounting portion (third mounting portion 87R) which extends from the main mounting portion 87A in a machine body-width direction K2 and which is for attachment of the console 79R that is the one of the consoles, and an opposite mounting portion (second mounting portion 87L) which extends from the main mounting portion 87A in an opposite machine body-width direction K2 and which is for attachment of the console 79L that is the other of the consoles, the second harness portion 730B extends upward at a machine body-outward side of the one mounting portion 87R and is routed to the console 79R that is the one of the consoles, and the third harness portion 730C extends upward at a machine body-outward side of the opposite mounting portion 87L and is routed to the console 79L that is the other of the consoles.

With this configuration, since the second harness portion 730B and the third harness portion 730C are each routed at a position outward of the slide frame 87 which supports the consoles 79L and 79R and which moves along the front-rear direction, it is possible to easily provide an extra length for the harness 730 to move.

The working machine 1 further includes a hydraulic hose 732 which is routed upward from the lower surface side of the floor step 52 through the opening 726 at the same side of the seat base 83 as the console 79R that is the one of the consoles and then is routed to the console 79L that is the other of the consoles, wherein the hydraulic hose 732 is routed from one side to the opposite side behind the movable body 85.

With this configuration, by routing the third harness portion 730C and the hydraulic hose 732 separately through upper and lower routes, it is possible to easily route the third harness portion 730C and the hydraulic hose 732.

The harness 730 includes a fourth harness portion 730D and a fifth harness portion 730E branching off from the second harness portion 730B, the second harness portion 730B includes a main portion 751 which extends from the first harness portion 730A toward a portion at which the fourth harness portion 730D and the fifth harness portion 730E branch off and a routed-to-console portion 752 which extends upward from a portion at which the routed-to-console portion 752 branches off from the main portion 751 and is routed to the console 79R that is the one of the consoles, and the routed-to-console portion 752, the fourth harness portion 730D, and the fifth harness portion 730E are arranged along a front-rear direction K1.

This configuration can be easily applied to cabins 5 having different front-rear dimensions.

The working machine 1 further includes a cabin 5 mounted on the machine body 2, a hydraulic hose 732 which is routed upward from the lower surface side of the floor step 52 through the opening 726 at the same side of the seat base 83 as the console 79R that is the one of the consoles, and an interior cover 857 which is disposed above the hydraulic hose 732 within the cabin 5, wherein the console 79R that is the one of the consoles includes a console cover 767 which is disposed above the hydraulic hose 732 and which is positioned such that the console cover 767 overlaps the hydraulic hose 732 and the interior cover 857 when seen from an operator seated on the operator's seat 6.

With this configuration, the interior cover 857 and the console cover 767 prevent or reduce splashing of hydraulic fluid if the hydraulic hose 732 is damaged.

A working machine 1 includes an operator's seat 6, a top panel 713 which supports the operator's seat 6, a rail device (first rail device 84) to adjust a position of the operator's seat 6 in a front-rear direction, and a rail mounting plate 718 which has a mounting surface (upper surface 718a) for attachment of the rail device 84, wherein the top panel 713 has a mounting hole 719 to accommodate the rail mounting plate 718, and the rail mounting plate 718 is inserted in the mounting hole 718a and fixed by welding to the top panel 713.

With this configuration, since the rail mounting plate 718 is inserted in the mounting hole 719 in the top panel 713 and fixed by welding, it is possible to achieve flatness of the mounting surface 718a for the rail device 84 without being affected by welding distortion of the top panel 713. This makes it possible to improve the flatness of the mounting surface.

The rail mounting plate 718 is composed of a thick plate which is greater in plate thickness than the top panel 713, and is inserted in the mounting hole 719 and fixed by welding so as to project upward from the top panel 713.

With this configuration, it is possible to ensure strength for receiving a load from the operator's seat 6 acting on the rail device 84. Furthermore, it is possible to support the rail device 84 at a position higher than the top panel 713, and possible to prevent the rail device 84, sliding along the front-rear direction, from interfering with the top panel 713.

The rail mounting plate 718 is substantially twice as great in plate thickness as the top panel 713, and includes an upper portion projecting upward from the top panel 713.

With this configuration, it is possible to achieve sufficient flatness of the mounting surface 718a for the rail device 84 and also possible to ensure sufficient strength.

The working machine 1 further includes a mounting bolt 722 and a mounting nut 721 to attach the rail device 84, wherein the rail device 84 includes a lower rail 89 attached to the rail mounting plate 718 and an upper rail 90 supported on the lower rail 89 such that the upper rail 90 is moveable along the front-rear direction, the mounting nut 721 is fixed to a lower surface of the rail mounting plate 718, and the mounting bolt 722 passes through the lower rail 89 and the rail mounting plate 718 from above and is screwed into the mounting nut 721.

This configuration makes it possible to attach the lower rail 89 from above, making it easy to attach the lower rail 89.

The working machine 1 further includes a floor step 52 provided below the operator's seat 6, and a rear support leg 715 which supports a rear portion of the top panel 713, wherein the rear support leg 715 includes a support plate 716 which is fixed to a lower surface of the top panel 713 such that the support plate 716 intersects the mounting hole 719 in plan view and a leg part 717 which is fixed to the support plate 716 and which is attached to the floor step 52, and a lower surface of the rail mounting plate 718 is located higher than the lower surface of the top panel 713.

With this configuration, the upper surface of the support plate can be brought into surface contact with the lower surface of the top panel 713.

The working machine 1 may further include a movable body 85 which is supported with the rail device 84 on the top panel 713 such that the movable body 85 is adjustable in position along a front-rear direction, and another rail device (second rail device 86) which supports the operator's seat 6 on the movable body 85 such that the operator's seat 6 is adjustable in position along the front-rear direction.

A working machine 1 includes a machine body 2, a frame member 206 supported on the machine body 2, a cover member (cover main body 26) which covers one or more apparatuses mounted on the machine body 2, and a hinge 226 with which the cover member 26 is swingably supported on the frame member 206, wherein the cover member 26 includes a connector plate 668 attached to the hinge 226, the hinge 226 includes a movable arm 659 which is supported on the frame member 206 such that the movable arm 659 is swingable up and down, a mounting plate 663 which is fixed on a swinging end of the movable arm 659, and a mounting bolt (first mounting bolt 669A) with which the connector plate 668 is attached to the mounting plate 663, the mounting plate 663 has a hole 664 for insertion of the mounting bolt 669A, the hole being an elongated hole including a mounting area 666 through which the mounting bolt 669A is passed to attach the connector plate 668 to the mounting plate 663, and a guiding area 667 which extends from the mounting area 666 to guide the mounting bolt 669A therethrough, and the guiding area 667 extends upward from the mounting area 666 when the movable arm 659 is in an upward swung position.

With this configuration, when the cover member 26 is hoisted and the connector plate 668 is attached to the mounting plate 663, the mounting bolt 669A can be tightened loosely in the guiding area 667 of the insertion hole 664. That is, the mounting bolt can be tightened loosely above a position at which the cover member 26 is attached. After the mounting bolt is tightened loosely, it is only necessary that the cover member 26 be lowered, the mounting bolt be moved from the guiding area 667 to the mounting area 666, and the mounting bolt be tightened properly in the mounting area 666. This eliminates the need for consideration of interference with other components that would interfere with the cover member 26 at the position at which the cover member 26 is attached, making it easy to mount the cover member 26.

The working machine 1 further includes a cabin 5 disposed at a lateral side of the cover member 26, and a fixed cover 27 which covers a side of the cover member 26 facing the cabin 5, wherein the guiding area 667 extends in a direction away from the cabin 5 when the cover member 26 is in a closed position.

With this configuration, it is possible to cause the cover member 26 to move in a direction away from the fixed cover 27 by a distance corresponding to the guiding area 667. This makes it possible to move the cover member 26 away from the fixed cover 27, and possible to bring the fixed cover 27 out forward from the space between the cabin 5 and the cover member 26.

The hinge 226 includes another mounting bolt (second mounting bolt 669B) other than the mounting bolt 669A, the mounting plate 663 has another hole 665 for insertion of the other mounting bolt 669B, and the other hole 665 is equal in length to the mounting area 666.

With this configuration, even if the mounting bolt 669A in the insertion hole 664 having the guiding area 667 loosens, the other mounting bolt 669B and the other insertion hole 665 restrict the displacement of the cover member 26.

he working machine 1 further includes a damper 555 to bias the cover member 26 in a direction in which the cover member 26 is opened.

With this configuration, the biasing force of the damper 555 can be used to cause the cover member 26 to move a distance corresponding to the guiding area 667.

The working machine 1 further includes a cabin 5 disposed at a lateral side of the cover member 26, and a fixed cover 27 which covers a side of the cover member 26 facing the cabin 5, wherein the damper 555 is positioned such that the damper 555 causes the cover member 26 in an open position to move along the guiding area 667 to cause the cover member 26 to be displaced in a direction away from the cabin 5.

With this configuration, it is possible to cause the cover member 26 to be displaced in a direction away from the cabin 5 using the biasing force of the damper 555, making it possible to easily bring the fixed cover 27 out of the space between the cabin 5 and the cover member 26.

The hinge 226 includes a hinge bracket 654 attached to the frame member 206 and a hinge shaft 658 with which the movable arm 659 is supported on the hinge bracket 654 such that the movable arm 659 is swingable up and down about an axis extending along a machine body front-rear direction K1, and the connector plate 668 is disposed in an upper and machine-body-inward portion of an interior space of the cover member 26 in a closed position and is attached to the mounting plate 663 such that the connector plate 668 is superimposed on the mounting plate 663.

This configuration makes it possible to easily attach the cover member 26 to the frame member 206 such that the cover member 26 is swingable about the axis along the machine body front-rear direction K1.

The working machine 1 further includes a frame body 225 which is provided inside the cover member 26 and which supports the cover member 26, wherein the frame body 225 includes a first rod member 672 which extends in a machine body-forward direction (toward the front of the machine body 2) from the connector plate 668 along the cover member 26, a second rod member 673 which extends in a machine body-outward direction (outward along the width direction of the machine body 2) from the connector plate 668 along the cover member 26, and a third rod member 674 which extends in a machine body-rearward direction (toward the rear of the machine body 2) from the connector plate 668 along the cover member 26.

With this configuration, it is possible to support the front portion to the rear portion of the cover member 26 with the frame body 225.

The cover member 26 includes a main cover 647A and a sub-cover 647B which is attached to the main cover 647A and which differs in color from the main cover 647A.

If the main cover and the sub-cover are integral with each other and to be painted in two colors, an area not to be painted needs be masked. However, when the main cover 647A and the sub-cover 647B are composed of separate parts, it is possible to paint the main cover 647A and the sub-cover 647B separately. This makes it possible to simplify the painting process, and possible to easily paint the cover member 26 in two colors.

A working machine 1 includes a machine body 2, a prime mover E1 mounted on a rear portion of the machine body 2, a hood (hood's rear portion 22B) which covers a rear side of the prime mover E1 and which is configured to be opened and closed, an apparatus which is disposed laterally outward of the prime mover E1 and which is mounted on the machine body 2, and a cover member 26 which is configured to be opened and closed, which covers the apparatus, and which is disposed at a lateral side of the hood 22B, wherein the cover member 26 includes an insertion edge portion 650 which is one of opposite edge portions that is closer to the hood 22B than the other and which is located within the hood 22B when the hood 22B and the cover member 26 are in a closed position.

With this configuration, since the insertion edge portion 650 of the cover member 26 is located within the hood 22B, it is possible to prevent a gap from forming between the hood 22B and the cover member 26 when seen from the rear while the hood 22B and the cover member 26 are in the closed position. This makes it possible to prevent deterioration of external appearance quality.

The hood 22B has an upper portion pivotally supported on an axis extending along a machine body-width direction K2 about which the hood 22B is swingable up and down, and the cover member 26 has an upper portion pivotally supported on an axis extending along a machine body front-rear direction K1 about which the cover member 26 is swingable up and down.

With this configuration, even when a configuration in which the insertion edge portion 650 of the cover member 26 is located within the hood 22B is used, the opening/closing of the hood 22B and the cover member 26 are not hindered.

The working machine 1 further includes a seal abutment member 709 provided inside the hood 22B and the cover member 26, wherein the hood 22B has a first stay wall 642 which is located at a position inward of the insertion edge portion 650 with respect to the machine body and to which a first sealing member 643 is attached, the cover member 26 has a second stay wall 651 which is located at a position outward of the insertion edge portion 650 with respect to the machine body and to which a second sealing member 652 is attached, and the seal abutment member 709 has a first abutment surface 639g on which the first sealing member 643 abuts when the hood 22B is in the closed position and a second abutment surface 639h on which the second sealing member 652 abuts when the cover member 26 is in the closed position.

This configuration makes it possible to prevent the insertion edge portion 650 from abutting on a member which seals the hood 22B.

The hood 22B includes a hood edge portion 644 which extends toward the prime mover E1, the hood edge portion being one of opposite end portions that is closer to the cover member 26 than the other, and the insertion edge portion 650 is located within the hood 22B on the same side of the hood edge portion 644 as the prime mover E1.

This configuration makes it possible to reduce the gap between the hood 22B and the cover member 26 along the front-rear direction.

The working machine 1 further includes a support frame 11 which extends upward from the machine body 2 within the hood 22B and which supports the hood 22B, a cabin 5 disposed forward of the hood 22B, and a fixed hood 22C which is disposed between the cabin 5 and the hood 22B, wherein the fixed hood 22C is attached to the support frame 11 and includes a third sealing member 636 on which an upper front portion of the hood 22B abuts.

This configuration makes it possible to simplify the shape of the sealing structure while ensuring the sealing between the cabin 5 and the hood 22B.

The support frame 11 includes a plurality of leg bodies (first front leg 57L, second front leg 57R, first rear leg 58L, second rear leg 58R), an upper plate 59 which is fixed to upper portions of the plurality of leg bodies 57L, 57R, 58L, and 58R and which is for placement of a rear portion of the cabin 5, and a plate member 20 which is fixed to a rear portion of the upper plate 59 such that the plate member 20 projects upward, the fixed hood 22C includes an upright plate part 22Ca which is disposed forward of the plate member 20 and rearward of the cabin 5, a fourth sealing member 634 which is attached to a lower portion of the upright plate part 22Ca and which abuts on the upper plate 59, and an upper plate part 22Cb which extends rearward from an upper portion of the upright plate part 22Ca beyond the plate member 20, and the third sealing member 636 is attached to a rear portion of the upper plate part 22Cb.

This configuration makes it possible to provide more enhanced sealing between the cabin 5 and the hood 22B.

A working machine 1 includes a machine body 2, a prime mover E1 mounted on the machine body 2, a partition wall member 22A which separates a prime mover chamber E2 housing the prime mover E1 and an area located diagonally upward and forward of the prime mover chamber E2, a partition plate 47 which is disposed below the partition wall member 22A and which partitions a lower front portion of the prime mover chamber E2, and a clamp 683 which is provided on an upper portion of the partition plate 47 and which clamps pipes (first to fourth pipes 684A to 684D) routed from the prime mover chamber E2 to an area located forward of the partition wall member 22A, wherein the partition wall member 22A has an access opening 71 which is located above the clamp 683 and which allows access from the area forward of the partition wall member to a side of the clamp 683 facing the prime mover chamber, and the clamp 683 is configured to be detached toward the prime mover chamber E2.

With this configuration, the clamp 683 can be accessed through the access opening 71 in the partition wall member 22A and can be detached toward the prime mover chamber E2. This makes it possible to detach the clamp 683 without having to lower the partition wall member 22A.

The working machine 1 further includes a stay 686 fixed to a back surface of the partition plate 47 and a holding member 687 which is attached to the stay 686 from above and which holds the clamp 683.

With this configuration, the holding member 687 can be accessed from above and detached, making it possible to easily detach the clamp 683.

The clamp 683 includes an upper first member 683A which abuts on the partition plate 47 from rear and which is movable rearward and a lower second member 683B which is engaged with the partition plate 47 and which together with the first member 683A clamps the pipes 684A to 684D, and the holding member 687 includes a holding portion 692 to hold the first member 683A and a restricting portion 694 to restrict rearward movement of the first member 683A.

With this configuration, merely by detaching the first member 683A of the clamp 683, it is possible to perform replacement of the pipes 684A to 684D.

The partition plate 47 has a cutout recess 685 which is in the form of a groove having an open top and which has a bottom surface 685a, one side surface 685b extending upward from one edge of the bottom surface 685a, and an opposite side surface 685c extending upward from the opposite edge of the bottom surface 685a, the clamp 683 is inserted in the cutout recess 685 and has a first recess 698 in a side facing the one side surface 685b, a second recess 699 in a side facing the opposite side surface 685c, and a third recess 700 in a side facing the bottom surface 685a, the first recess 698 has a first forward-facing surface 698a which abuts on a back surface of a first wall portion 47a having the one side surface 685b, a first downward-facing surface 698b which extends forward from an upper edge of the first forward-facing surface 698a and abuts on an upper surface of the first wall portion 47a, and a first side-facing surface 698c which extends forward from one of opposite edges of the first forward-facing surface 698a that is closer to the one side surface 685b than the other and abuts on the one side surface 685b, the second recess 699 has a second forward-facing surface 699a which abuts on a back surface of a second wall portion 47b having the opposite side surface 685c, a second downward-facing surface 699b which extends forward from an upper edge of the second forward-facing surface 699a and abuts on an upper surface of the second wall portion 47b, and a second side-facing surface 699c which extends forward from one of opposite edges of the second forward-facing surface 699a that is closer to the opposite side surface 685c than the other and abuts on the opposite side surface 685c, the third recess 700 has a third forward-facing surface 700a which connects together lower portions of the first forward-facing surface 698a and the second forward-facing surface 699a and which abuts on a back surface of a third wall portion 47c having the bottom surface 685a, a third downward-facing surface 700b which extends forward from an upper edge of the third forward-facing surface 700a and which abuts on the bottom surface 685a, and a fourth downward-facing surface 700c which is located forward of the third downward-facing surface 700b and which is located lower than the third downward-facing surface 700b, and the clamp 683 is divided by a dividing surface which divides each of the first and second recesses 698 and 699 into upper and lower parts.

With this configuration, it is possible to easily detach the clamp 683 while ensuring tight sealing between the clamp 683 and the partition plate 47.

The clamp 683 includes a plurality of pipe passage portions (first to fourth pipe passage portions 701A to 701D) for passage of the pipes 684A to 684D and is divided into upper and lower parts by a dividing surface which divides each of the plurality of pipe passage portions 701A to 701D into two, and the plurality of pipe passage portions 701A to 701D are provided such that adjacent ones of the plurality of pipe passage portions 701A to 701D are displaced from each other along a top-bottom direction.

This configuration makes it possible to provide a clamp 683 that is compact in width.

The working machine 1 further includes a cabin 5 provided on the opposite side of the partition wall member 22A from the prime mover chamber E2, and an air conditioner main body 136 provided in the cabin 5, wherein the clamp 683 clamps the pipes 684A to 684D connected to the air conditioner main body 136.

This configuration makes it possible to perform replacement of the pipes 684A to 684D connected to the air conditioner main body 136 without having to lower the partition wall member 22A.

A working machine 1 includes a machine body 2, a prime mover E1 mounted on a rear portion of the machine body 2, a hood (hood's rear portion 22B) which covers a rear side of the prime mover E1 such that the hood 22B is openable and closable, a weight 46 provided below the hood 22B, and a camera 608 configured to capture an image of an area rearward of the machine body 2, wherein the camera 608 is attached to an outside of the hood 22B such that an angle of the camera 608 is adjustable to include the weight 46 within a field of view of the camera 608.

With this configuration, since the camera 608 is attached to the outside of the hood 22B, it is possible to easily set the angle of the camera 608.

The working machine 1 further includes a camera cover 609 which covers the camera 608, and the camera cover 609 is attached from an inside of the hood 22B.

This configuration makes it possible to prevent the camera 608 from being detached outward from the hood 22B.

The hood 22B includes a mount (first mount 611) which includes a sign mounting portion 613 configured for attachment of a sign member (emblem 612), the mount 611 includes a camera mounting portion 614 for attachment of the camera 608, and the camera cover 609 is configured to be attached to the sign mounting portion 613 instead of the sign member 612.

This makes it possible to attach the camera 608 using the mount 611 for attachment of the sign member 612.

The hood 22B includes an upper wall 22Da and an extension wall 22Db which extends from a rear edge of the upper wall 22Da and slopes rearward in a downward direction, and the mount 611 is provided on the extension wall 22Db.

This configuration makes it possible to easily set the angle at which the camera 608 is attached so that the weight 46 falls within the field of view of the camera 608.

The camera cover 609 includes another mount (second mount 627) for attachment of the sign member 612.

This configuration makes it possible to attach the sign member 612 to the camera cover 609 and eliminates the need for separately providing, to the hood, a mount for use in cases where the camera 608 is attached.

The camera cover 609 includes a cover main body 623 which covers the camera 608, a cover bracket 624 for attachment to the sign mounting portion 613, a protruding part 625 which extends from the cover bracket 624 in machine body-width directions K2, and a trim 626 which is attached to the protruding part 625 and which abuts on the hood 22B.

With this configuration, since the trim 626 abuts on the hood 22B at opposite sides of the cover main body 623 along the machine body-width directions K2, it is possible to prevent the swaying of the cover main body 623.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a machine body;
   a frame member supported on the machine body;
   a cover member which covers one or more apparatuses mounted on the machine body; and
   a hinge with which the cover member is swingably supported on the frame member, wherein
   the cover member includes a connector plate attached to the hinge,
   the hinge includes: a movable arm which is supported on the frame member such that the movable arm is swingable up and down; a mounting plate which is fixed on a swinging end of the movable arm; and a mounting bolt with which the connector plate is attached to the mounting plate,
   the mounting plate has a hole for insertion of the mounting bolt, the hole being an elongated hole including: a mounting area through which the mounting bolt is passed to attach the connector plate to the mounting plate; and a guiding area which extends from the mounting area to guide the mounting bolt therethrough, and
   the guiding area extends upward from the mounting area when the movable arm is in an upward swung position.

2. The working machine according to claim 1, further comprising:
   a cabin disposed at a lateral side of the cover member; and
   a fixed cover which covers a side of the cover member facing the cabin, wherein
   the guiding area extends in a direction away from the cabin when the cover member is in a closed position.

3. The working machine according to claim 1, wherein:
   the hinge includes another mounting bolt other than the mounting bolt;
   the mounting plate has another hole for insertion of the other mounting bolt; and
   the other hole is equal in length to the mounting area.

4. The working machine according to claim 1, further comprising:
   a damper to bias the cover member in a direction in which the cover member is opened.

5. The working machine according to claim 4, further comprising:
   a cabin disposed at a lateral side of the cover member, and
   a fixed cover which covers a side of the cover member facing the cabin, wherein
   the damper is positioned such that the damper causes the cover member in an open position to move along the guiding area to cause the cover member to be displaced in a direction away from the cabin.

6. The working machine according to claim 1, wherein:
the hinge includes a hinge bracket attached to the frame member and a hinge shaft with which the movable arm is supported on the hinge bracket such that the movable arm is swingable up and down about an axis extending along a machine body front-rear direction; and
the connector plate is disposed in an upper and machine-body-inward portion of an interior space of the cover member in a closed position and is attached to the mounting plate such that the connector plate is superimposed on the mounting plate.

7. The working machine according to claim 1, further comprising:
a frame body which is provided inside the cover member and which supports the cover member, wherein
the frame body includes a first rod member which extends in a machine body-forward direction from the connector plate along the cover member, a second rod member which extends in a machine body-outward direction from the connector plate along the cover member, and a third rod member which extends in a machine body-rearward direction from the connector plate along the cover member.

8. The working machine according to claim 1, wherein the cover member includes a main cover and a sub-cover which is attached to the main cover and which differs in color from the main cover.

9. The working machine according to claim 1, further comprising:
a prime mover mounted on a rear portion of the machine body; and
a hood which covers a rear side of the prime mover and which is configured to be opened and closed, wherein
the cover member is configured to be opened and closed, is disposed at a lateral side of the hood and laterally outward of the prime mover, and includes an insertion edge portion which is one of opposite edge portions that is closer to the hood than the other and which is located within the hood when the hood and the cover member are in a closed position.

10. A working machine comprising:
a machine body;
a prime mover mounted on a rear portion of the machine body;
a hood which covers a rear side of the prime mover and which is configured to be opened and closed;
a cover member which is configured to be opened and closed, which is disposed laterally outward of the prime mover, which covers one or more apparatuses mounted on the machine body, and which is disposed at a lateral side of the hood; and
a seal abutment member provided inside the hood and the cover member, wherein
the cover member includes an insertion edge portion which is one of opposite edge portions that is closer to the hood than the other and which is located within the hood when the hood and the cover member are in a closed position,
the hood has a first stay wall which, when the hood and the cover member are in the closed position, is located at a position inward of the insertion edge portion with respect to the machine body and to which a first sealing member is attached,
the seal abutment member has a first abutment surface on which the first sealing member abuts when the hood is in the closed position, and
the insertion edge portion is located between the first abutment surface and one of opposite edge portions of the hood that is closer to the cover member when the hood and the cover member are in the closed position.

11. A working machine comprising:
a machine body;
a prime mover mounted on a rear portion of the machine body;
a hood which covers a rear side of the prime mover and which is configured to be opened and closed; and
a cover member which is configured to be opened and closed, which is disposed laterally outward of the prime mover, which covers one or more apparatuses mounted on the machine body, and which is disposed at a lateral side of the hood; wherein
the hood has an upper portion pivotally supported on an axis extending along a machine body-width direction about which the hood is swingable up and down;
the cover member has an upper portion pivotally supported on an axis extending along a machine body front-rear direction about which the cover member is swingable up and down; and
the cover member includes an insertion edge portion which is one of opposite edge portions that is closer to the hood than the other and which is located within the hood when the hood and the cover member are in a closed position.

12. The working machine according to claim 10, wherein the cover member has a second stay wall which is located at a position outward of the insertion edge portion with respect to the machine body and to which a second sealing member is attached, and
the seal abutment member has a second abutment surface on which the second sealing member abuts when the cover member is in the closed position.

13. The working machine according to claim 10, wherein:
the hood includes a hood edge portion which extends toward the prime mover, the hood edge portion being one of opposite end portions that is closer to the cover member than the other; and
the insertion edge portion is located within the hood on the same side of the hood edge portion as the prime mover.

14. The working machine according to claim 12, further comprising:
a support frame which extends upward from the machine body within the hood and which supports the hood;
a cabin disposed forward of the hood; and
a fixed hood which is disposed between the cabin and the hood, wherein
the fixed hood is attached to the support frame and includes a third sealing member on which an upper front portion of the hood abuts.

15. The working machine according to claim 14, wherein:
the support frame includes a plurality of leg bodies, an upper plate which is fixed to upper portions of the plurality of leg bodies and which is for placement of a rear portion of the cabin, and a plate member which is fixed to a rear portion of the upper plate such that the plate member projects upward;
the fixed hood includes an upright plate part which is disposed forward of the plate member and rearward of the cabin, a fourth sealing member which is attached to a lower portion of the upright plate part and which abuts on the upper plate, and an upper plate part which extends rearward from an upper portion of the upright plate part beyond the plate member; and the third sealing member is attached to a rear portion of the upper plate part.

* * * * *